(12) United States Patent
Foster et al.

(10) Patent No.: US 12,473,898 B1
(45) Date of Patent: *Nov. 18, 2025

(54) LINEAR DRIVE ASSEMBLY

(71) Applicant: Kerr Machine Co., Sulphur, OK (US)

(72) Inventors: Kelcy Jake Foster, Sulphur, OK (US); Micheal Cole Thomas, Azle, TX (US); Christopher Todd Barnett, Stratford, OK (US); Nicholas Son, Davis, OK (US); John Keith, Ardmore, OK (US); Guy J. Lapointe, Sulphur, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/004,636

(22) Filed: Dec. 30, 2024

Related U.S. Application Data

(63) Continuation of application No. 18/628,879, filed on Apr. 8, 2024, now Pat. No. 12,180,956, which is a continuation of application No. 18/305,594, filed on Apr. 24, 2023, now Pat. No. 11,953,000.

(60) Provisional application No. 63/487,951, filed on Mar. 2, 2023, provisional application No. 63/478,518, filed on Jan. 5, 2023, provisional application No. 63/431,842, filed on Dec. 12, 2022, provisional application No. 63/426,865, filed on Nov. 21, 2022, provisional application No. 63/419,014, filed on Oct.

(Continued)

(51) Int. Cl.
| | | |
|---|---|---|
| *F04B 53/14* | (2006.01) | |
| *F04B 9/02* | (2006.01) | |
| *F04B 19/04* | (2006.01) | |
| *F16C 5/00* | (2006.01) | |
| *F16H 21/04* | (2006.01) | |
| *F16H 21/18* | (2006.01) | |
| *F16H 57/04* | (2010.01) | |
| *E21B 43/26* | (2006.01) | |

(52) U.S. Cl.
CPC ............... *F04B 9/02* (2013.01); *F04B 19/04* (2013.01); *F04B 53/146* (2013.01); *F16C 5/00* (2013.01); *F16H 21/04* (2013.01); *F16H 21/18* (2013.01); *F16H 57/0421* (2013.01); *E21B 43/2607* (2020.05)

(58) Field of Classification Search
CPC .... F04B 39/0022; F04B 53/14; F04B 53/144; F04B 53/146; F16J 1/12; F16C 5/00
See application file for complete search history.

(56) References Cited

U.S. PATENT DOCUMENTS

| | | |
|---|---|---|
| 1,836,498 A | 12/1931 | Gustav |
| 1,873,482 A | 8/1932 | Rogatchoff |

(Continued)

FOREIGN PATENT DOCUMENTS

| | | |
|---|---|---|
| EP | 2494140 A1 | 5/2017 |
| GB | 1178682 A | 1/1970 |

*Primary Examiner* — Michael Leslie
(74) *Attorney, Agent, or Firm* — Tomlinson McKinstry, P.C.

(57) ABSTRACT

A linear drive assembly configured for use within a power end assembly. The linear drive assembly is configured to interconnect a crankshaft and a pony rod and comprises a crosshead assembly attached to a connecting rod assembly. In one or more embodiments disclosed herein, the connecting rod assembly is configured to attach to opposite sides of the crosshead assembly so that no portion of the connecting rod assembly is disposed within an interior of a crosshead included in the crosshead assembly.

20 Claims, 115 Drawing Sheets

Related U.S. Application Data 25, 2022, provisional application No. 63/343,180, filed on May 18, 2022, provisional application No. 63/334,355, filed on Apr. 25, 2022.

(56) References Cited

U.S. PATENT DOCUMENTS

| | | | |
|---|---|---|---|
| 2,269,680 A | 1/1942 | Naab | |
| 2,771,846 A | 11/1956 | Horton et al. | |
| 2,957,422 A | 10/1960 | Loeber | |
| 3,005,412 A | 10/1961 | Camp | |
| 4,470,771 A | 9/1984 | Hall et al. | |
| 4,494,415 A | 1/1985 | Elliston | |
| 4,553,298 A | 11/1985 | Grable | |
| 4,566,370 A | 1/1986 | Hanafi | |
| 4,593,608 A | 6/1986 | Corey et al. | |
| 4,872,395 A | 10/1989 | Bennitt et al. | |
| 5,031,512 A | 7/1991 | Graziani | |
| 5,507,219 A | 4/1996 | Stogner | |
| 7,032,690 B2 | 4/2006 | Ramey | |
| 7,610,847 B2 | 11/2009 | McKelroy | |
| 7,811,064 B2 | 10/2010 | Allen | |
| 8,083,504 B2 | 12/2011 | Williams et al. | |
| 8,528,462 B2 | 9/2013 | Pacht | |
| 8,701,546 B2 | 4/2014 | Pacht | |
| 10,267,308 B2 | 4/2019 | Bagagli et al. | |
| 10,352,321 B2 | 7/2019 | Byrne et al. | |
| 10,393,113 B2 | 8/2019 | Wagner | |
| 10,677,380 B1 | 6/2020 | Surjaatmadja et al. | |
| 10,871,227 B1 | 12/2020 | Belshan et al. | |
| 11,162,479 B2 | 11/2021 | Thomas et al. | |
| 11,208,996 B2 | 12/2021 | Foster et al. | |
| 11,635,068 B2 | 4/2023 | Foster et al. | |
| 11,953,000 B2 | 4/2024 | Foster et al. | |
| 12,180,956 B2 * | 12/2024 | Foster | F16H 21/18 |
| 2008/0006148 A1 | 1/2008 | McKelroy | |
| 2010/0038070 A1 | 2/2010 | Blanco et al. | |
| 2010/0129249 A1 | 5/2010 | Bianchi | |
| 2012/0141308 A1 | 6/2012 | Saini | |
| 2014/0348677 A1 | 11/2014 | Moeller et al. | |
| 2015/0132152 A1 | 5/2015 | Lazzara | |
| 2015/0132157 A1 | 5/2015 | Whaley et al. | |
| 2015/0159647 A1 | 6/2015 | Dille et al. | |
| 2016/0090980 A1 | 3/2016 | Howard et al. | |
| 2016/0208797 A1 | 7/2016 | Ladd | |
| 2016/0369792 A1 | 12/2016 | Wagner | |
| 2017/0102025 A1 * | 4/2017 | Johansson | F16C 19/24 |
| 2017/0211565 A1 | 7/2017 | Morreale | |
| 2018/0045187 A1 | 2/2018 | Nagel et al. | |
| 2018/0193895 A1 | 7/2018 | Johnson | |
| 2019/0145391 A1 | 5/2019 | Davids | |
| 2019/0277279 A1 | 9/2019 | Byrne et al. | |
| 2019/0277341 A1 | 9/2019 | Byrne et al. | |
| 2020/0362678 A1 | 11/2020 | Lesko | |
| 2020/0386222 A1 | 12/2020 | Pham et al. | |
| 2021/0148346 A1 | 5/2021 | Foster et al. | |
| 2022/0389916 A1 | 12/2022 | Keith et al. | |
| 2023/0213065 A1 | 7/2023 | Zhang | |

* cited by examiner

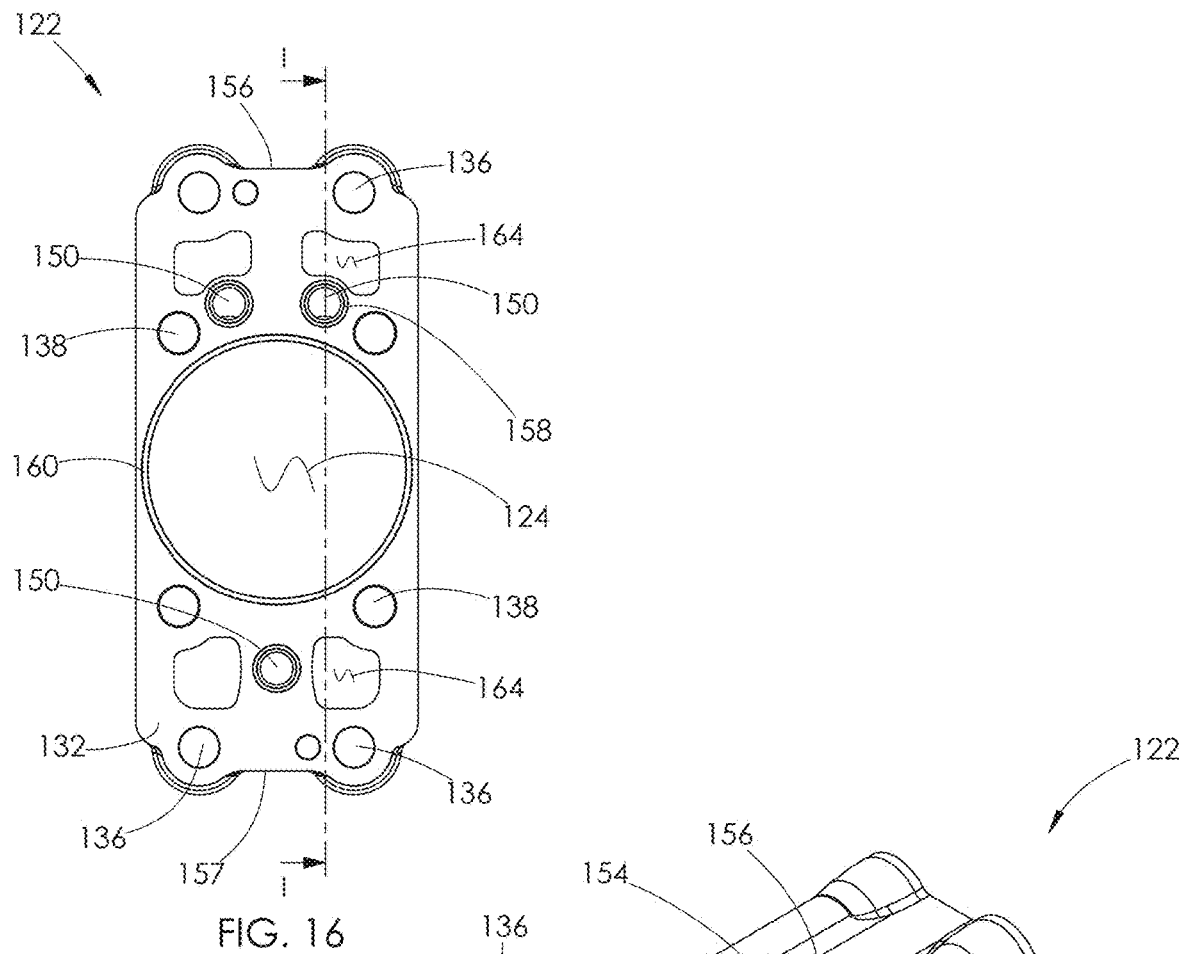
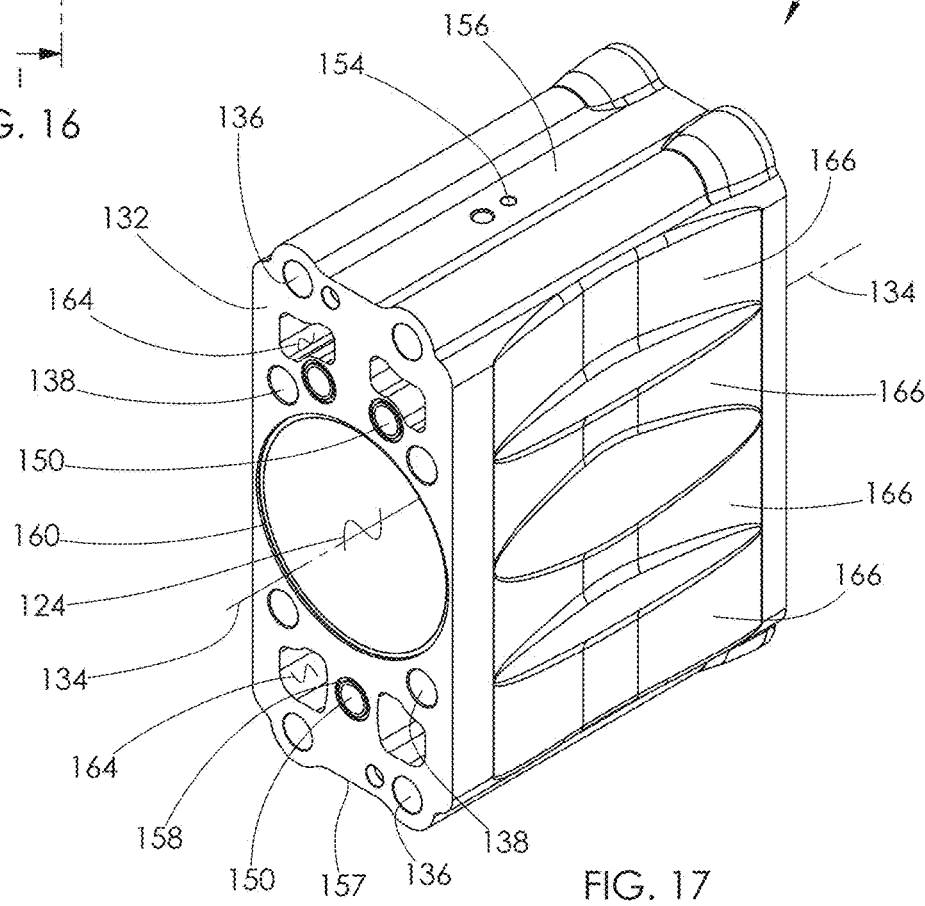

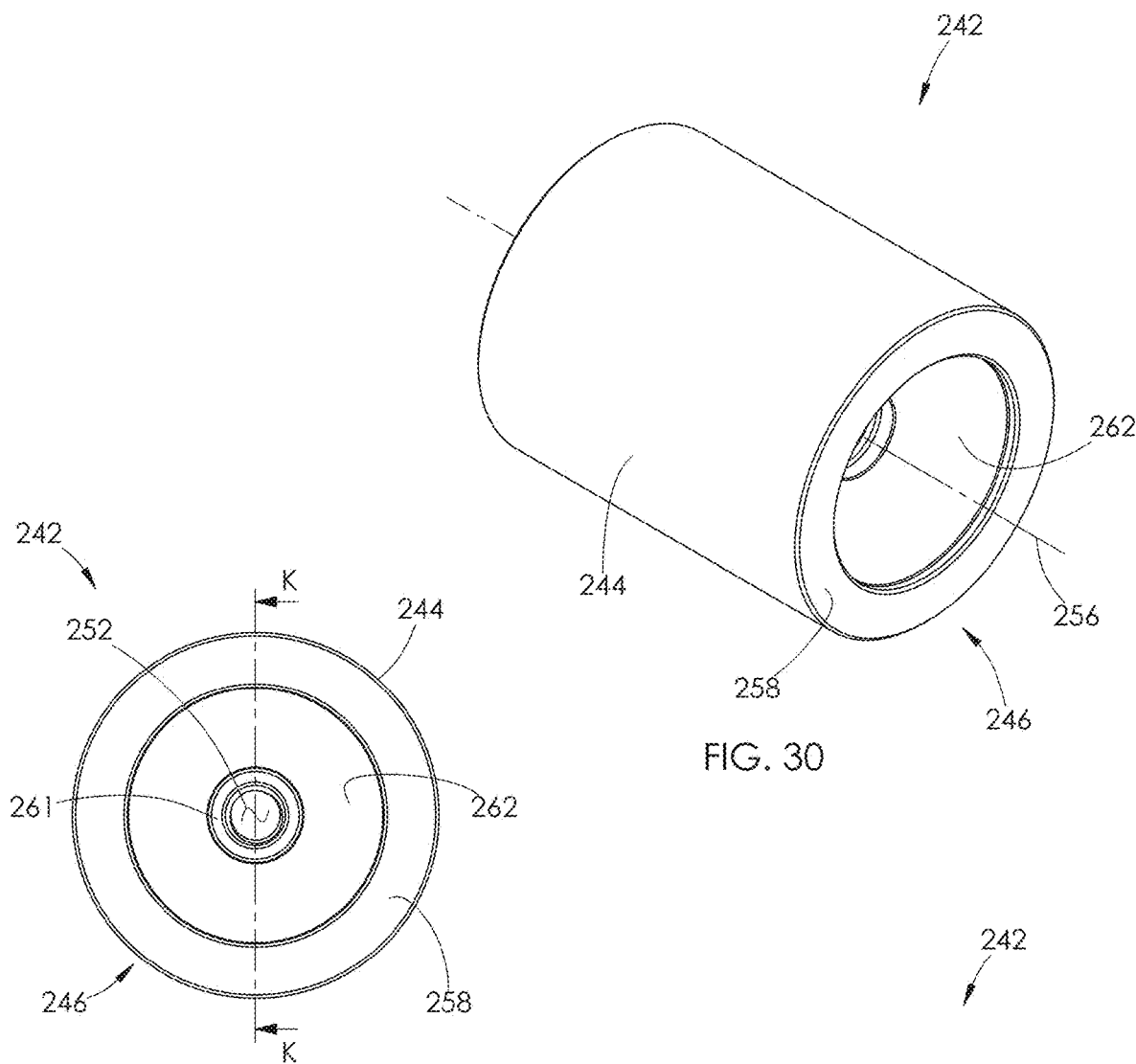
FIG. 30
FIG. 31
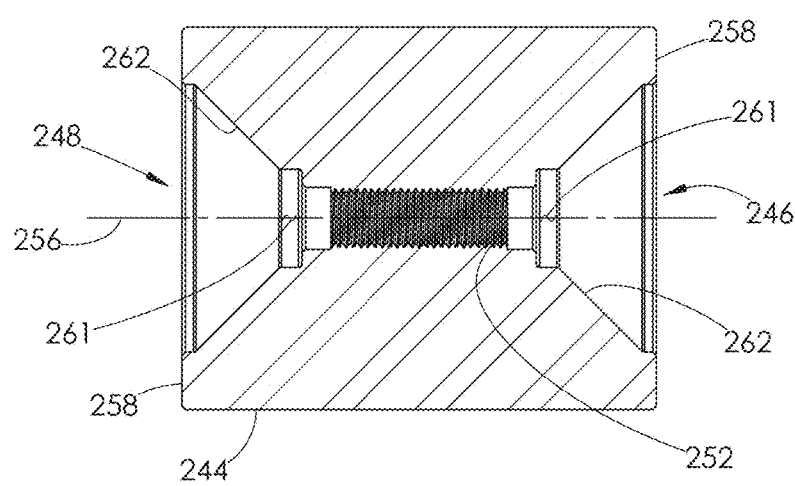
FIG. 32

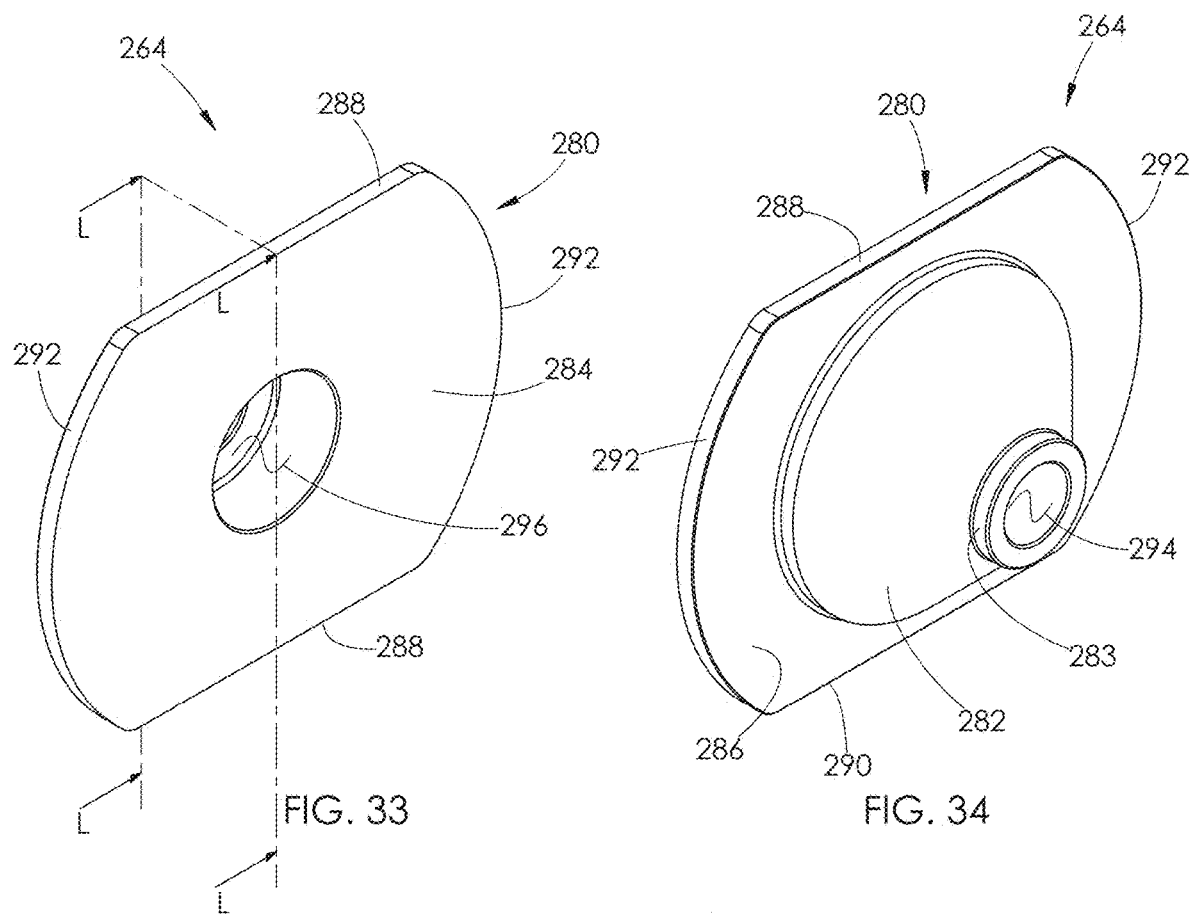
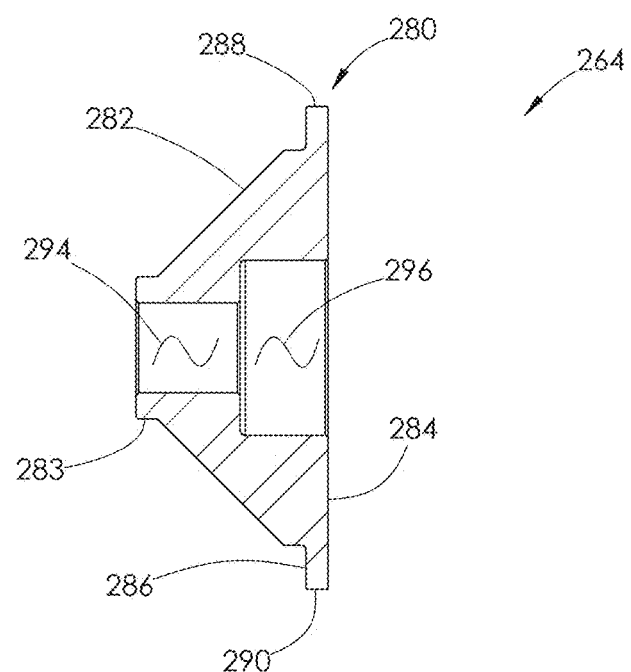
FIG. 33
FIG. 34
FIG. 35

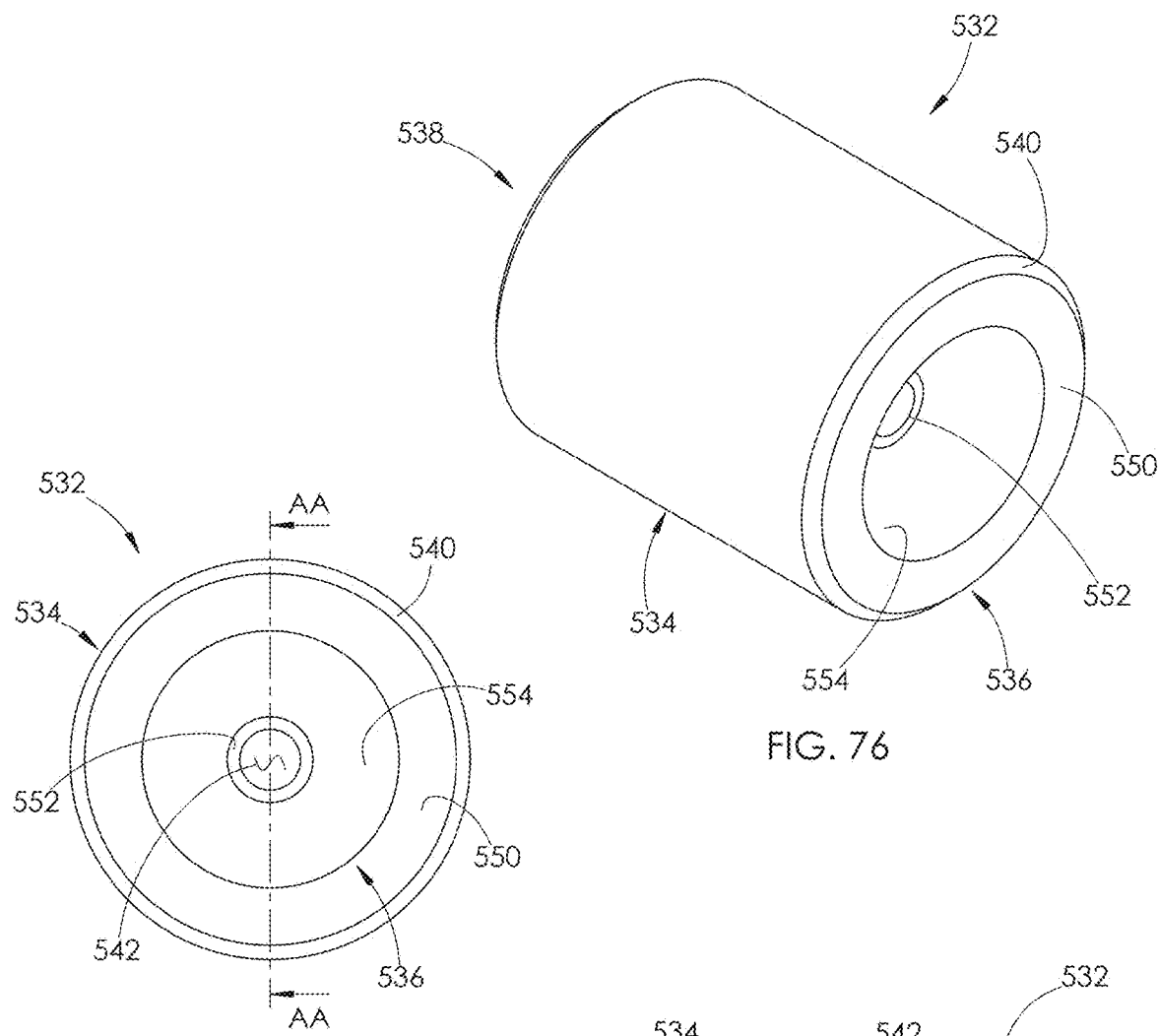
FIG. 76
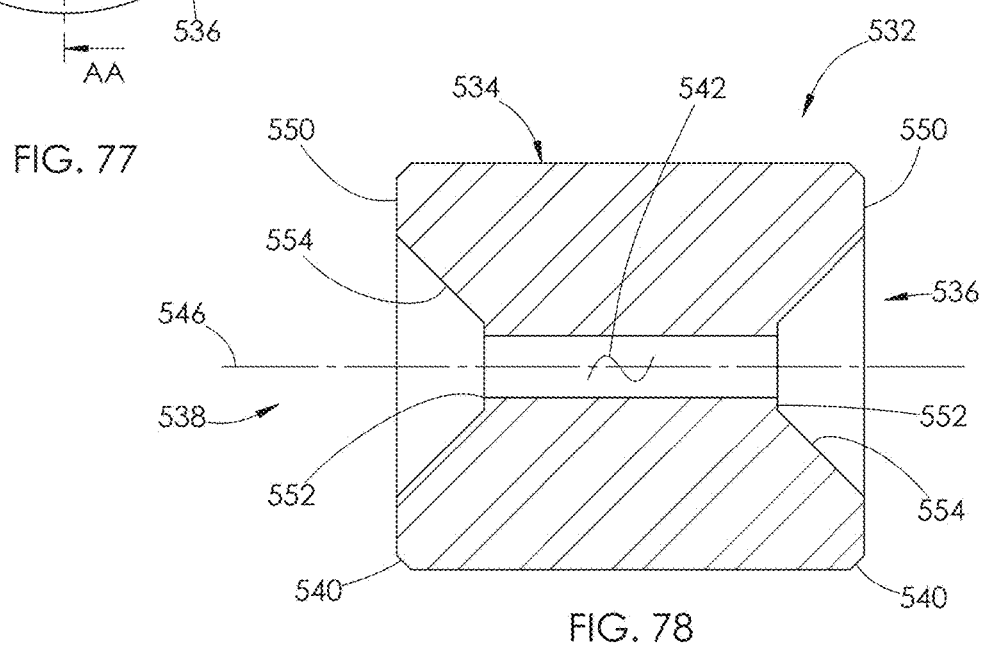
FIG. 77
FIG. 78

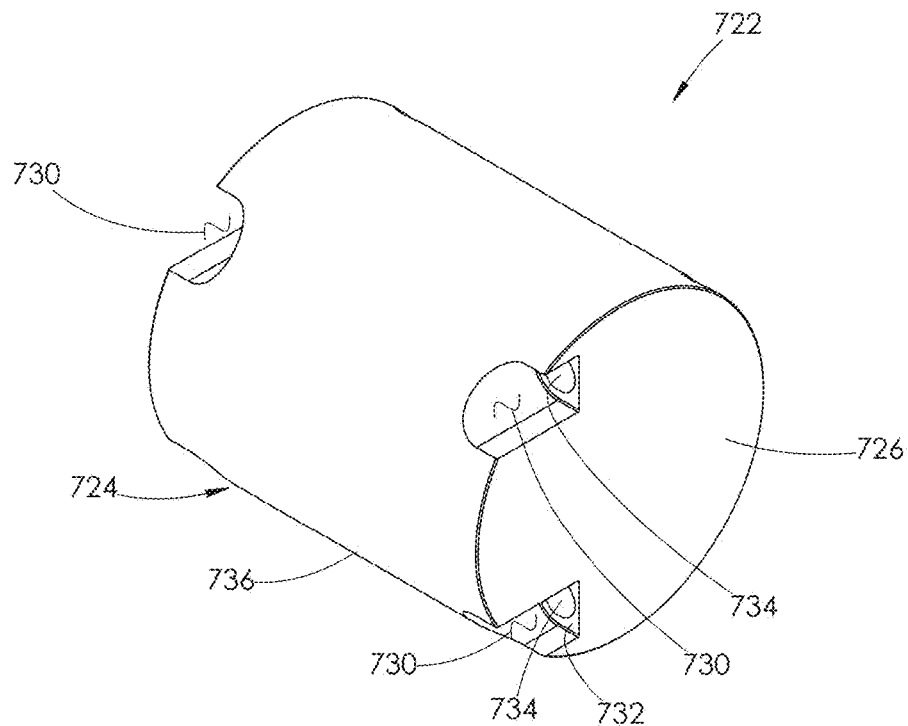
FIG. 103
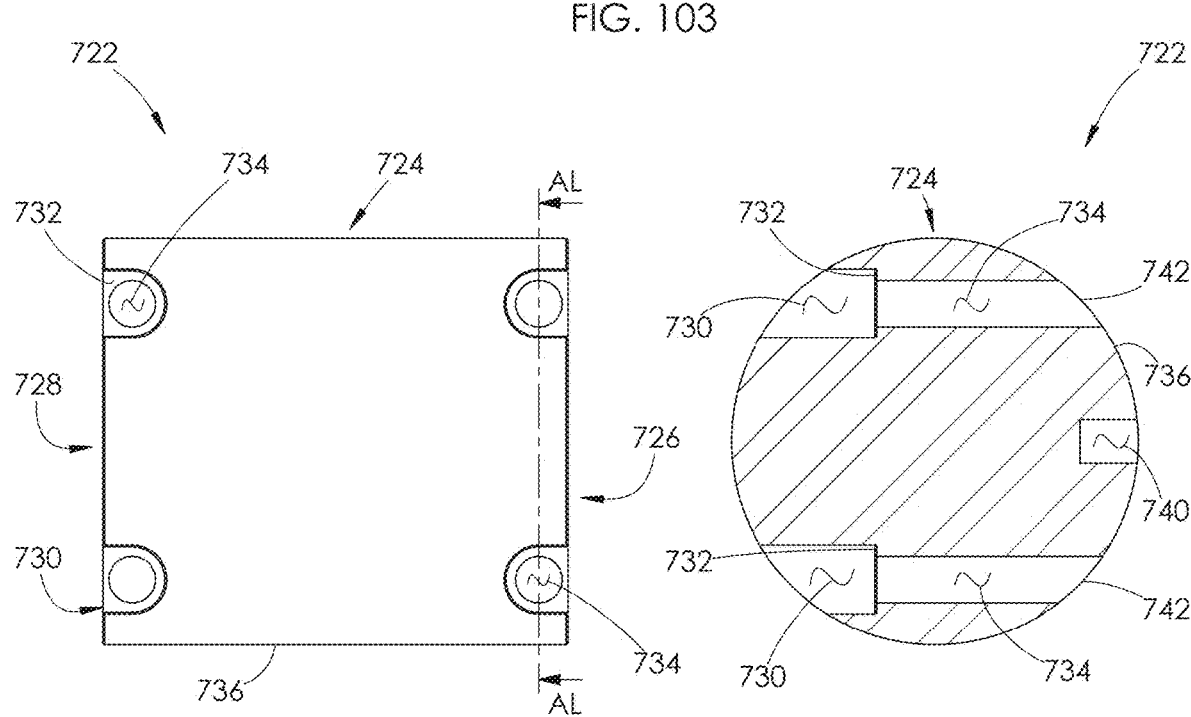
FIG. 104
FIG. 105

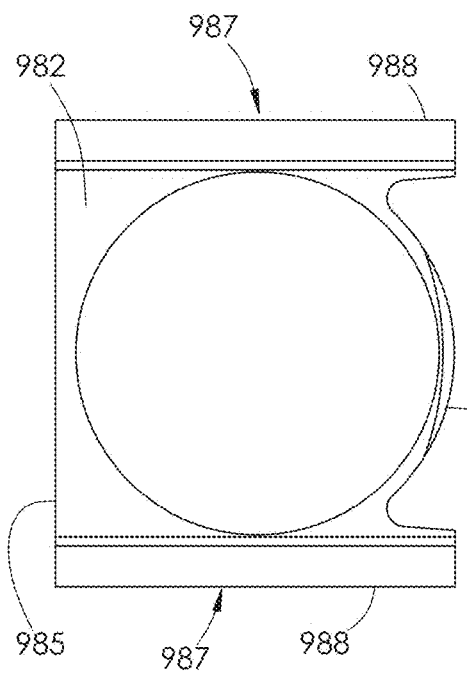
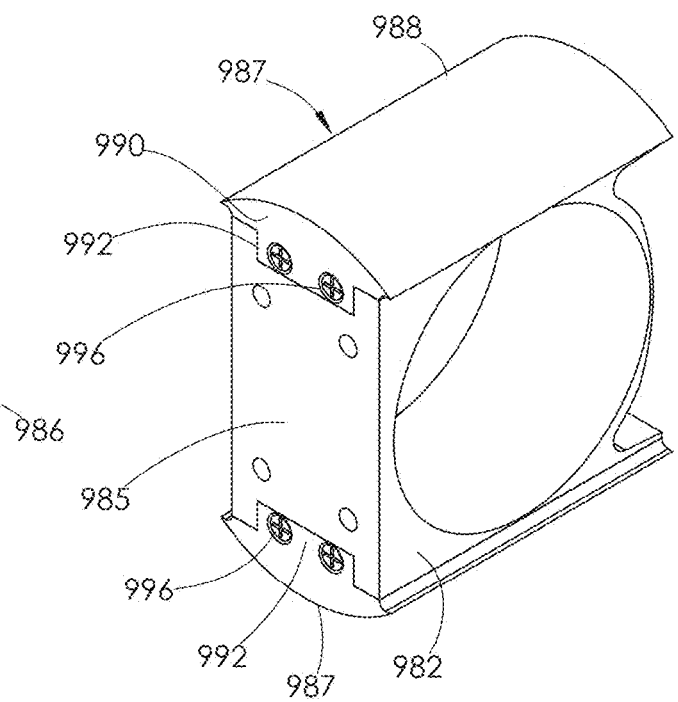
FIG. 136    FIG. 137
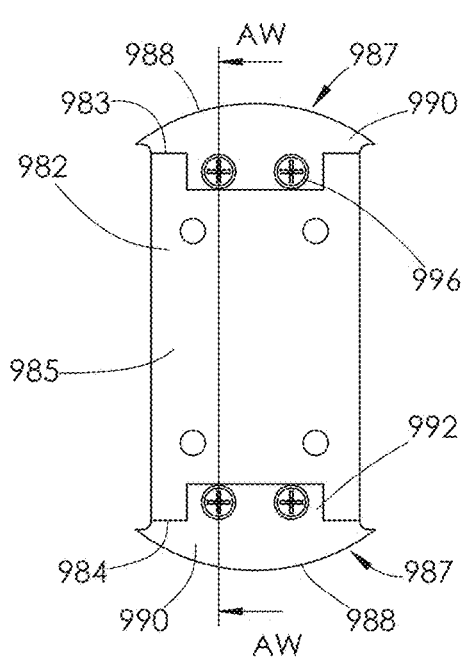
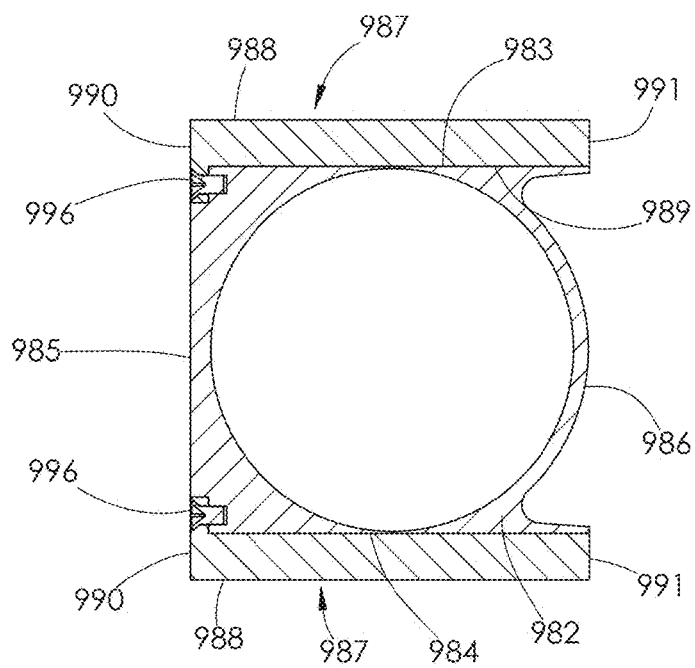
FIG. 138    FIG. 139

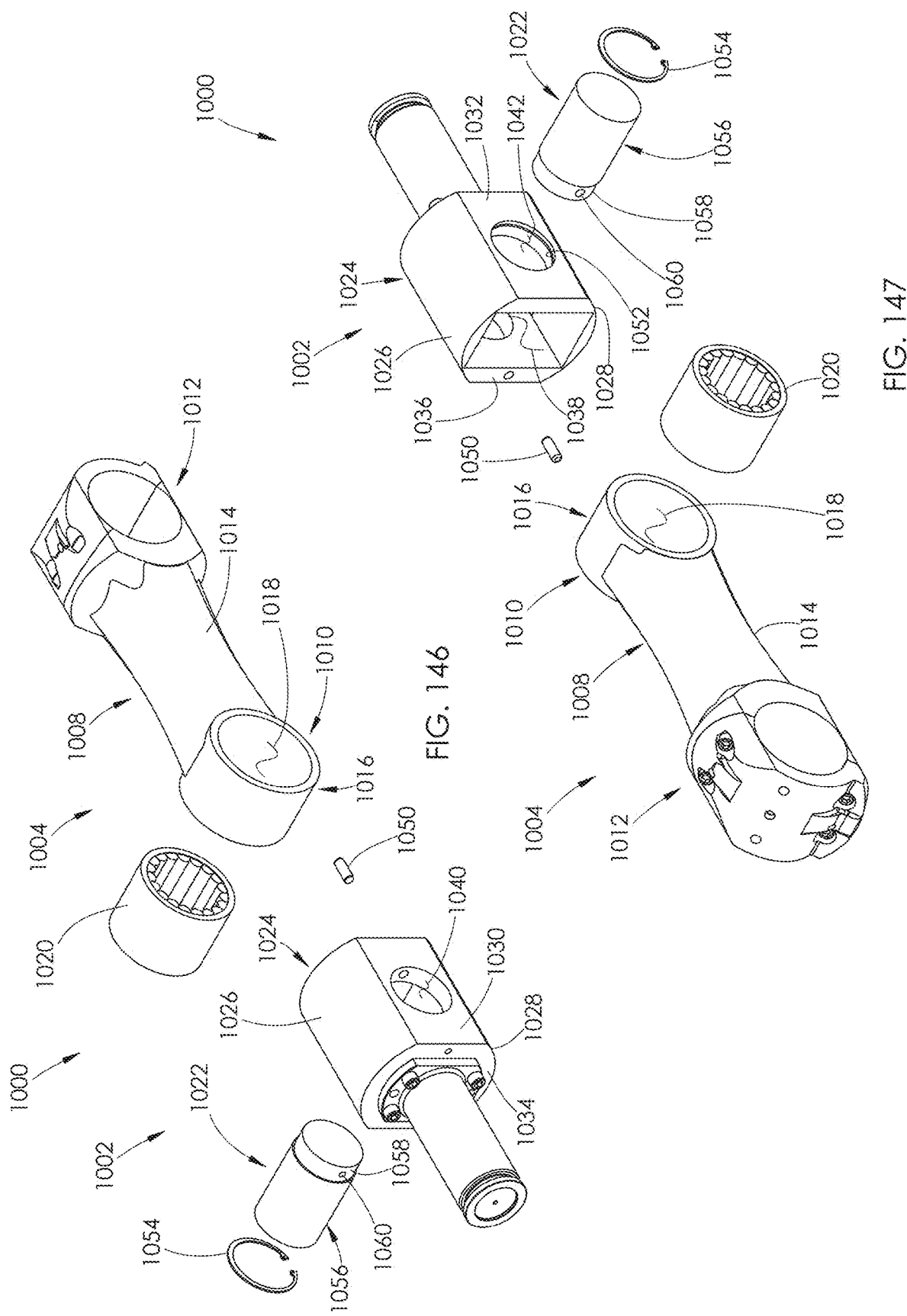

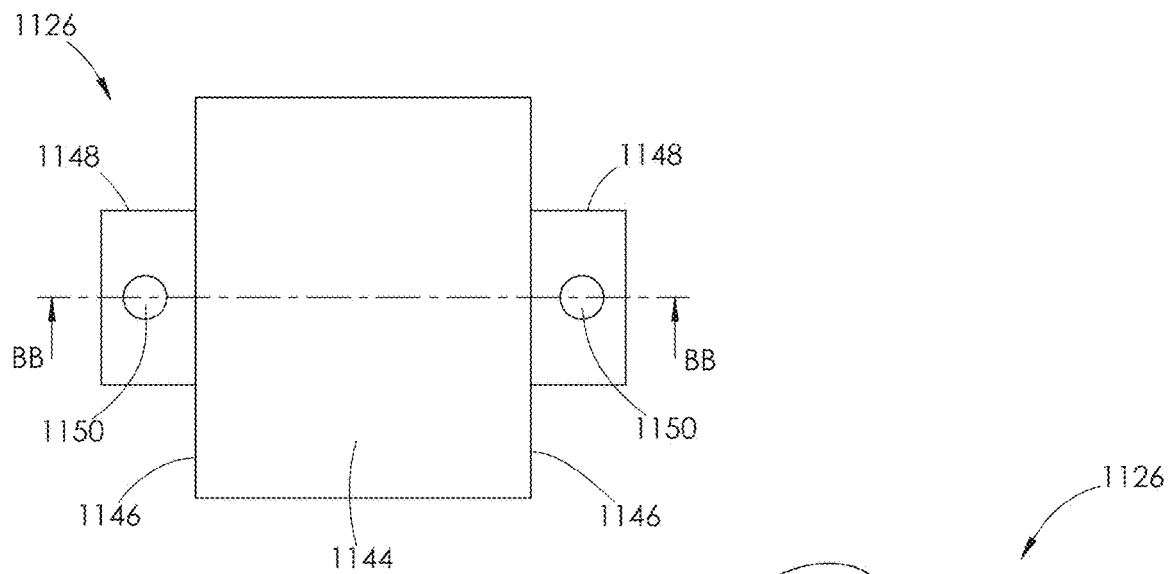
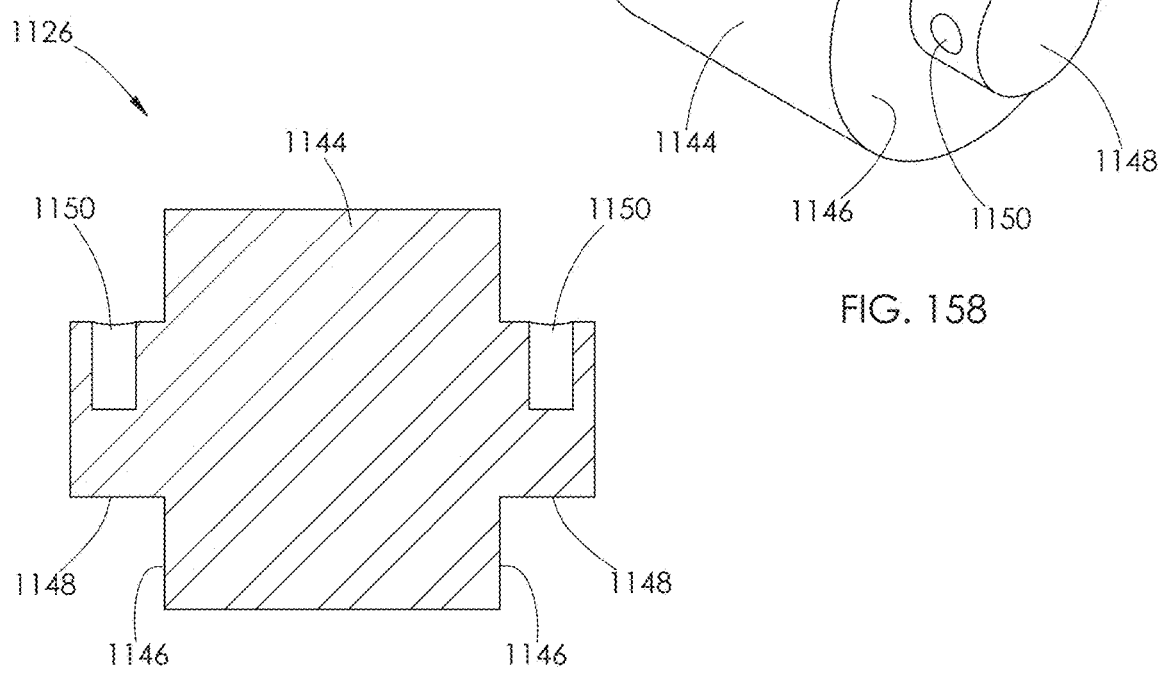
FIG. 157
FIG. 158
FIG. 159

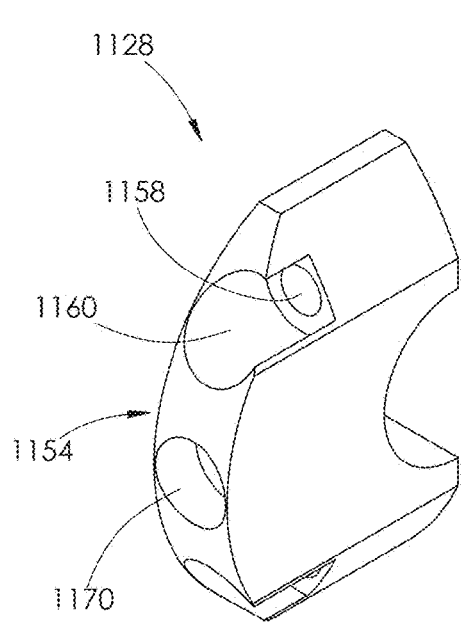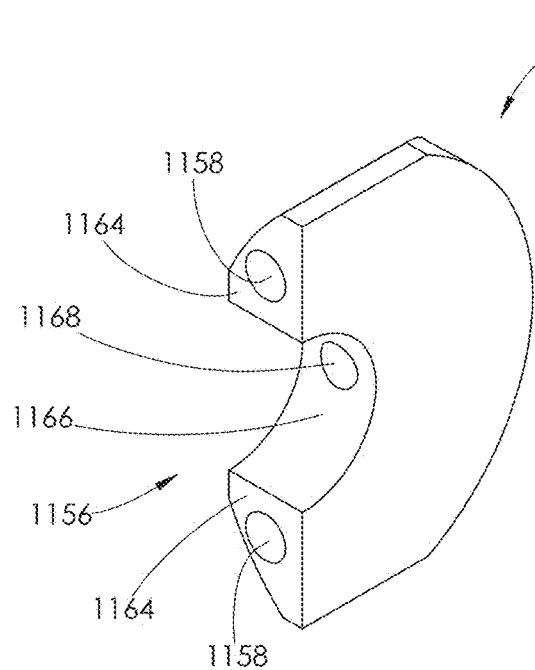
FIG. 160  FIG. 161
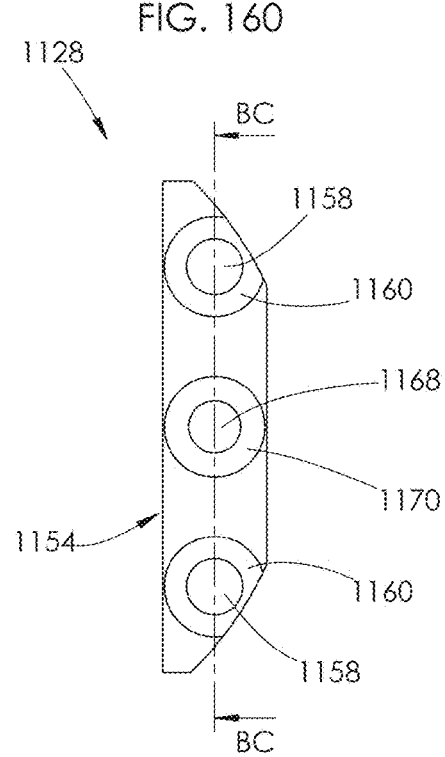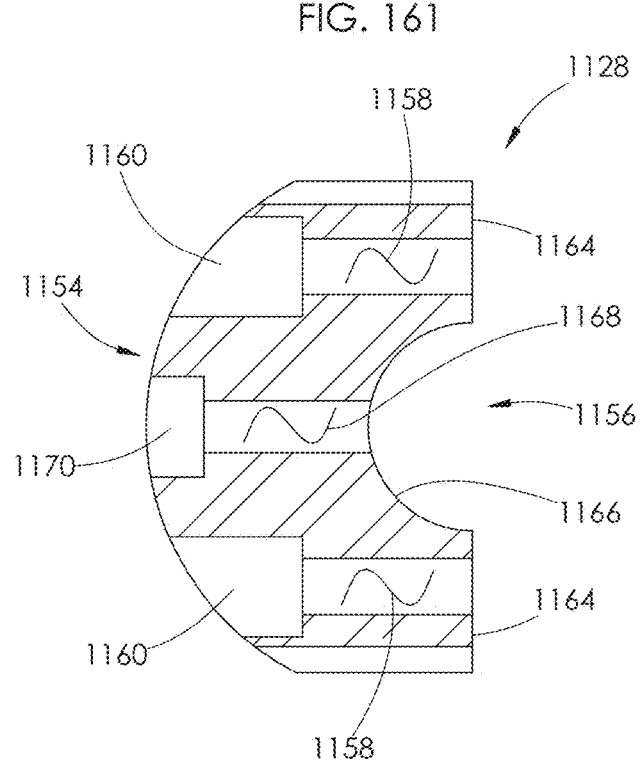
FIG. 162  FIG. 163

LINEAR DRIVE ASSEMBLY

RELATED APPLICATIONS

This application claims the benefit of the following U.S. provisional patent applications: Ser. No. 63/334,355, authored by Foster et al., and filed on Apr. 25, 2022; Ser. No. 63/343,180, authored by Foster et al., and filed on May 18, 2022; Ser. No. 63/419,014, authored by Foster et al., and filed on Oct. 25, 2022; Ser. No. 63/426,865, authored by Lapointe et al., and filed on Nov. 21, 2022; Ser. No. 63/431,842, authored by Foster et al., and filed on Dec. 12, 2022; Ser. No. 63/478,518, authored by Foster et al., and filed on Jan. 5, 2023; and Ser. No. 63/487,951, authored by Foster et al., and filed on Mar. 2, 2023. The entire contents of all of the above listed provisional patent applications are incorporated herein by reference.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating in an ambient environment at a wellsite 24 in FIG. 2. Each of the fluid ends 22 is attached to a power end 26 in a one-to-one relationship. The power end 26 drives, or provides power to, the fluid end 22. Together, the fluid end 22 and power end 26 function as a high-pressure pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations 16, shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi.

The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively may deliver as much as 4,200 gallons per minute or 100 barrels per minute to the wellbore.

Turning to FIGS. 3 and 4, one embodiment of a power end assembly 38 is shown. One embodiment of a linear drive assembly 40 is shown installed within the power end assembly 38, as shown in FIG. 4. As described herein, the linear drive assembly 40 comprises features of traditional linear drive assemblies known in the art.

Continuing with FIG. 4, the linear drive assembly 40 interconnects a crankshaft 44 and a pony rod 46. The pony rod 46 is attached to a plunger 48. The plunger 48 is configured to reciprocate within a fluid end assembly, as shown for example by the plunger 110 and fluid end assembly 102 in FIG. 10. Rotation of the crankshaft 44 causes the linear drive assembly 40 to reciprocate the pony rod 46, which in turn reciprocates the plunger 48.

Turning to FIGS. 5-7, the linear drive assembly 40 comprises a crosshead assembly 50 attached to a connecting rod assembly 52. The connecting rod assembly 52 comprises a crosshead connection end 54 joined to a crankshaft connection end 56 by an elongate arm 58, as shown in FIG. 7.

Like traditional crosshead assemblies known in the art, the crosshead assembly 50 comprises a generally cylindrical crosshead 60 having a cavity 62 formed therein, as shown in FIGS. 6 and 7. The cavity 62 is open at a rear end of the crosshead 60 and is sized to receive the crosshead connection end 54 of the connecting rod assembly 52. The crosshead connection end 54 has a generally cylindrical shape and has a wrist pin bore 64 formed therein.

Continuing with FIGS. 6 and 7, also, like traditional crosshead assemblies known in the art, a thrust seat 66 is attached to a front wall 68 of the cavity 62 and is sized to engage a front surface or knuckle 70 of the crosshead connection end 54 when such end is installed within the cavity 62. The thrust seat 66 is held in place by a pair of retainer plates 69, shown in FIG. 7, that are fastened to the crosshead 60 using a plurality of fasteners 71. The crosshead connection end 54 is held within crosshead 60 by a wrist pin 72, as shown in FIG. 6. The wrist pin 72 extends through the wrist pin bore 64 formed in the crosshead connection end 54 and into openings 74 formed on opposite sides of the crosshead 60. The wrist pin 72 is secured within the crosshead 60 by a cover 75 and fasteners 77.

Turning back to FIG. 4, the crankshaft connection end 56 of the connecting rod assembly 52 is configured to clamp around a connecting rod journal 79 making up a portion of the crankshaft 44. As the crankshaft 44 rotates, the crankshaft connection end 56 rotates relative to the connecting rod journal 79 and the crosshead connection end 54 rotates relative to the thrust seat 66. The front surface 70 of the crosshead connection end 54 engages the thrust seat 66 as it rotates. Since this engagement occurs with high normal forces, the thrust seat 66 and front surface 70 are prone to high wear and require maintenance or replacement during operation. Even with the addition of lubricating fluids, the wear rate of these contact points requires shorter maintenance intervals than desired during operation. There is a need in the art for a more wear resistant linear drive assembly, thereby requiring less maintenance during operation.

BRIEF DESCRIPTION OF THE DRAWINGS

FIG. 16 is a rear elevational view of the crosshead guide shown in FIG. 14.

FIG. 17 is a rear perspective view of the crosshead guide shown in FIG. 14.

FIG. 30 is a perspective view of the wrist pin shown in FIG. 29.

FIG. 31 is a side elevational view of the wrist pin shown in FIG. 30.

FIG. 32 is a cross-sectional view of the wrist pin shown in FIG. 31, taken along line K-K.

FIG. 33 is a front perspective view of the retainer shown in FIG. 29.

FIG. 34 is a rear perspective view of the retainer shown in FIG. 33.

FIG. 35 is a cross-sectional view of the retainer shown in FIG. 33, taken along line L-L.

FIG. 76 is a perspective view of the wrist pin used with the linear drive assembly shown in FIG. 73.

FIG. 77 is a side elevational view of the wrist pin shown in FIG. 76.

FIG. 78 is a cross-sectional view of the wrist pin shown in FIG. 77, taken along line AA-AA.

FIG. 103 is a front perspective view of the wrist pin used within the linear drive assembly shown in FIG. 102.

FIG. 104 is a front elevational view of the wrist pin shown in FIG. 103.

FIG. 105 is a cross-sectional view of the wrist pin shown in FIG. 104, taken along line AL-AL.

FIG. 120 is a front perspective view of another embodiment of a linear drive assembly disclosed herein.

FIG. 121 is a side elevational view of the linear drive assembly shown in FIG. 120.

FIG. 122 is a rear perspective view of the linear drive assembly shown in FIG. 120.

FIG. 123 is a top plan view of the linear drive assembly shown in FIG. 120.

FIG. 124 is a cross-sectional view of the linear drive assembly shown in FIG. 123, taken along line AS-AS.

FIG. 125 is a front perspective and partially exploded view of the linear drive assembly shown in FIG. 120.

FIG. 126 is a front perspective view of another embodiment of a linear drive assembly disclosed herein.

FIG. 127 is a cross-sectional view of the linear drive assembly shown in FIG. 126, taken along line AT-AT.

FIG. 128 is a front perspective view of the crosshead used within the linear drive assembly shown in FIG. 126.

FIG. 129 is a front elevational view of the crosshead shown in FIG. 128.

FIG. 130 is a front perspective view of another embodiment of a crosshead guide disclosed herein having the linear drive assembly shown in FIG. 126 installed therein.

FIG. 131 is a cross-sectional view of the linear drive assembly and crosshead guide shown in FIG. 130, taken along line AU-AU.

Figure 130:
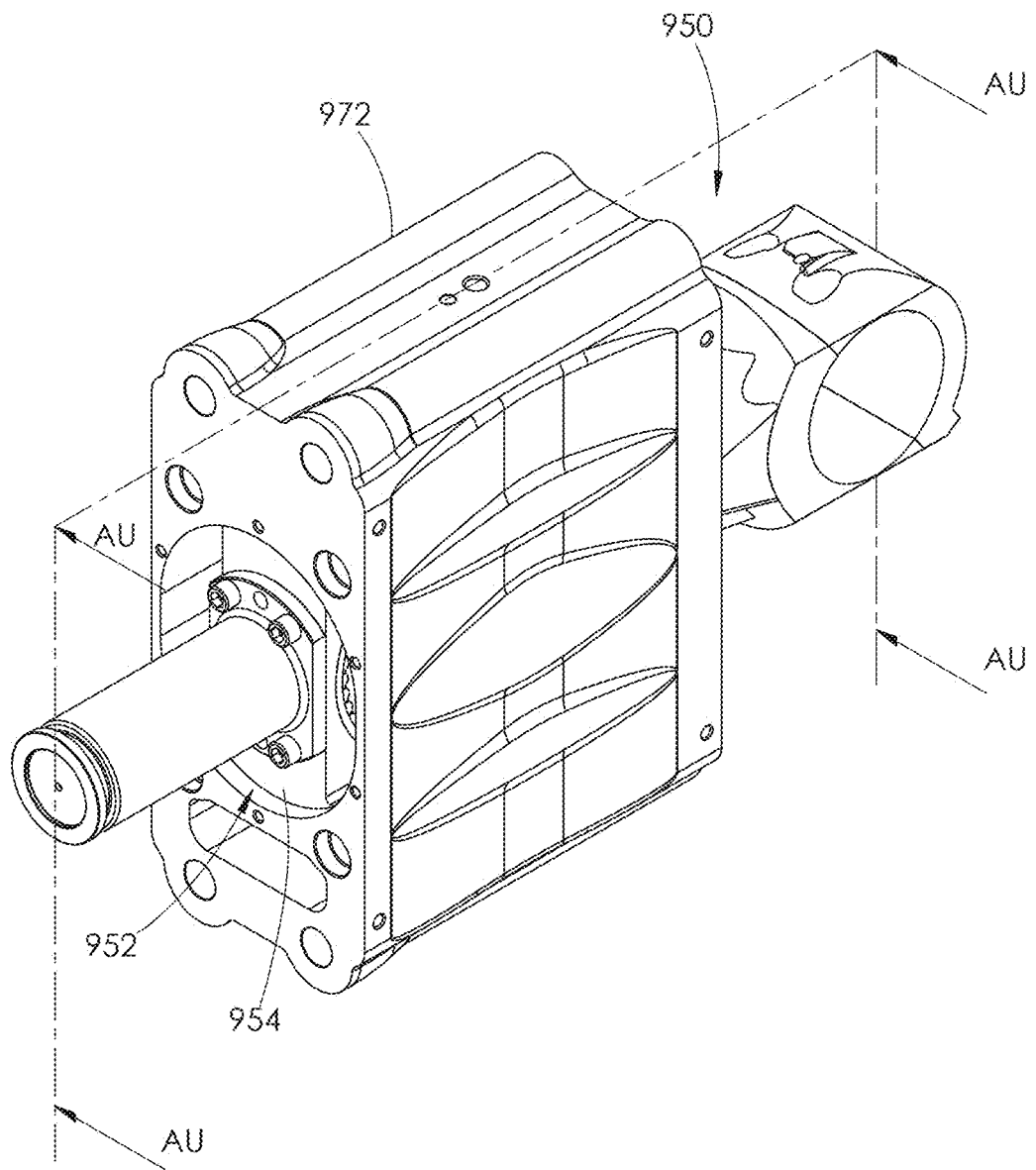
Figure 131:
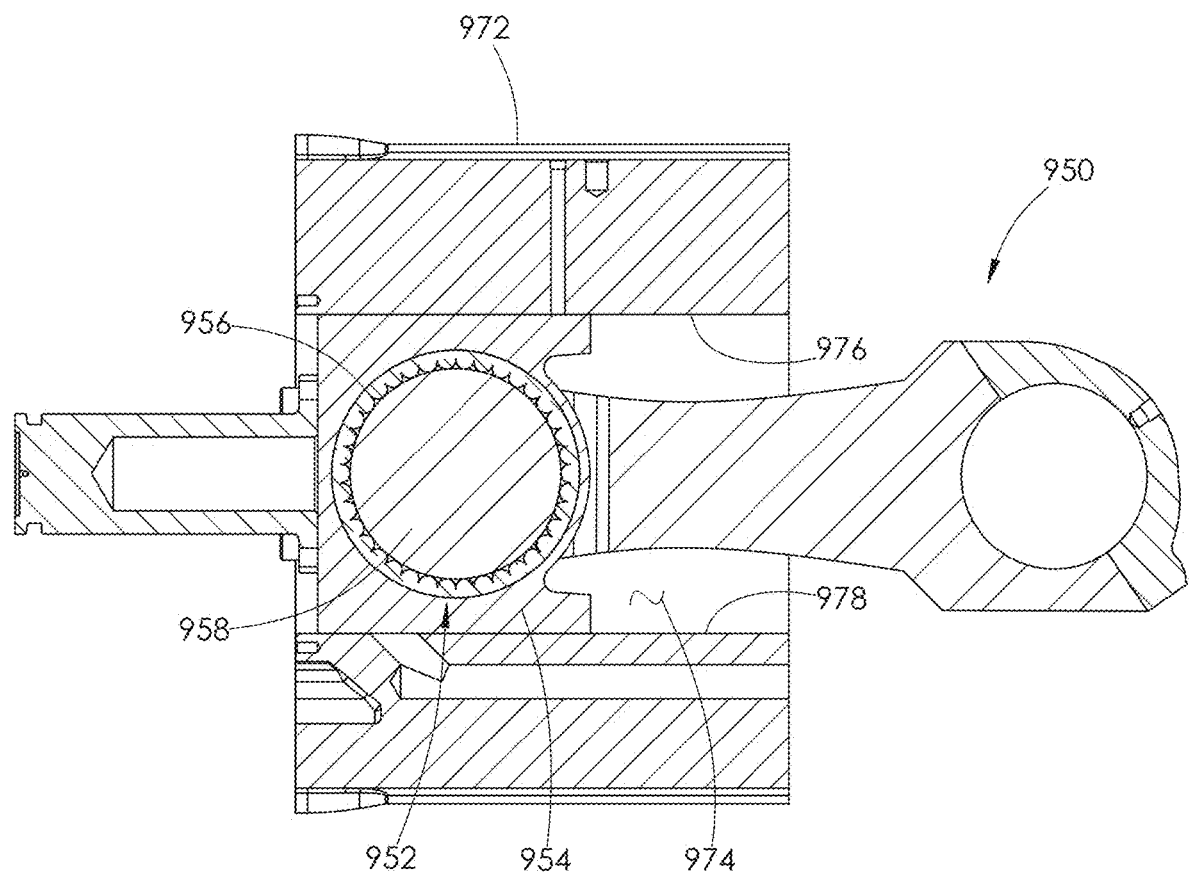
Figure 132:
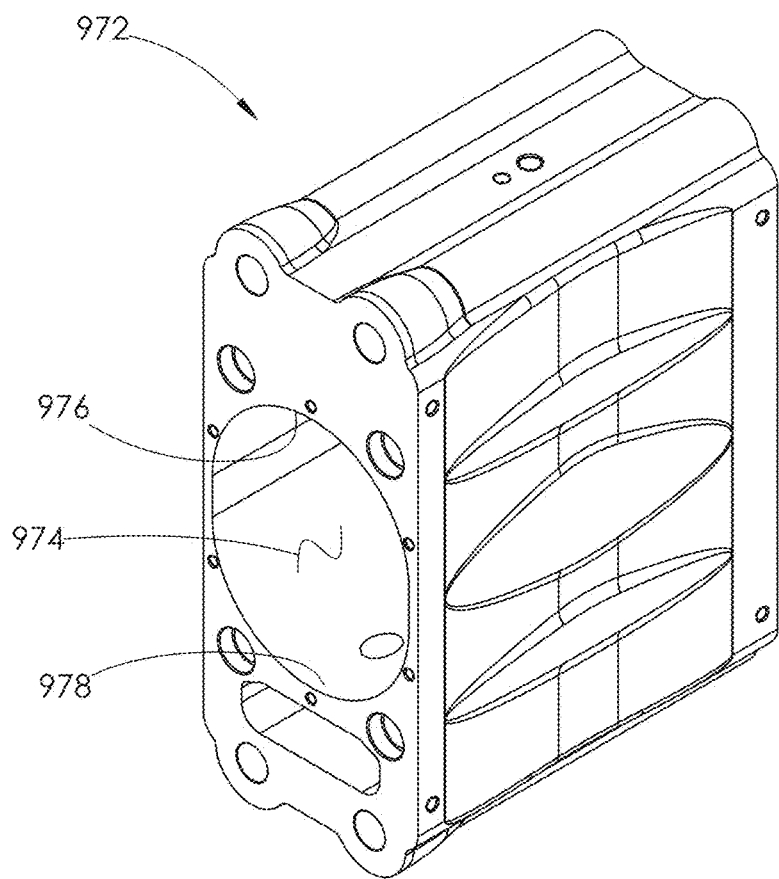

FIG. 132 is a front perspective view of the crosshead guide shown in FIG. 130.

Figure 133:
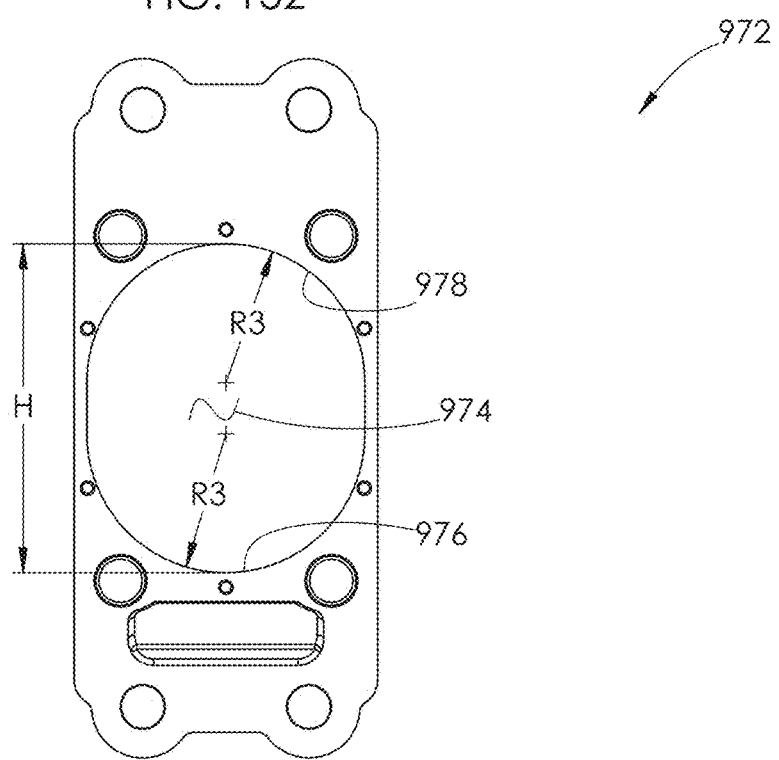

FIG. 133 is a front elevational view of the crosshead guide shown in FIG. 132.

Figure 134:
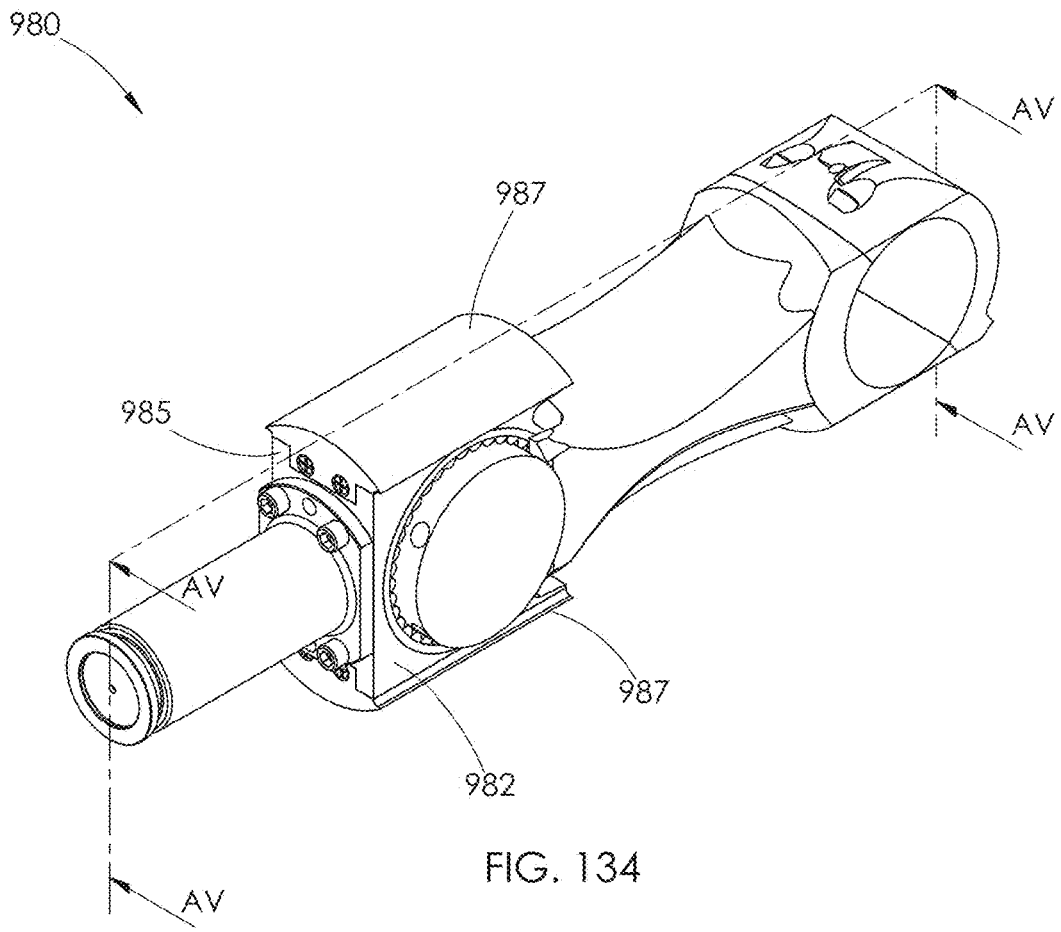

FIG. 134 is a front perspective view of another embodiment of a linear drive assembly disclosed herein.

Figure 135:
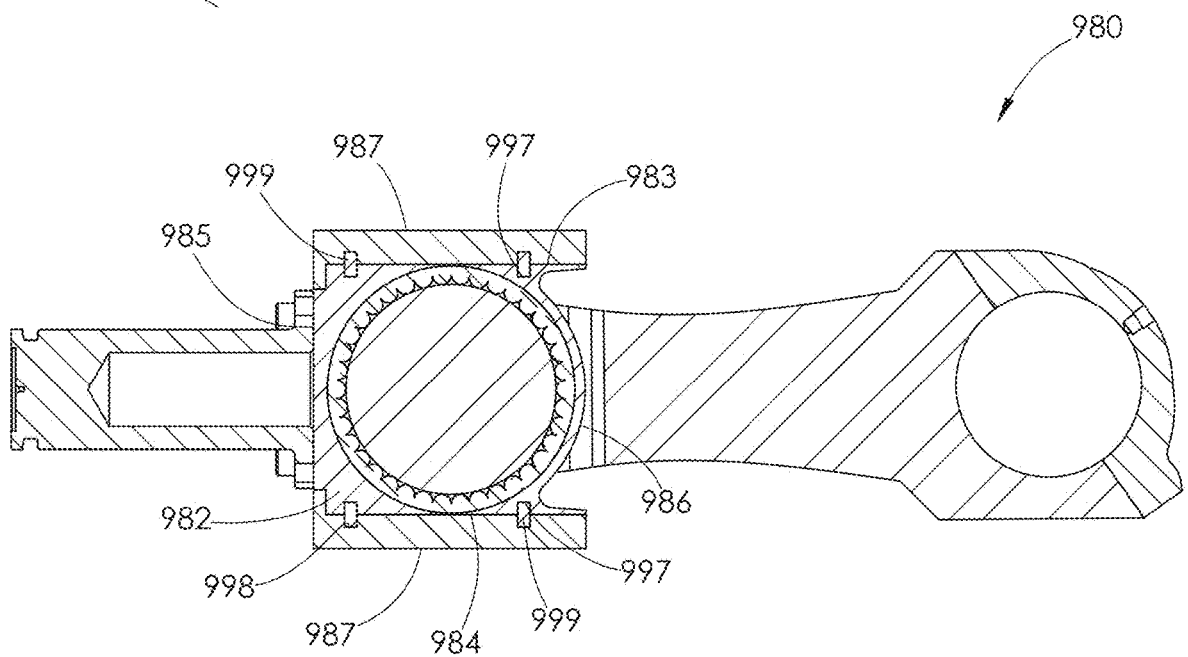

FIG. 135 is a cross-sectional view of the linear drive assembly shown in FIG. 134, taken along line AV-AV.

FIG. 136 is a side elevational view of the crosshead and attached crosshead inserts used with the linear drive assembly shown in FIG. 134.

FIG. 137 is a front perspective view of the crosshead and attached crosshead inserts shown in FIG. 136.

FIG. 138 is a front elevational view of the crosshead and attached crosshead inserts shown in FIG. 136.

FIG. 139 is a cross-sectional view of the crosshead and attached crosshead inserts shown in FIG. 138, taken along line AW-AW.

Figure 140:
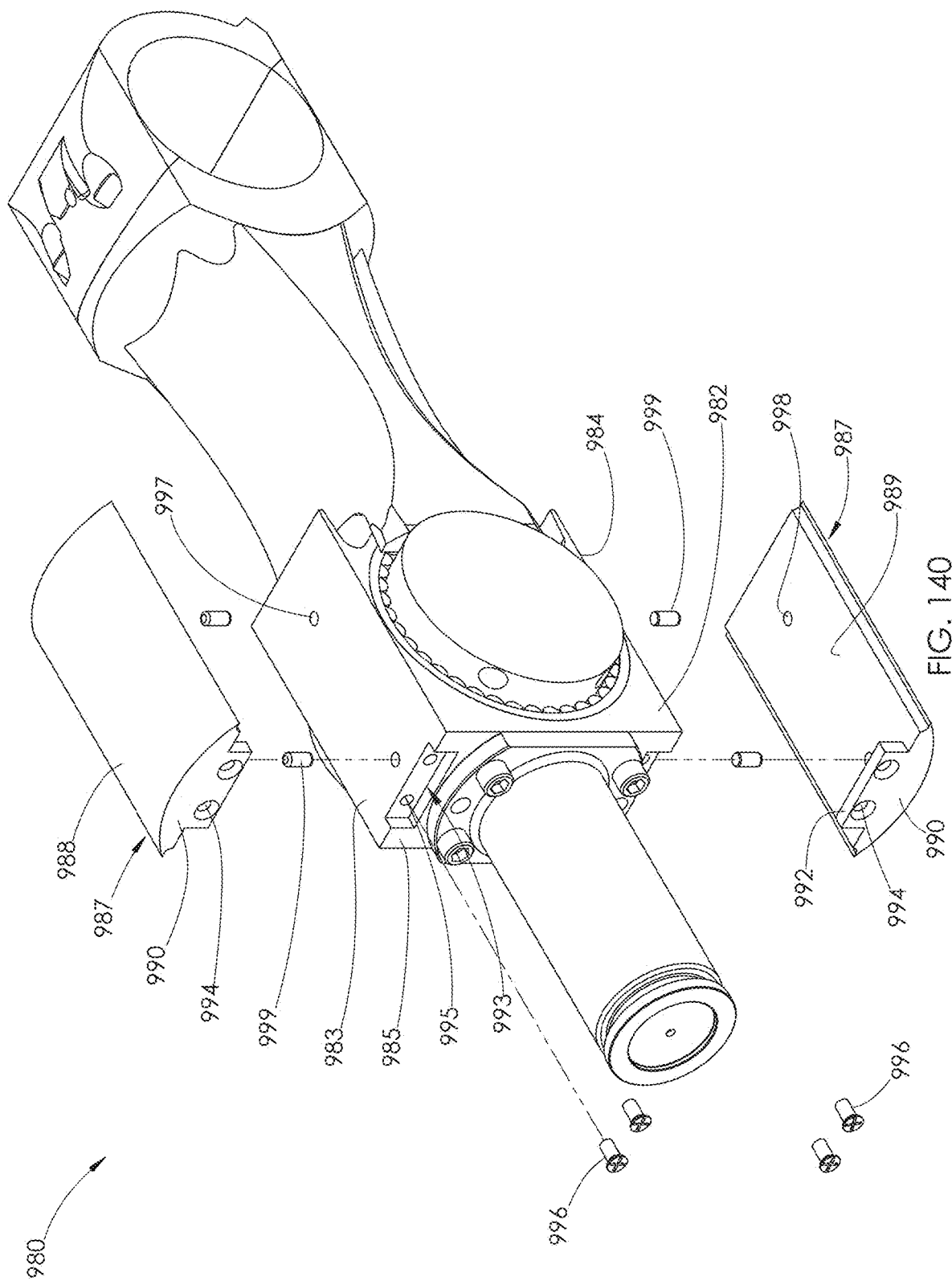

FIG. 140 is a front perspective and partially exploded view of the linear drive assembly shown in FIG. 134.

Figure 141:
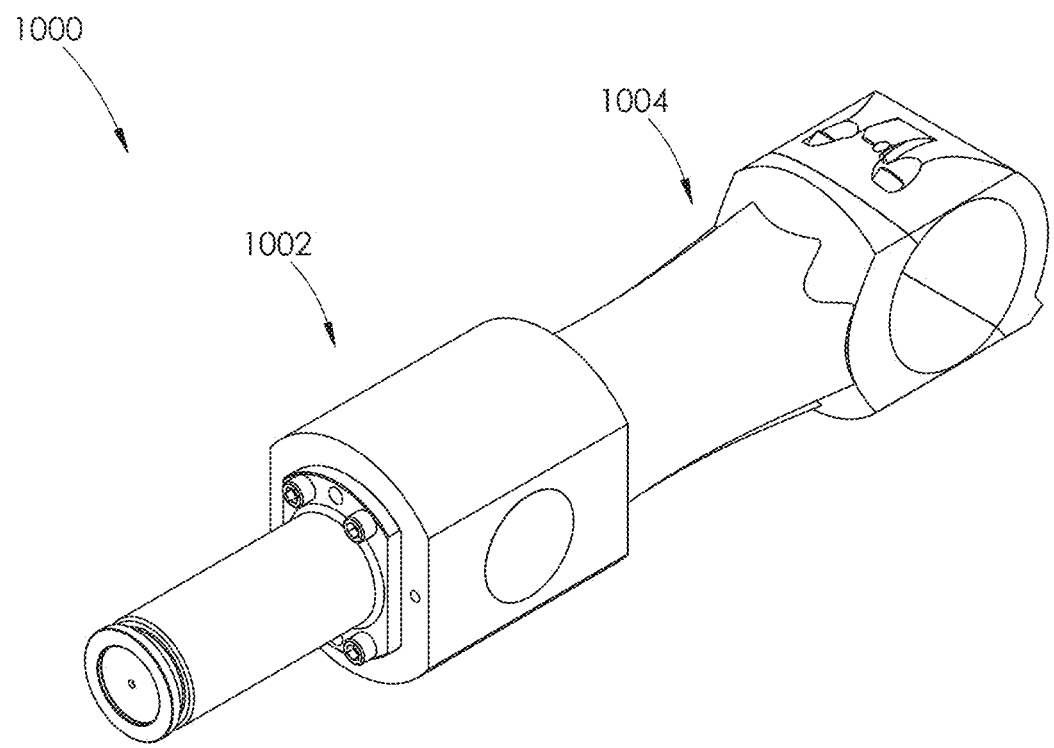

FIG. 141 is a front perspective view of another embodiment of a linear drive assembly disclosed herein.

Figure 142:
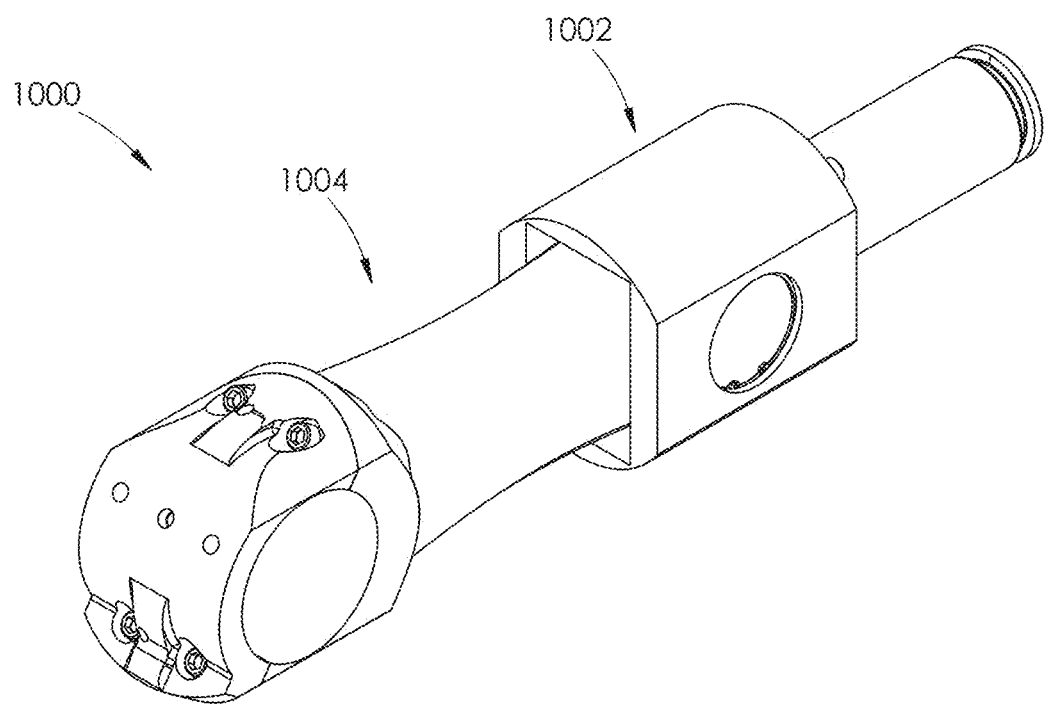

FIG. 142 is a rear perspective view of the linear drive assembly shown in FIG. 141.

Figure 143:
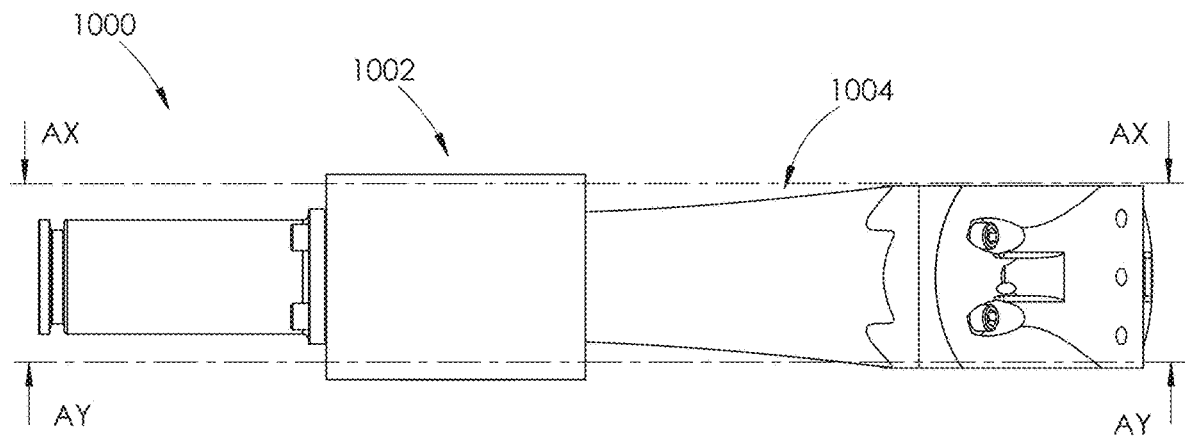

FIG. 143 is a top plan view of the linear drive assembly shown in FIG. 141.

Figure 144:
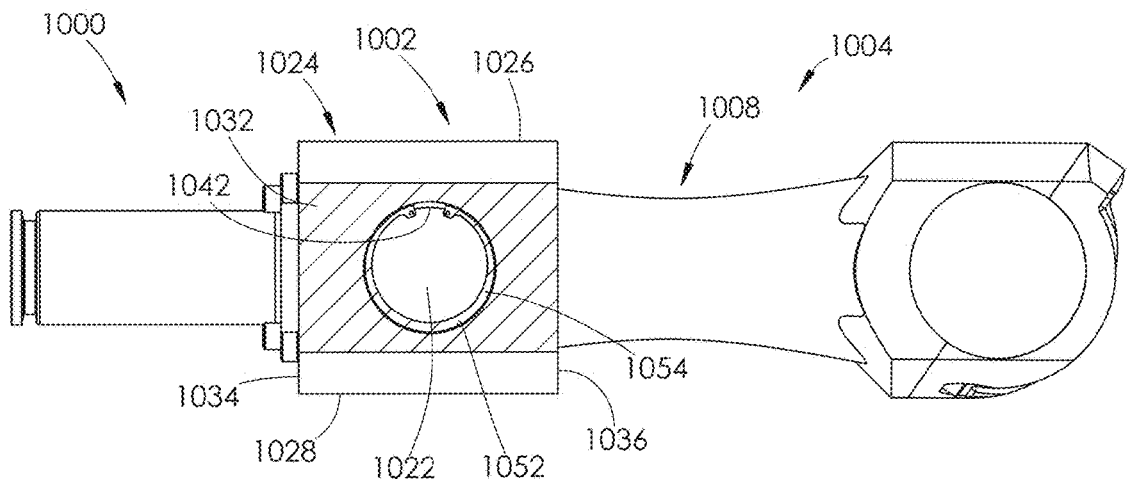

FIG. 144 is a cross-sectional view of the linear drive assembly shown in FIG. 143, taken along line AX-AX.

Figure 145:
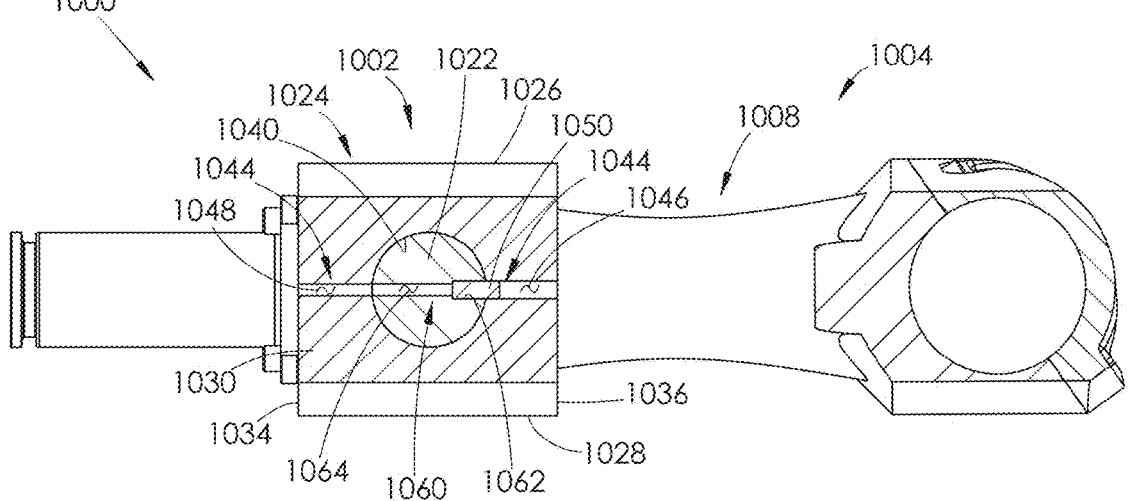

FIG. 145 is a cross-sectional view of the linear drive assembly shown in FIG. 143, taken along line AY-AY.

FIG. 146 is a front perspective and partially exploded view of the linear drive assembly shown in FIG. 141.

FIG. 147 is a rear perspective and partially exploded view of the linear drive assembly shown in FIG. 141.

Figure 148:
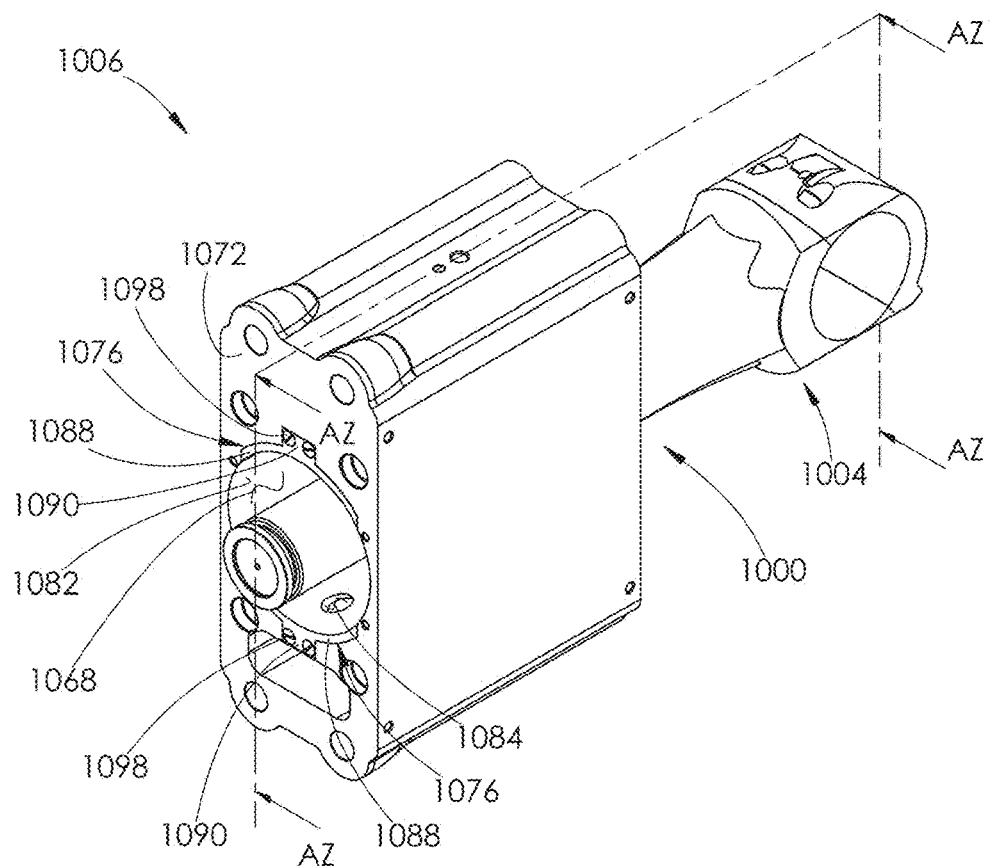

FIG. 148 is a front perspective view of another embodiment of a crosshead disclosed herein having the linear drive assembly shown in FIG. 141 installed therein.

Figure 149:
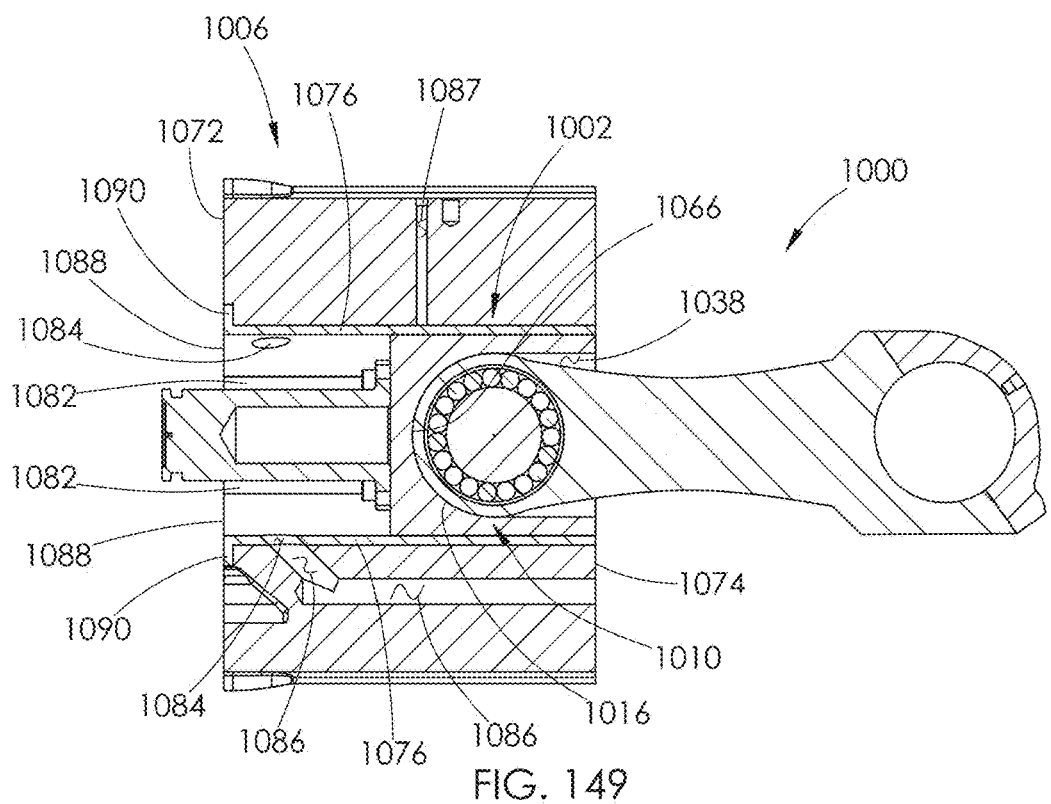

FIG. 149 is a cross-sectional view of the crosshead guide and linear drive assembly shown in FIG. 148, taken along line AZ-AZ.

Figure 150:
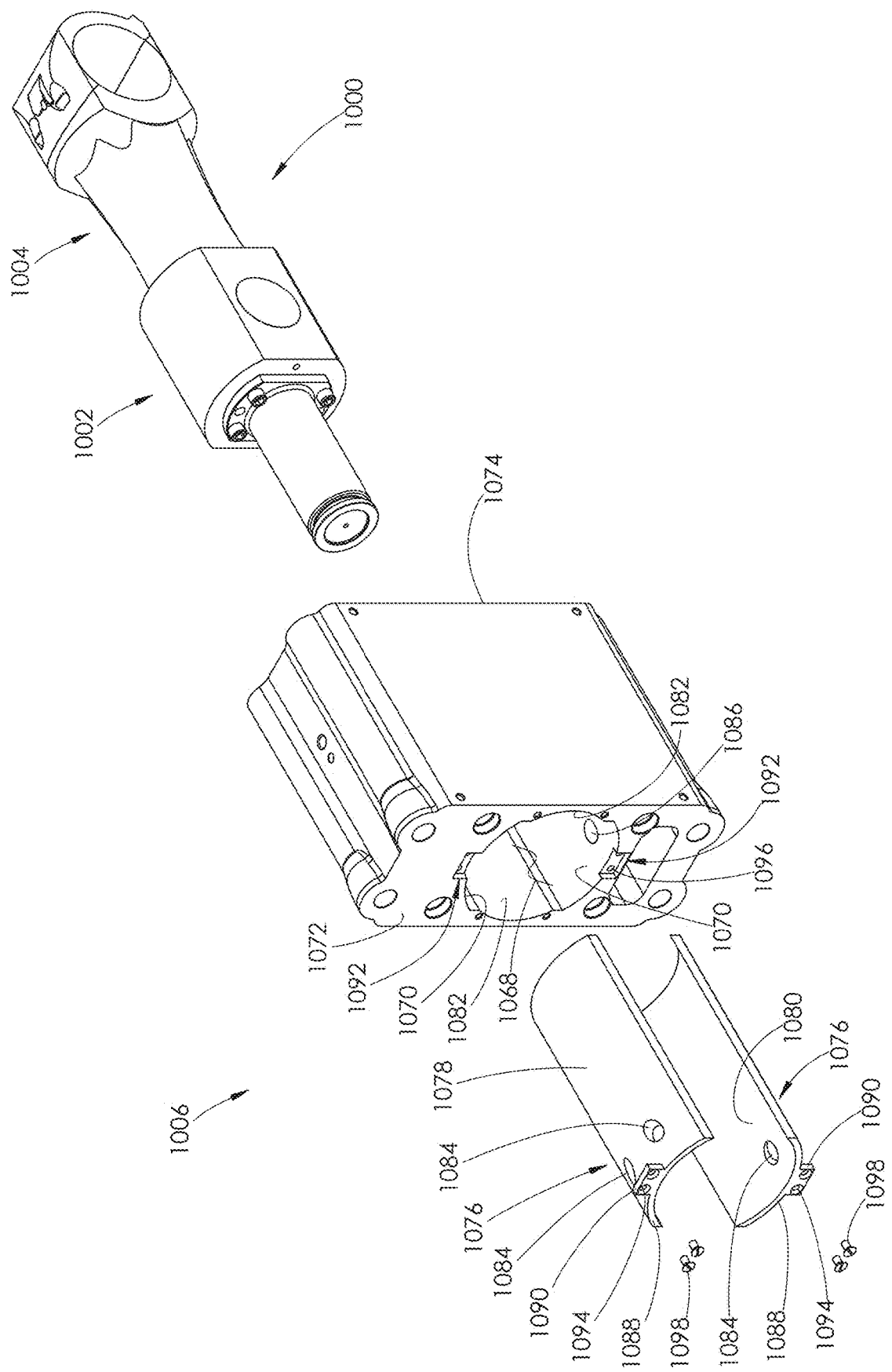

FIG. 150 is a front perspective and partially exploded view of the crosshead guide and linear drive assembly shown in FIG. 148.

Figure 151:
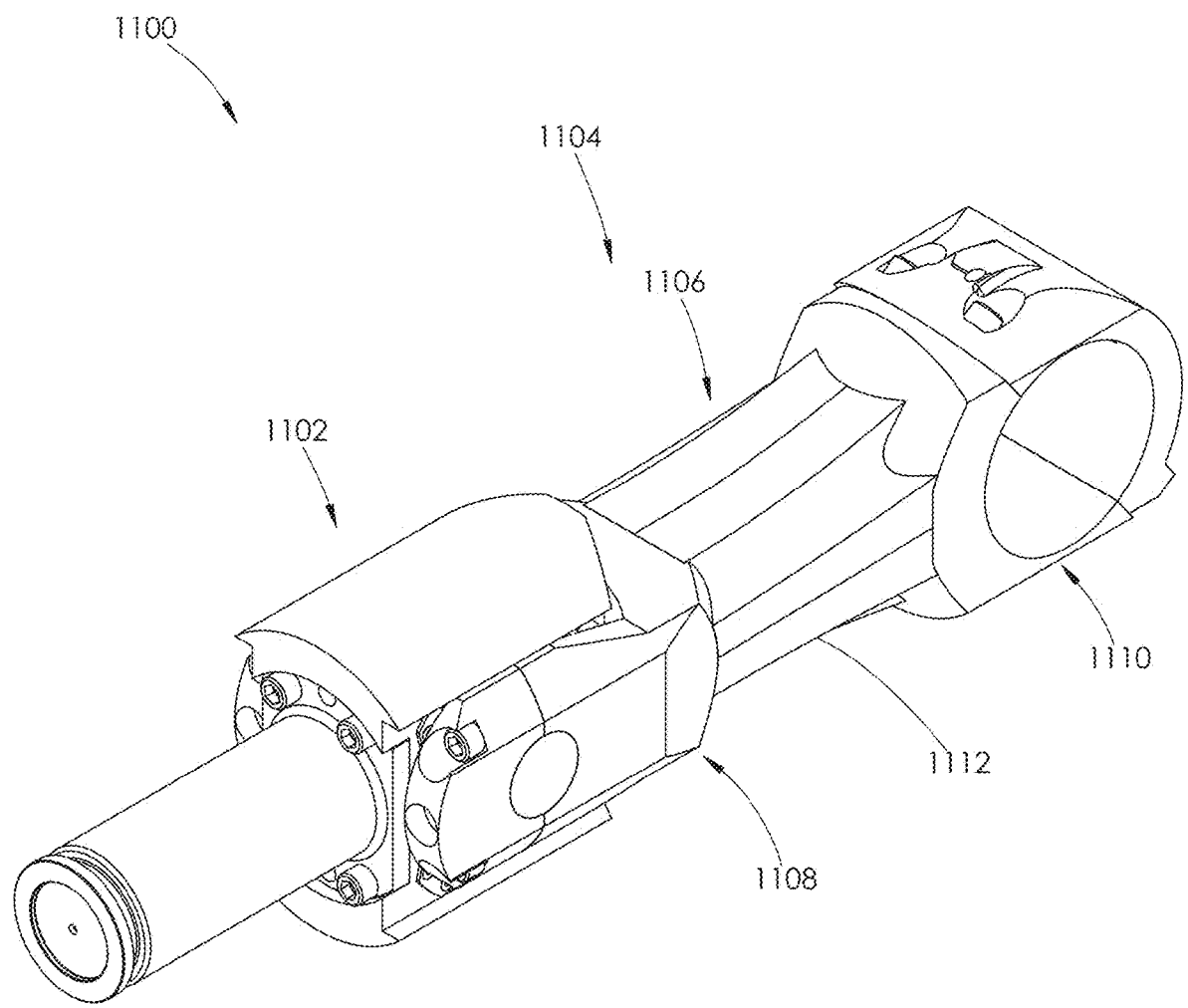

FIG. 151 is a front perspective view of another embodiment of a linear drive assembly disclosed herein.

Figure 152:
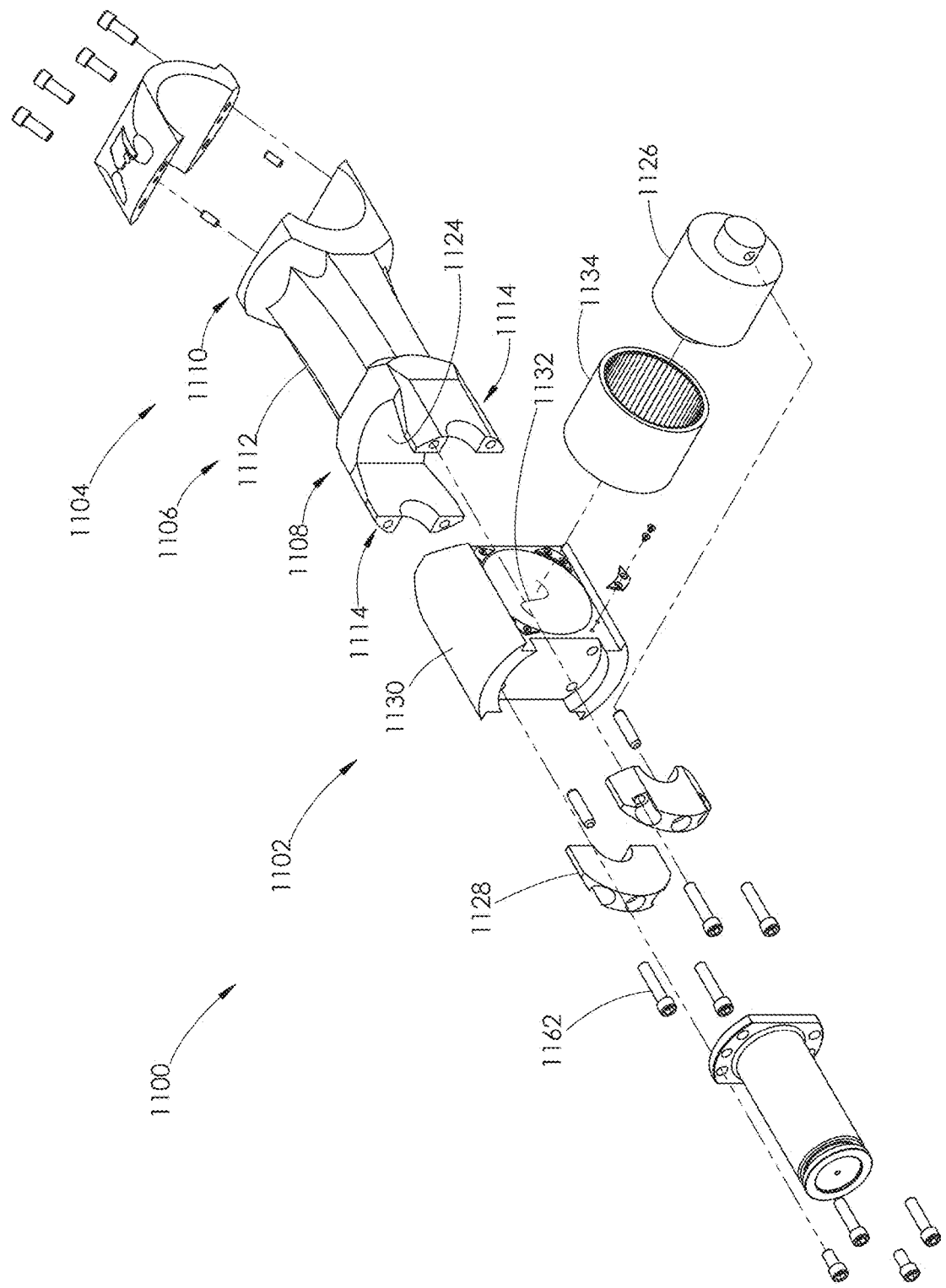

FIG. 152 is a front perspective and exploded view of the linear drive assembly shown in FIG. 151.

Figure 153:
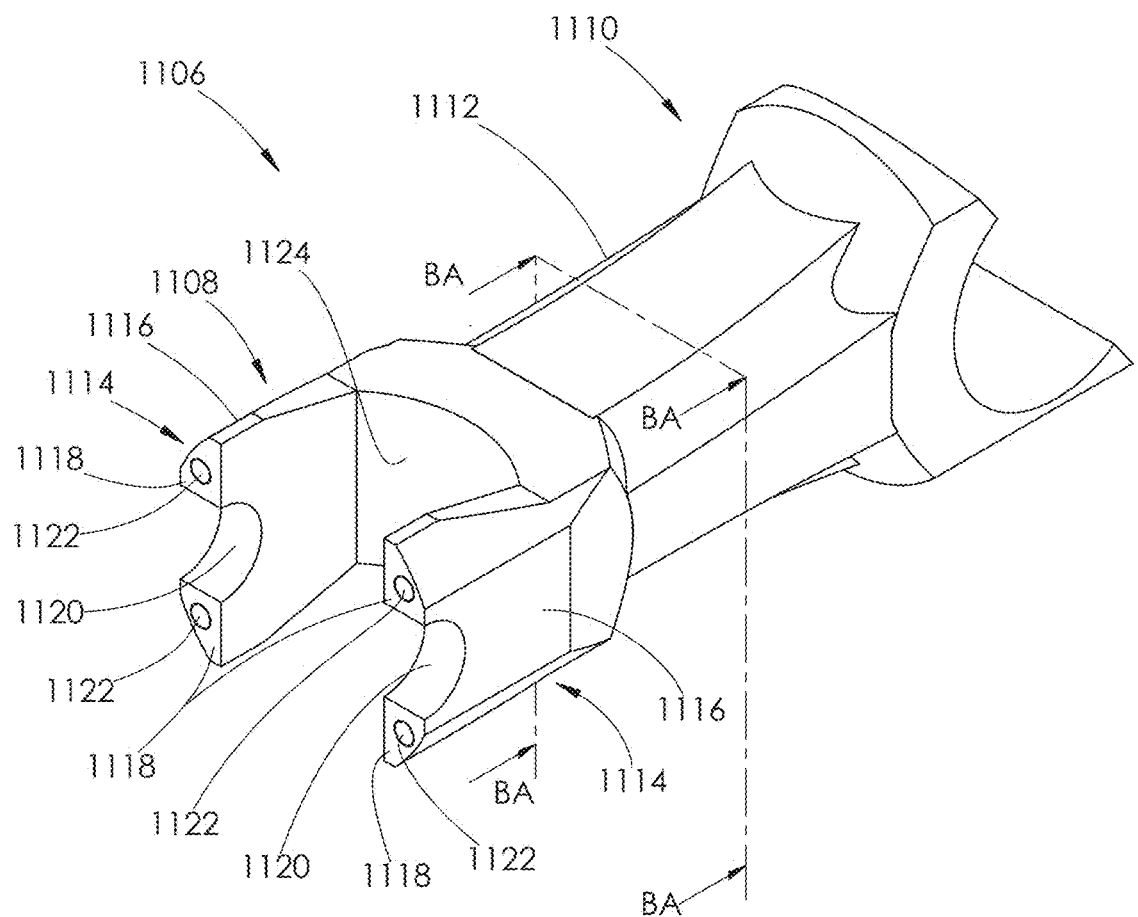

FIG. 153 is a front perspective view of a portion of the connecting rod assembly shown in FIG. 152.

Figure 154:
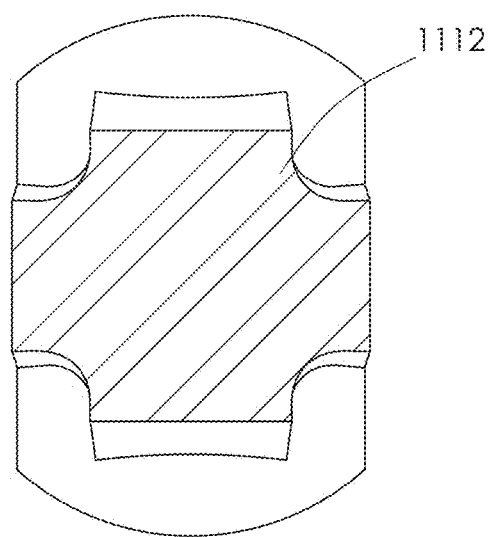

FIG. 154 is a cross-sectional view of the portion of the connecting rod assembly shown in FIG. 153, taken along line BA-BA.

Figure 155:
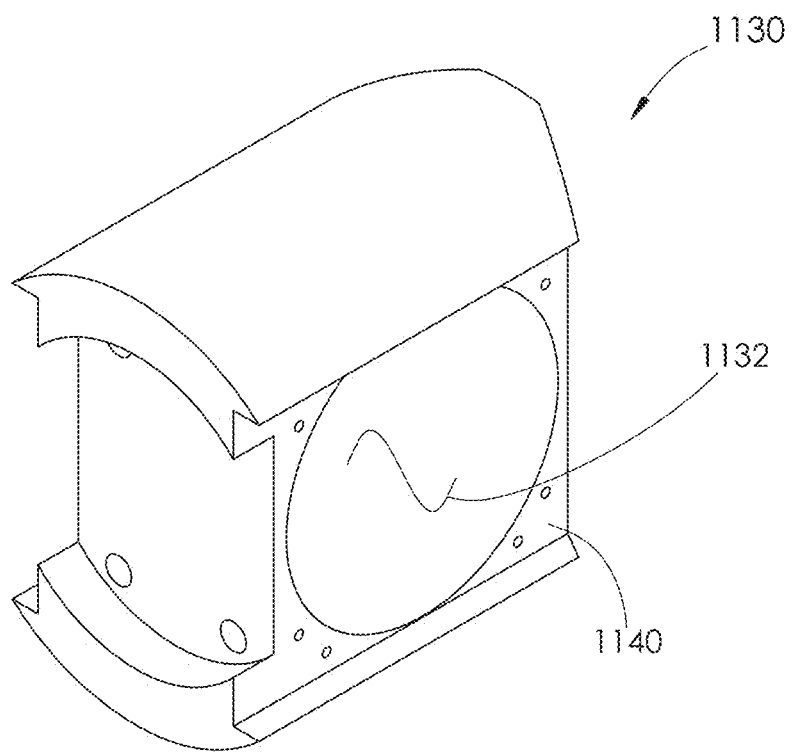

FIG. 155 is a front perspective view of the crosshead used with the linear drive assembly shown in FIG. 152.

Figure 156:
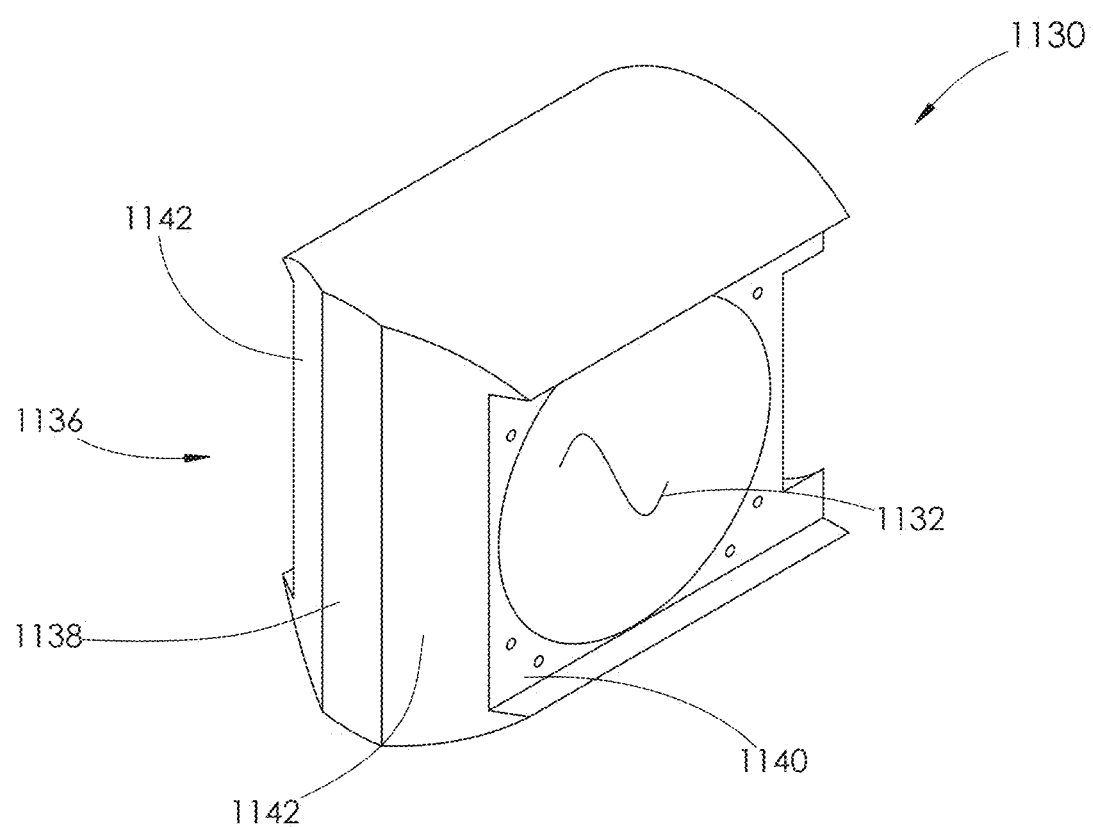

FIG. 156 is a rear perspective view of the crosshead shown in FIG. 155.

FIG. 157 is a side elevational view of the wrist pin used with the linear drive assembly shown in FIG. 152.

FIG. 158 is a front perspective view of the wrist pin shown in FIG. 157.

FIG. 159 is a cross-sectional view of the wrist pin shown in FIG. 157, taken along line BB-BB.

FIG. 160 is a front perspective view of one of the saddles used within the linear drive assembly shown in FIG. 152.

FIG. 161 is a rear perspective view of the saddle shown in FIG. 160.

FIG. 162 is a front elevational view of the saddle shown in FIG. 160.

FIG. 163 is a cross-sectional view of the saddle shown in FIG. 162, taken along line BC-BC.

Figure 164:
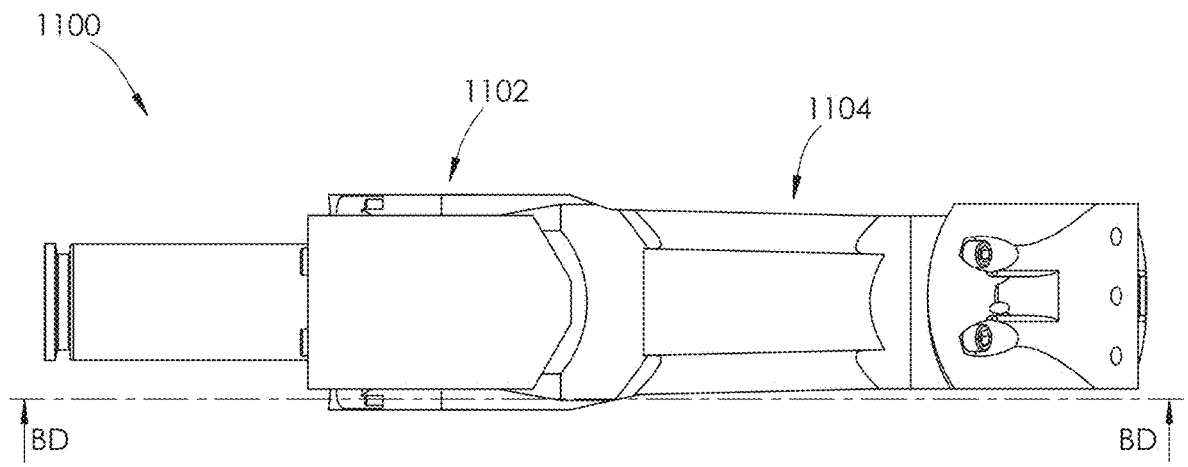

FIG. 164 is a top plan view of the linear drive assembly shown in FIG. 151.

Figure 165:
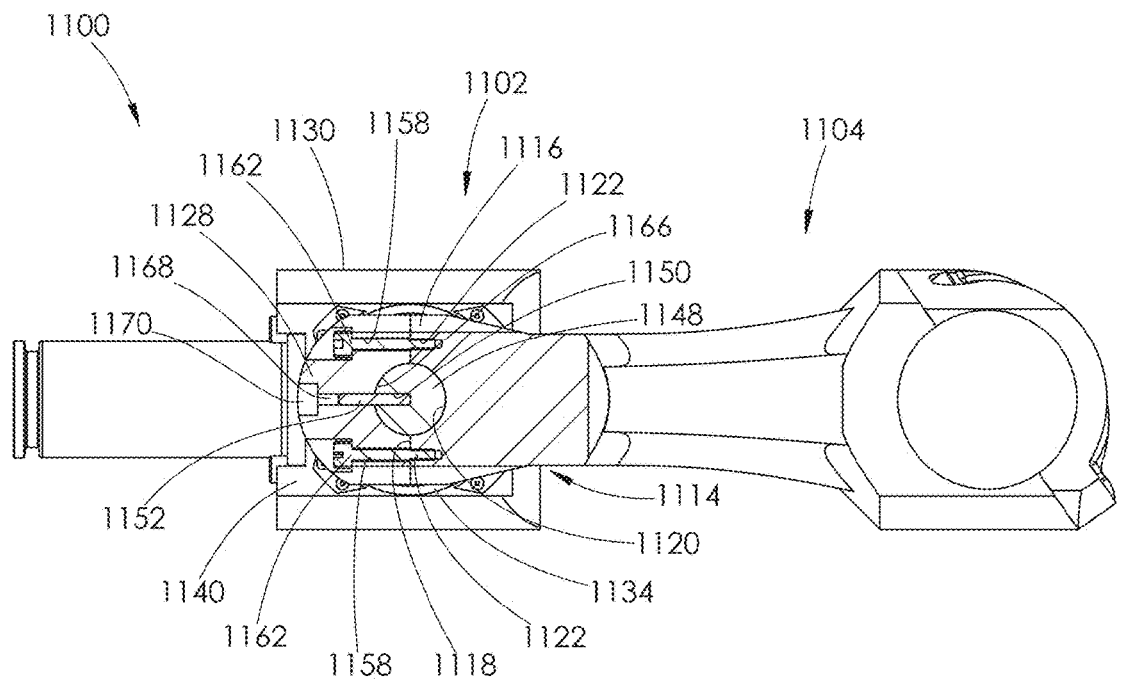

FIG. 165 is a cross-sectional view of the linear drive assembly shown in FIG. 164, taken along line BD-BD.

Figure 166:
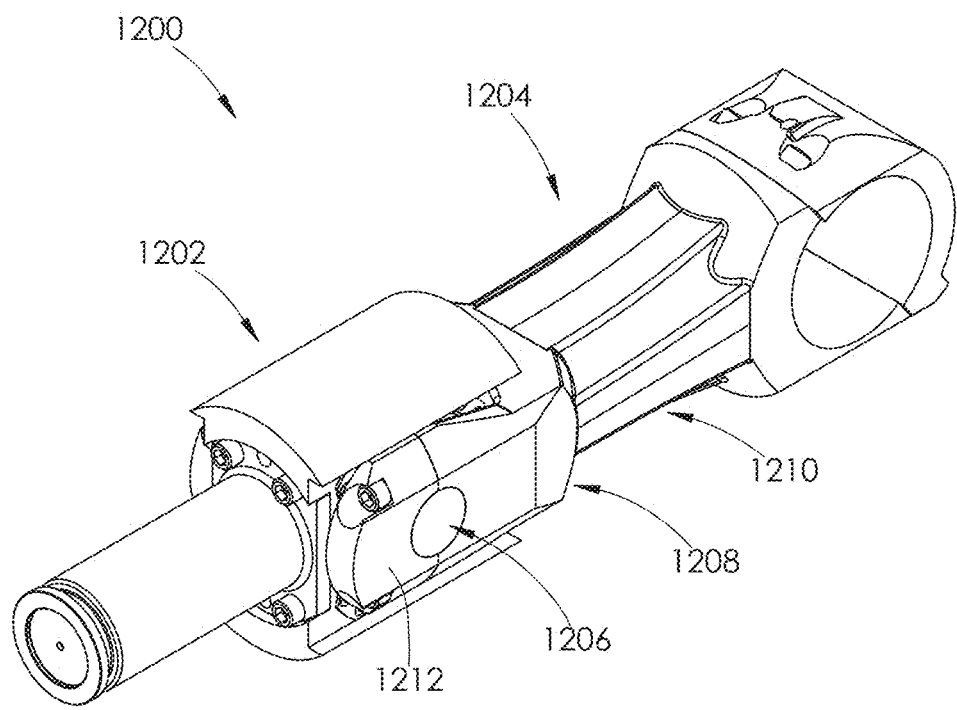

FIG. 166 is a front perspective view of another embodiment of a linear drive assembly disclosed herein.

Figure 167:
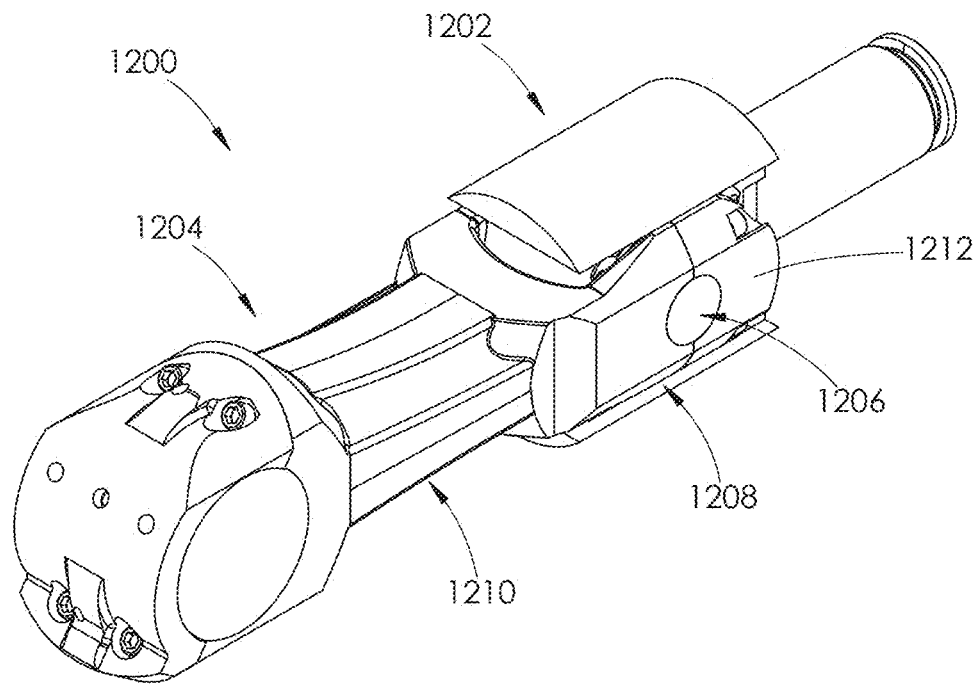

FIG. 167 is a rear perspective view of the linear drive assembly shown in FIG. 166.

Figure 168:
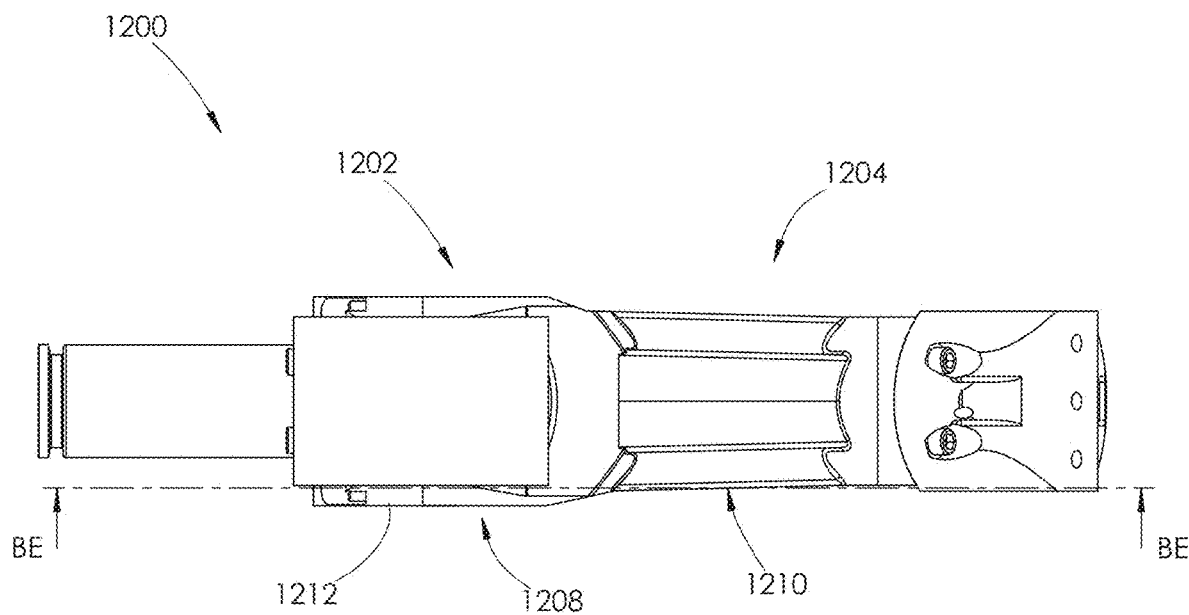

FIG. 168 is a top plan view of the linear drive assembly shown in FIG. 166.

Figure 169:
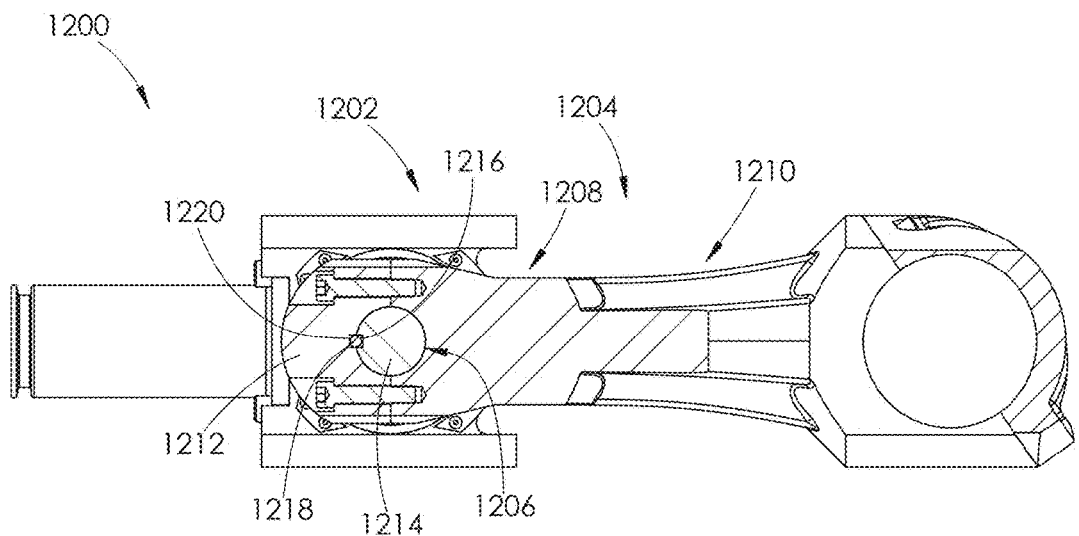

FIG. 169 is a cross-sectional view of the linear drive assembly shown in FIG. 168, taken along line BE-BE.

Figure 170:
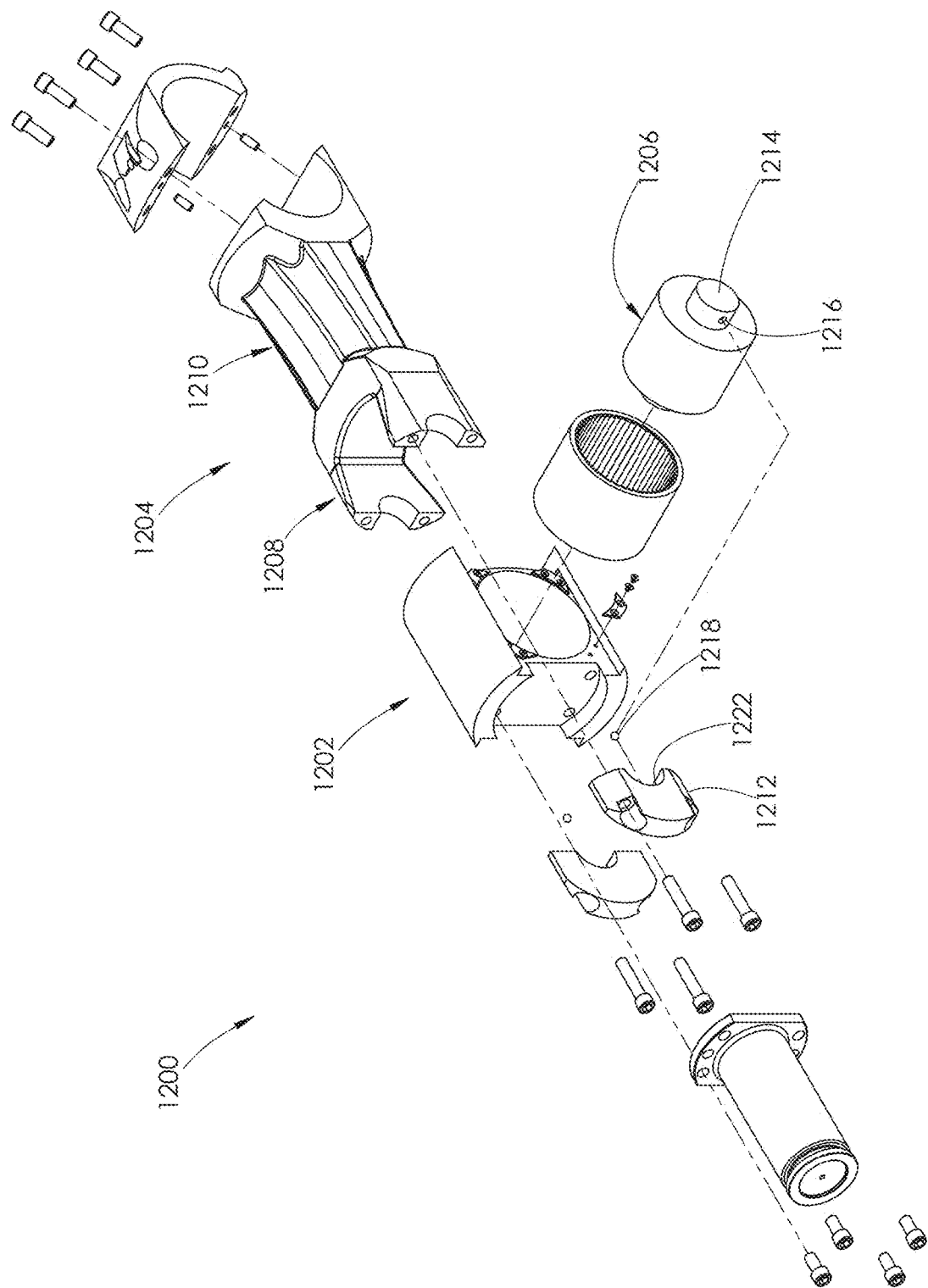

FIG. 170 is a front perspective and exploded view of the linear drive assembly shown in FIG. 166.

Figure 171:
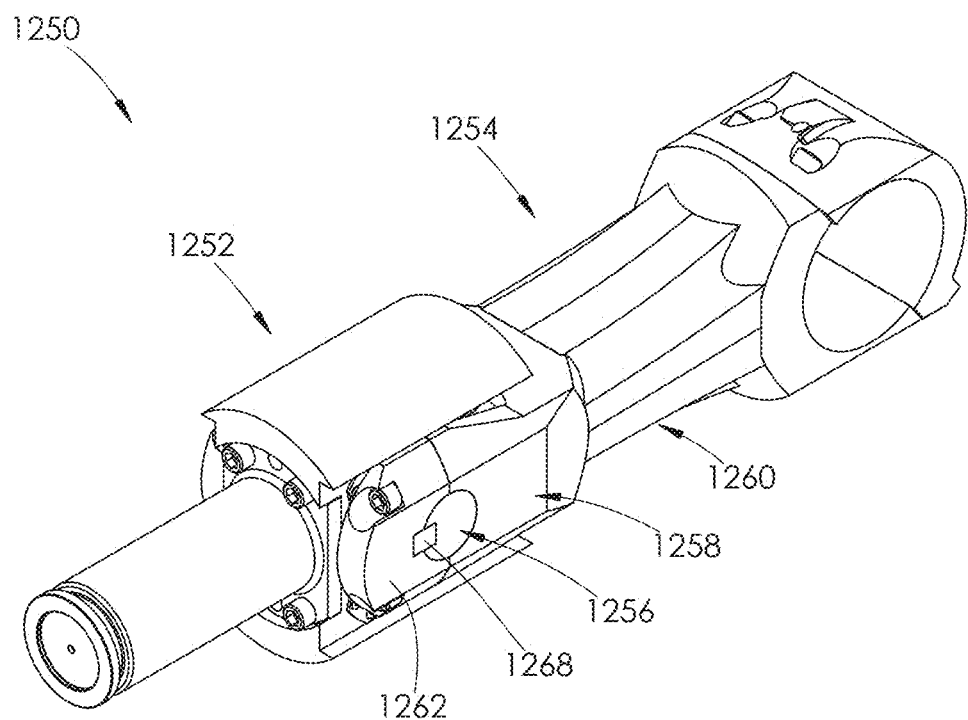

FIG. 171 is a front perspective view of another embodiment of a linear drive assembly disclosed herein.

Figure 172:
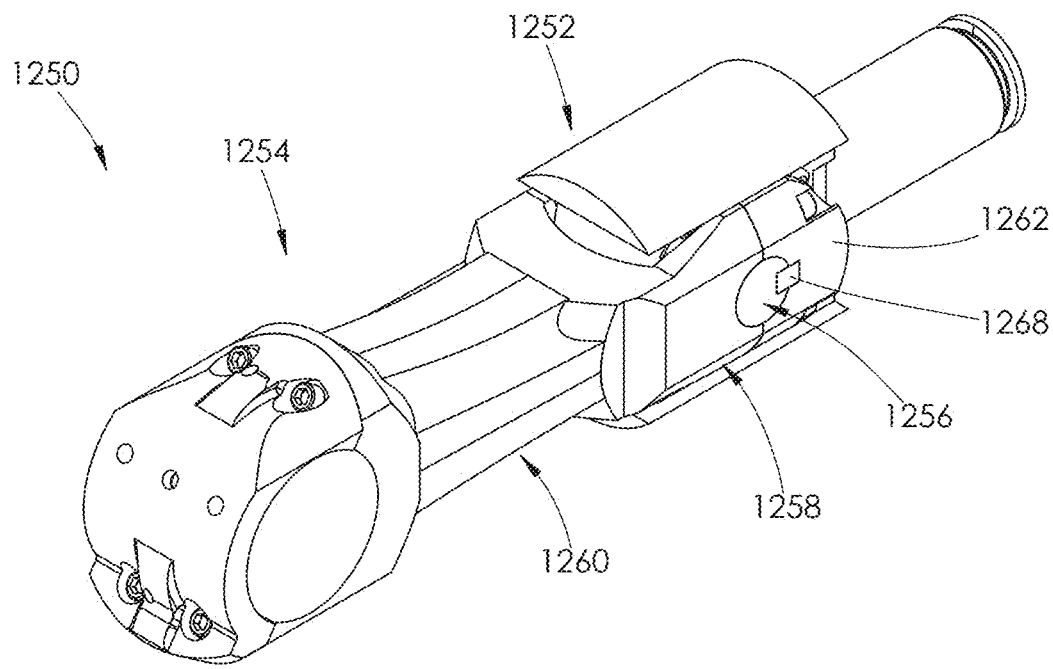

FIG. 172 is a rear perspective view of the linear drive assembly shown in FIG. 171.

Figure 173:
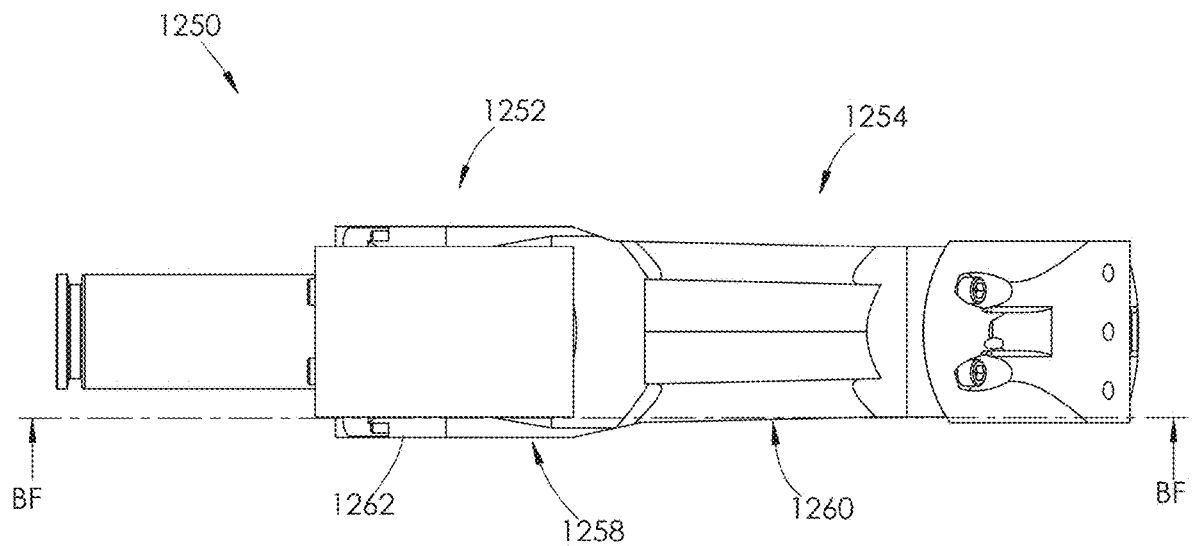

FIG. 173 is a top plan view of the linear drive assembly shown in FIG. 171.

Figure 174:
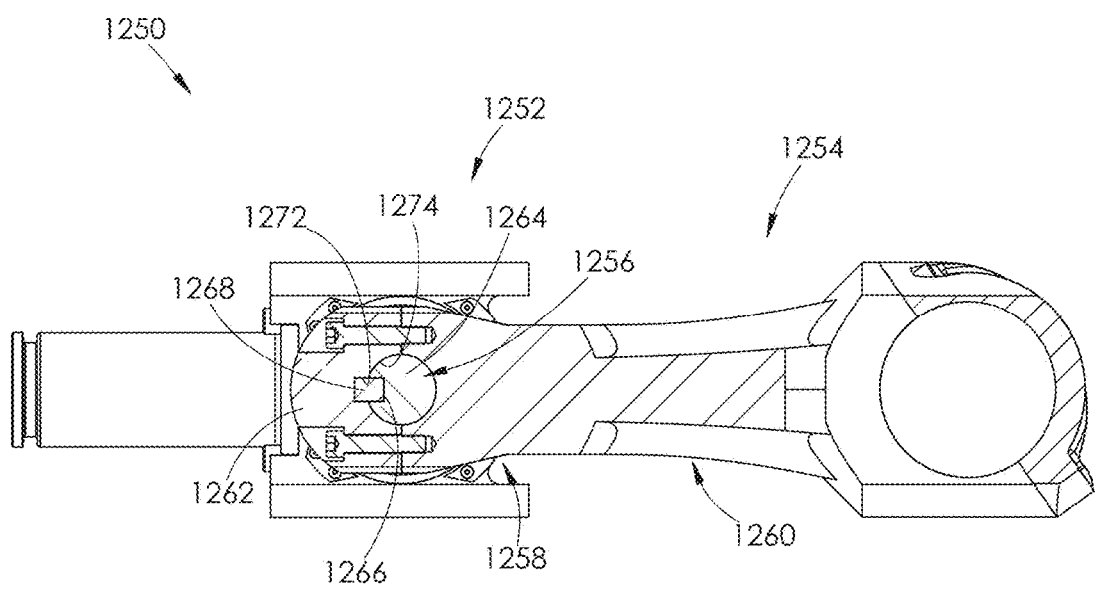

FIG. 174 is a cross-sectional view of the linear drive assembly shown in FIG. 173, taken along line BF-BF.

Figure 175:
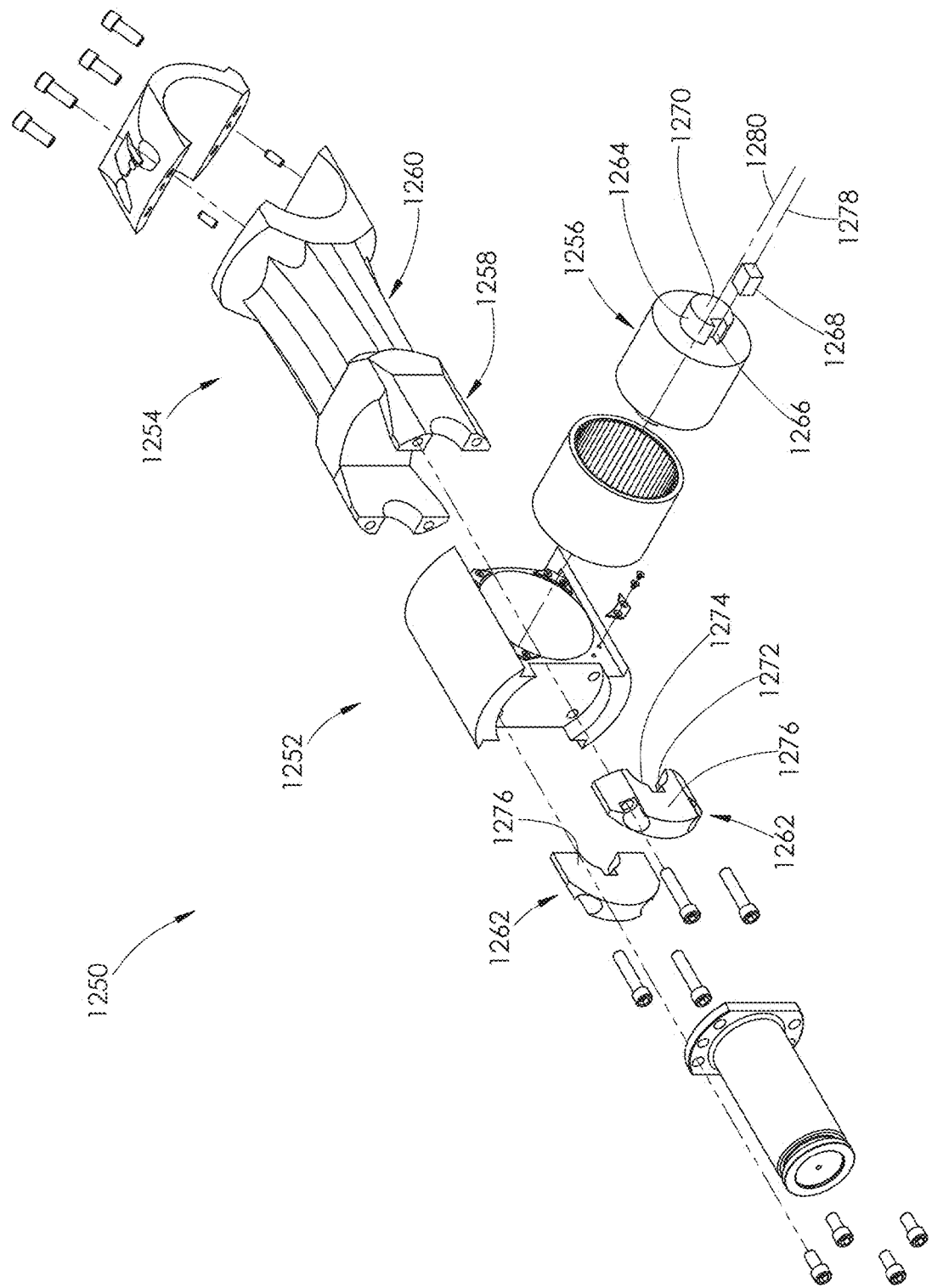

FIG. 175 is a front perspective and exploded view of the linear drive assembly shown in FIG. 171.

Figure 176:
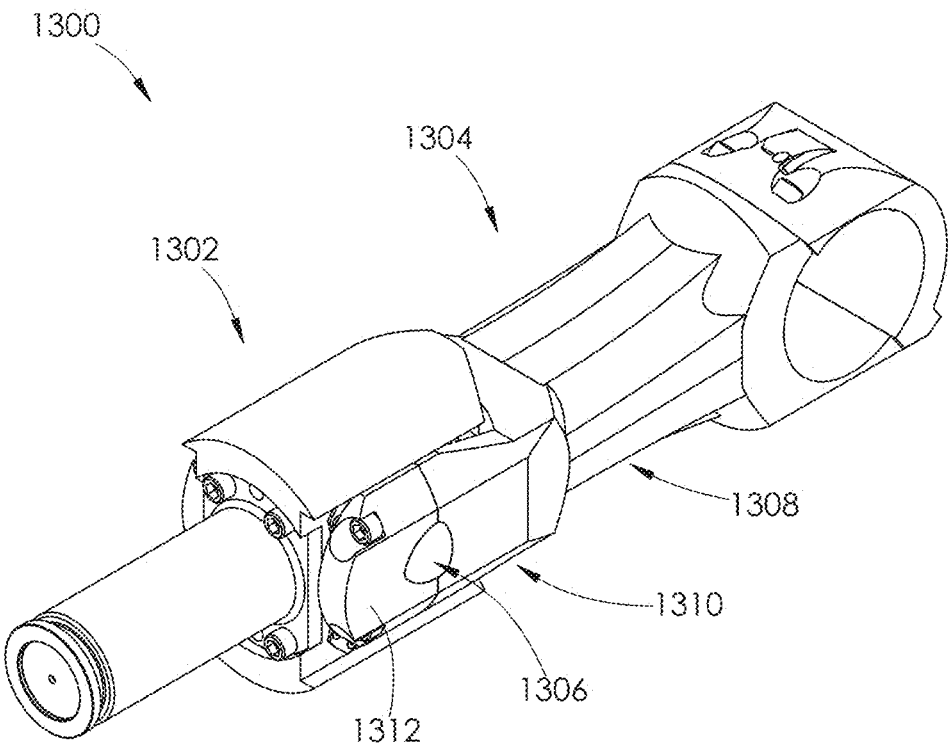

FIG. 176 is a front perspective view of another embodiment of a linear drive assembly disclosed herein.

Figure 177:
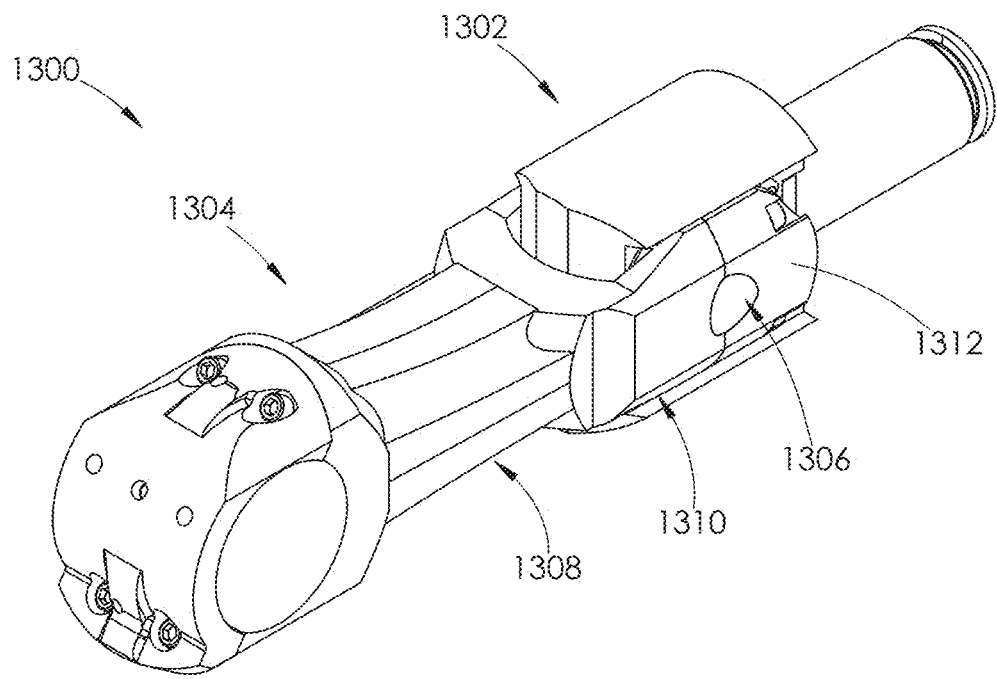

FIG. 177 is a rear perspective view of the linear drive assembly shown in FIG. 176.

Figure 178:
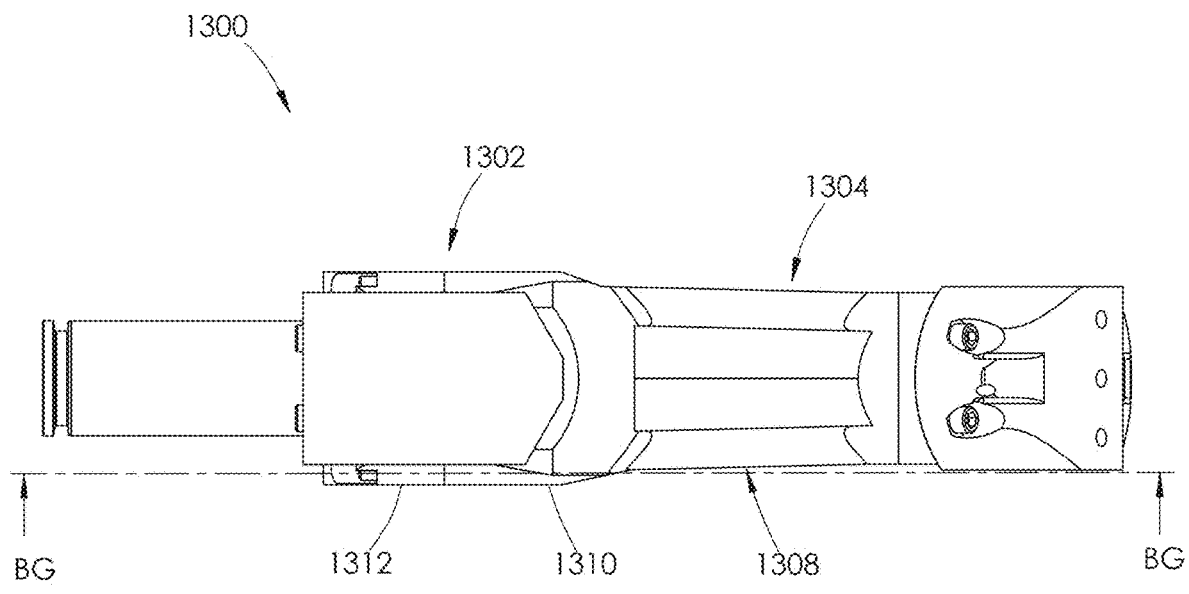

FIG. 178 is a top plan view of the linear drive assembly shown in FIG. 176.

Figure 179:
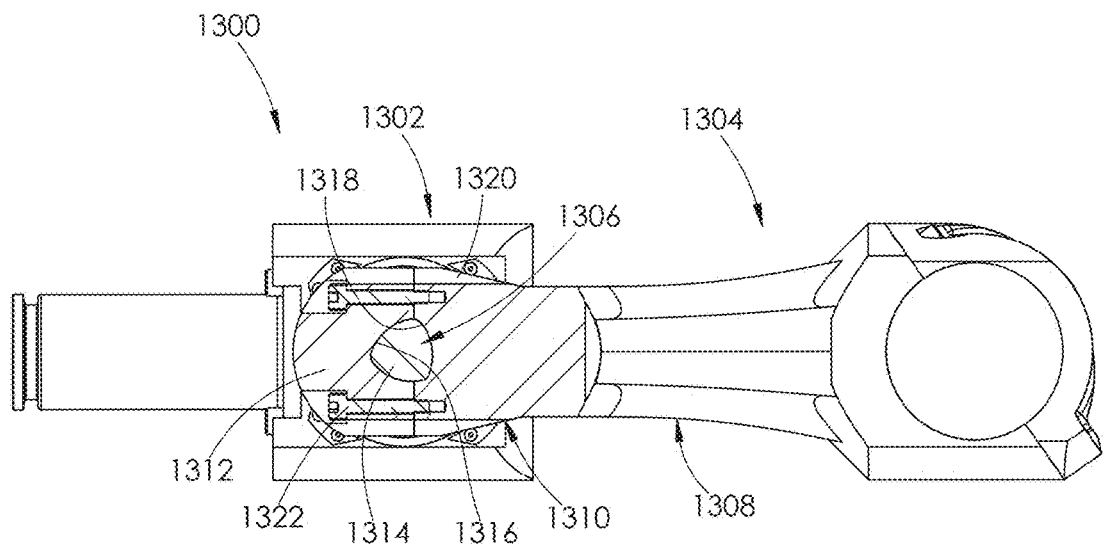

FIG. 179 is a cross-sectional view of the linear drive assembly shown in FIG. 178, taken along line BG-BG.

Figure 180:
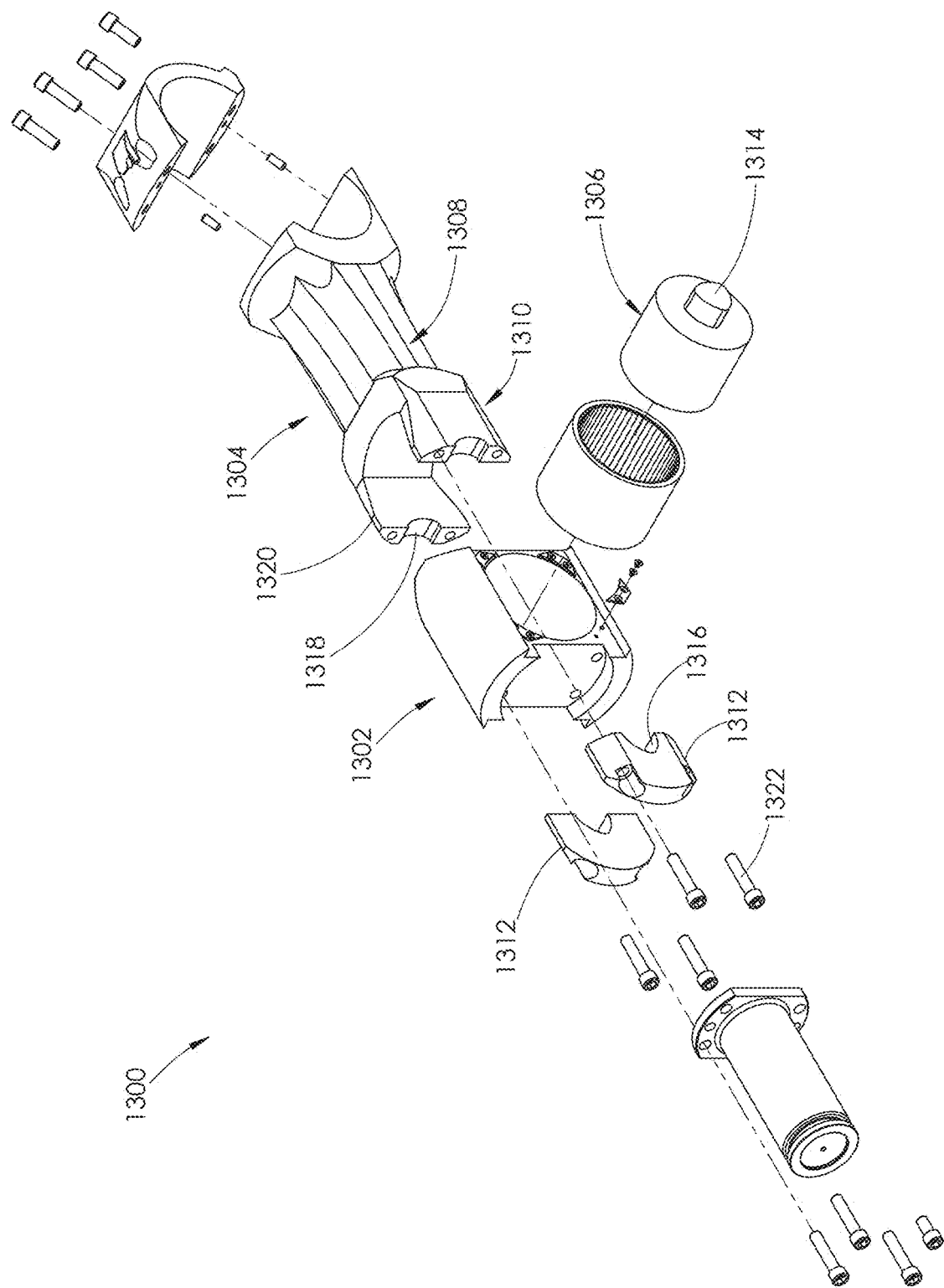

FIG. 180 is a front perspective and exploded view of the linear drive assembly shown in FIG. 176.

Figure 181:
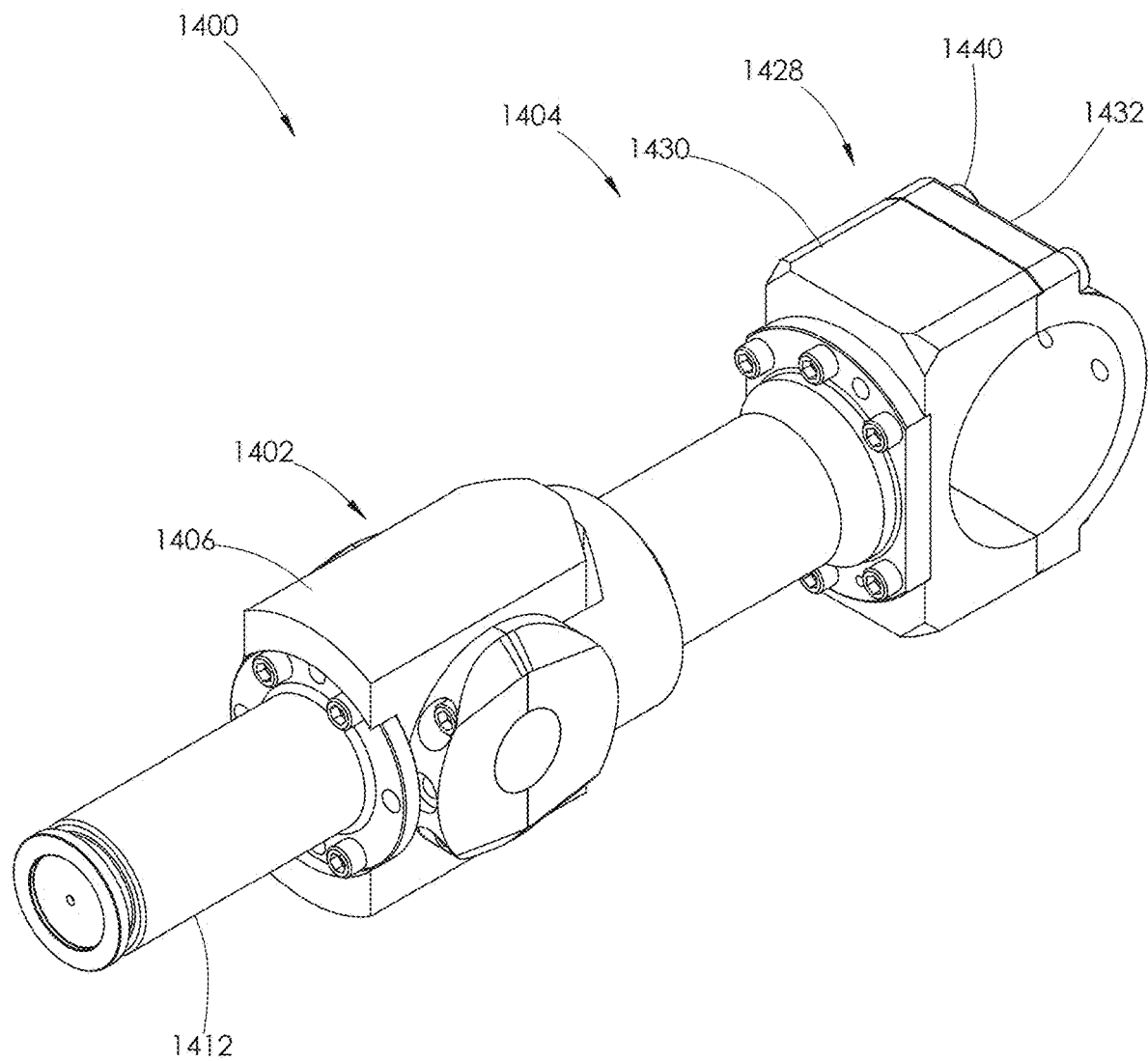

FIG. 181 is a front perspective view of another embodiment of a linear drive assembly disclosed herein.

Figure 182:
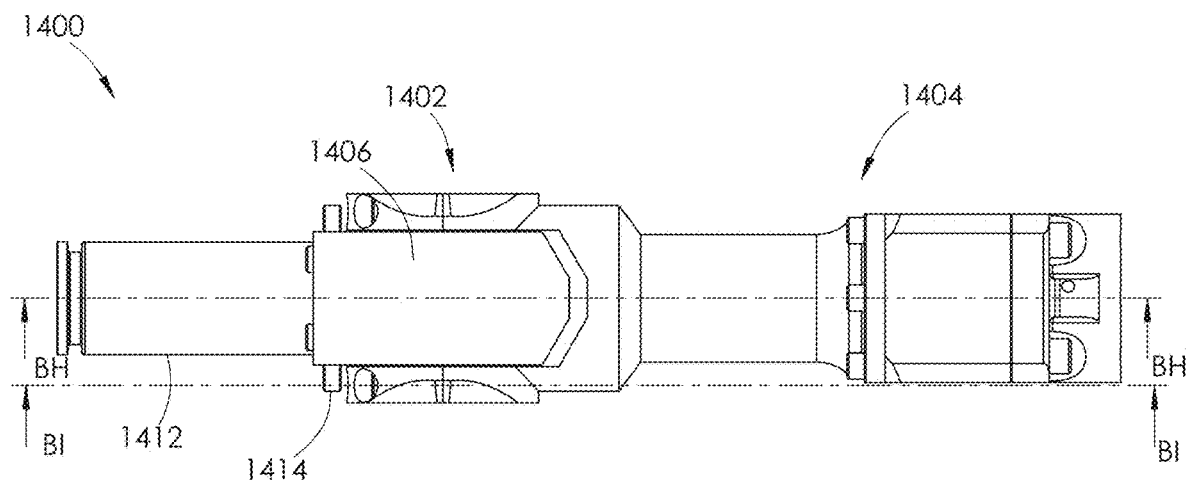

FIG. 182 is a top plan view of the linear drive assembly shown in FIG. 181.

Figure 183:
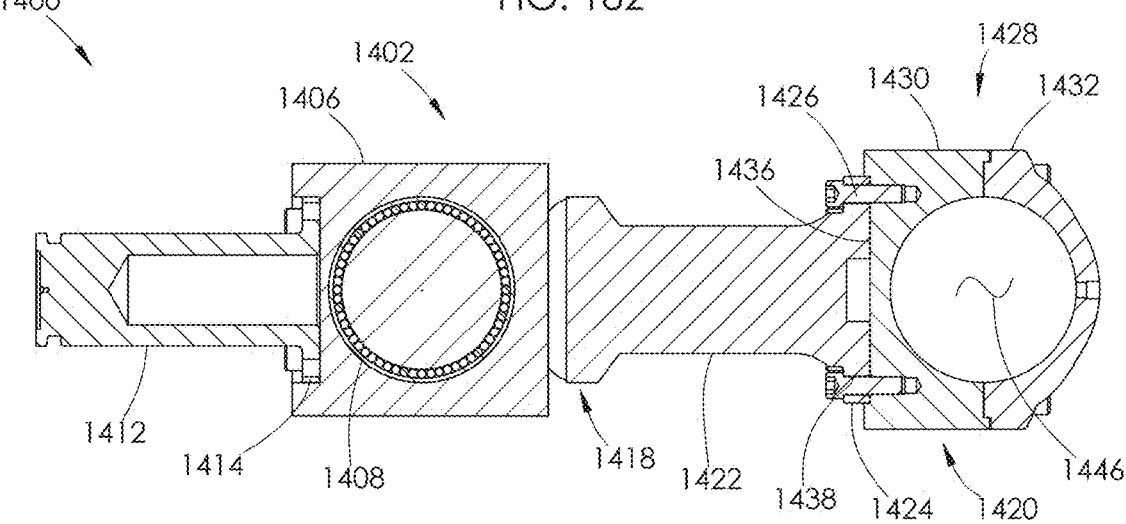

FIG. 183 is a cross-sectional view of the linear drive assembly shown in FIG. 182, taken along line BH-BH.

Figure 184:
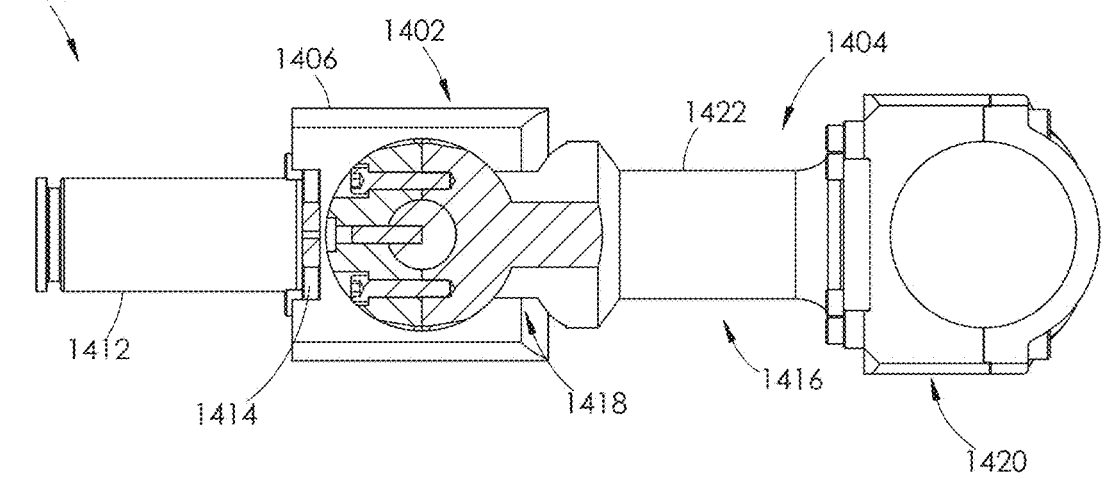

FIG. 184 is a cross-sectional view of the linear drive assembly shown in FIG. 182, taken along line BI-BI.

Figure 185:
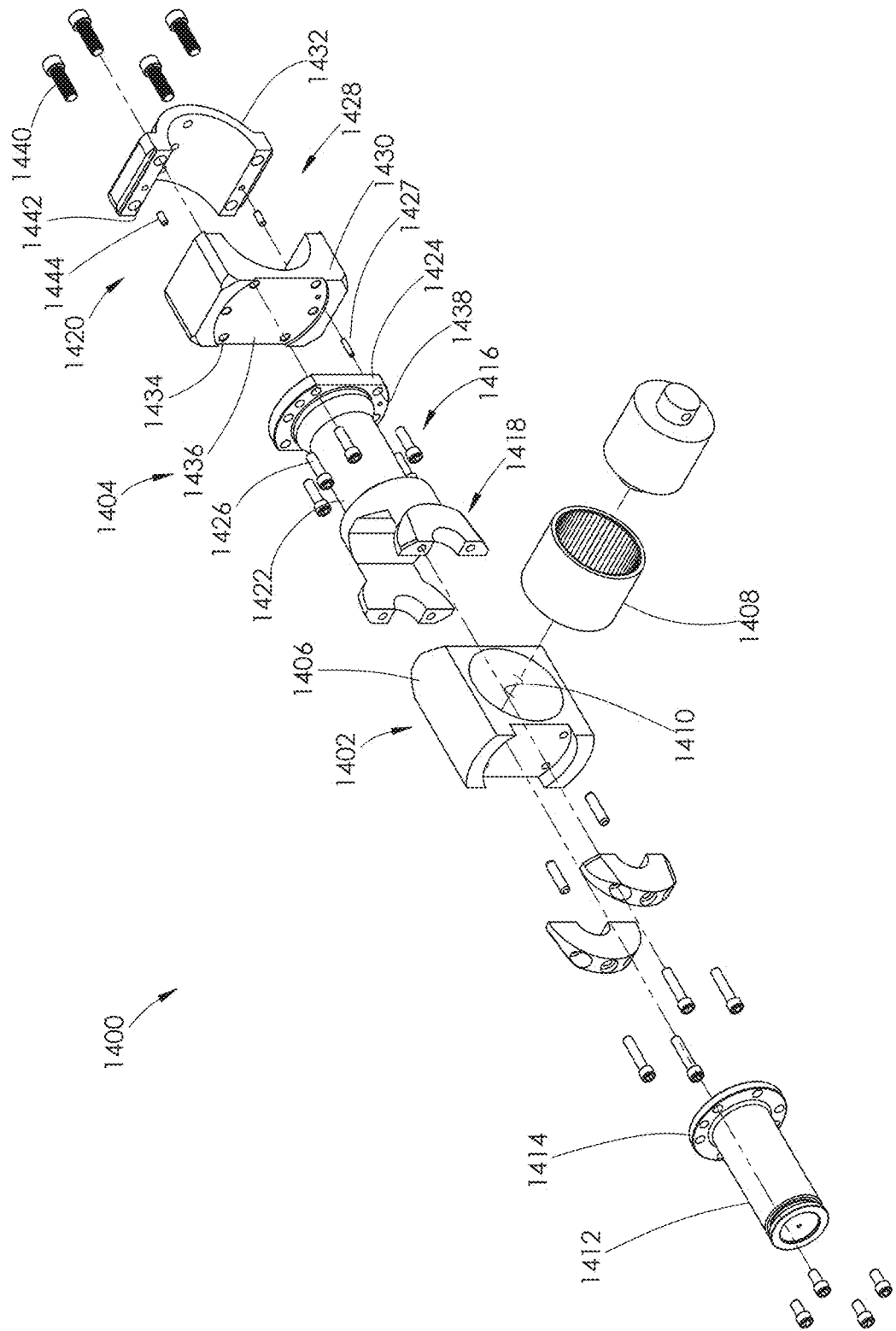

FIG. 185 is a front perspective and exploded view of the linear drive assembly shown in FIG. 181.

Figure 186:
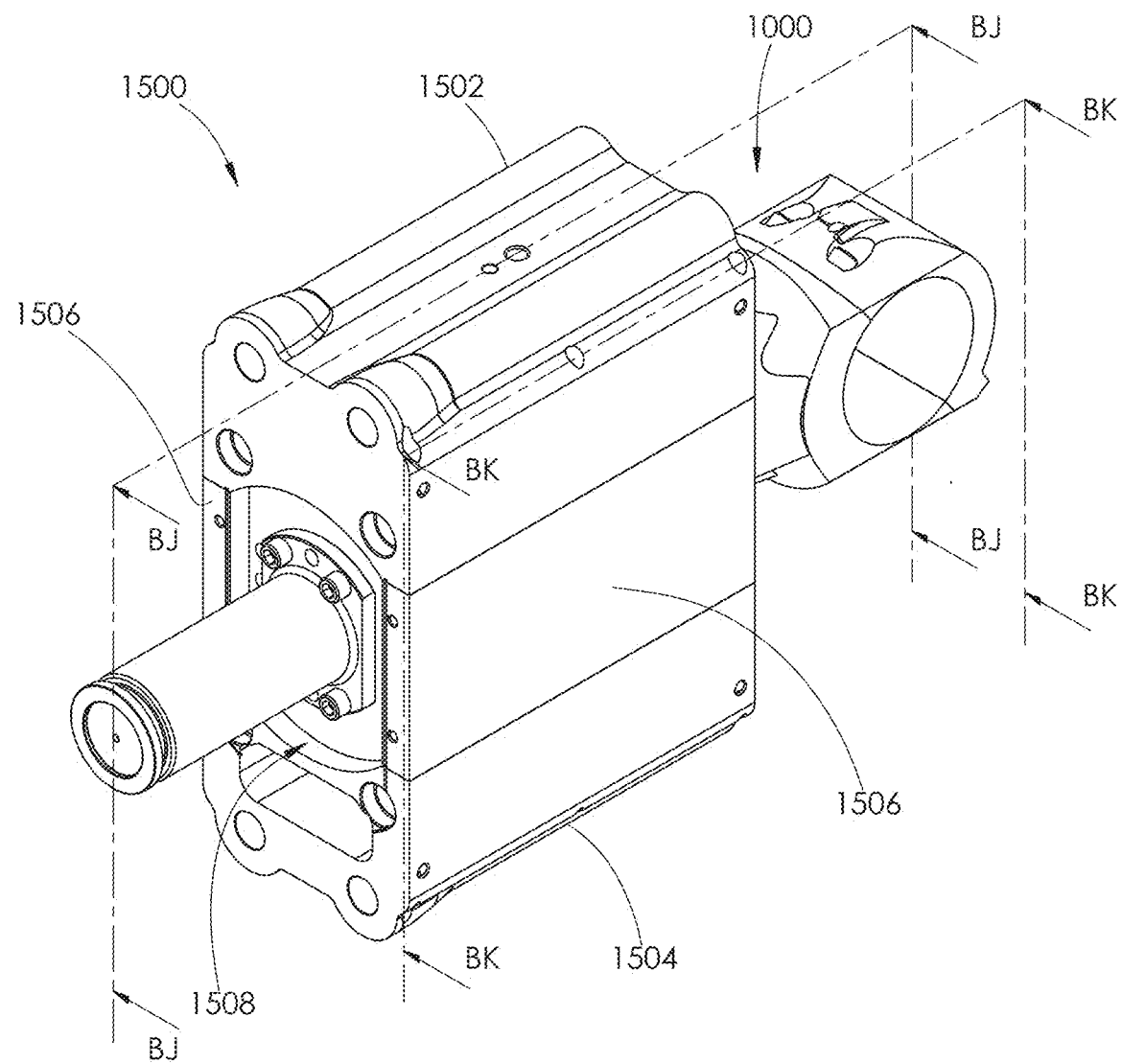

FIG. 186 is a front perspective view of another embodiment of a crosshead guide disclosed herein having the linear drive assembly shown in FIG. 141 installed therein.

Figure 187:
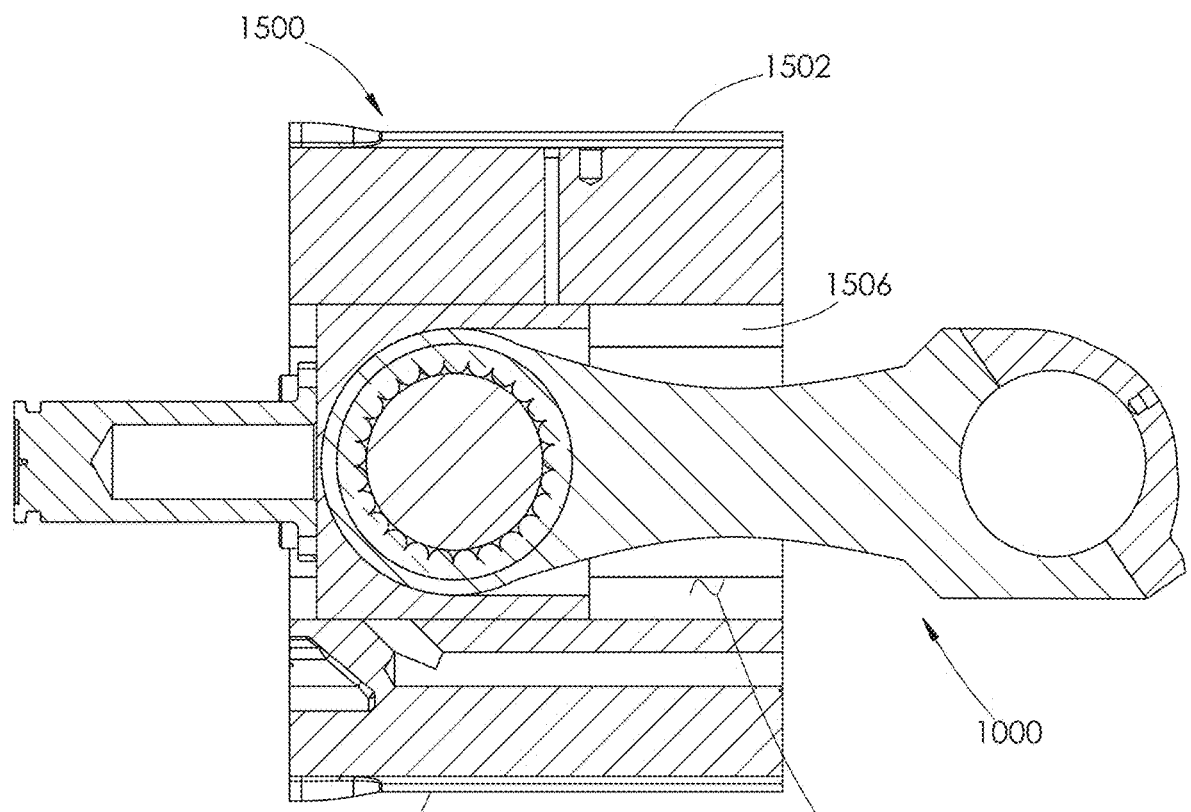

FIG. 187 is a cross-sectional view of the crosshead guide and linear drive assembly shown in FIG. 186, taken along line BJ-BJ.

Figure 188:
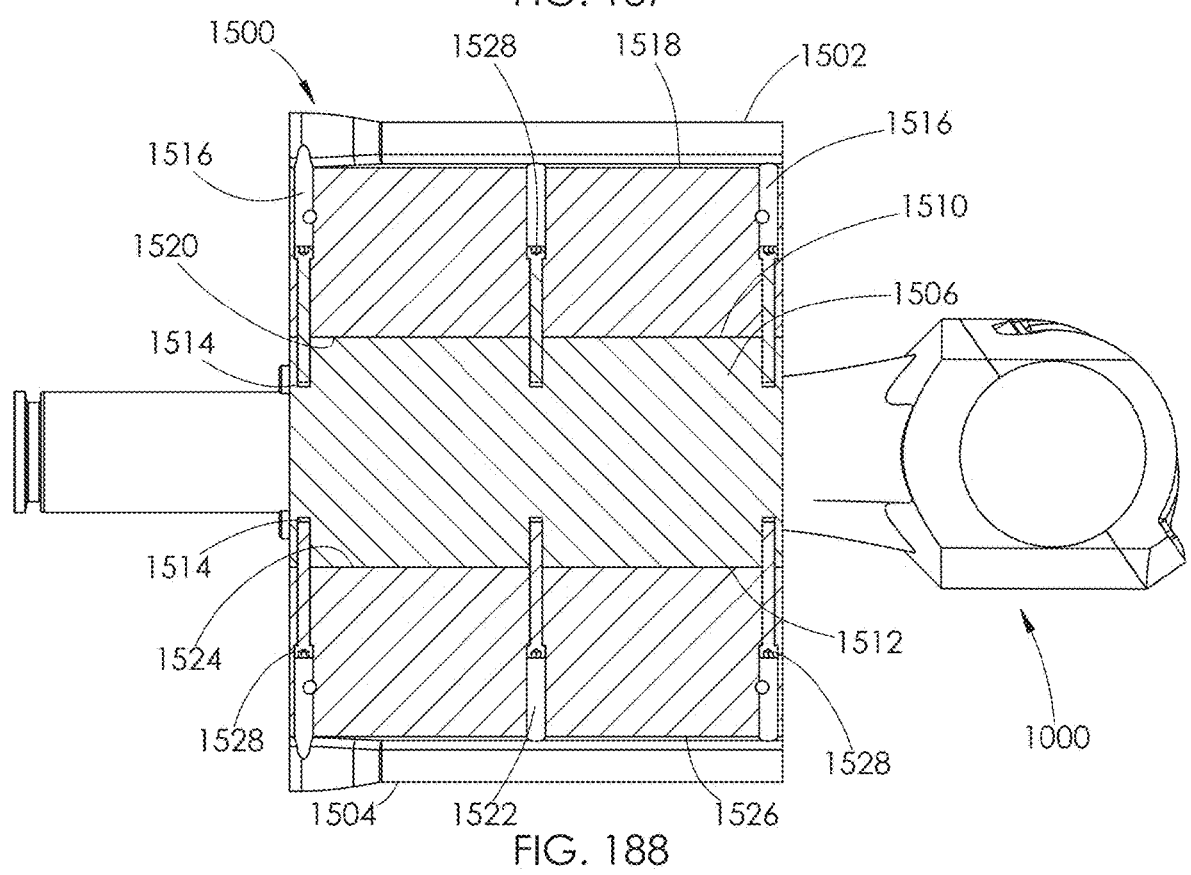

FIG. 188 is a cross-sectional view of the crosshead guide and linear drive assembly shown in FIG. 186, taken along line BK-BK.

Figure 189:
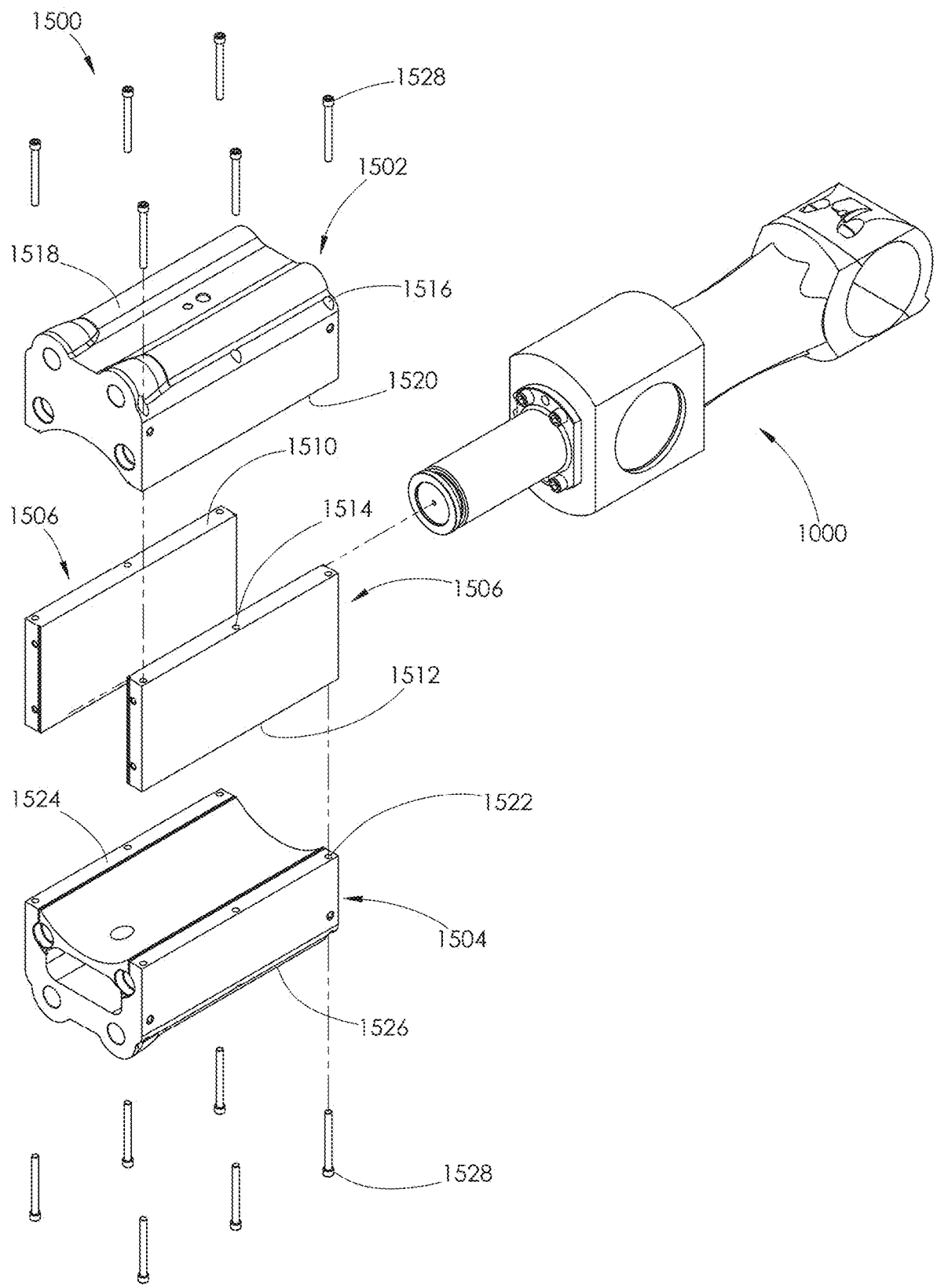

FIG. 189 is a front perspective and partially exploded view of the crosshead guide and linear drive assembly shown in FIG. 186.

Figure 190:
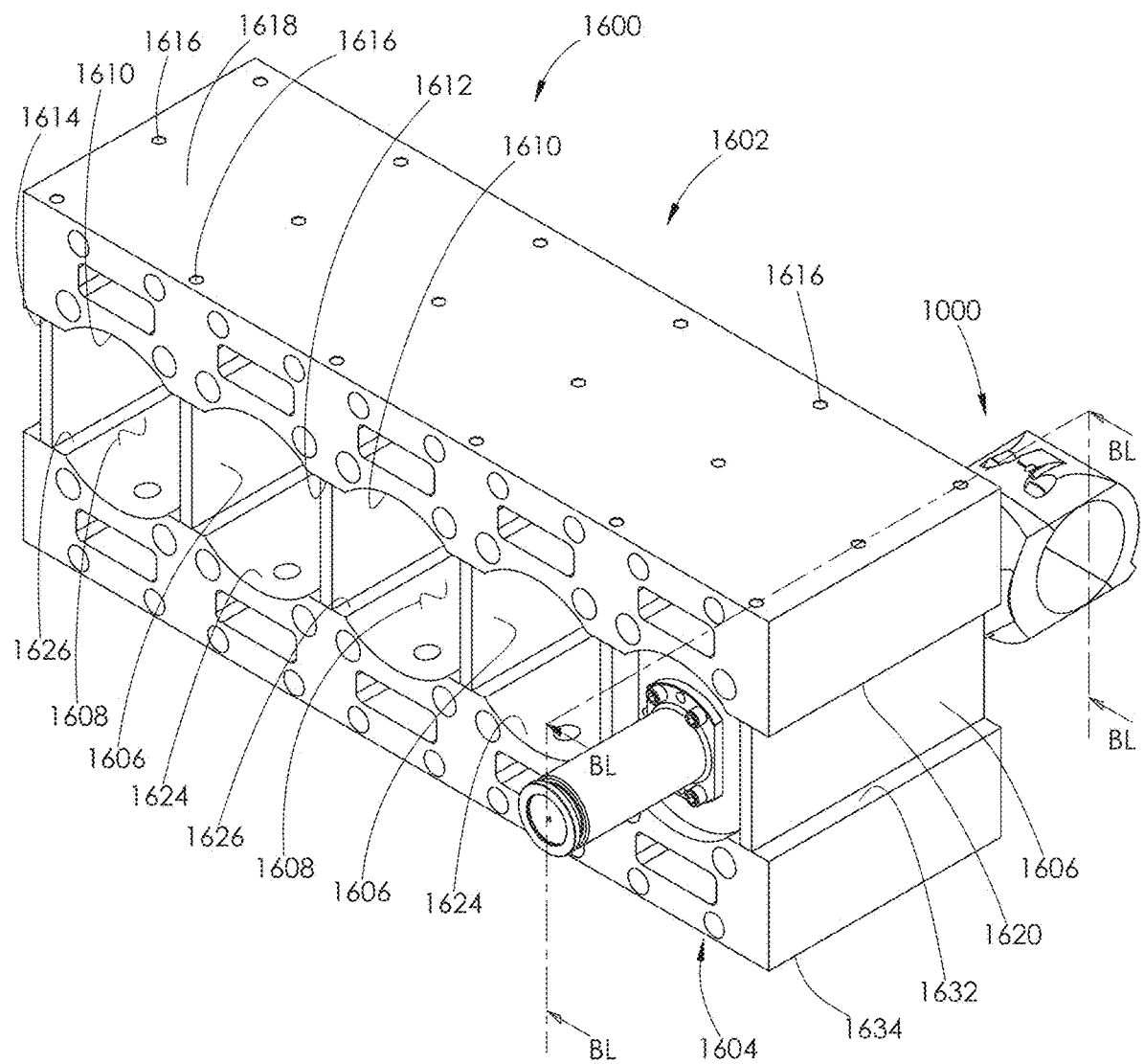

FIG. 190 is a front perspective view of another embodiment of a crosshead section disclosed herein having the linear drive assembly shown in FIG. 141 installed therein.

Figure 191:
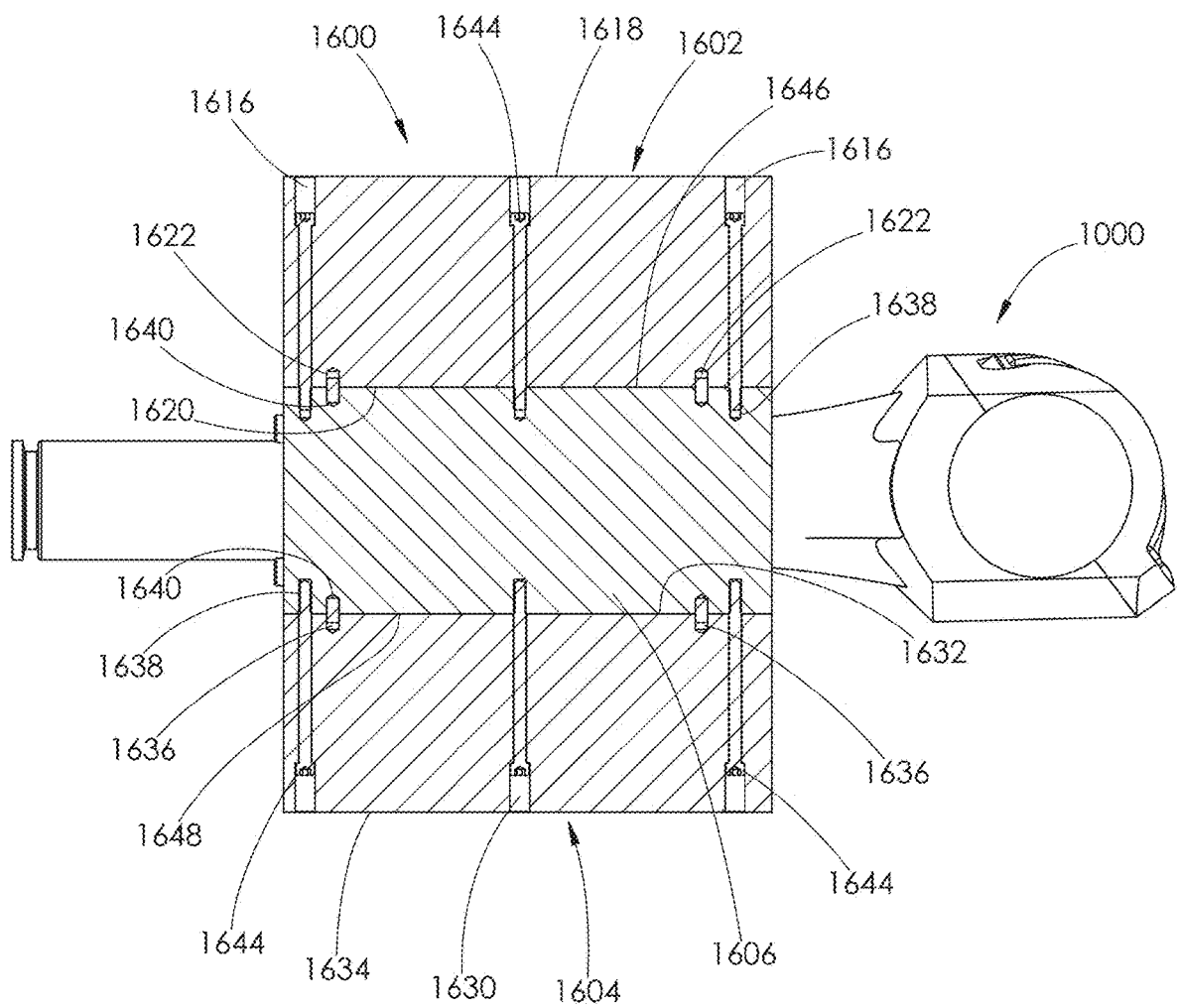

FIG. 191 is a cross-sectional view of the crosshead section and linear drive assembly shown in FIG. 190, taken along line BL-BL.

Figure 192:
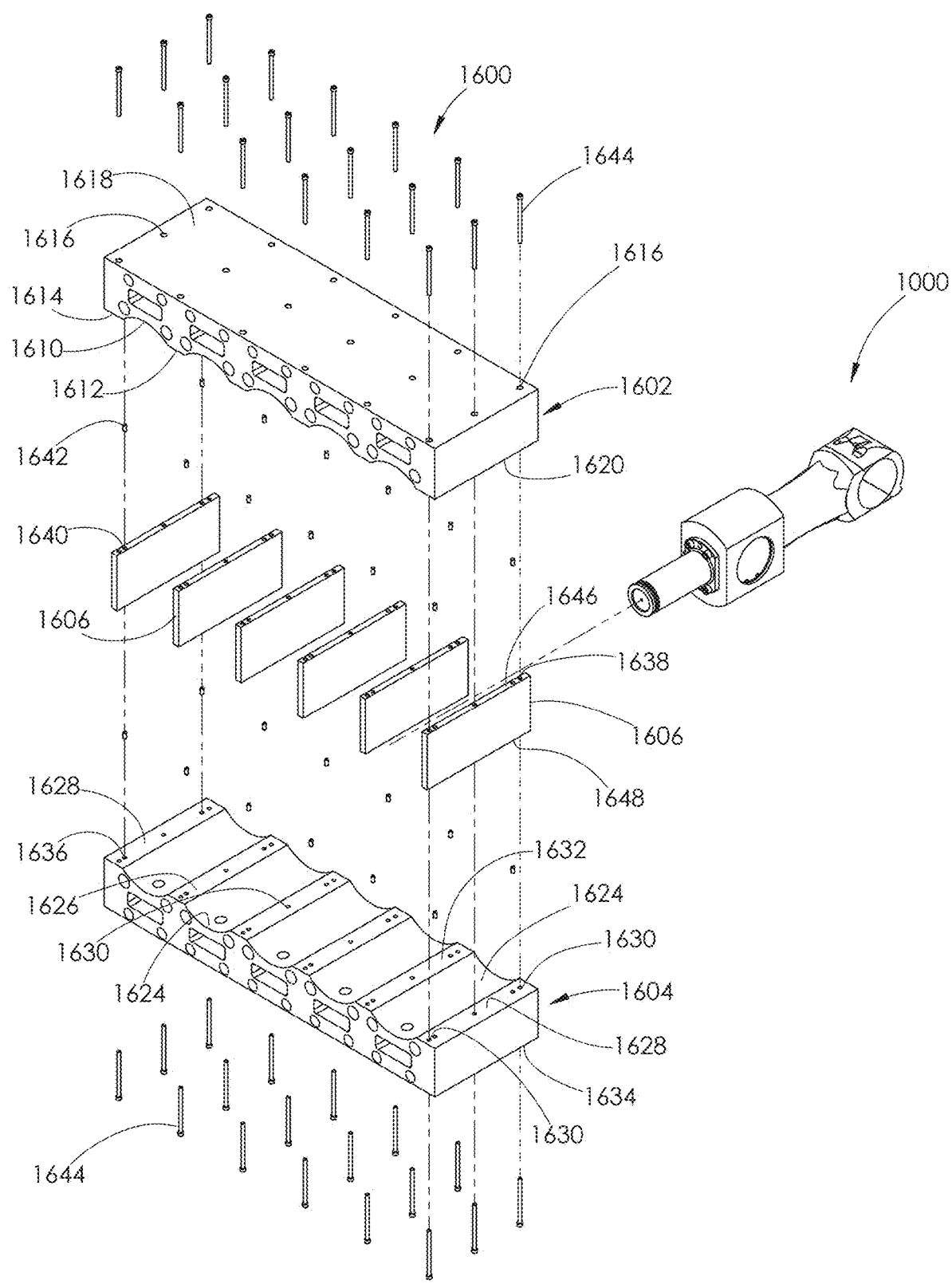

FIG. 192 is a front perspective and partially exploded view of the crosshead section and linear drive assembly shown in FIG. 190.

DETAILED DESCRIPTION

Figure 10:
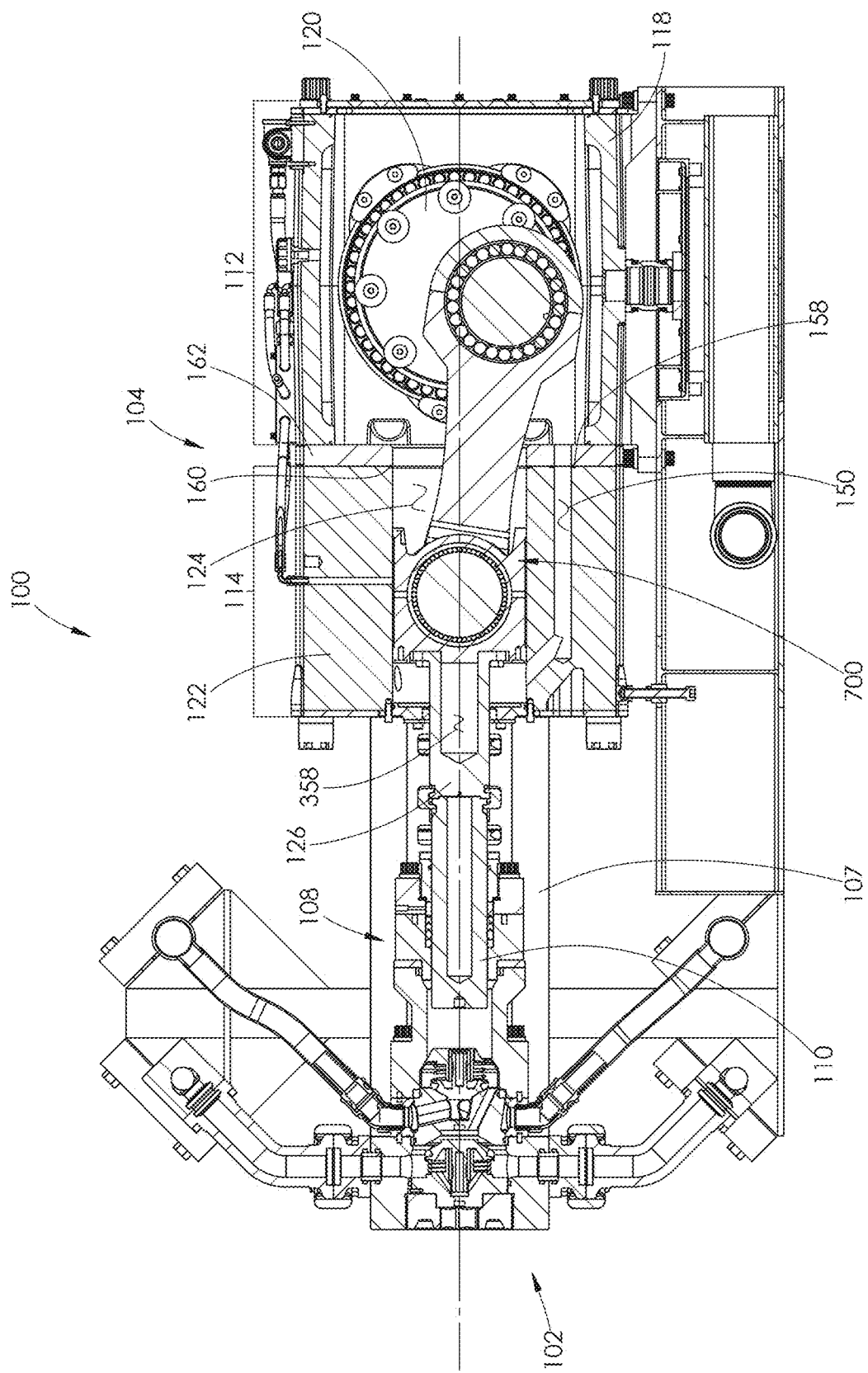
FIG. 10 is a cross-sectional view of the pump shown in FIG. 9, taken along line C-C.
Figure 11:
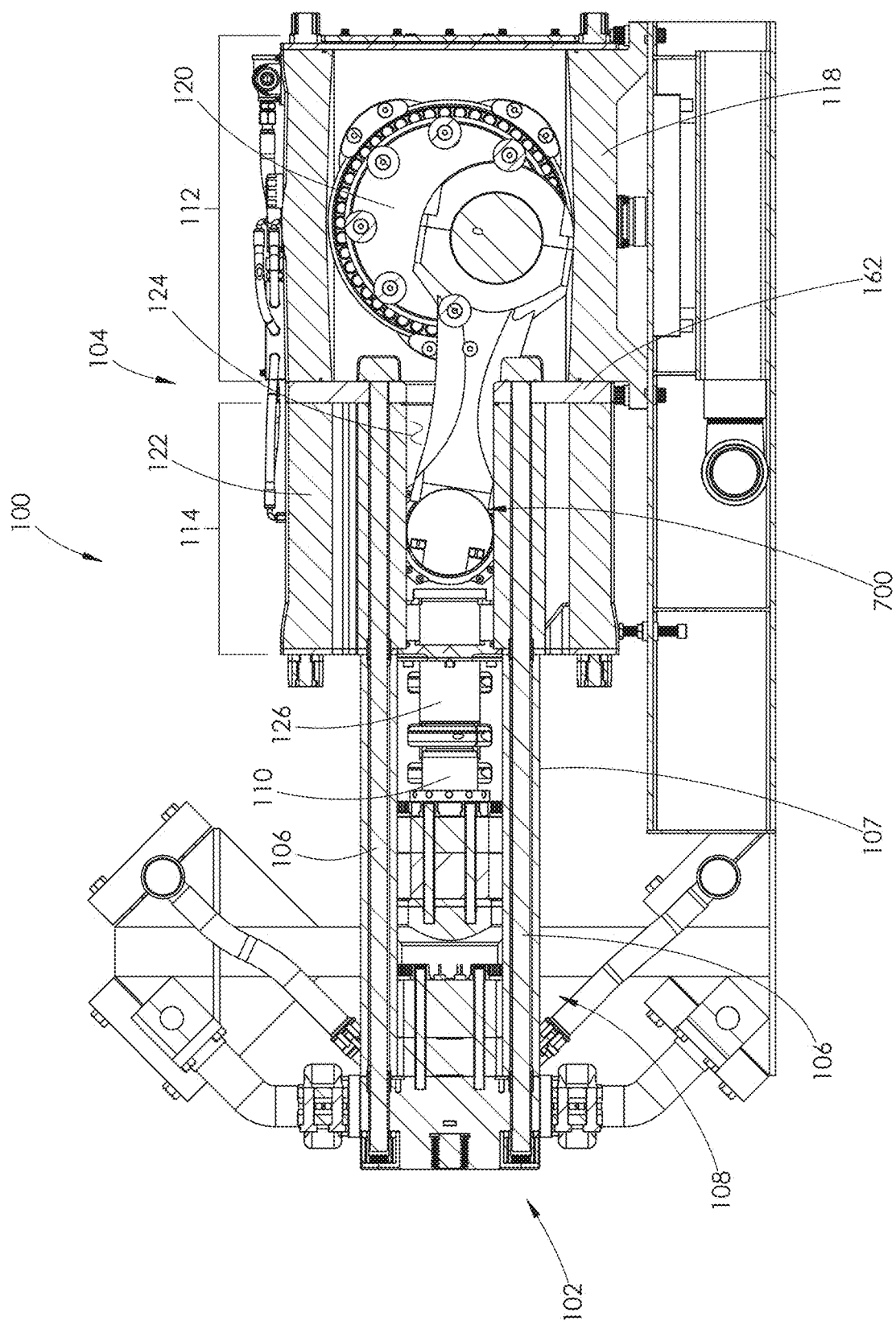
FIG. 11 is a cross-sectional view of the pump shown in FIG. 9, taken along line D-D.

Turning now to FIGS. 8-12, one embodiment of a high-pressure pump 100 is shown. The pump 100 comprises a fluid end assembly 102 attached to a power end assembly 104 using a plurality of stay rods 106, as shown in FIG. 11. A portion of each stay rod 106 is surrounded by a sleeve 107 shown in FIGS. 8 and 10-12. The fluid end assembly 102 comprises a plurality of fluid end sections 108 positioned in a side-by-side relationship. During operation, a plunger 110 installed within each fluid end section 108 reciprocates therein to pressurize fluid, as shown in FIG. 10. The various components of the fluid end assembly 102 are described in more detail in U.S. patent application Ser. No. 17/884,691, authored by Keith et al., the entire contents of which are incorporated herein by reference ("the '691 application").

Figure 12:
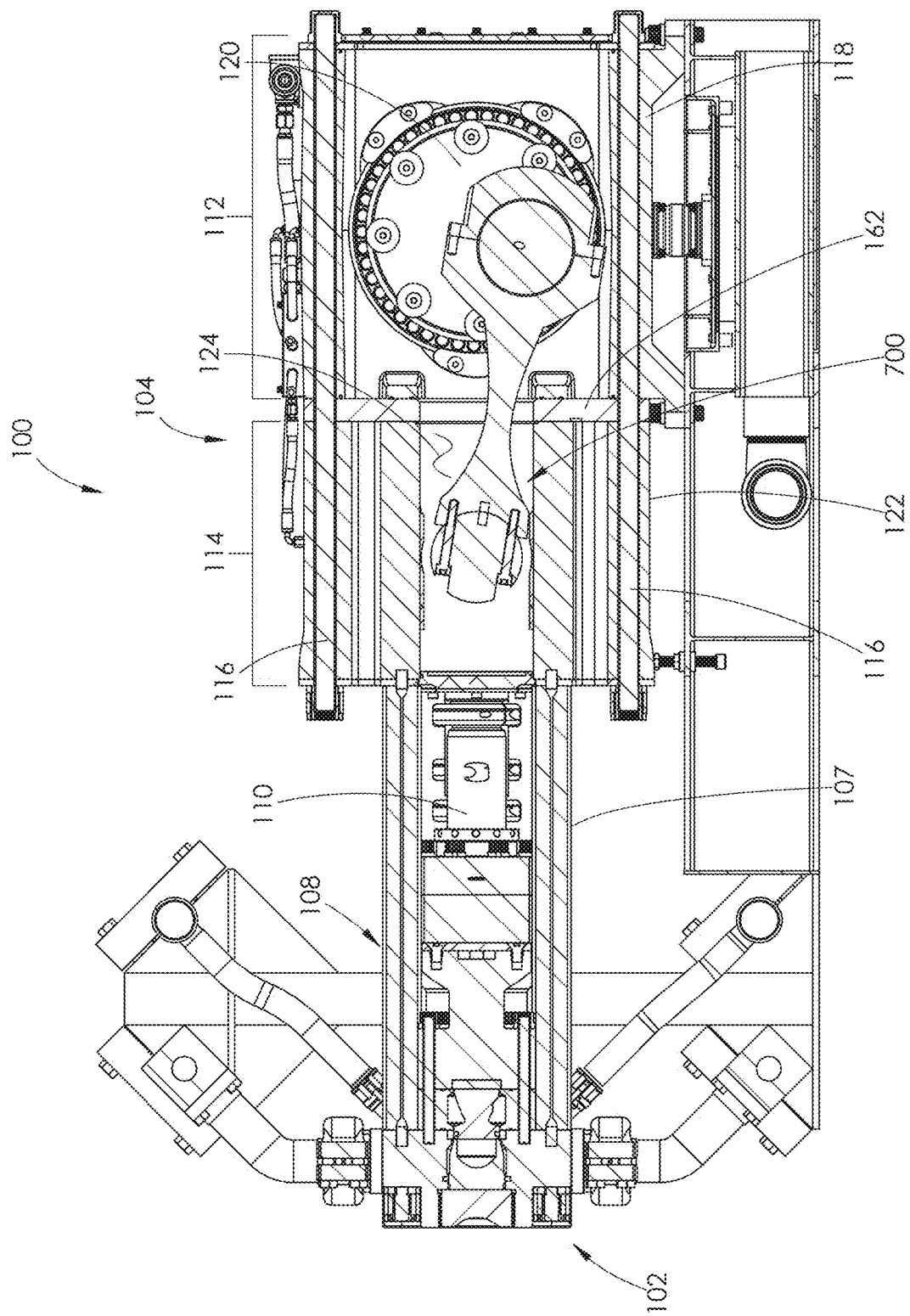
FIG. 12 is a cross-sectional view of the pump shown in FIG. 9, taken along line E-E.

Continuing with FIGS. 8-13, the power end assembly 104 comprises a crank section 112 joined to a crosshead section 114 by a plurality of stay rods 116, as shown best in FIG. 12. The stay rods 116 may be characterized as a plurality of first stay rods or a first set of stay rods or tie rods 116, while the stay rods 106, shown best in FIG. 11, may be characterized as a plurality of second stay rods or a second set of stay rods 106. The first set of stay rods 116 secure the components of the power end assembly 104 together, while the second set of stay rods 106 secure the fluid end assembly 102 to the power end assembly 104.

Continuing with FIGS. 10-13, the crank section 112 comprises an integrally formed crank frame 118 housing a crankshaft 120, and the crosshead section 114 comprises a plurality of crosshead guides 122 situated in a side-by-side relationship. A crosshead bore 124 is formed within each crosshead guide 122 and each bore is sized to receive a portion of a linear drive assembly 700, as shown in FIGS. 10-12. Each linear drive assembly 700 is attached to the crankshaft 120 and is configured to cause the reciprocation of a pony rod 126 and the corresponding plunger 110. The various components of the power end assembly 104 are described in more detail in the '691 application, previously incorporated herein by reference.

The linear drive assembly 700 shown in FIGS. 10-12 is just one embodiment of many linear drive assembly embodiments disclosed herein. As will be described herein, each disclosed linear drive assembly embodiment is configured to reduce wear incurred by the components of the assembly during operation. Reducing the amount of wear incurred by the components during operation thereby increases the time between maintenance intervals during operation. The linear drive assembly 700 shown in FIGS. 10-12 will be described in greater detail with reference to FIGS. 100-108, later herein.

Figure 18:
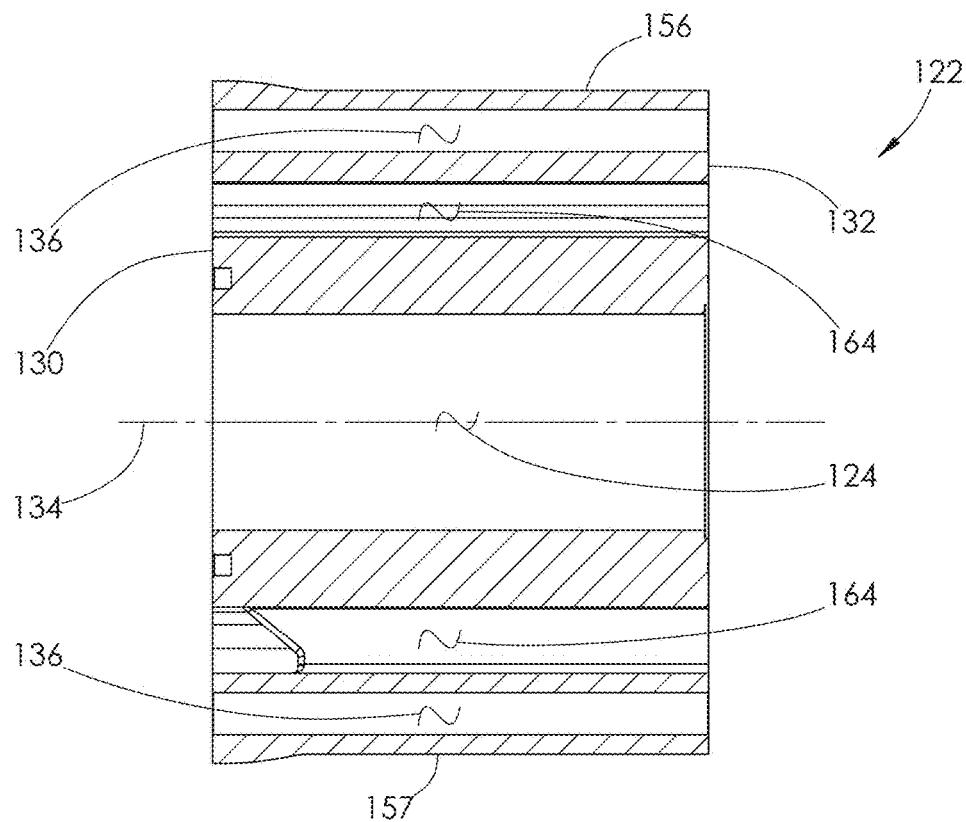
FIG. 18 is a cross-sectional view of the crosshead guide shown in FIG. 14, taken along line F-F.
Figure 19:
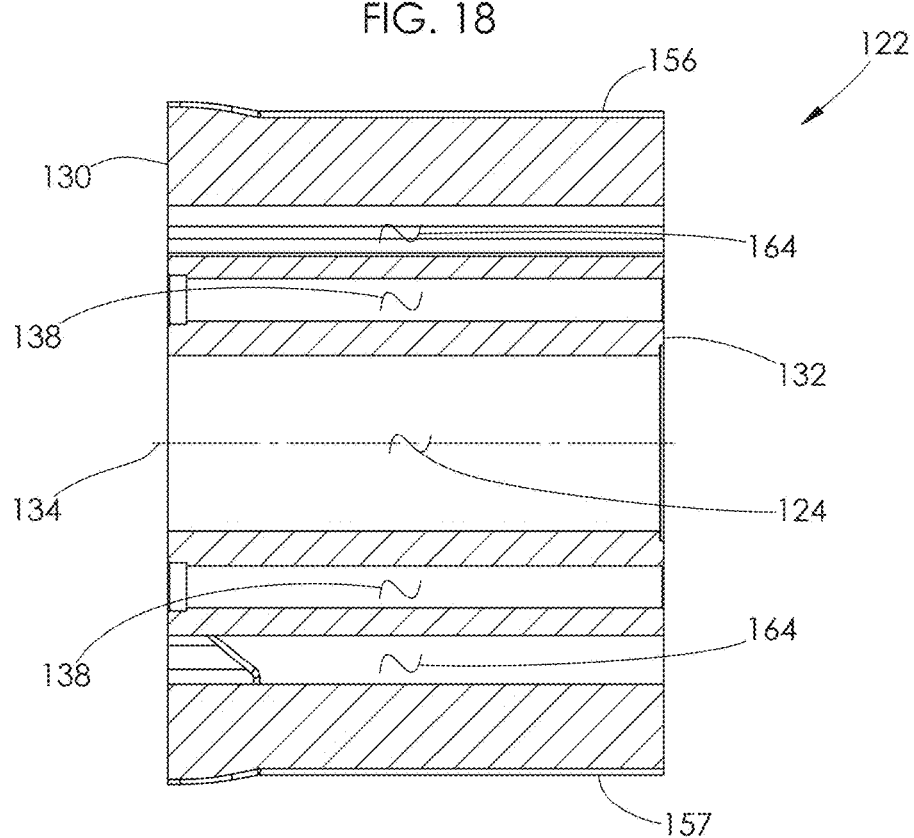
FIG. 19 is a cross-sectional view of the crosshead guide shown in FIG. 14, taken along line G-G.
Figure 20:
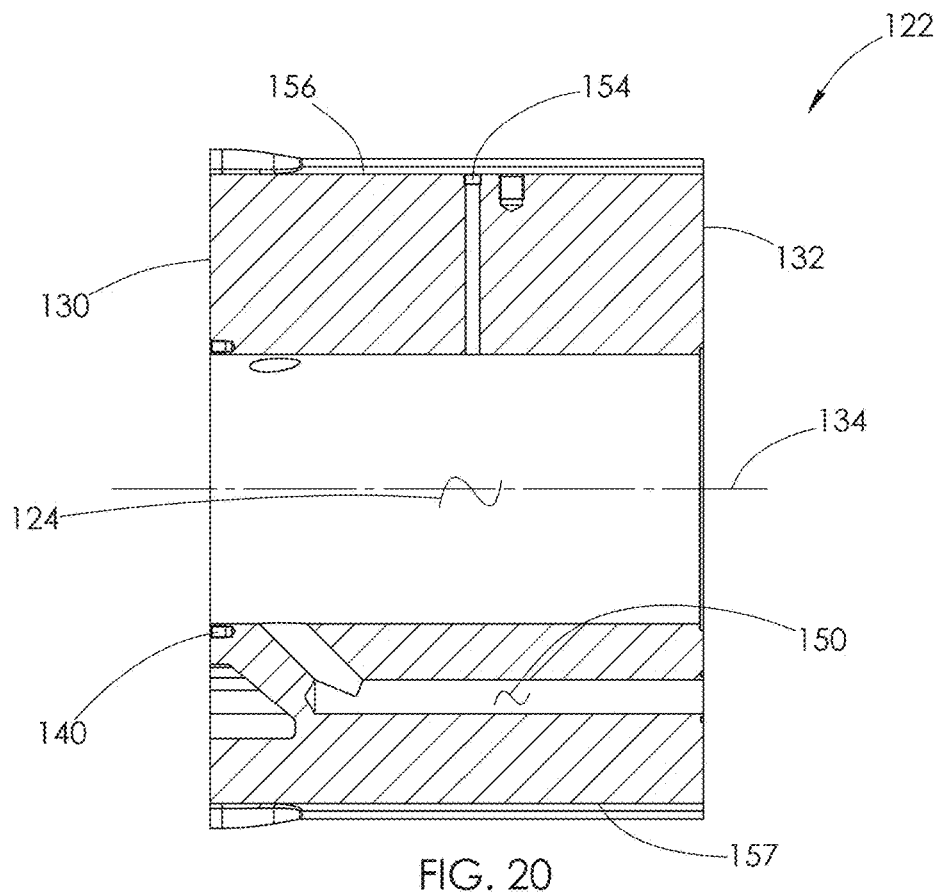
FIG. 20 is a cross-sectional view of the crosshead guide shown in FIG. 14, taken along line H-H.

Turning to FIGS. 14-21, each embodiment of the linear drive assemblies described herein is configured to be installed within one of the crosshead guides 122 or is configured to be installed within another embodiment of a crosshead guide disclosed later herein. Each crosshead guide 122 has the general shape of a rectangular prism and comprises opposed front and rear surfaces 130 and 132. The crosshead bore 124 opens on the front and rear surfaces 130 and 132 of the crosshead guide 122 and has a longitudinal axis 134 extending therethrough, as shown in FIG. 20. The crosshead guide 122 further comprises a plurality of upper and lower first through-bores 136, and a plurality of upper and lower second through-bores 138. The first through-bores 136 are configured to receive the first set of stay rods 116, as shown in FIG. 12, and the second through-bores 138 are configured to receive the second set of stay rods 106, as shown in FIG. 11.

Figure 13:
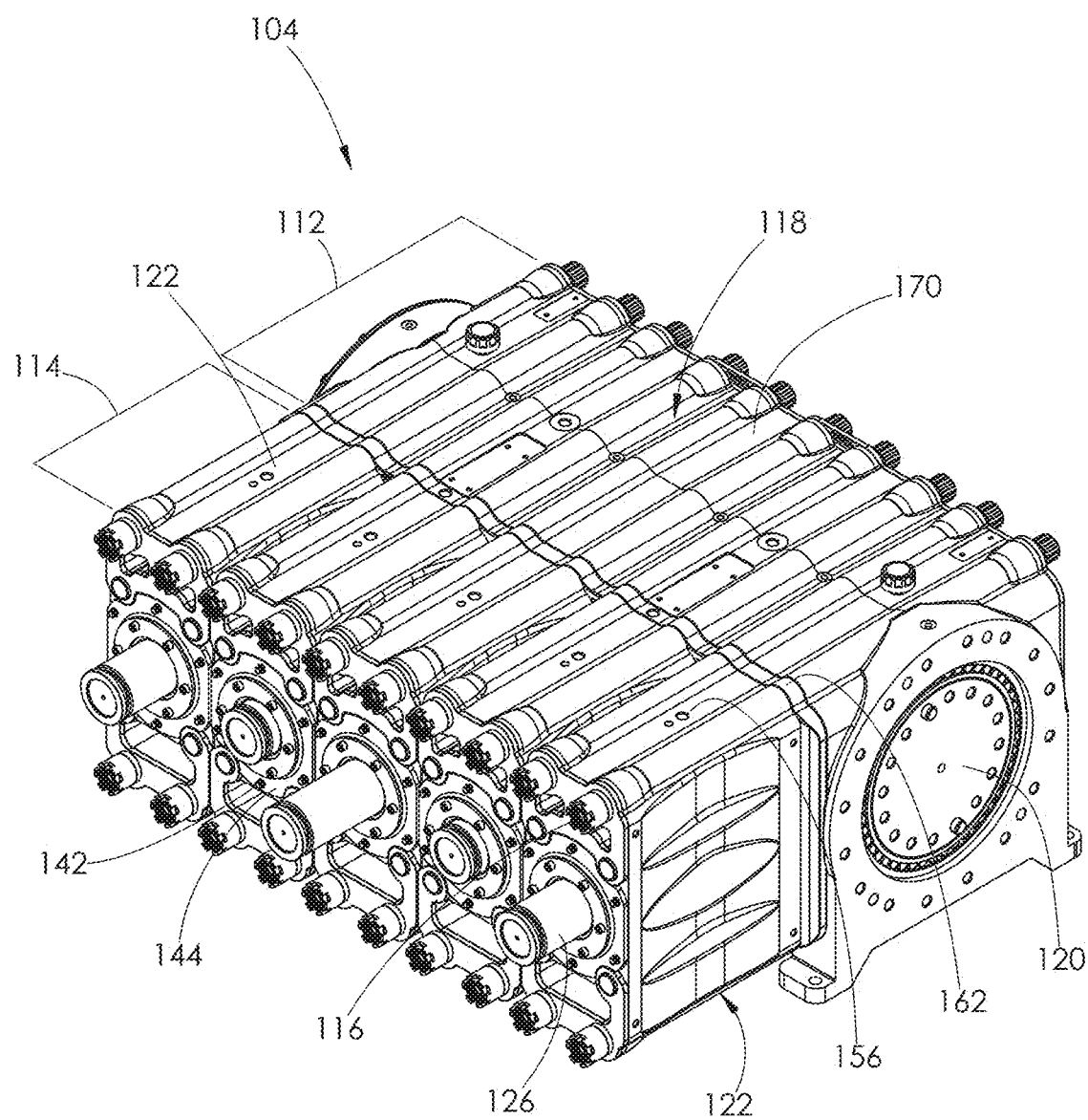
FIG. 13 is a front perspective view of the power end assembly shown in FIG. 8.

Continuing with FIGS. 14-21, a plurality of threaded openings 140 are formed in the front surface 130 and surround an opening of the crosshead bore 124. The threaded openings 140 are configured to receive a plurality of fasteners 142 used to secure a pony rod cover 144 to the crosshead guide 122, as shown in FIG. 13. The pony rod cover 144 seals the opening of the crosshead bore 124 around the pony rod 126 at the front surface 130 of the crosshead guide 122. The pony rod cover 144 is described in more detail in the '691 application.

Figure 21:
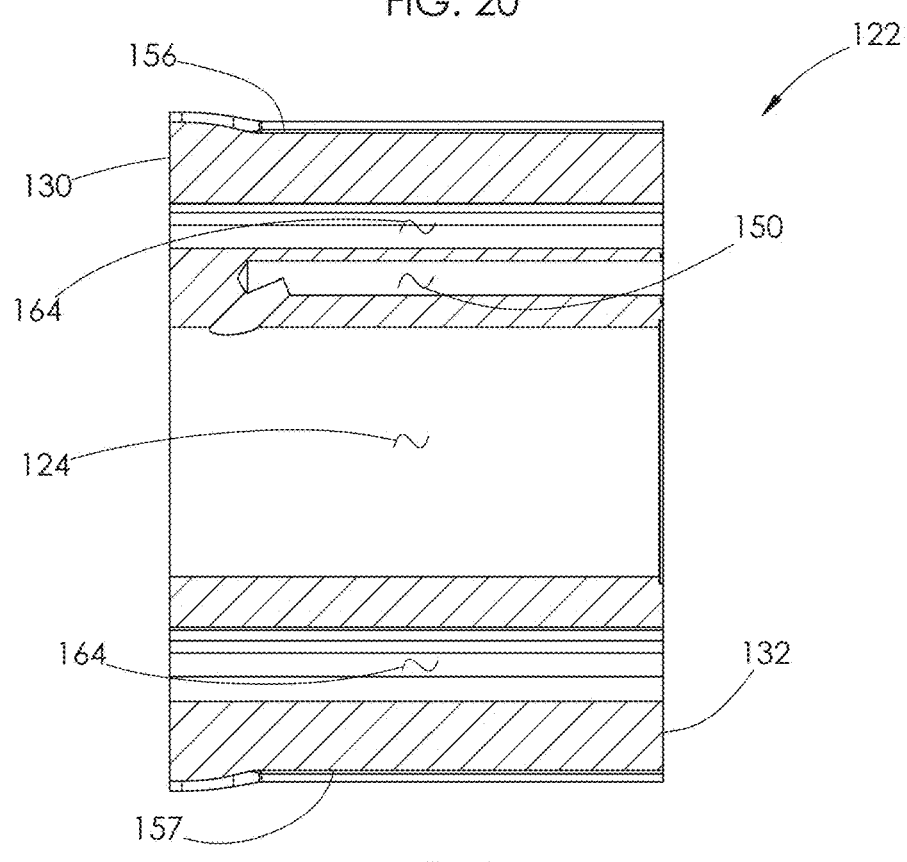
FIG. 21 is a cross-sectional view of the crosshead guide shown in FIG. 16, taken along line I-I.

Continuing with FIGS. 16, 17, 20, and 21, the crosshead guide 122 further comprises a plurality of exhaust vents 150 formed therein. Each vent 150 interconnects the crosshead bore 124 and the rear surface 132 of the guide 122, as shown in FIGS. 20 and 21. Two vents 150 are positioned between the crosshead bore 124 and an upper surface 156 of the crosshead guide 122, and a third vent 150 is positioned between the crosshead bore 124 and a lower surface 157 of the crosshead guide 122, as shown in FIGS. 16 and 17. In operation, any air pressure accumulating within the crosshead bore 124 is vented into the open space within the crank frame 118 through one or more of the vents 150, as shown in FIG. 10.

Figure 8:
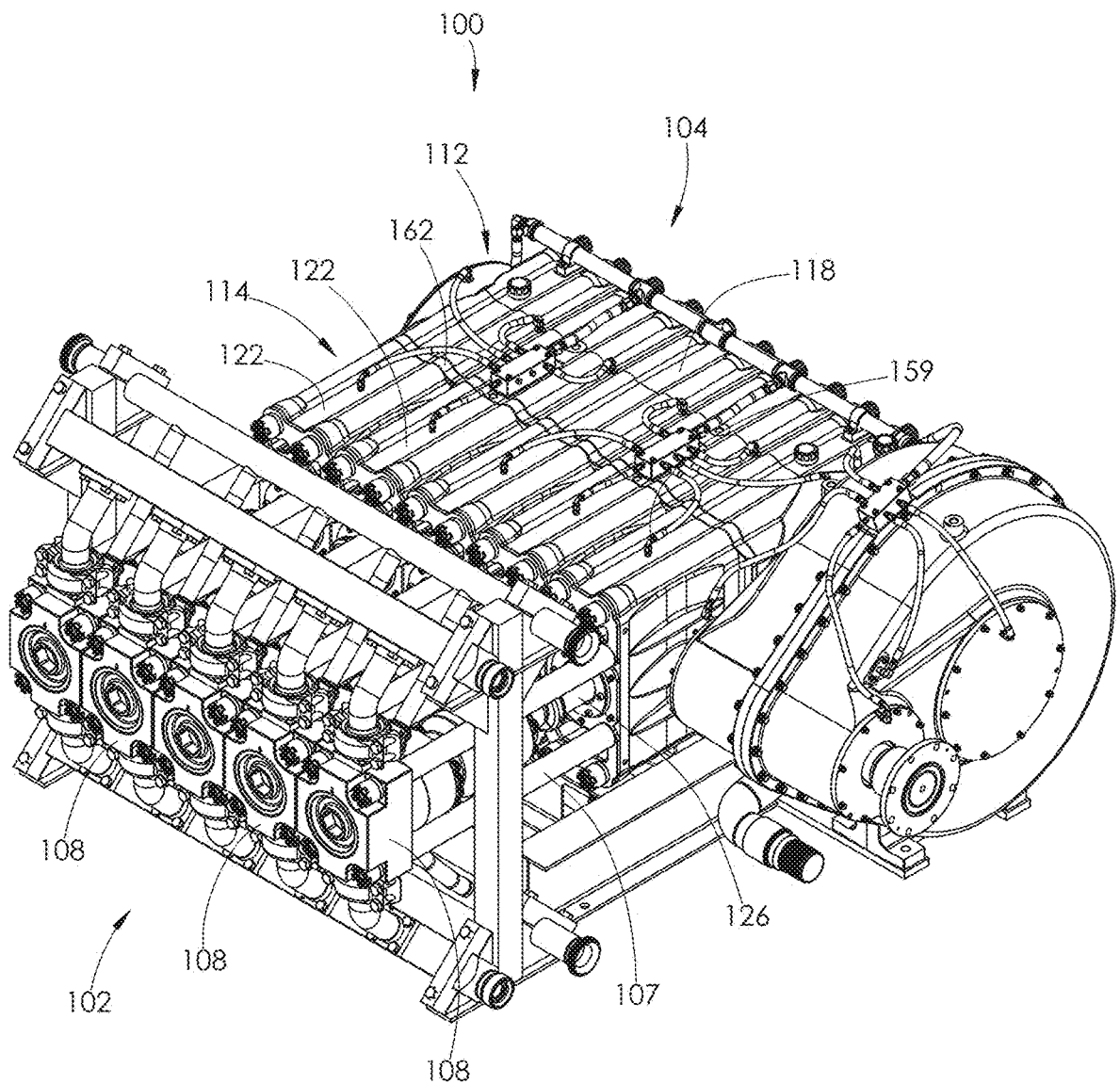
FIG. 8 is a front perspective view of one embodiment of a high-pressure pump.
Figure 9:
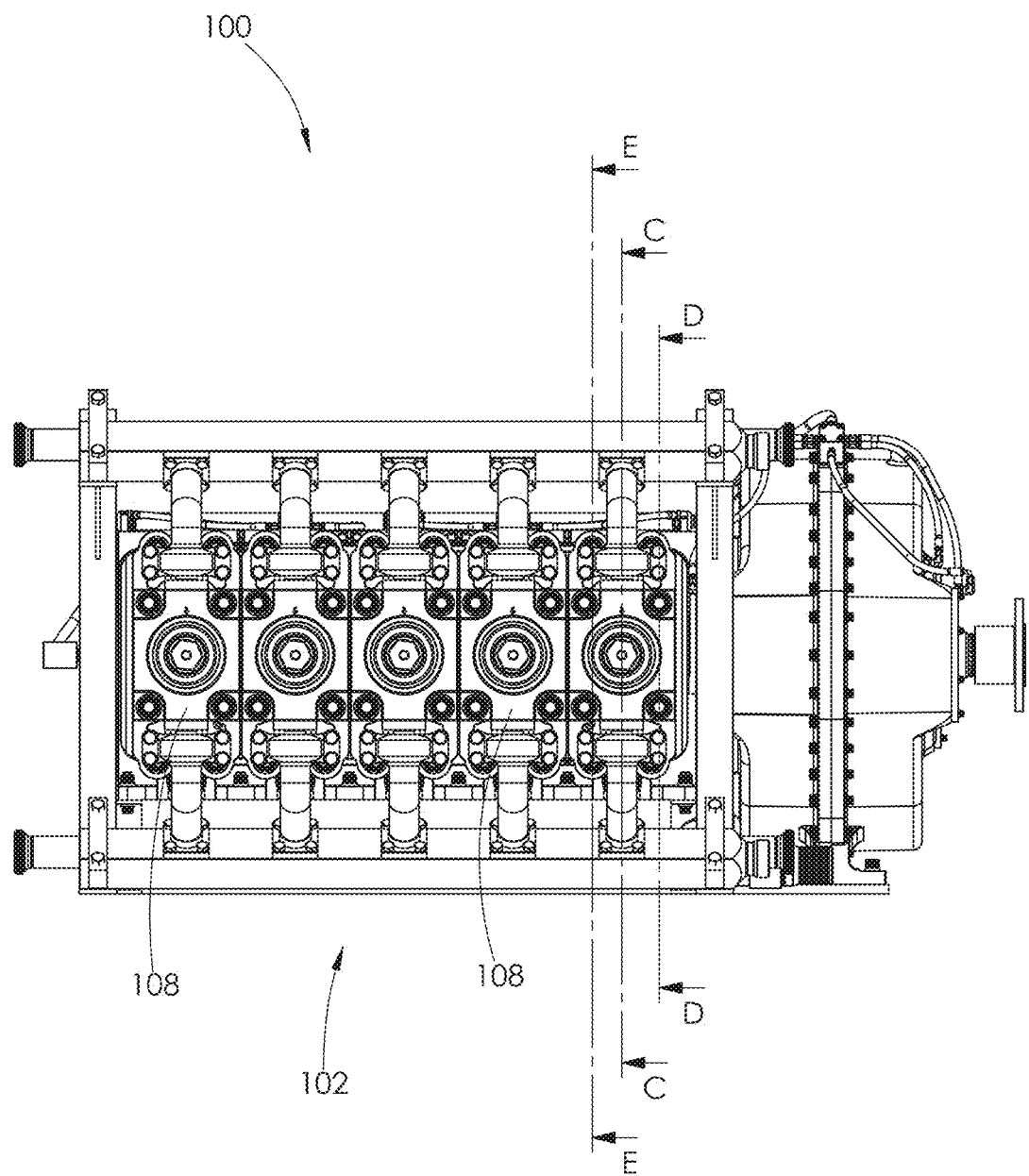
FIG. 9 is a front elevational view of the pump shown in FIG. 8.

Continuing with FIGS. 17 and 20, the crosshead guide 122 further comprises a lubricant port 154 configured to receive lubricant from a lubrication system 159, shown in FIG. 8. The lubricant port 154 interconnects the upper surface 156 and the crosshead bore 124 of the crosshead guide 122. In operation, lubricant delivered to the crosshead bore 124 from the lubricant port 154 eventually drains from the crosshead guide 122 and into the crank frame 118 via one or more of the vents 150 and/or the crosshead bore 124, as shown in FIG. 10. Lubricant is prevented from leaking around the crosshead guide 122 by a plurality of O-ring seals (not shown) installed within grooves 158 and 160 formed in the rear surface 132 of the guide 122, as shown in FIGS. 16 and 17. The grooves 158 and 160 surround the opening of the vents 150 and the opening of the crosshead bore 124. The O-ring seals installed within the grooves 158 and 160 engage a central support plate 162, shown in FIG. 10 and described in detail in the '691 application.

Continuing with FIGS. 14-21, each crosshead guide 122 is heavy and made of a single casting or of single-piece construction and may require a lifting mechanism to maneuver. To reduce the weight of each crosshead guide 122 as much as possible, a plurality of non-symmetrically shaped holes 164 are formed within the crosshead guide 122 and interconnect the front and rear surfaces 130 and 132, as shown in FIGS. 18 and 19. The holes 164 remove unnecessary raw material from each guide 122, thereby reducing its weight. Likewise, a plurality of cavities 166 are formed in the sides of each crosshead guide 122, as shown in FIG. 17. The cavities 166 remove unnecessary material from each guide 12, thereby reducing its weight.

Along the same lines, the upper and lower surfaces 156 and 157 of the crosshead guides 122 and an upper surface 170 of the crank frame 118 are shaped to conform to the shape of each of the plurality of first stay rods 116, as shown in FIG. 13. Shaping such surfaces to conform to the shape of the stay rods 116 reduces unnecessary weight from the power end assembly 104.

Linear Drive Assembly 200

Figure 22:
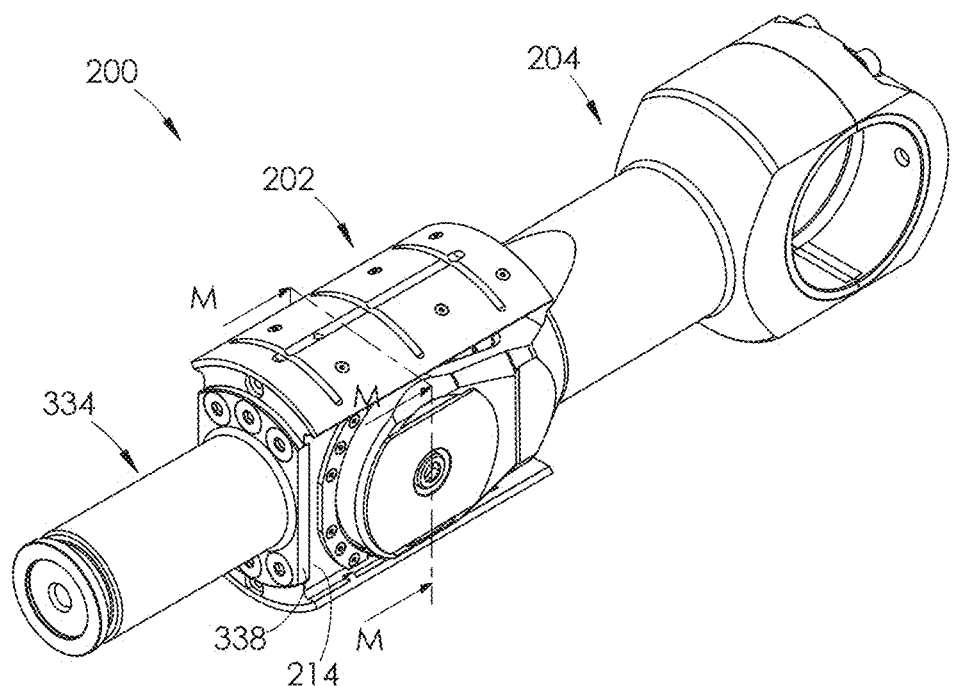
FIG. 22 is a front perspective view of one embodiment of a linear drive assembly disclosed herein.
Figure 23:
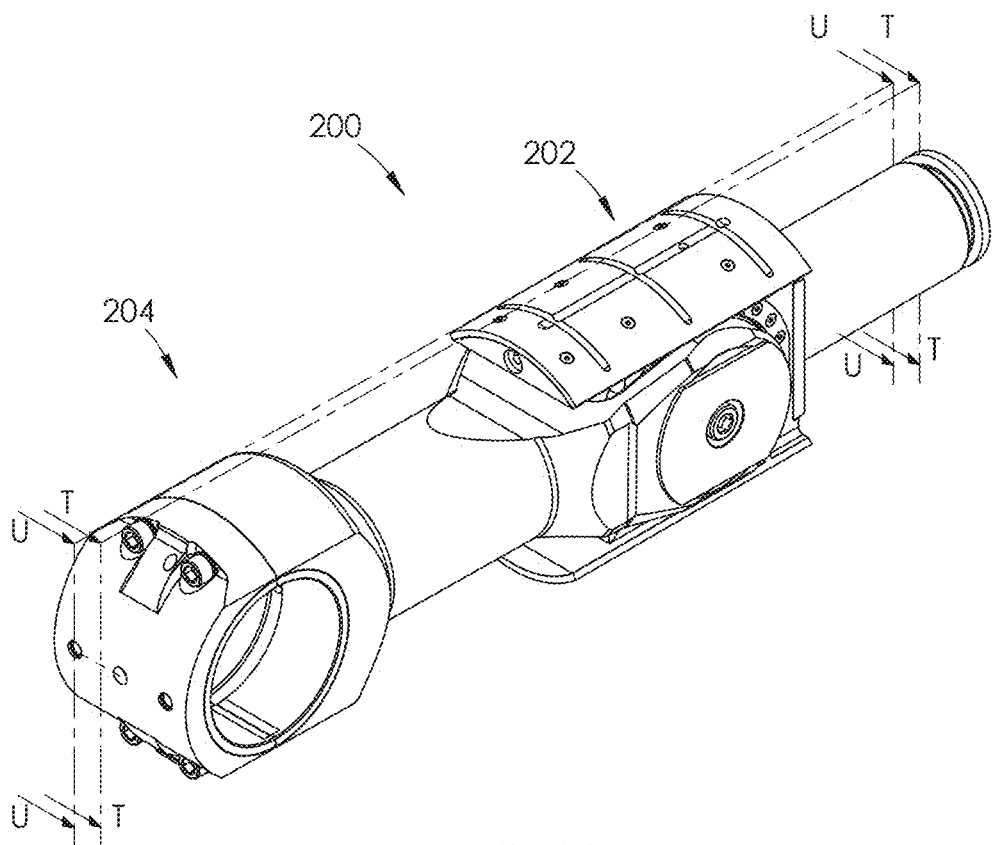
FIG. 23 is a rear perspective view of the linear drive assembly shown in FIG. 22.
Figure 24:
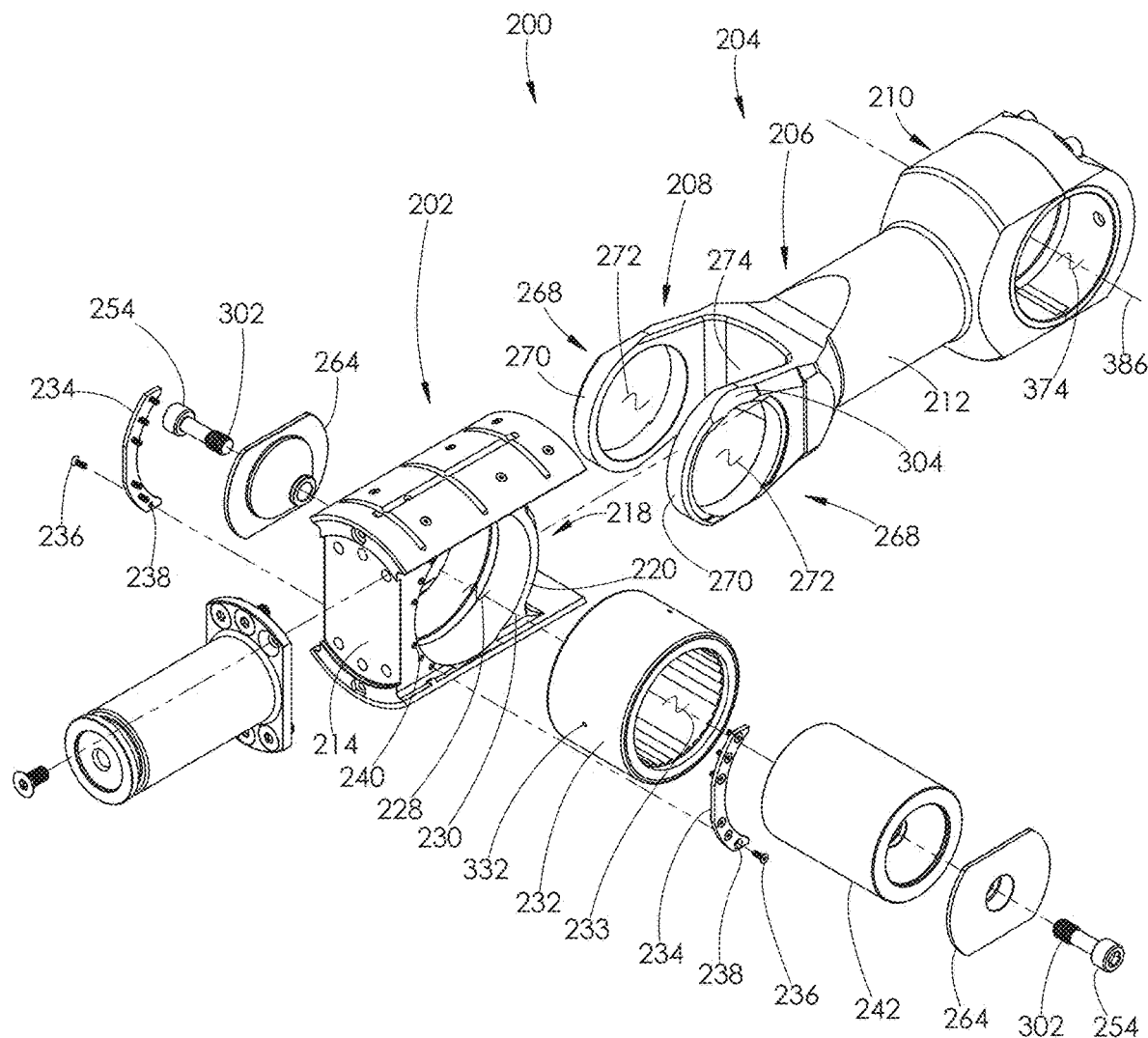
FIG. 24 is a front perspective and exploded view of the linear drive assembly shown in FIG. 22.

Turning now to FIGS. 22-56, one embodiment of a linear drive assembly 200 is shown. The linear drive assembly 200 comprises a crosshead assembly 202 attached to a connecting rod assembly 204, as shown in FIGS. 22 and 23. The connecting rod assembly 204 comprises a connecting rod 206 comprising a crosshead connection end 208 joined to a crankshaft connection end 210 by an elongate arm 212, as shown in FIG. 24. The arm 212 has a generally cylindrical cross-sectional shape. The crosshead connection end 208 of the connecting rod 206 is configured to attach to the crosshead assembly 202 while the crankshaft connection end 210 is configured to attach to the crankshaft 120 shown in FIG. 36.

Figure 47:
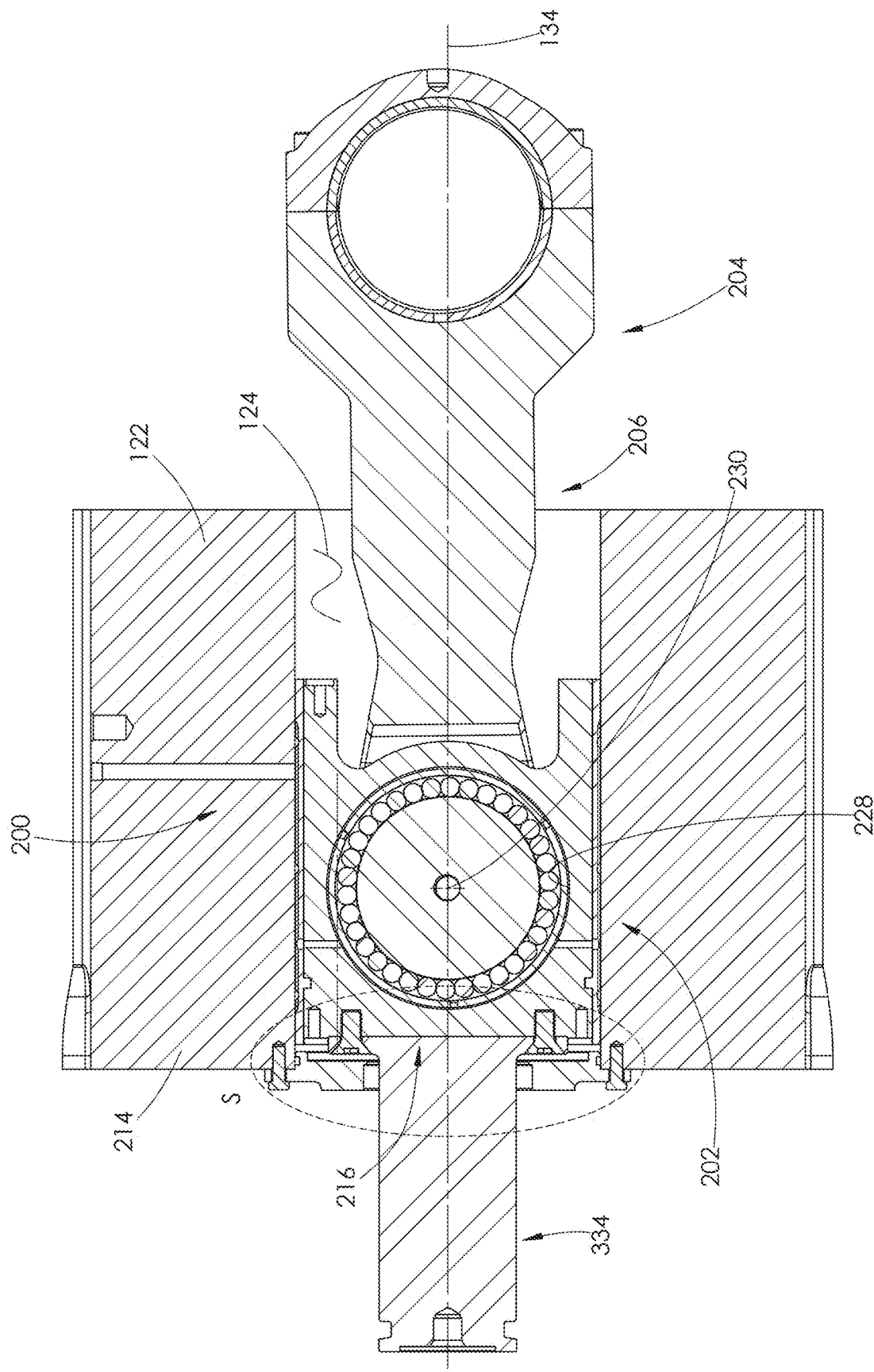
FIG. 47 is a cross-sectional view of the crosshead guide and linear drive assembly shown in FIG. 46, taken along line R-R.

Continuing with FIGS. 24-27, the crosshead assembly 202 comprises a crosshead 214 configured to reciprocate within the crosshead guide 122, as shown in FIG. 47. The crosshead 214 comprises front and rear ends 216 and 218 joined by opposed first and second sides 220 and 222. The crosshead 214 further comprises upper and lower ends 224 and 226. In contrast to the crosshead 60 shown in FIGS. 5-7, the rear end 218 of the crosshead 214 is closed. No portion of the crosshead connection end 208 extends into an interior of the crosshead 214. Instead, as will be described herein, the crosshead connection end 208 is secured to components positioned on the opposed first and second sides 220 and 222 of the crosshead 214.

Figure 25:
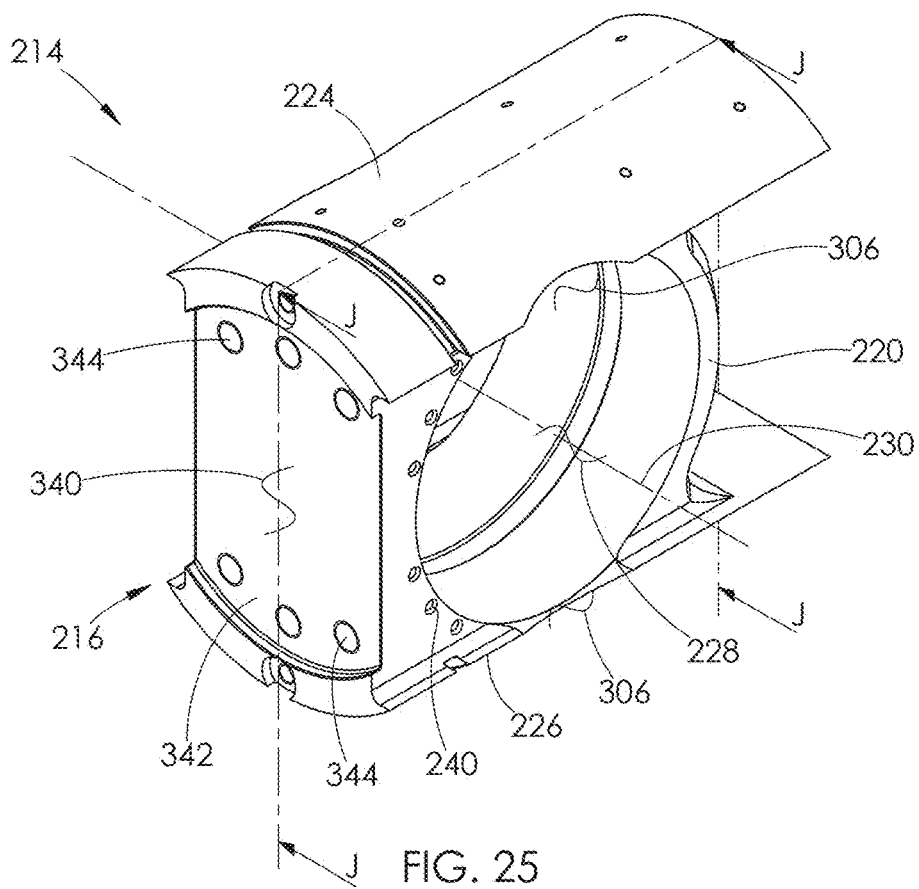
FIG. 25 is a front perspective view of the crosshead used with the linear drive assembly shown in FIG. 22.
Figure 26:
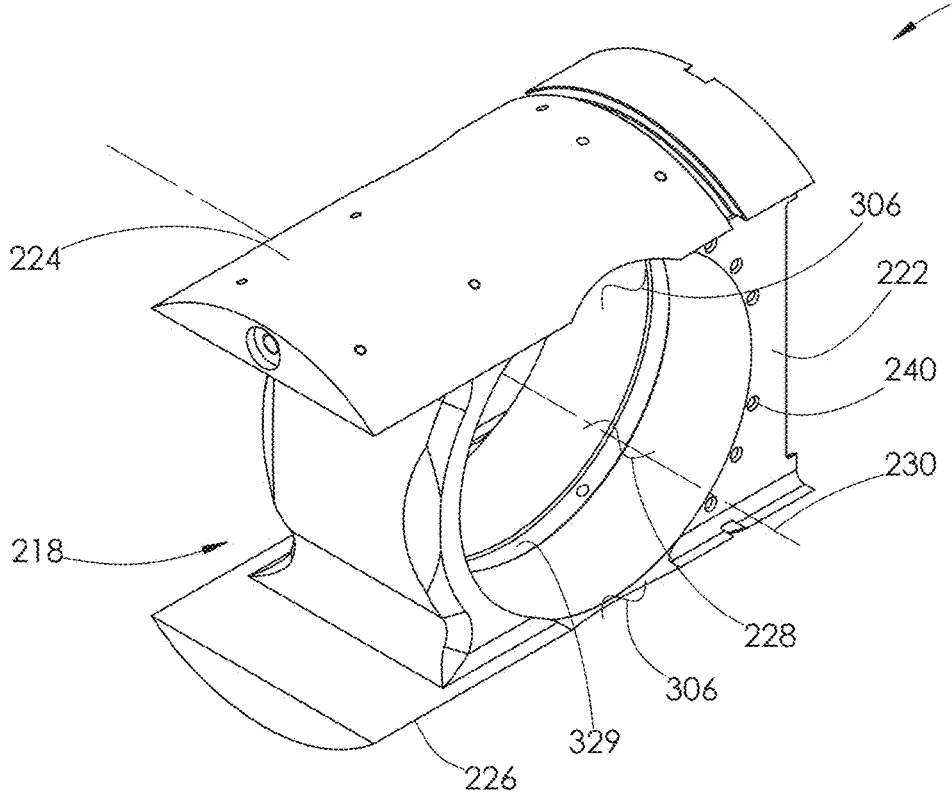
FIG. 26 is a rear perspective view of the crosshead shown in FIG. 25.
Figure 27:
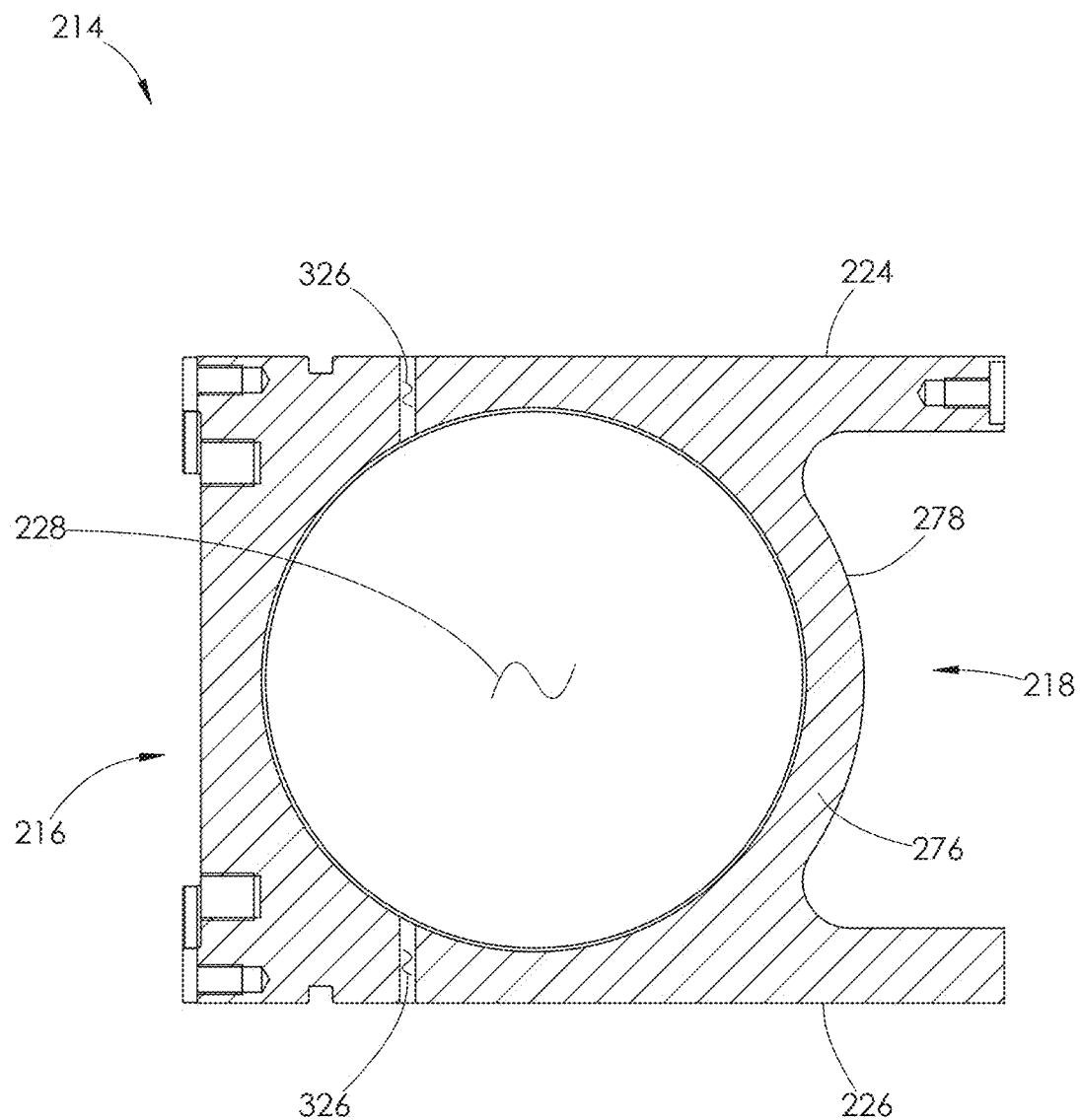
FIG. 27 is a cross-sectional view of the crosshead shown in FIG. 25, taken along line J-J.

Continuing with FIGS. 25-27, a wrist pin bore 228 is formed within the crosshead 214 and interconnects the opposed first and second sides 220 and 222. When the crosshead 214 is installed within the crosshead bore 124 of the crosshead guide 122, a central longitudinal axis 230 of the wrist pin bore 228 is perpendicular to the longitudinal axis 134 of the crosshead bore 124, as shown in FIG. 47.

Figure 28:
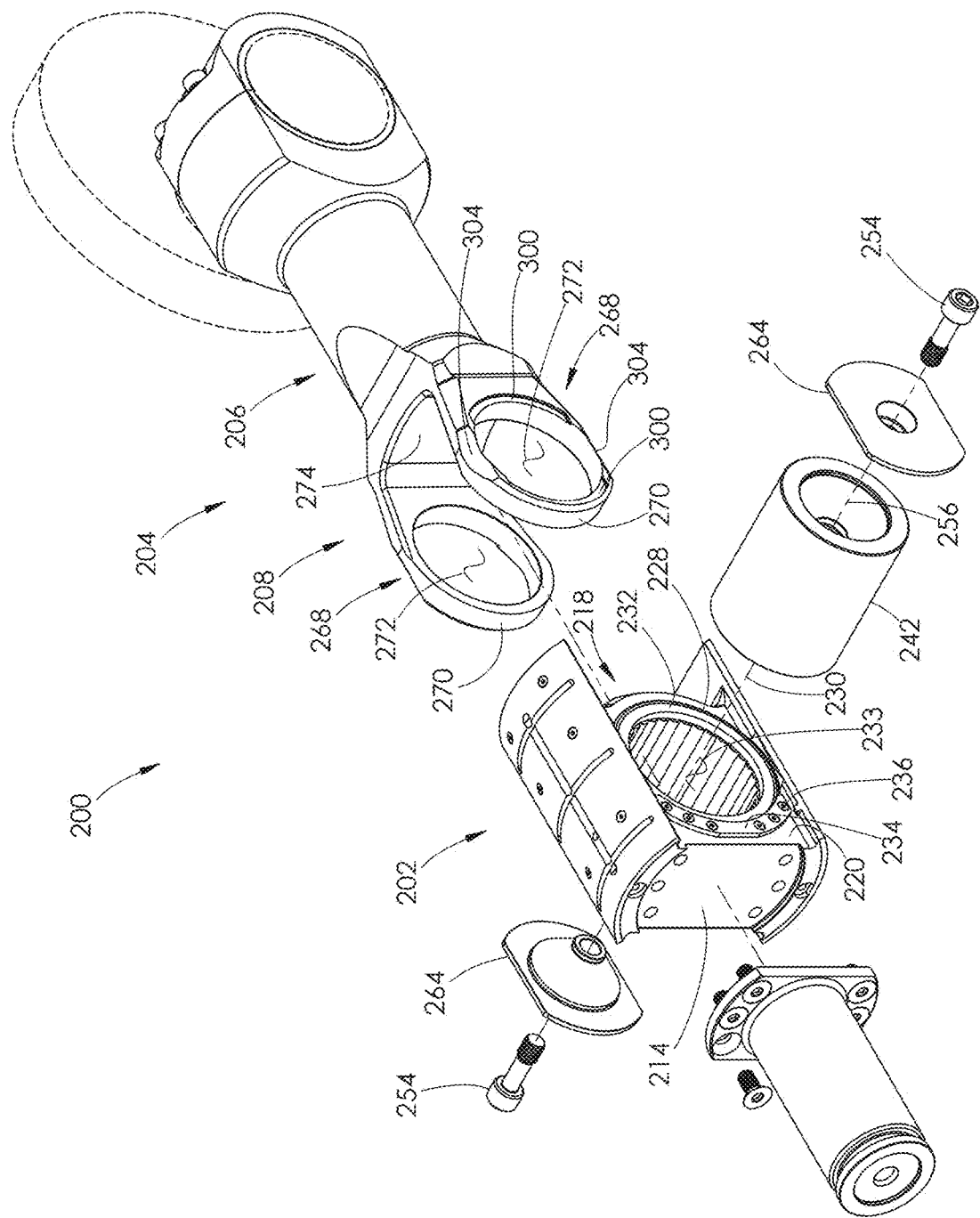
FIG. 28 is the front perspective and exploded view of the linear drive assembly shown in FIG. 24, but the bearing is shown installed within the crosshead.

Continuing with FIGS. 24 and 28, a bearing 232 having a central opening 233 is installed within the wrist pin bore 228. The bearing 232 is a needle roller bearing. However, other types of bearings known in the art may also be used. The bearing 232 is cylindrical and sized to be tightly received within or have a transition fit with the wrist pin bore 228. The bearing 232 is held within the wrist pin bore 228 by a pair of wear pads 234.

Continuing with FIGS. 24-26 and 28, the wear pads 234 each have a generally crescent shape and are attached to the opposed first and second sides 220 and 222 of the crosshead 214 such that the wear pads 234 are opposed to one another. Each wear pad 234 extends between the upper and lower ends 224 and 226 and is positioned adjacent the front end 216 of the crosshead 214. The wear pads 234 are attached to the crosshead 214 using a plurality of fasteners 236. The fasteners 236 extend through openings 238 formed in each wear pad 234 and thread into threaded openings 240 formed in the crosshead 214.

When the wear pads 234 are attached to the crosshead 214, a portion of each wear pad 234 overlaps and engages an outer edge of the bearing 232 but does not overlap any portion of the central opening 233 of the bearing 232, as shown in FIG. 28. The bearing 232 is prevented from moving axially within the wrist pin bore 228 by the opposed wear pads 234. In alternative embodiments, a plurality of wear pads may be used on each side 220 or 222 of the crosshead 214 to secure the bearing 232 in place, as shown for example in FIGS. 74 and 75.

Turning to FIGS. 28-32, the central opening 233 of the bearing 232 is sized to receive a cylindrical wrist pin 242. The wrist pin 242 comprises a cylindrical body 244 having opposed first and second sides 246 and 248, as shown in FIGS. 30-32. A threaded through-bore 252 extends through a center of the wrist pin 242 and interconnects the first and second sides 246 and 248, as shown in FIG. 32. As will be described herein, the threaded through-bore 252 is sized to receive a plurality of wrist pin fasteners 254. A longitudinal axis 256 of the through-bore 252 aligns with the central longitudinal axis 230 of the wrist pin bore 228 when the wrist pin 242 is installed within the bearing 232.

Figure 29:
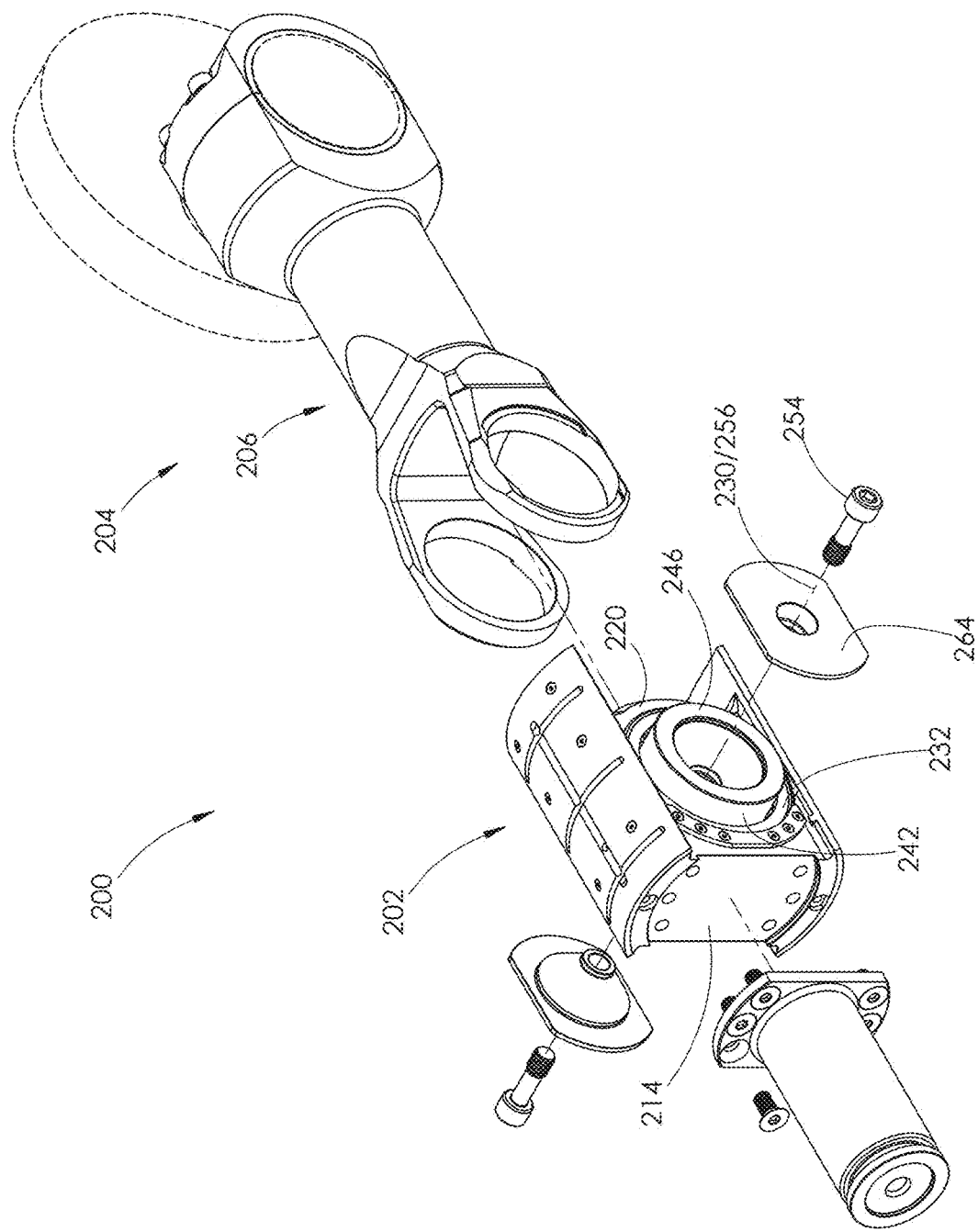
FIG. 29 is the front perspective and exploded view of the linear drive assembly shown in FIG. 28, but the wrist pin is shown installed within the bearing.

Continuing with FIGS. 30-32, the first and second sides 246 and 248 of the wrist pin 242 each comprise an outer rim 258 joined to a counterbore 261 of the through-bore 252 by a tapered surface 262. As will be described herein, each tapered surface 262 and counterbore 261 is sized to mate with a retainer 264, shown in FIGS. 33-35. When the wrist pin 242 is installed within the bearing 232, the first and second sides 246 and 248 of the wrist pin 242 project from the first and second sides 220 and 222 of the crosshead 214, as shown in FIGS. 29 and 37. Thus, a length of the wrist pin 242 is greater than a width of the crosshead 214, measured from the first side 220 to the second side 222. As described herein, the wrist pin 242 is not installed within the bearing 232 until the crosshead connection end 208 of the connecting rod 206 is properly positioned relative to the crosshead 214, as shown in FIG. 36.

Turning back to FIGS. 24 and 28, the crosshead connection end 208 of the connecting rod 206 comprises a pair of opposed and spaced apart linking elements 268. The linking elements 268 each comprise a ring 270 having a central opening 272. Each central opening 272 is sized to receive a portion of the wrist pin 242, as shown in FIGS. 37 and 38. The linking elements 268 are spaced from one another by a recessed intermediate surface 274. The distance between the linking elements 268 is sized to correspond with a width of the crosshead 214 between its opposed sides 220 and 222.

Continuing with FIGS. 24 and 28, to attach the crosshead connection end 208 to the crosshead 214, the crosshead connection end 208 and the crosshead 214 are brought together such that the linking elements 268 are positioned adjacent the opposite sides 220 and 222 of the crosshead 214. The linking elements 268 are positioned such that the central opening 272 of each ring 270 aligns with the central opening 233 of the bearing 232. When in such position, the rear end 218 of the crosshead 214 faces and is slightly spaced from the recessed intermediate surface 274 of the crosshead connection end 208. A portion of the upper and lower ends 224 and 226 of the crosshead 214 may overlap a portion of the connection rod 206. As shown in FIG. 27, the rear end 218 of the crosshead 214 comprises a thicker wall 276 extending between the wrist pin bore 228 and a rear surface 278, than that shown in FIG. 60. The thicker wall 276 helps provide greater support to the bearing 232 during operation.

Figure 36:
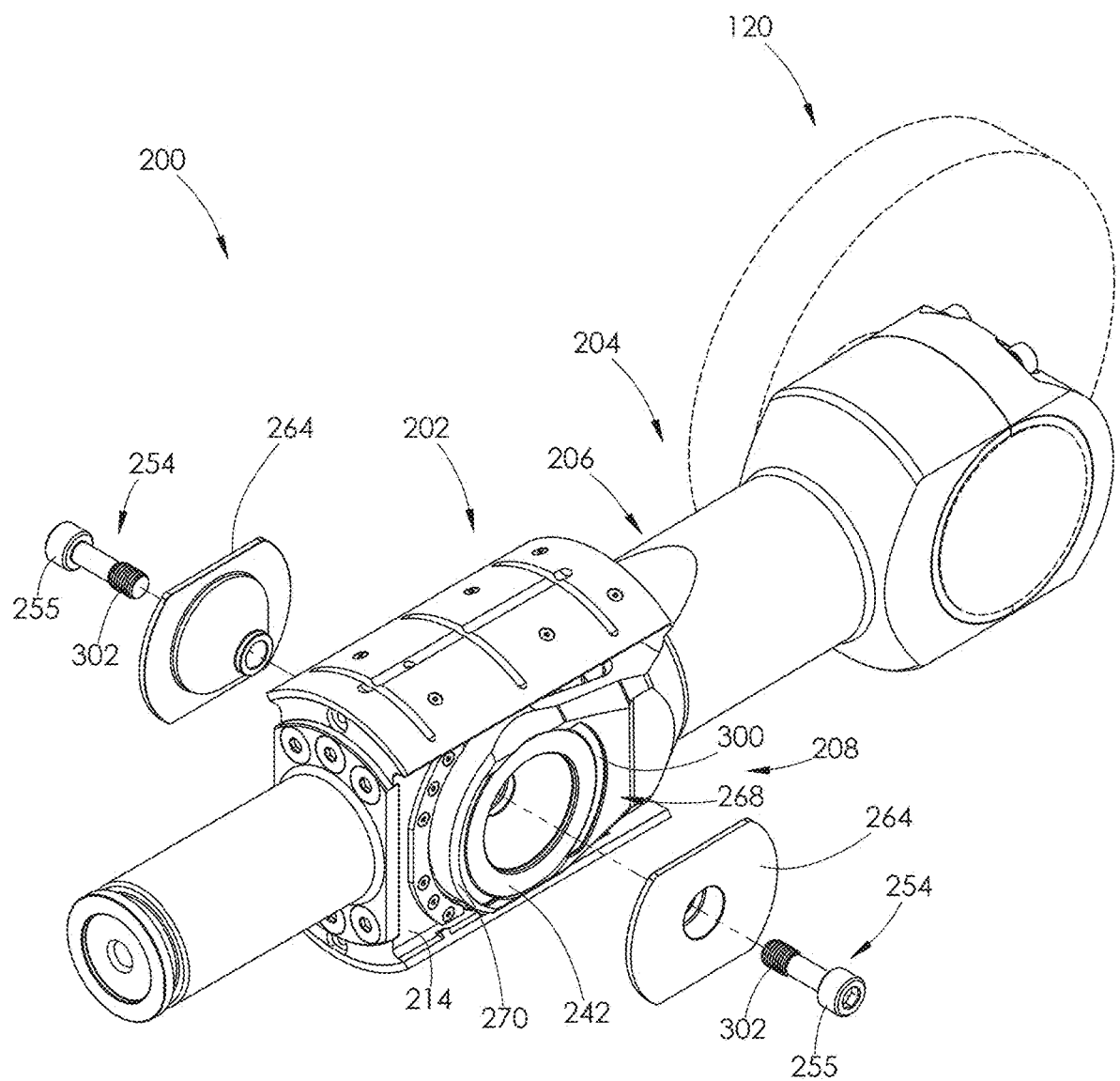
FIG. 36 is the front perspective view of the linear drive assembly shown in FIG. 22, but the retainers are shown exploded from the assembly.
Figure 37:
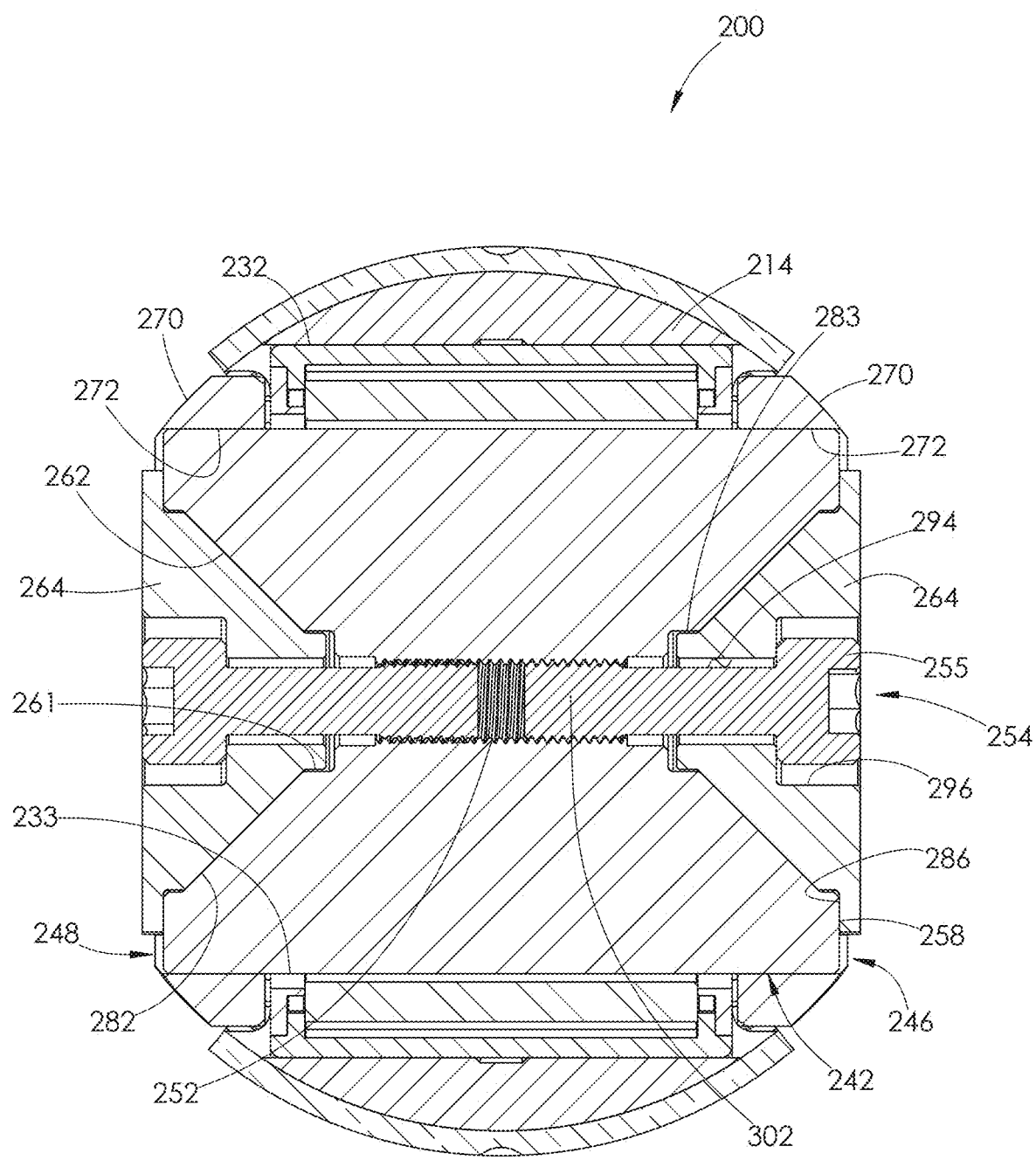
FIG. 37 is a cross-sectional view of the linear drive assembly shown in FIG. 22, taken along line M-M.
Figure 38:
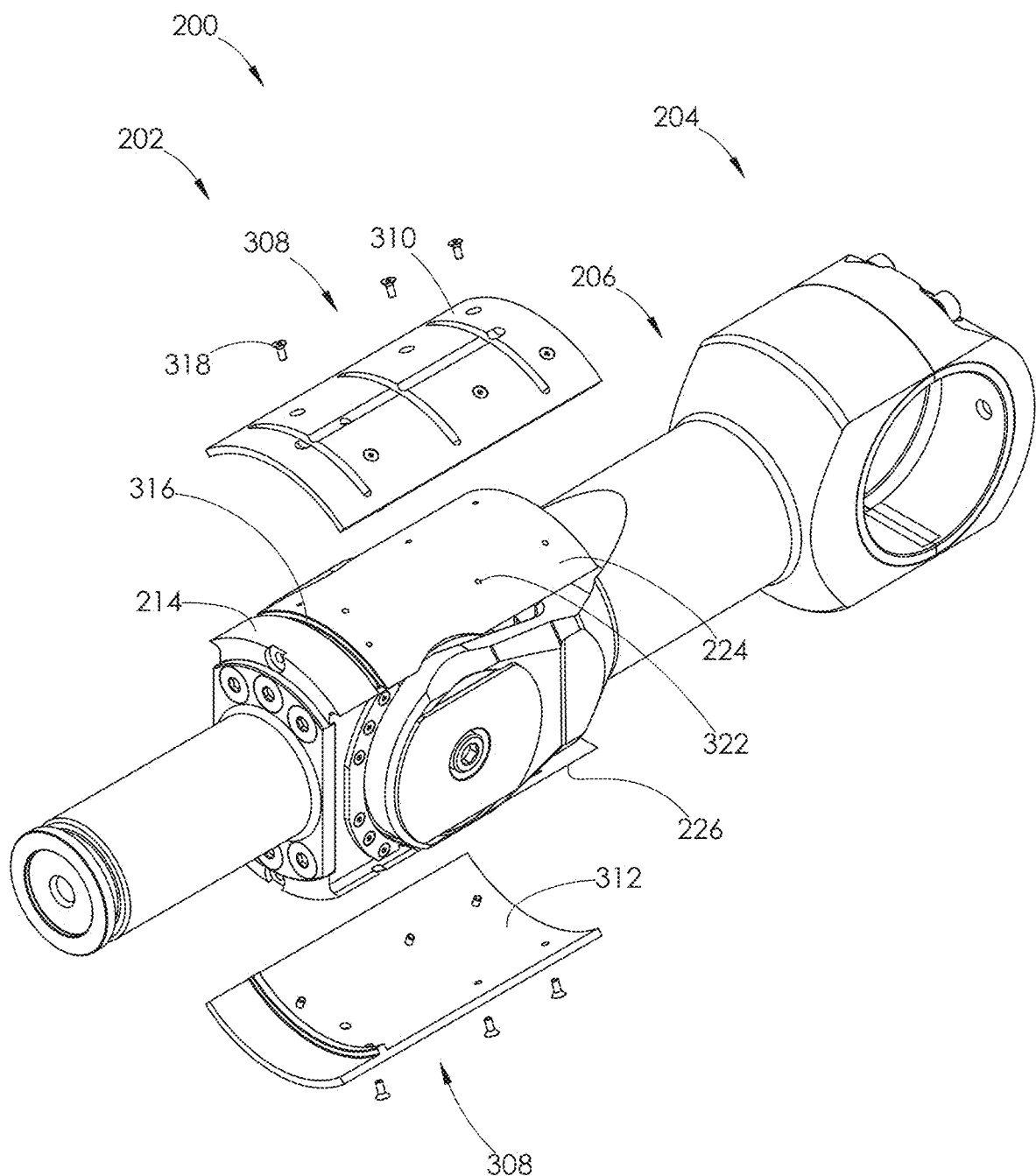
FIG. 38 is the front perspective view of the linear drive assembly shown in FIG. 22, but the wear plates are shown exploded from the assembly.

Continuing with FIGS. 36 and 37, once the crosshead connection end 208 and the crosshead 214 are in place, the wrist pin 242 is installed within the central openings 272 of the rings 270 and the central opening 233 of the bearing 232. When installed therein, at least a portion of each of the first and second sides 246 and 248 of the wrist pin 242 is positioned within a corresponding one of the rings 270 of each linking element 268. As will be described herein, the linking elements 268 are secured to the wrist pin 242 using the wrist pin fasteners 254 and a pair of retainers 264.

Turning to FIGS. 33-35, the retainer 264 comprises a plate 280 joined to a conical boss 282. The conical boss 282 comprises a cylindrical lower end 283. The retainer 264 may be characterized as a "retainer plate" 264. The plate 280 has a generally rectangular shape and comprises opposed front and rear surfaces 284 and 286 joined to flat upper and lower surfaces 288 and 290 and curved side surfaces 292. The conical boss 282 is centered on the rear surface 286 of the plate 280 and is sized to mate with the tapered surface 262 of the sides 246 and 248 of the wrist pin 242. A through-bore 294 extends through a center of the conical boss 282 and its lower end 283 and opens into a counterbore 296 formed in the front surface 284 of the plate 280.

Continuing with FIGS. 36 and 37, a retainer 264 is positioned against each of the first or second sides 246 and 248 of the wrist pin 242 such that the conical bosses 282 engage the tapered surfaces 262 and the lower end 283 is disposed within the counterbore 261. When in such position, the through-bores 294 align with the threaded through-bore 252 formed in the wrist pin 242. The front surface 284 of each plate 280 engages the outer rim 258 of each corresponding side 246 and 248 of the wrist pin 242 and engage opposed sides of a corresponding one of the rings 270. A cutout 300, shown in FIG. 28, is formed in opposed sides of each ring 270 for receiving the curved sides 292 of the corresponding plate 280. The walls surrounding the cutout 300 engage the curved sides 292 of the plate 280, thereby preventing the retainers 264 from rotating relative to the linking elements 268.

Continuing with FIGS. 36 and 37, the retainers 264 are secured to the wrist pin 242 using the wrist pin fasteners 254. A threaded end 302 of each fastener 254 is inserted through a corresponding through-bore 294 in the retainer 264 until it engages the threaded through-bore 252 formed in the wrist pin 242. Each fastener 254 is turned until each retainer 264 is rigidly secured to the wrist pin 242 and the rings 270 are retained between the opposed retainers 264. When in such position, a head 255 of each fastener 254 is disposed within a corresponding one of the counterbores 296 formed in the corresponding retainer 264. Such connection method thereby secures the crosshead connection end 208 of the connecting rod 206 to the wrist pin 242. In operation, the wrist pin 242 and the crosshead connection end 208 rotate relative to the crosshead 214 about their common axes 230 and 256.

Turning back to FIGS. 24 and 28, in order to provide clearance for the various components during assembly, upper and lower clearance bevels 304 may be formed in the outer surface of each of the linking elements 268. The clearance bevels 304 are positioned above and below the retainers 264 and 266 when assembled. Likewise, upper and lower ring cutouts 306 may be formed in the opposed sides 220 and 222 of the crosshead 214, as shown in FIGS. 25 and 26. The ring cutouts 306 are shaped to provide space for a portion of an outer surface of the ring 270 of each linking element 268.

Figure 6:
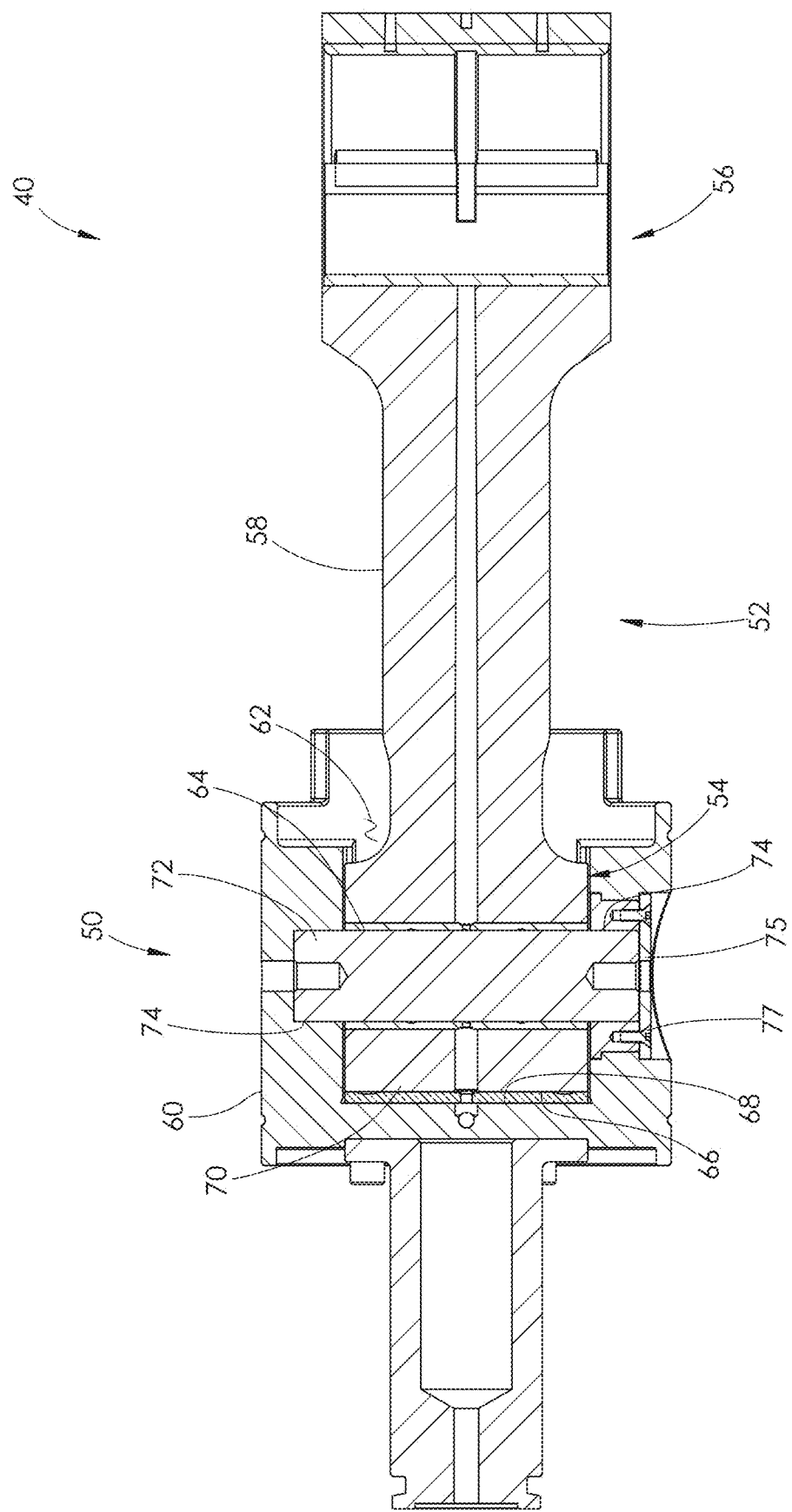
FIG. 6 is a cross-sectional view of the linear drive assembly shown in FIG. 5, taken along line B-B.
Figure 7:
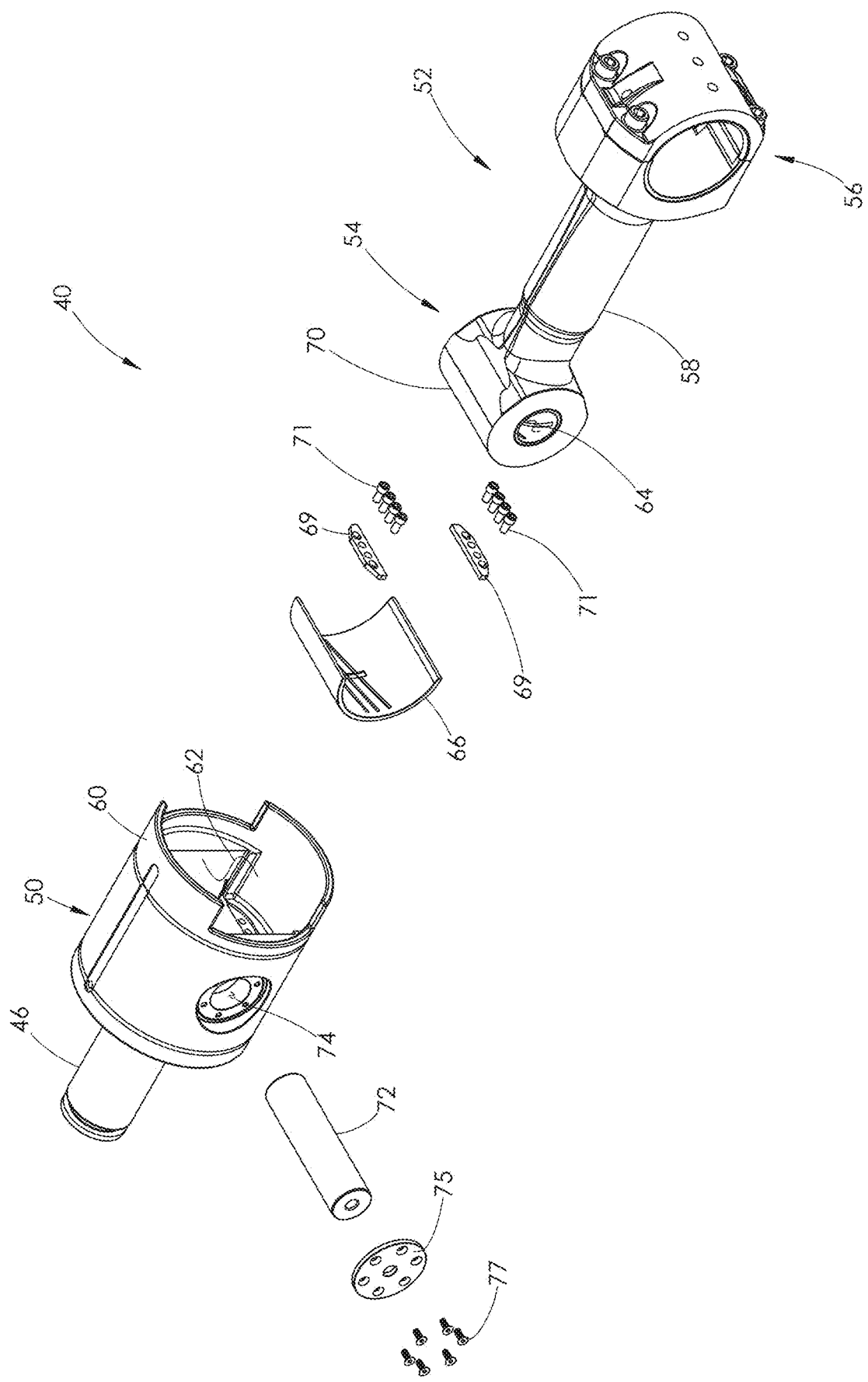
FIG. 7 is a rear perspective and exploded view of the linear drive assembly shown in FIG. 5.

As described above, the linear drive assembly 200 does not use a thrust seat like the thrust seat 66 shown in FIGS. 6 and 7. Likewise, the crosshead connection end 208 of the connecting rod 206 does not include the front surface 70, shown in FIGS. 6 and 7, engaging any thrust seat or any interior portion of crosshead 214. Thus, wear typically experienced by these engaging components is no longer present in the linear drive assembly 200.

During operation, the input forces are the same no matter what embodiment of a linear drive assembly is used. However, the larger the components and the interfacing areas of the linear drive assembly used, the less stress there is applied to the components during operation. By not installing any portion of the connection rod assembly 204 into the crosshead 214, more space exists within the crosshead 214 for the wrist pin 242. Thus, a much larger wrist pin 242 can be used with the crosshead 214 as compared to the wrist pin 72, shown in FIGS. 6 and 7. Less stress therefore exists in the wrist pin 242 and its interfacing components during operation, thereby extending the life of the linear drive assembly 700.

Turning to FIGS. 38-45, the crosshead assembly 202 further comprises a pair of wear plates 308. The wear plates 308 may also be characterized as "boots" or "inserts". One wear plate 308 is attached to the upper end 224 of the crosshead 214 and one wear plate 308 is attached to the lower end 226 of the crosshead 214. The upper and lower ends 224 and 226 of the crosshead 214 each have a convex shape. The wear plates 308 are sized to match the length, width, and shape of the upper and lower ends 224 and 226 of the crosshead 214. An upper surface 310 of each wear plate 308 has a convex shape which conforms to the shape of the crosshead bore 124, while a lower surface 312 of each wear plate 308 has a concave shape which conforms the upper and lower ends 224 and 226 of the crosshead 214.

The wear plates 308 may be formed of aluminum bronze or other similar materials that are not as hard as the crosshead guide 122. As a result, the wear plates 308 will intentionally wear faster than the crosshead guide 122. Forcing the wear plates 308 to be the wear component during operation extends the life of the crosshead guide 122. At the same time, each wear plate 308 can be easily removed and replaced with a new wear plate 308, as needed.

During operation, the wear plate 308 attached to the lower end 226 of the crosshead 214 receives the majority of the wear due to gravity. Thus, such wear plate 308 may wear much faster than the wear plate 308 attached to the upper end 224 of the crosshead 214. In such instance, the wear plate 308 attached to the lower end 226 may be switched with the wear plate 308 attached to the upper end 224 of the crosshead 214 before replacing either of the wear plates 308 with a new wear plate 308. The plates 308 may be switched by removing the connecting rod 206 and flipping the crosshead 214, 180 degrees, or the plates 308 may be physically removed and switched. Switching the plates 308 extends the hours one can get out of the plates 308 before new wear plates 308 are required.

Figure 42:
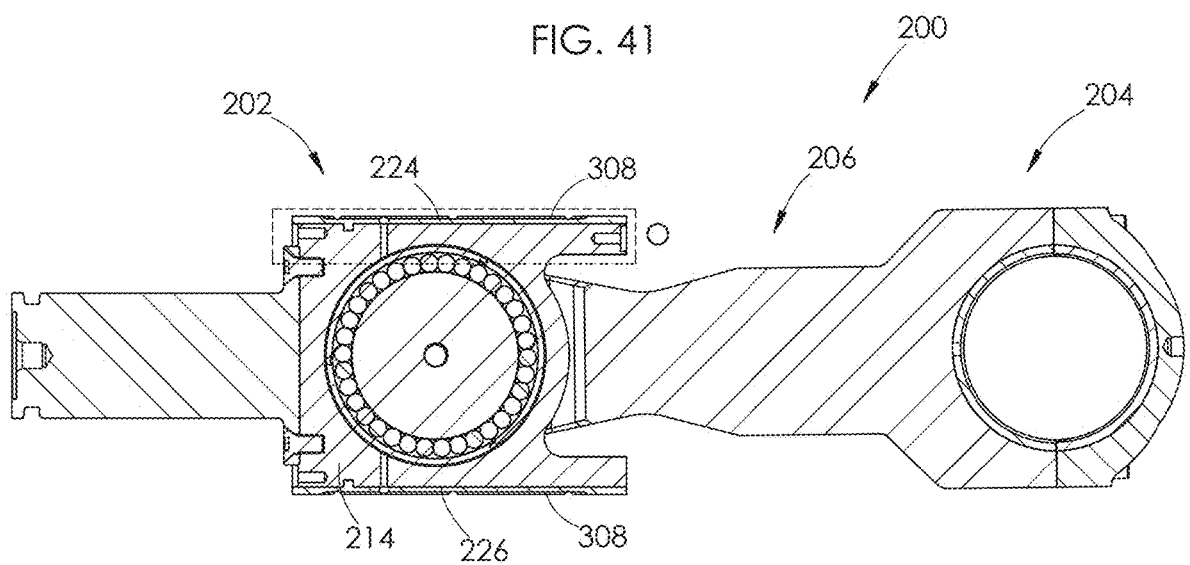
FIG. 42 is a cross-sectional view of the linear drive assembly shown in FIG. 41, taken along line N-N.
Figure 43:
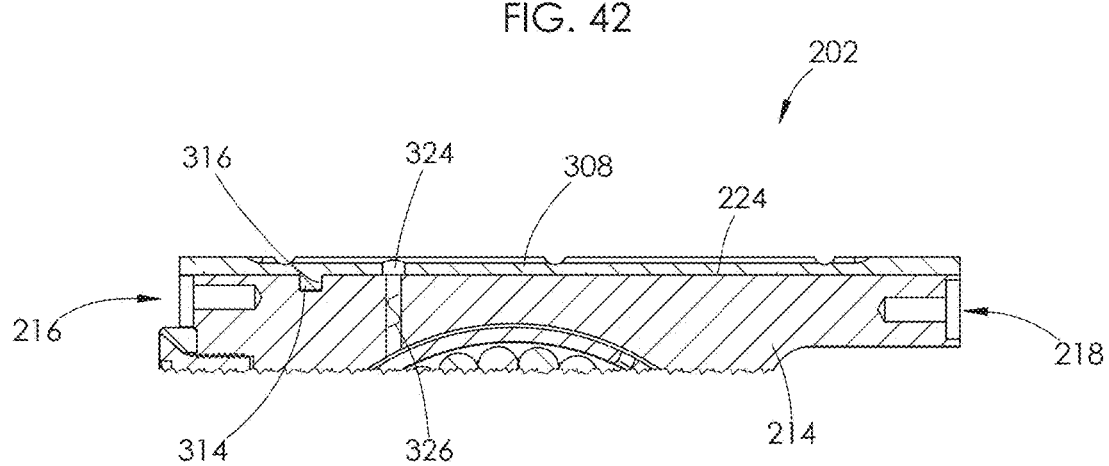
FIG. 43 is an enlarged view of area O, shown in FIG. 42.
Figure 44:
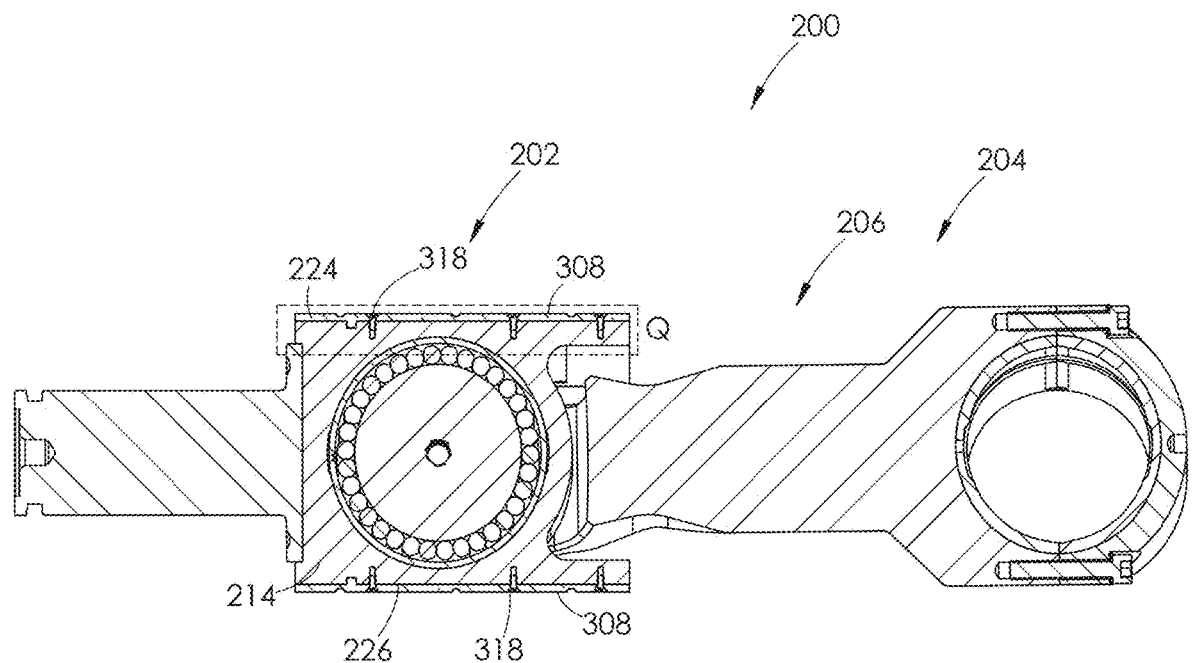
FIG. 44 is a cross-sectional view of the linear drive assembly shown in FIG. 41, taken along line P-P.
Figure 45:
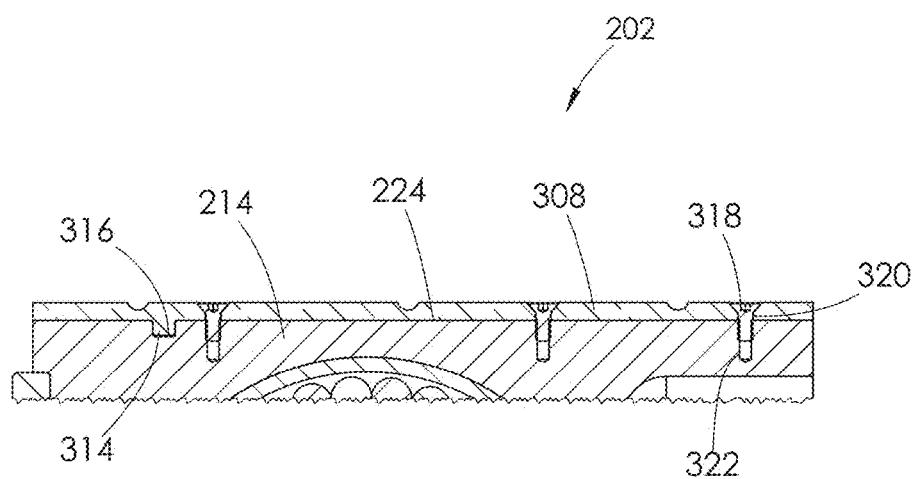
FIG. 45 is an enlarged view of area Q, shown in FIG. 44.

Continuing with FIGS. 39-45, a retention flange 314 projects from the lower surface 312 of each wear plate 308 and extends along the width of each plate 308. The flange 314 is sized to be installed within a retention groove 316 formed in the upper and lower ends 224 and 226 of the crosshead 214, as shown in FIGS. 42 and 43. Installation of the retention flanges 314 within a corresponding one of the retention grooves 316 properly aligns the wear plates 308 on the crosshead 214. Once properly aligned, the wear plates 308 are attached to a corresponding end 224 or 226 of the crosshead 214 using a plurality of fasteners 318. The fasteners 318 extend through openings 320 formed in the wear plates 308 and are threaded into threaded openings 322 formed in the upper and lower ends 224 and 226 of the crosshead 214.

During operation, the retention flanges 314 carry or receive a majority of the shear force imparted on the upper surfaces 310 of the wear plates 308. As a result, the fasteners 318 have a lower shear load. This allows the fasteners 318 to be small and reduces the size of the corresponding openings 320 and threaded openings 322 configured to receive the fasteners 318. The smaller the openings 320 formed in the wear plate 308 for the fasteners 318, the larger the wear area for each plate 308.

Continuing with FIGS. 39-43, each wear plate 308 further comprises a lubricant opening 324. When the wear plates 308 are attached to the crosshead 214, the lubricant opening 324 aligns with a lubricant hole 326 formed in upper and lower ends 224 and 226 of the crosshead 214. The lubricant hole 326 interconnects the exterior of the crosshead 214 with the wrist pin bore 228, as shown in FIG. 27. The aligned lubricant hole 326 and lubricant opening 324 are positioned closer to the front end 216 than the rear end 218 of the crosshead 214, as shown in FIGS. 42 and 43. Positioning the lubricant hole 326 closer to the front end 216 of the crosshead 214 allows the lubricant hole 326 to be formed within a thicker wall of the crosshead 214 than if the lubricant hole 326 were centered on the crosshead 214. By forming the lubricant hole 326 in a thicker wall, the lubricant hole 326 is less likely to affect the integrity of the walls surrounding the lubricant hole 326.

Figure 39:
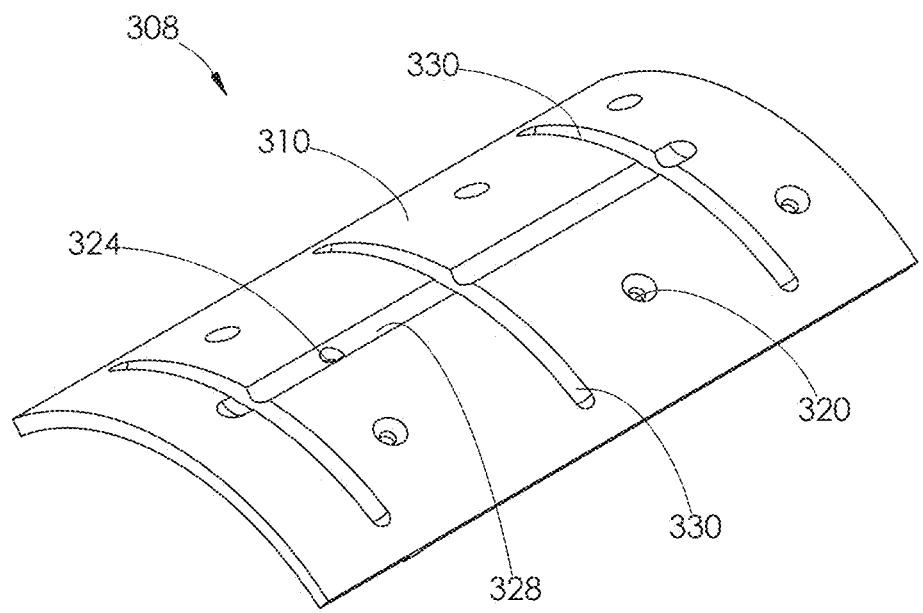
FIG. 39 is a top perspective view of one of the wear plates shown in FIG. 38.
Figure 40:
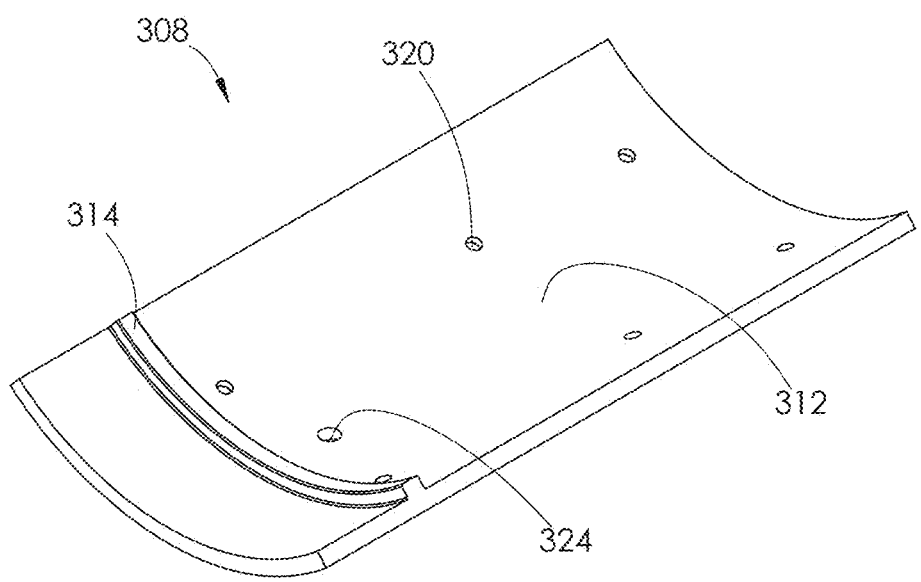
FIG. 40 is a bottom perspective view of the wear plate shown in FIG. 39.
Figure 41:
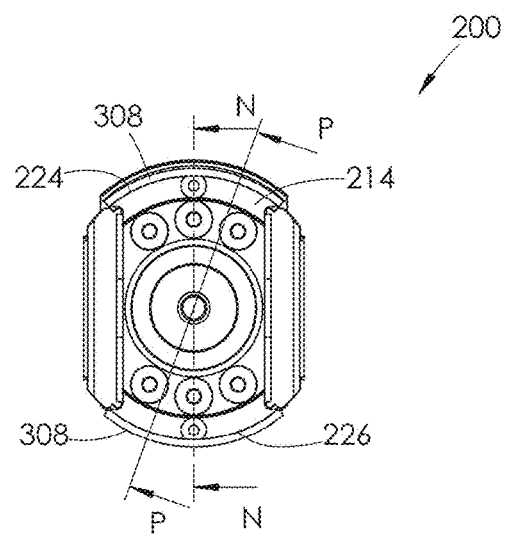
FIG. 41 is a front elevational view of the linear drive assembly shown in FIG. 22.

Continuing with FIG. 39, the lubricant opening 324 on each wear plate 308 is situated within a lubricant channel 328 formed along the length of the plate 308. A plurality of lubricant grooves 330 are formed along the width of each wear plate 308 at spaced intervals. The lubricant grooves 330 intersect and are in fluid communication with the lubricant channel 328.

In operation, lubricant delivered to the crosshead bore 124 formed in the crosshead guide 122 collects within the lubricant grooves 330 or lubricant channel 328. Lubricant within the grooves 330 or channel 328 is eventually directed into the lubricant opening 324 where is it delivered to a circumferential channel 329 formed in the crosshead 214, as shown in FIG. 26. Lubricant within the channel 329 then contacts an outer surface of the bearing 232. A plurality of openings 332, as shown in FIG. 24, are formed around the circumference of the bearing 232 to allow lubricant within the wrist pin bore 228 to flow into the interior of the bearing 232 and lubricate the bearing rollers and an outer surface of the wrist pin 242.

Figure 48:
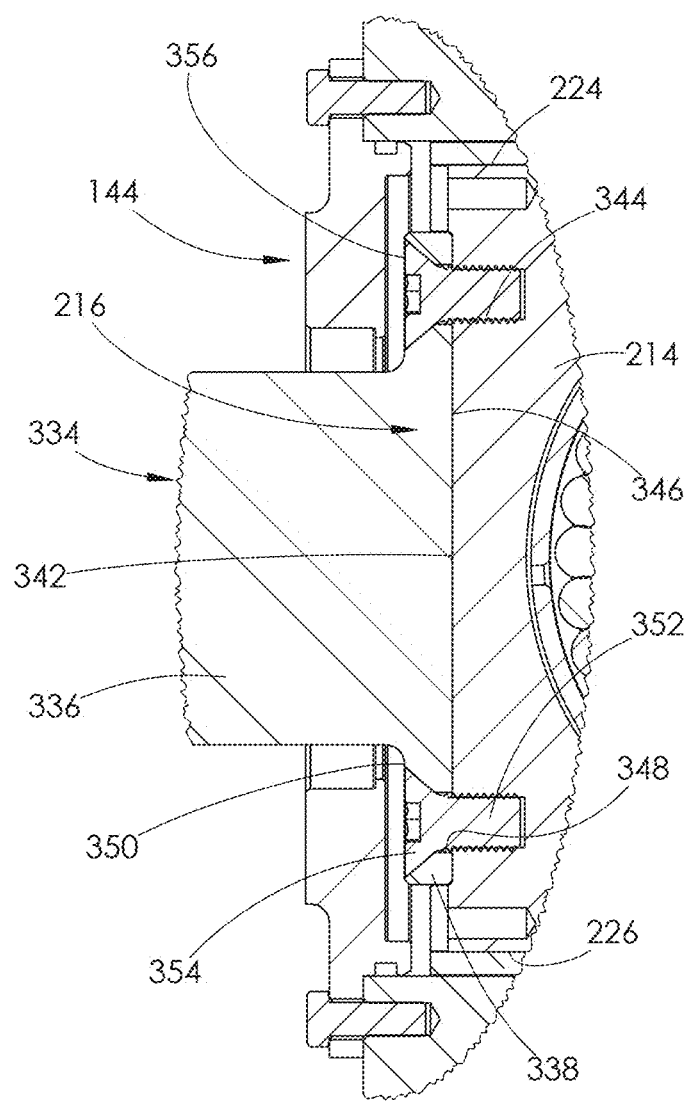
FIG. 48 is an enlarged view of area S, shown in FIG. 47.
Figure 49:
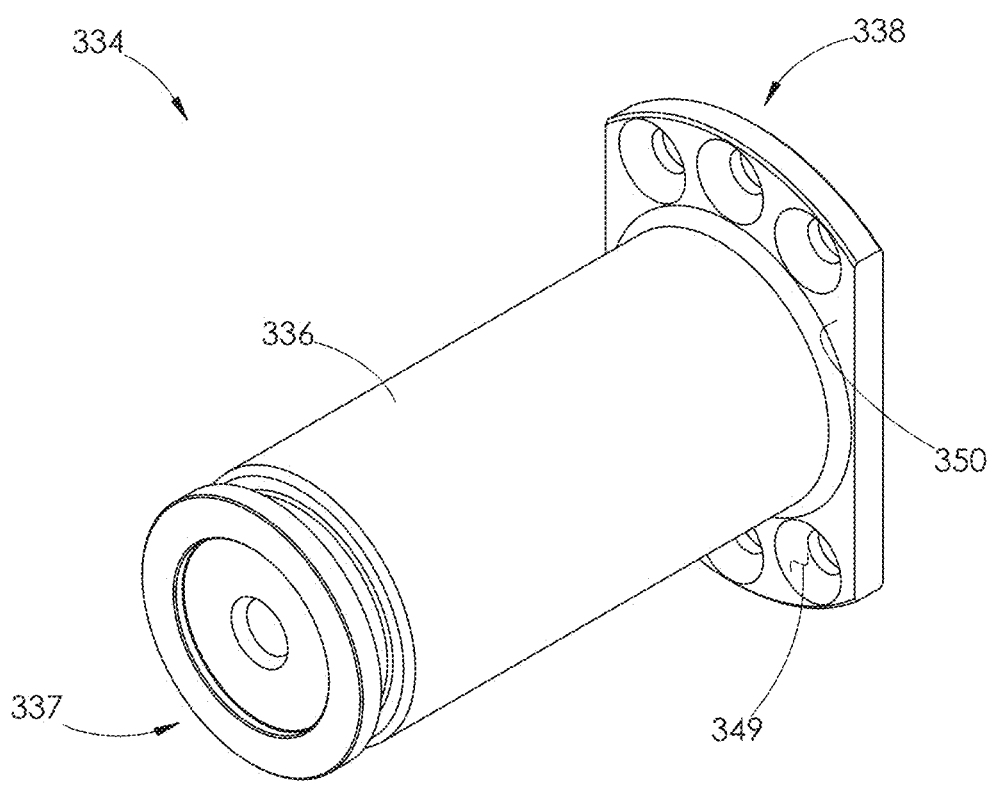
FIG. 49 is a front perspective view of the pony rod used with the linear drive assembly shown in FIG. 22.
Figure 50:
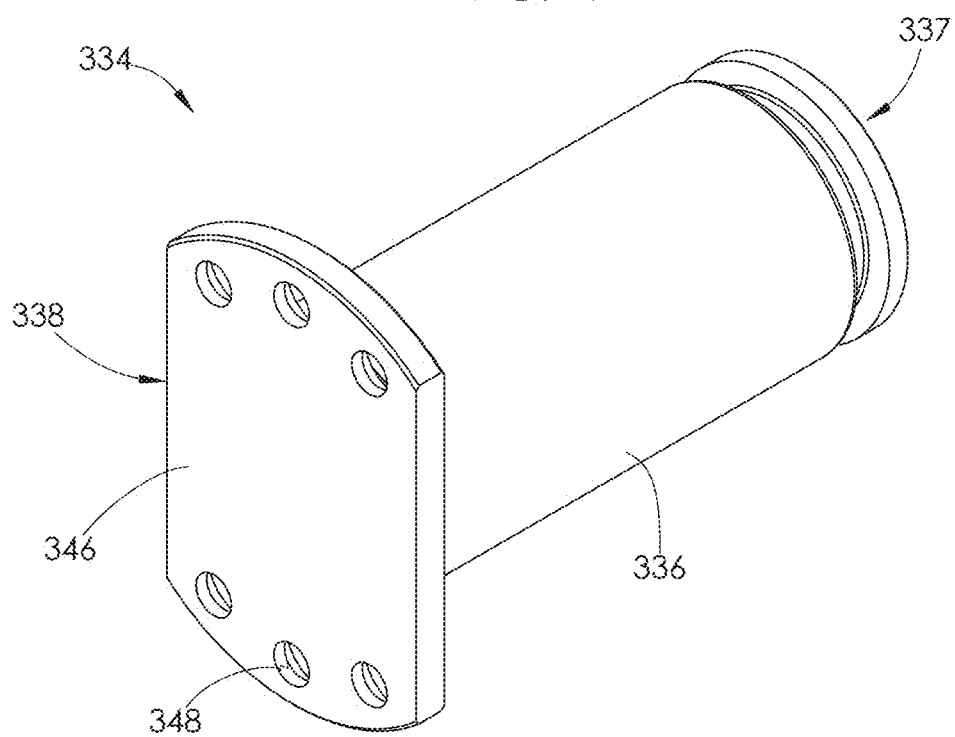
FIG. 50 is a rear perspective view of the pony rod shown in FIG. 49.

With reference to FIGS. 25 and 46-50, the front end 216 of the crosshead 214 is configured to attach to a pony rod 334. The pony rod 334 comprises an elongate body 336 joined to a rear plate 338, as shown in FIGS. 49 and 50. A front end 337 of the pony rod 334 is configured to attach to a corresponding one of the plungers 110, as shown for example in FIG. 10, where a front end of the pony rod 126 is identical to the front end 337 of the pony rod 334.

Continuing with FIGS. 22, 25, and 46-50, a pony rod cutout 340 is formed in the front end 216 of the crosshead 214 that is sized and shaped to closely receive the rear plate 338 of the pony rod 334, as shown in FIGS. 22 and 48. The pony rod cutout 340 has a planar base 342 having a plurality of threaded openings 344 formed therein, as shown in FIG. 25. A plurality of the threaded openings 344 are positioned adjacent the upper end 224 of the crosshead 214 and a plurality of threaded openings 344 are positioned adjacent the lower end 226 of the crosshead 214.

When the rear plate 338 is positioned within the pony rod cutout 340, a rear surface 346 of the rear plate 338 abuts the base 342 of the cutout 340 and a plurality of openings 348 formed in the rear plate 338 align with the threaded openings 344. Each of the plurality of openings 348 formed in the rear plate 338 open into a counterbore 349 on a front surface 350 of the rear plate 338, as shown in FIGS. 48-50. A fastener 352 is installed within each pair of aligned openings 348 and threaded openings 344 to secure the pony rod 334 to the crosshead 214, as shown in FIGS. 47 and 48.

When the fastener 352 is installed within the opening 348 in the rear plate 338, a head 354 of the fastener 352 is positioned entirely within the counterbore 349 such that a front surface 356 of the head 354 is flush with the front surface 350 of the rear plate 338, as shown in FIG. 48. The fastener 352 is a low-profile screw. Making the fastener 352 sit flush with the rear plate 338 provides clearance between the rear plate 338 and the pony rod cover 144 when the crosshead 214 is stroked all the way forward, as shown in FIG. 48.

Continuing with FIG. 47, in contrast to the pony rod 126 shown in FIG. 10, the pony rod 334 does not have an interior hollow bore 358. Instead, the pony rod 334 is solid. Using a solid pony rod 334 helps distribute the load applied to the bearing 232 installed within the crosshead 214 during operation. Using a solid pony rod 334 also helps prevent the pony rod 334 from flexing away from its centerline during operation—the centerline being a line that aligns with the longitudinal axis 134 of the crosshead bore 124. During operation, if any components start to veer off of the centerline, the components may wear or fail faster than if they remain aligned.

Turning to FIGS. 51-56, the crankshaft connection end 210 of the connecting rod assembly 204 comprises a clamp 360 configured to clamp around connecting rod journal 362 making up a portion of the crankshaft 120. The clamp 360 comprises a first half 364 integrally joined to the elongate arm 212 of the connecting rod 206 and a removable second half 366. The second half 366 of the clamp 360 may also be referred to as a "cap" 366.

Figure 51:
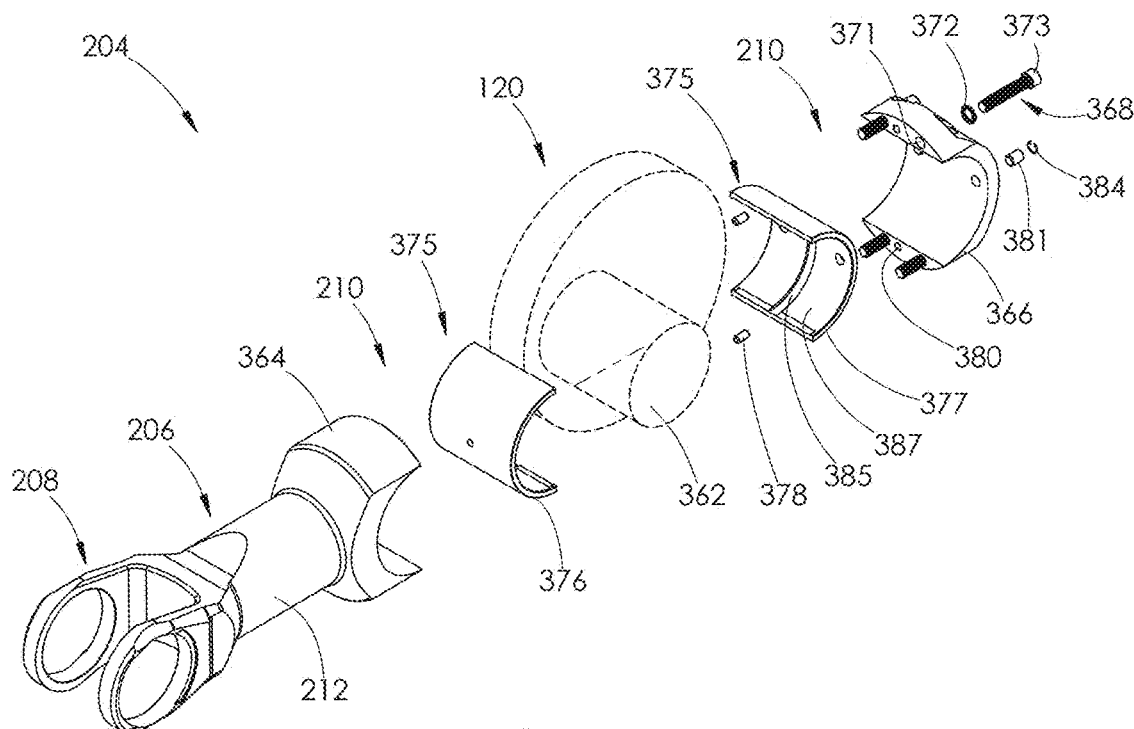
FIG. 51 is a front perspective and exploded view of the connecting rod assembly used within the linear drive assembly shown in FIG. 22.
Figure 52:
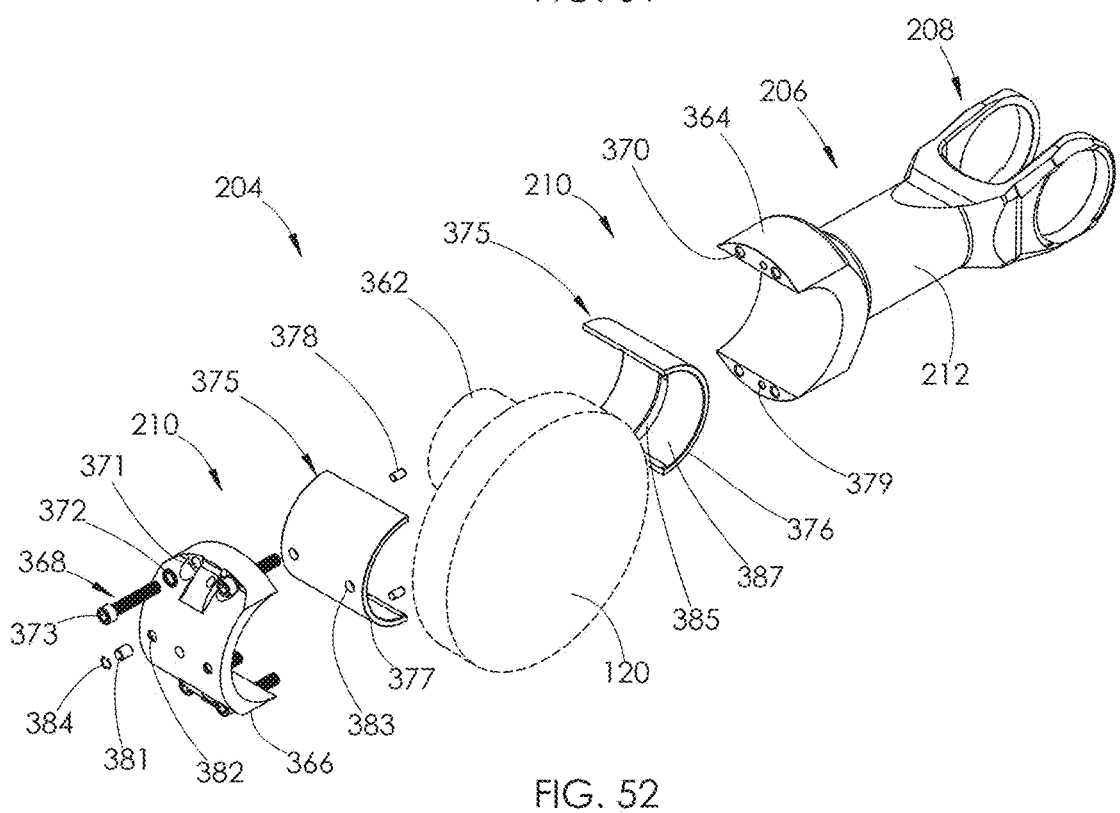
FIG. 52 is a rear perspective and exploded view of the connecting rod assembly shown in FIG. 51.
Figure 53:
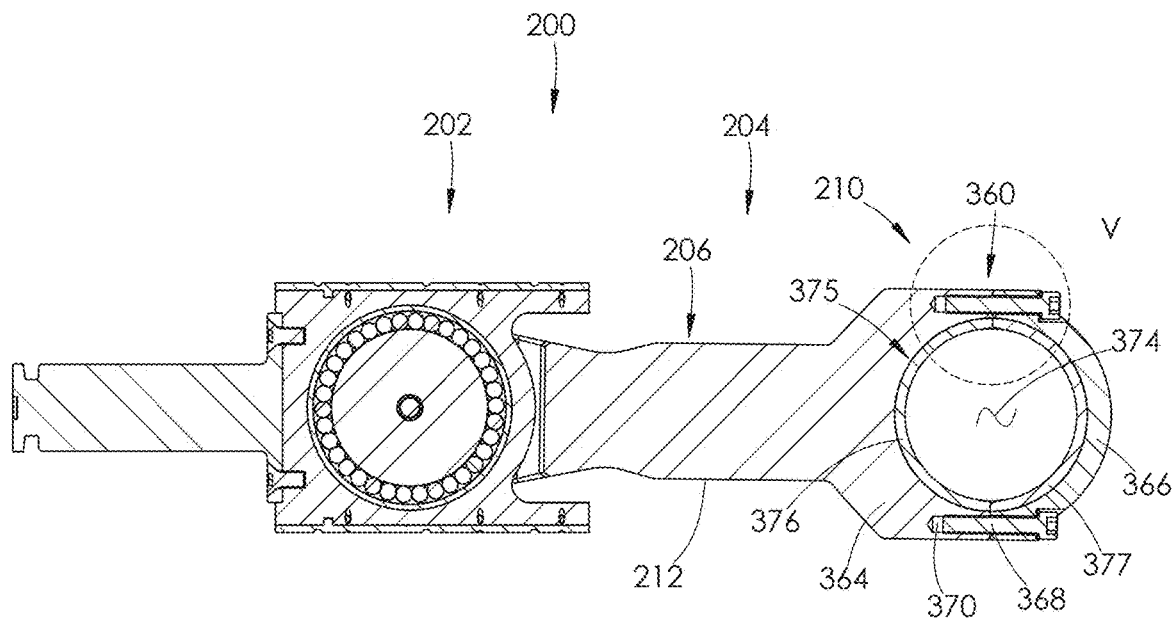
FIG. 53 is a cross-sectional view of the linear drive assembly shown in FIG. 23, taken along line T-T.
Figure 54:
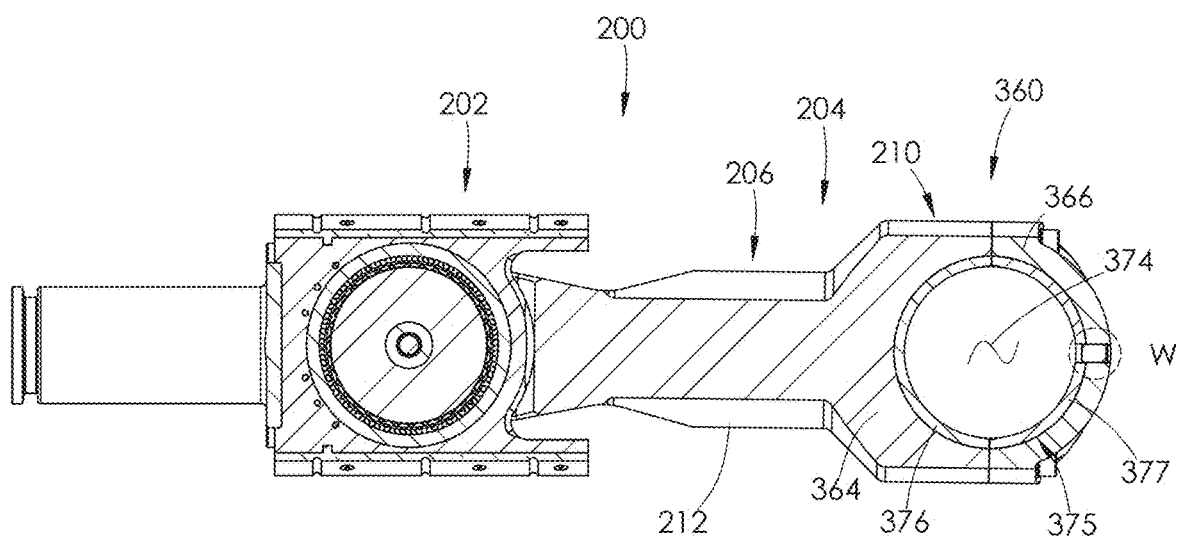
FIG. 54 is a cross-sectional view of the linear drive assembly shown in FIG. 23, taken along line U-U.
Figure 55:
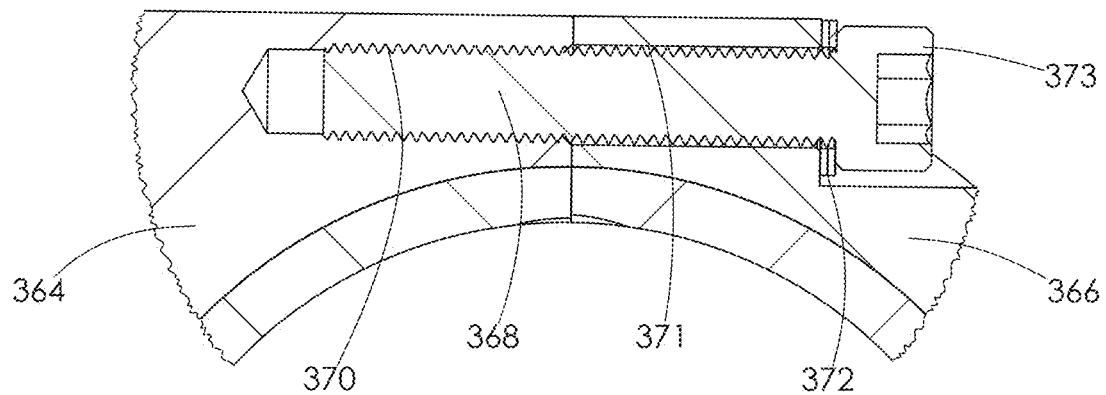
FIG. 55 is an enlarged view of area V, shown in FIG. 53.

Continuing with FIGS. 51-55, the first and second half 364 and 366 of the clamp 360 are secured together using a plurality of fasteners 368. The first half 364 of the clamp 360 comprises a plurality of upper and lower threaded openings 370. The second half 366 of the clamp 360 comprises a plurality of upper and lower through-bores 371 positioned to align with the threaded openings 370 when the halves 364 and 366 of the clamp 360 are brought together. A fastener 368 is installed within each pair of aligned threaded openings 370 and through-bores 371. A wedge-lock washer 372 may also be positioned between an opening of each through-bore 371 and a head 373 of the fastener 368. The washer 372 helps prevent the fastener 368 from backing out of the corresponding threaded opening 370 during operation. During assembly, the halves 364 and 366 are aligned with one another using locating dowel pins 378. The dowel pins 378 are installed within aligned openings 379 and 380 formed in the first and second halves 364 and 366 of the clamp 360, as shown in FIGS. 51 and 52.

Figure 46:
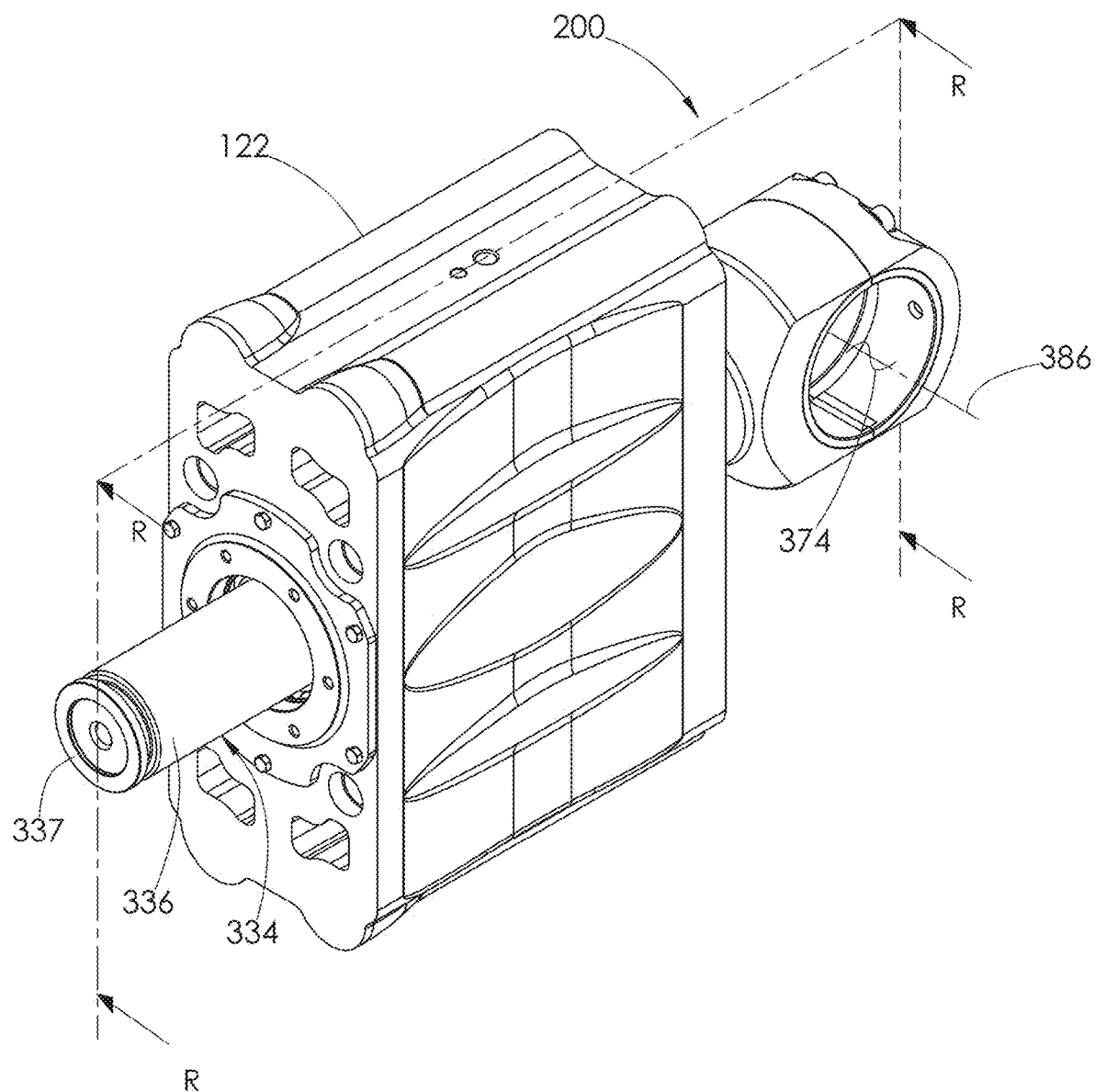
FIG. 46 is a front perspective view of the linear drive assembly shown in FIG. 22 installed within the crosshead guide shown in FIG. 15.

Continuing with FIGS. 51-54, when the halves 364 and 366 of the clamp 360 are secured together, the interior of the clamp 360 comprises a bore 374. A central longitudinal axis 386 of the bore 374, shown in FIG. 46, is in a parallel relationship with the longitudinal axis 230 of the wrist pin bore 228, shown in FIG. 24. The bore 374 is sized to closely receive a split ring bearing 375. The split ring bearing 375 is in turn sized to closely receive the connecting rod journal 362 of the crankshaft 120, as shown in FIGS. 51 and 52. The split ring bearing 375 comprises a first half 376 abutting a second half 377. Each half 376 and 377 is installed within a corresponding half 364 and 366 of the clamp 360.

Figure 56:
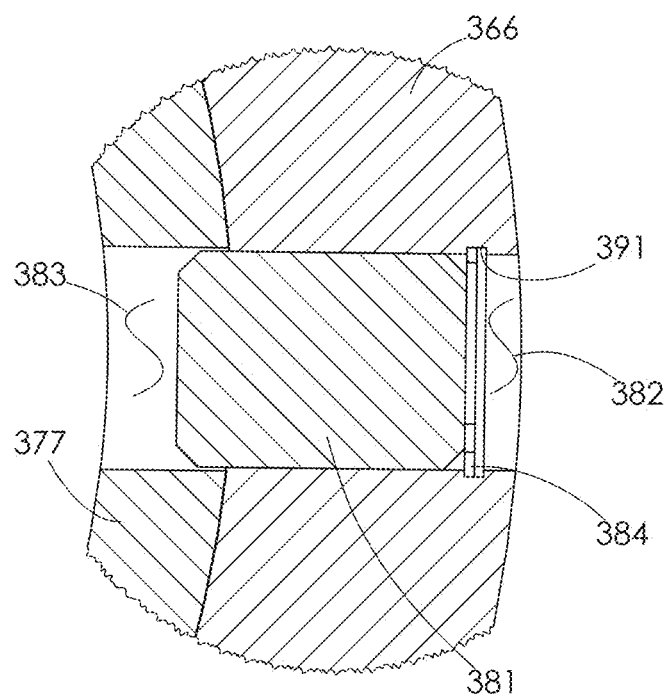
FIG. 56 is an enlarged view of area W, shown in FIG. 54.
Figure 57:
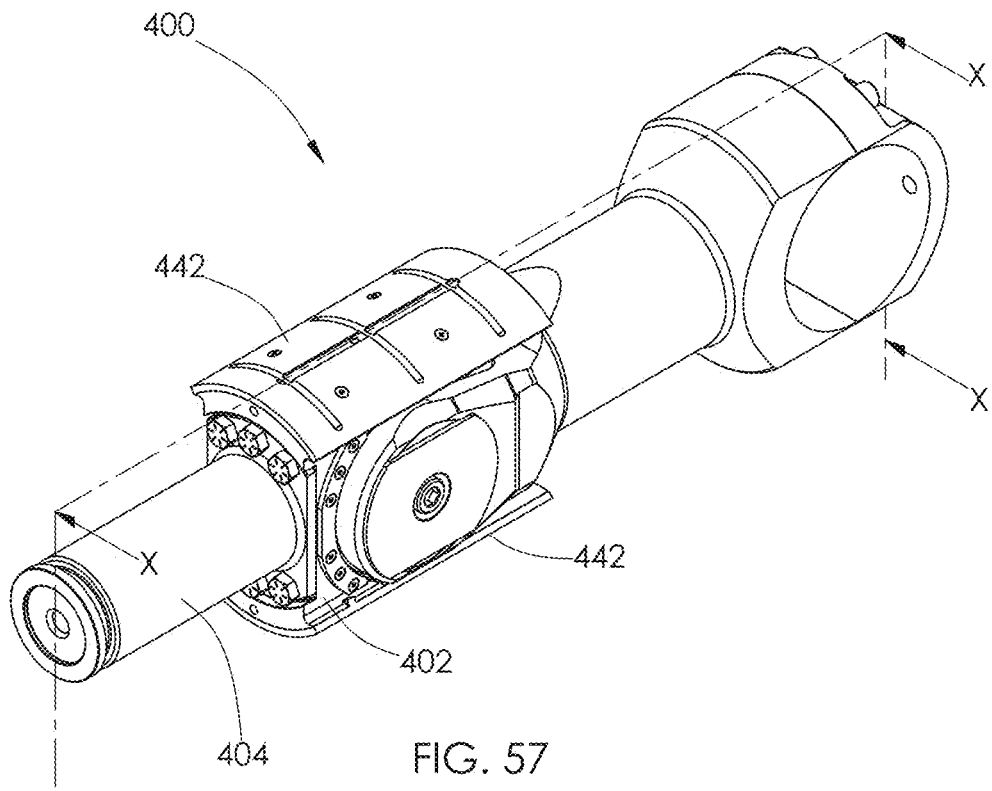
FIG. 57 is a front perspective view of another embodiment of a linear drive assembly disclosed herein.
Figure 58:
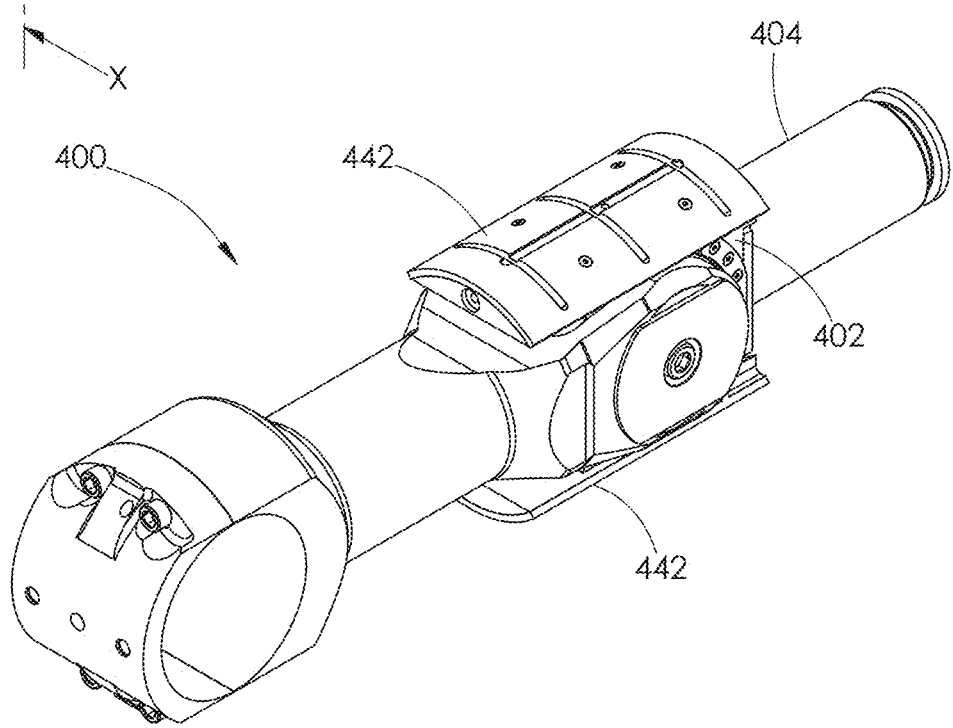
FIG. 58 is a rear perspective view of the linear drive assembly shown in FIG.

The split ring bearing 375 is prevented from rotating relative to the clamp 360 by a plurality of locating dowel pins 381. The dowel pins 381 are each installed within aligned openings 382 and 383 formed in the second half 366 of the clamp 360 and the second half 377 of the split ring bearing 375. The dowel pins 381 are each retained within the second half 366 of the clamp 360 using a retaining ring 384. The retaining ring 384 is installed within an annular groove 391 formed within the opening 382 in the second half 366 of the clamp 360, as shown in FIG. 56. Because the second half 377 of the split ring bearing 375 is prevented from rotating within the clamp 360, the first half 376 is likewise prevented from rotating within the clamp 360.

Continuing with FIGS. 51 and 52, a lubricant channel 385 is formed in an inner surface 387 of each half 376 and 377 of the split ring bearing 375. In operation, lubricant supplied to the crankshaft 120 may flow through holes (not shown) in the connecting rod journal 362 and into the interior of the split ring bearing 375. In operation, the split ring bearing 375 and the clamp 360 rotate as a single unit relative to the connecting rod journal 362. Such movement is lubricated by lubricant collecting within the lubricant channels 385 and within the interior of the split ring bearing 375. The split ring bearing 375 may be formed of aluminum bronze or other similar materials that are not as hard as the crankshaft 120 or the clamp 360. As a result, the split ring bearing 375 will intentionally wear faster than the crankshaft 120 and the clamp 360. Forcing the split ring bearing 375 to be the wear component during operation extends the life of the crankshaft 120 and the clamp 360. At the same time, the split ring bearing 375 can be easily removed and replaced with a new split ring bearing 375, as needed.

Linear Drive Assembly 400

Turning to FIGS. 57-62, another embodiment of a linear drive assembly 400 is shown. The linear drive assembly 400 is identical to the linear drive assembly 200, except that the linear drive assembly 400 comprises another embodiment of a crosshead 402 and another embodiment of a pony rod 404.

Figure 59:
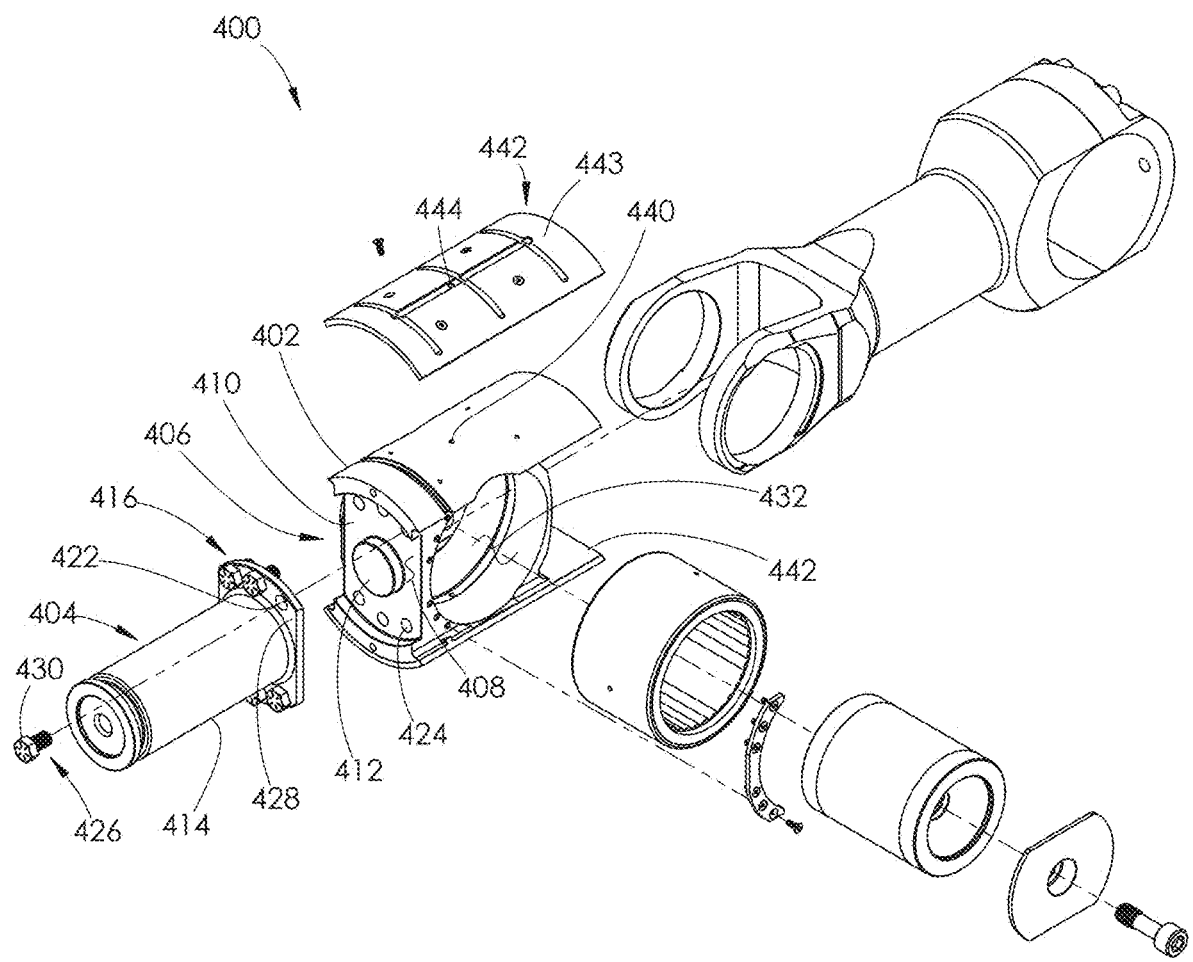
FIG. 59 is a front perspective and exploded view of the linear drive assembly shown in FIG. 57.
Figure 60:
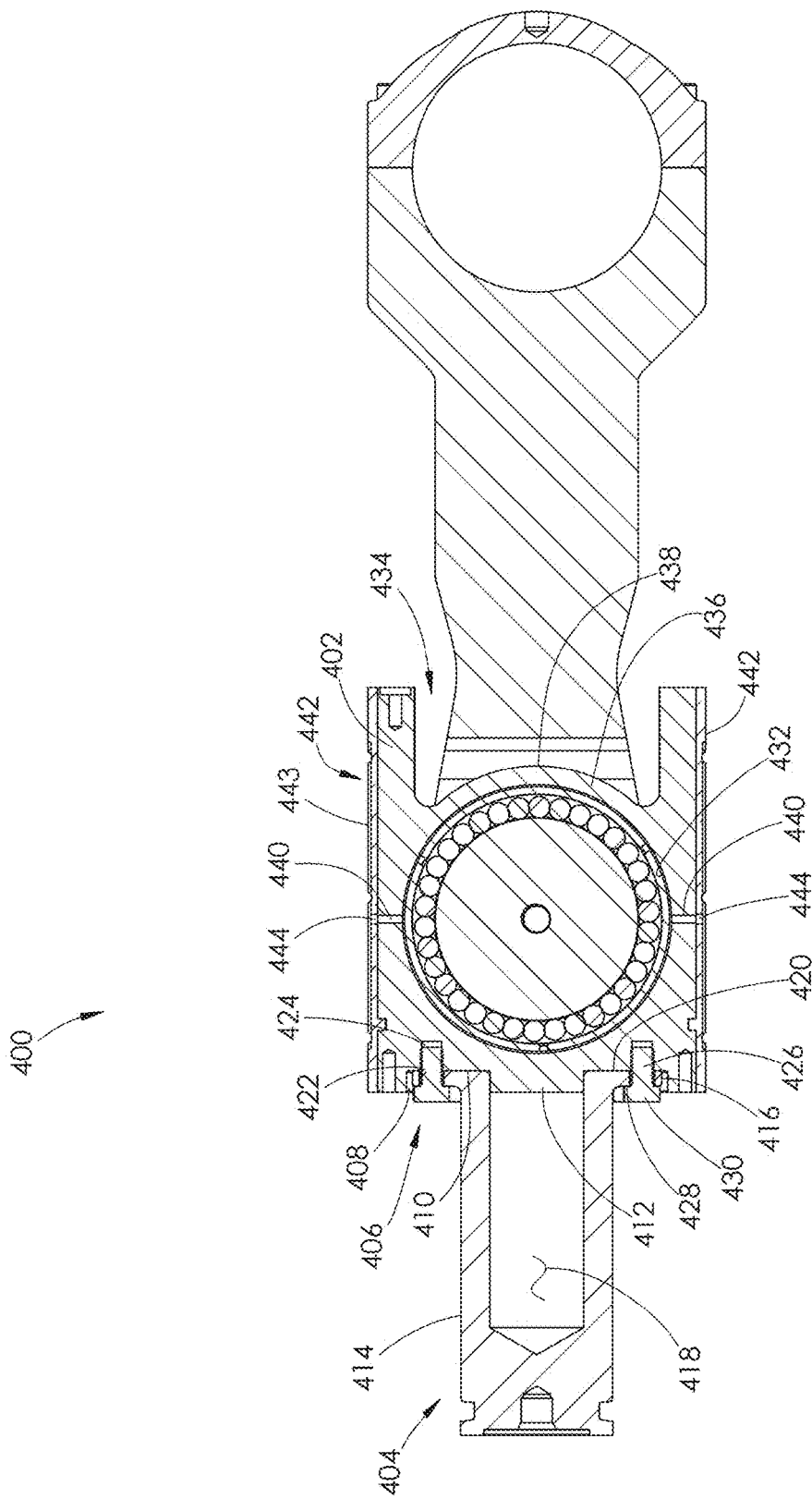
FIG. 60 is a cross-sectional view of the linear drive assembly shown in FIG. 57, taken along line X-X.

Continuing with FIGS. 59 and 60, the crosshead 402 is identical to the crosshead 214, shown in FIGS. 25 and 26, except for the following described features. A front end 406 of the crosshead 402 comprises a pony rod cutout 408 having a planar base 410. In contrast to the front end 216 of the crosshead 214, a pony rod mounting boss 412 projects from a center of the planar base 410. As described herein, the mounting boss 412 is sized to be received within a portion of the pony rod 404.

Figure 61:
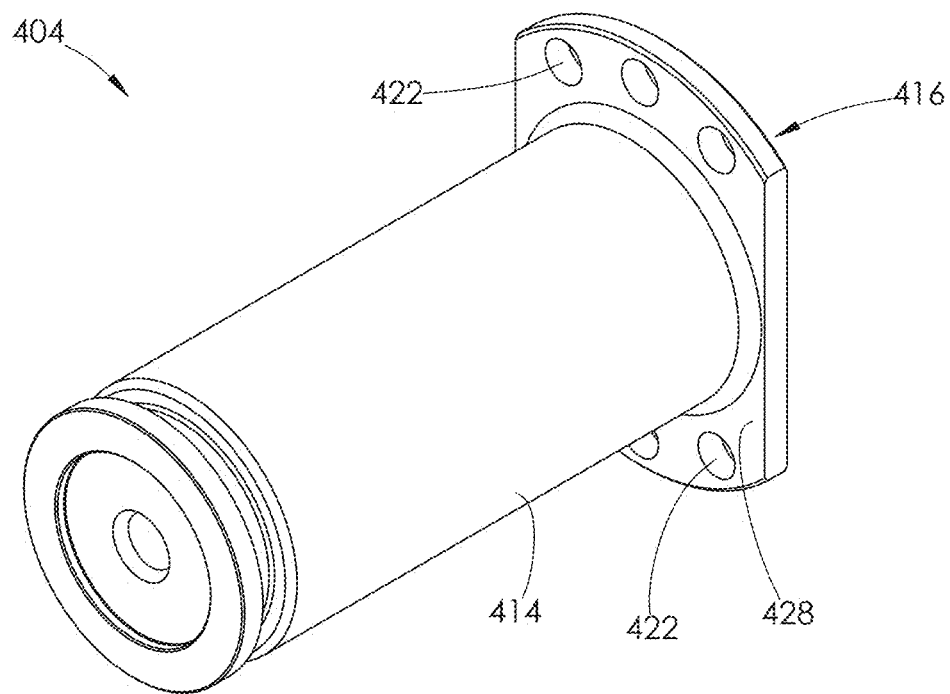
FIG. 61 is a front perspective view of the pony rod used with the linear drive assembly shown in FIG. 57.
Figure 62:
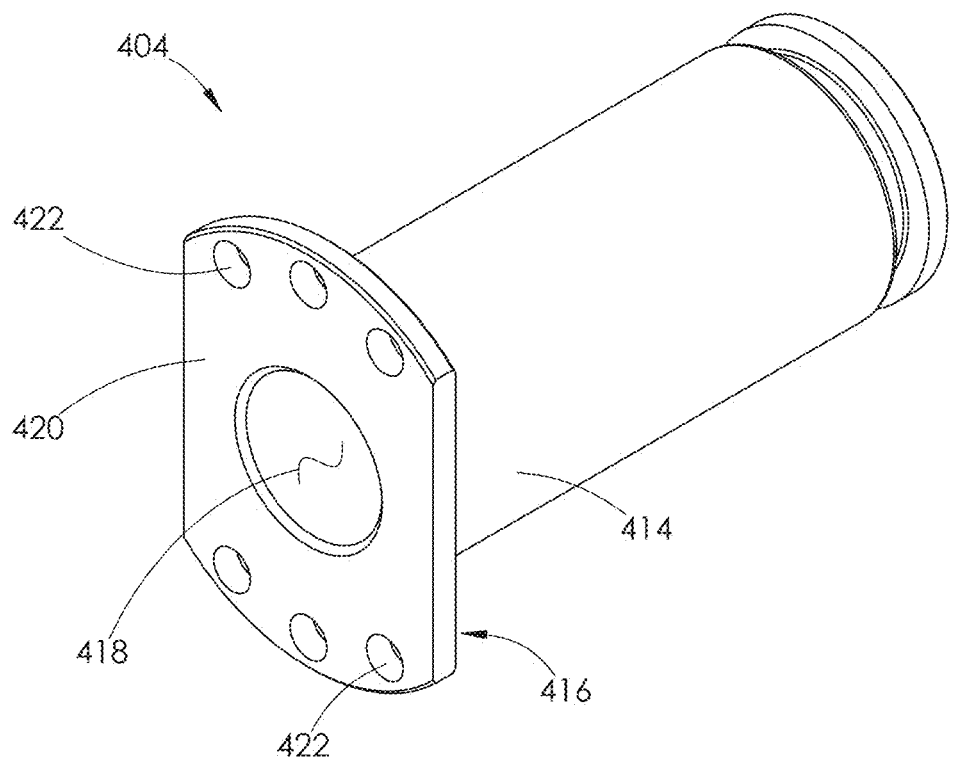
FIG. 62 is a rear perspective view of the pony rod shown in FIG. 61.
Figure 63:
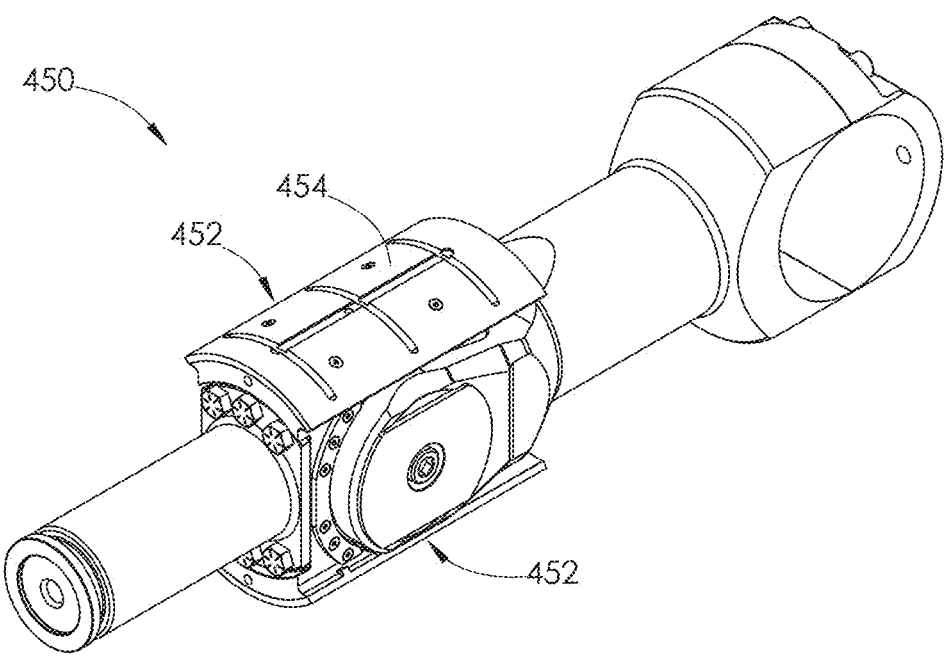
FIG. 63 is a front perspective view of another embodiment of a linear drive assembly disclosed herein.
Figure 64:
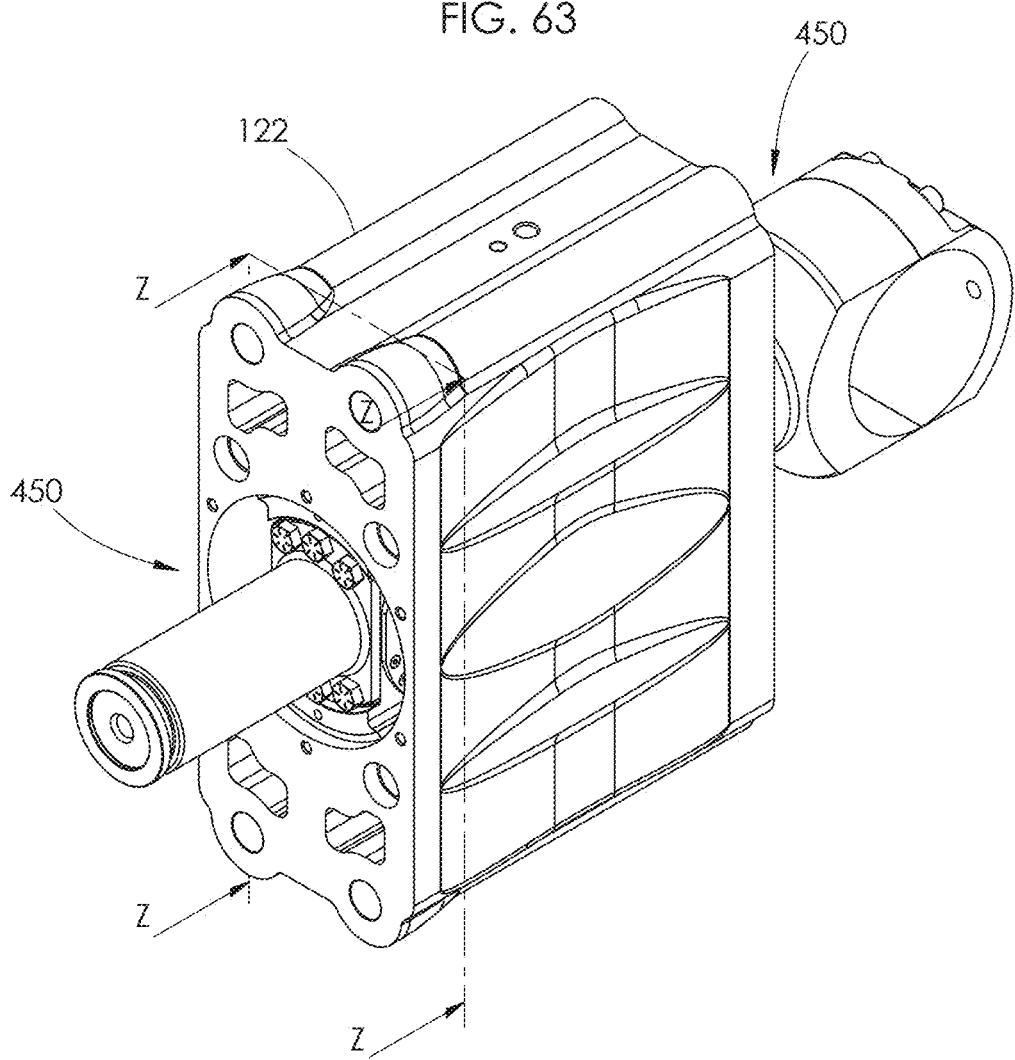
FIG. 64 is a front perspective view of the linear drive assembly shown in FIG. 63 installed within the crosshead guide shown in FIG. 15.

Continuing with FIGS. 60-62, the pony rod 404 comprises an elongate body 414 joined to a rear plate 416. A blind bore 418 is formed within the pony rod 404 that opens on a rear surface 420 of the rear plate 416. The bore 418 is sized to closely receive the mounting boss 412. Likewise, the rear plate 416 is sized and shaped to be closely received within the pony rod cutout 408. The rear plate 416 further comprises a plurality of upper and lower openings 422. The upper and lower openings 422 are configured to align with upper and lower threaded openings 424 formed in the planar base 410 of the crosshead 402.

Continuing with FIGS. 59 and 60, the pony rod 404 is attached to the crosshead 402 using a plurality of fasteners 426. Each fastener 426 is installed within a corresponding aligned opening 422 and threaded opening 424. In contrast to the upper and lower openings 348 formed in the rear plate 338, shown in FIGS. 49 and 50, the upper and lower openings 422 do not open into a counterbore on a front surface 428 of the rear plate 416. Thus, a head 430 of each fastener 426 engages the front surface 428 of the rear plate 416. When the pony rod 404 is attached to the crosshead 402, the pony rod mounting boss 412 is installed within the bore 418 formed in the pony rod 404. The mounting boss 412 helps to properly align the pony rod 404 on the crosshead 402, while the bore 418 helps remove excess weight from the pony rod 404.

Continuing with FIG. 60, the crosshead 402 further comprises a wrist pin bore 432. A rear end 434 of the crosshead 402 comprises a thinner wall 436 between the wrist pin bore 432 and a rear surface 438 of the crosshead 402 than that of the crosshead 214, shown in FIG. 27. The crosshead 402 further comprises upper and lower lubricant holes 440. The lubricant holes 440 are like the lubricant holes 326 shown in FIG. 27, but the lubricant holes 440 are centered on the crosshead 402, instead of being positioned closer to the front end 406 of the crosshead. As a result, the crosshead 402 utilizes another embodiment of wear plates 442. The wear plates 442 are like the wear plates 308, shown in FIGS. 38-40, but a lubricant opening 444 formed in each wear plate 442 is positioned to align with the lubricant holes 440.

Linear Drive Assembly 450

Turning to FIGS. 63-70, another embodiment of a linear drive assembly 450 is shown. The linear drive assembly 450 is identical to the linear drive assembly 400, but it comprises another embodiment of wear plates 452. The wear plates 452 are identical to the wear plates 442, shown in FIGS. 60, 66, and 67, but as described herein, an upper or outer surface 454 of the wear plates 452 is shaped differently from the outer surface 443 of the wear plates 442.

Figure 65:
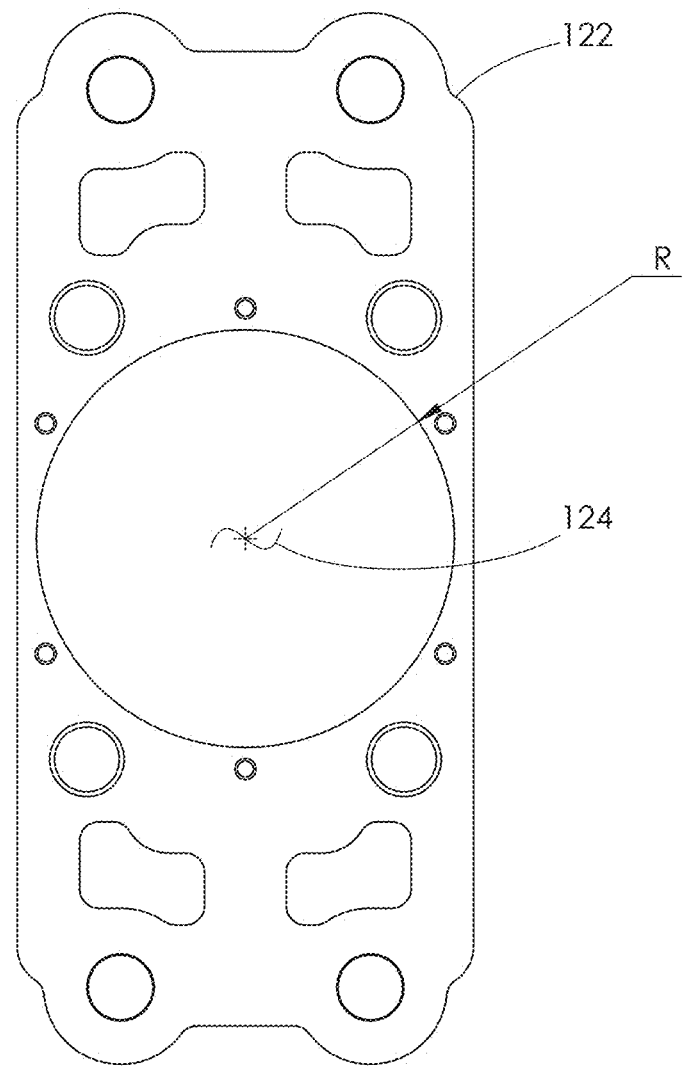
FIG. 65 is a front elevational view of the crosshead guide shown in FIG. 64.
Figure 66:
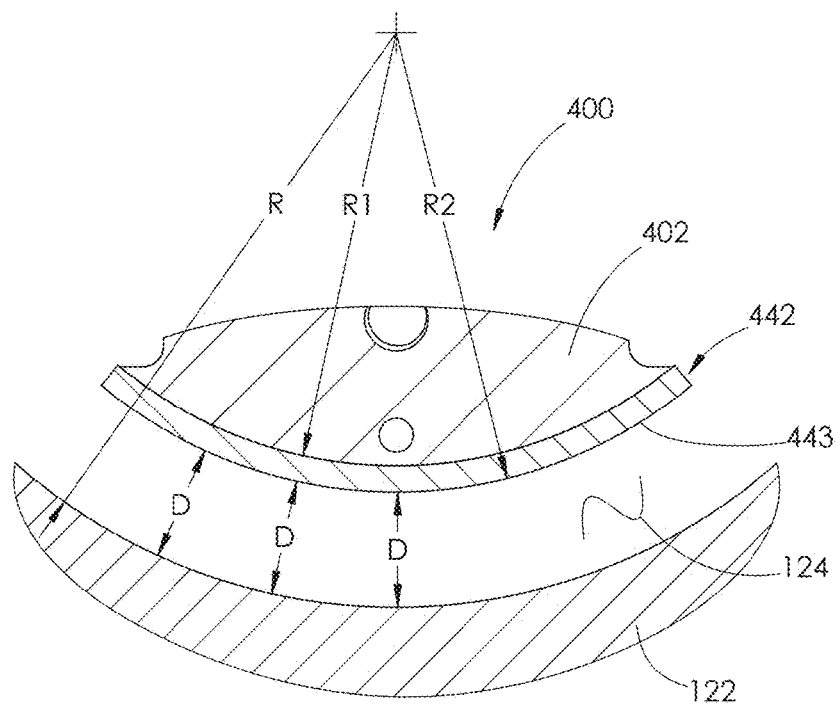
FIG. 66 is a cross-sectional view of the crosshead shown in FIG. 57 installed within the crosshead guide shown in FIG. 65. The crosshead is shown spaced from the crosshead guide.
Figure 67:
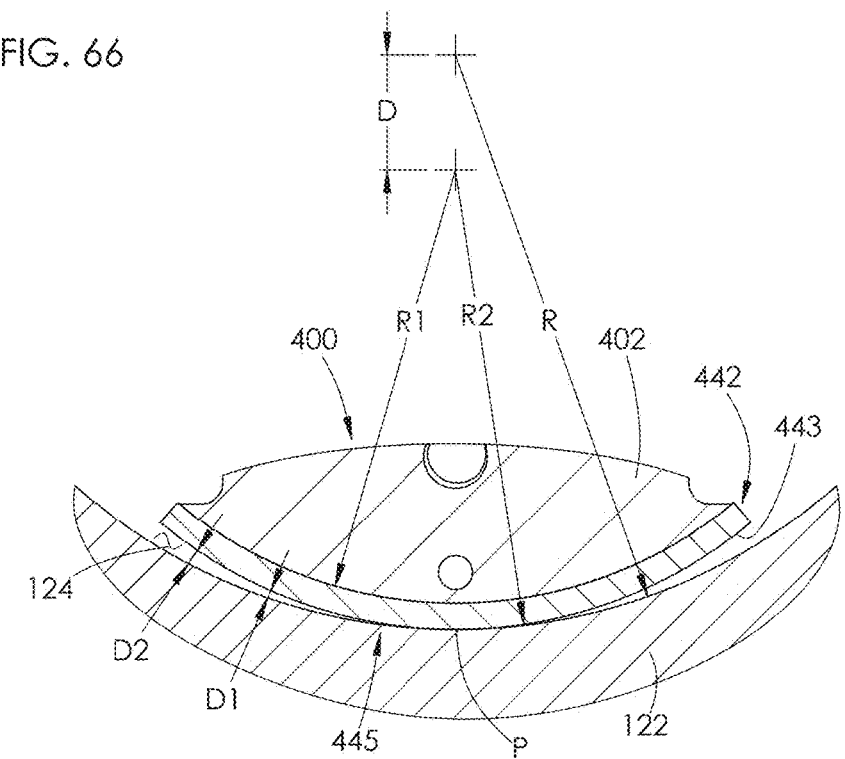
FIG. 67 is a cross-sectional view of the crosshead and crosshead guide shown in FIG. 66, but the crosshead is shown engaging the crosshead guide.

Continuing with FIGS. 65-67, the crosshead bore 124 formed within the crosshead guide 122 has a radius, R, as shown in FIG. 65. The crosshead 402 has a radius, R1, as shown in FIGS. 66 and 67. R1 is also formed so that it is concentric with R. Because R1 is concentric with R, R1 is less than R so that when the wear plate 442 is assembled to the crosshead 402, the crosshead assembly 400 can fit within the crosshead bore 124.

When the wear plates 442, shown in FIG. 60 are installed on the crosshead 402, an upper or outer surface 443 of each wear plate 442 has a radius, R2. Because the wear plates 442 are shaped to match the shape of the crosshead 402, R2 is also concentric with R. R2 is therefore smaller than R so that the crosshead assembly 400 can fit within the crosshead bore 124.

Continuing with FIGS. 66 and 67, ideally, the crosshead assembly 400 is held centered within the crosshead bore 124 so that all points on the upper surface 443 of each wear plate 442 are spaced the same distance, D, from the wall of the crosshead bore 124, as shown in FIG. 66. The equal spacing provides for consistent lubrication around the wear plates 442, during operation. However, gravity causes the crosshead assembly 400 to engage the crosshead bore 124 at its lower end 445, as shown in FIG. 67. This causes the crosshead assembly 400 to be non-concentric with the crosshead bore 124. As a result, the sides of the wear plates 442 are spaced at varying distances from the crosshead bore 124, as shown by D1 and D2, while a contact point, P, rides on a layer of lubricant along the bottom of the crosshead bore 124 during operation. The wear plates 442 and the crosshead bore 124 are quickly eroded at the contact point, P. This may require an earlier than planned replacement of the lower wear plate 442 and the crosshead guide 122 during operation.

Figure 68:
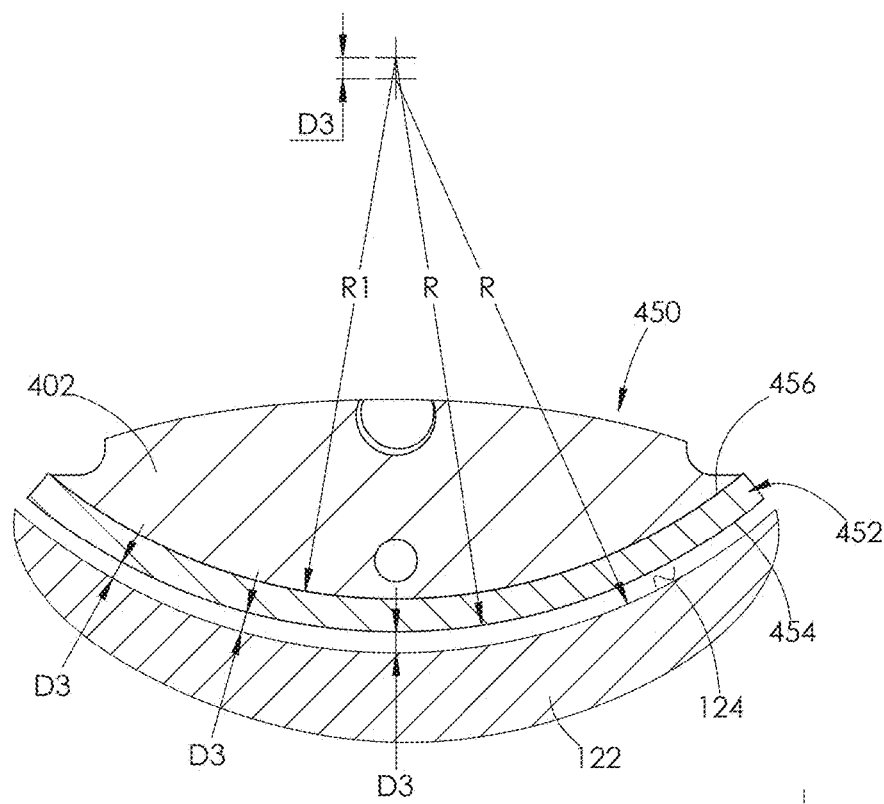
FIG. 68 is a cross-sectional view of the crosshead shown in FIG. 63 installed within the crosshead guide shown in FIG. 65. The crosshead is shown spaced from the crosshead guide.
Figure 69:
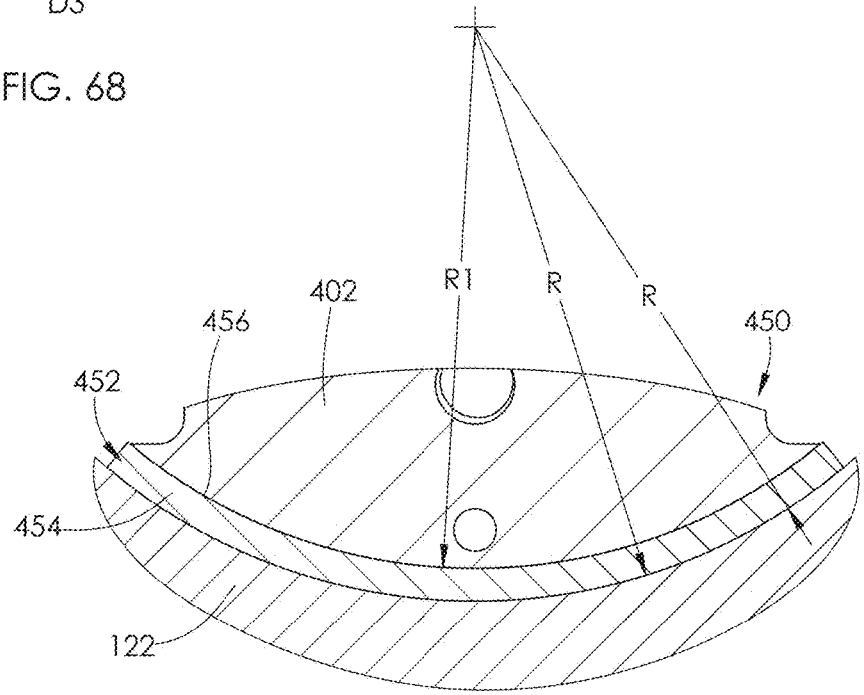
FIG. 69 is a cross-sectional view of the crosshead and crosshead guide shown in FIG. 68, but the crosshead is shown engaging the crosshead guide. Such view is an enlarged view of area Y, shown in FIG. 70.
Figure 70:
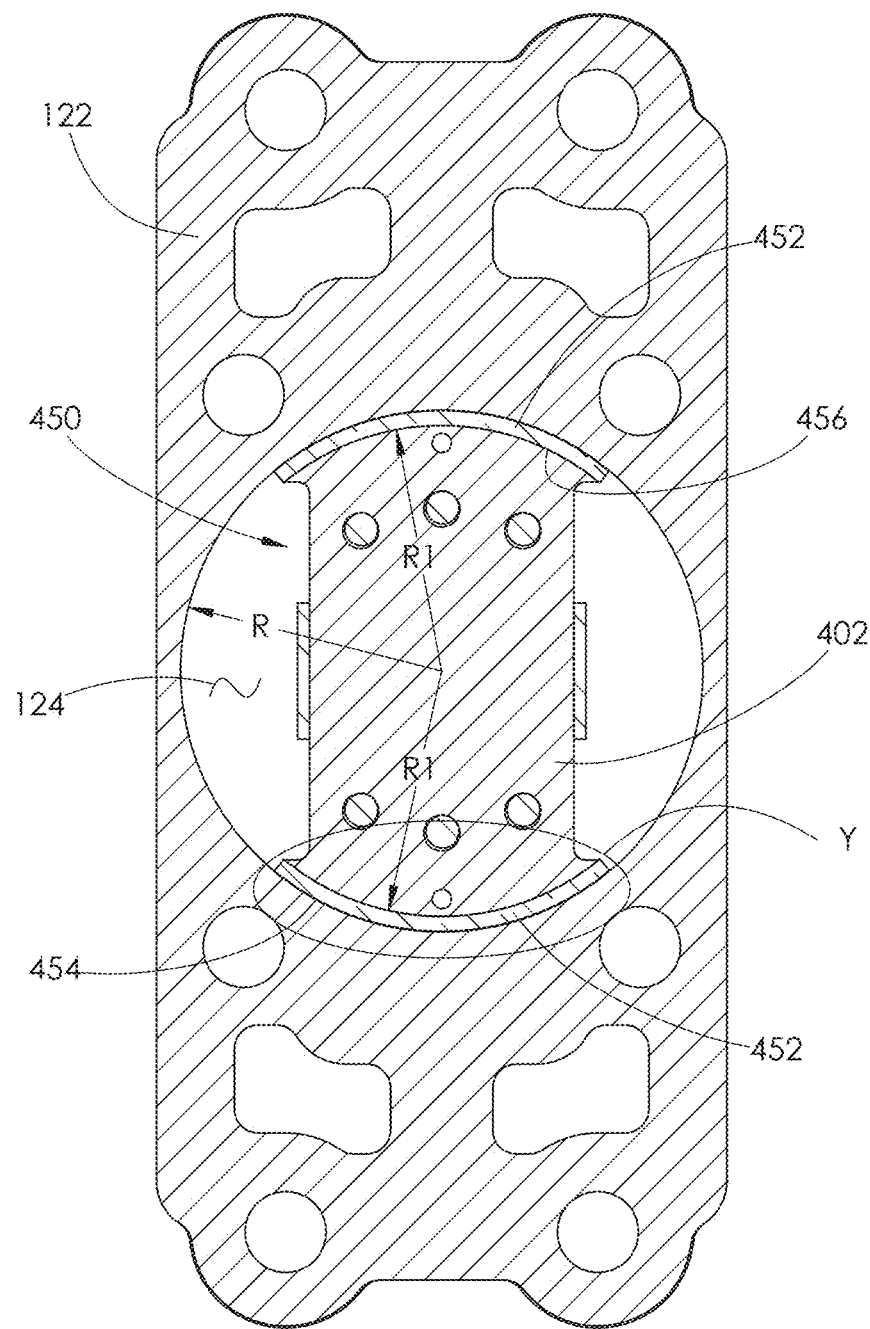
FIG. 70 is a cross-sectional view of the crosshead guide and installed linear drive assembly shown in FIG. 64, taken along line Z-Z.

Turning to FIGS. 68-70, the wear plates 452 are shaped to avoid the wear concerns of the wear plates 442. Each wear plate 452 comprises an upper or outer surface 454 and a lower or inner surface 456. The inner surface 456 is congruent to the Radius, R1, of the crosshead 402. The inner surface 456 thus has a radius that is concentric to both R1 of the crosshead 402 and R of the crosshead bore 124. In contrast to the wear plate 442, the outer surface 454 of the wear plate 452 is non-concentric with R1 of the crosshead 402 and R of the crosshead bore 124. The outer surface 454 is instead formed so that it is equal to R of the crosshead bore 124. Installation of the crosshead 402 and wear plates 452 within the crosshead bore 124 is possible even though the radii are equal because the components are non-concentric with one another.

Continuing with FIGS. 68 and 69, as with FIG. 66, ideally, the crosshead 402 and attached wear plates 452 are held centered within the crosshead bore 124 so that the upper or outer surfaces 454 of each wear plate 452 is spaced the same distance, D3, along its width from the crosshead bore 124, as shown in FIG. 68. However, if gravity causes the outer surface 454 to engage the crosshead bore 124, the entire outer surface 454 uniformly engages the crosshead bore 124, as shown in FIG. 69. Such engagement distributes wear evenly throughout the wear plate 452 and the crosshead bore 124, thereby significantly reducing the rate of wear of the wear plates 452 and the crosshead bore 124 during operation. As described with regard to the linear drive assembly 200, forming the wear plates 452 out of a softer material than the crosshead guide 122 forces the wear plates 452 to be the wear component, helping to extend the life of the crosshead guide 122.

Linear Drive Assembly 500

Turning now to FIGS. 71-85, another embodiment of a linear drive assembly 500 is shown. The linear drive assembly 500 comprises the connecting rod assembly 204 shown in FIGS. 51-56, but the linear drive assembly 500 comprises another embodiment of a crosshead assembly 502. The linear drive assembly 500 provides the same benefits as the linear drive assembly 200, but the linear drive assembly 500 comprises another method of attaching the linking elements 268 of the crosshead connection end 208 to the crosshead assembly 502.

Figure 71:
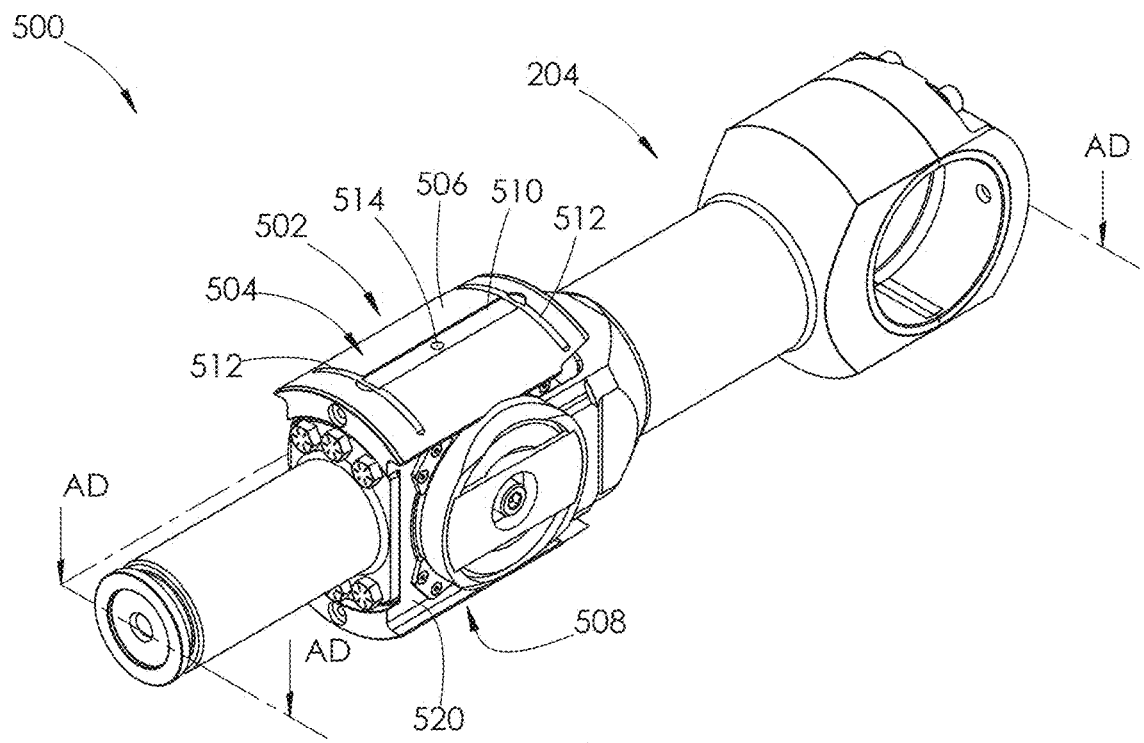
FIG. 71 is a front perspective view of another embodiment of a linear drive assembly disclosed herein.
Figure 72:
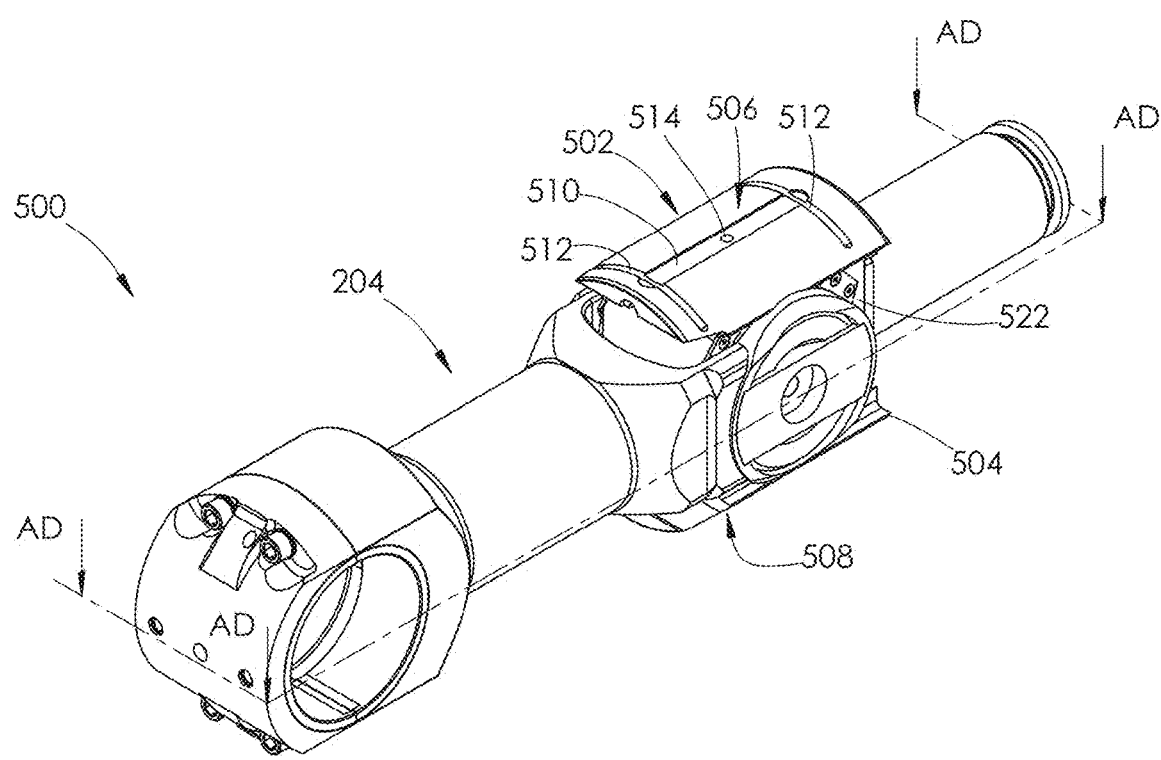
FIG. 72 is a rear perspective view of the linear drive assembly shown in FIG. 71.
Figure 73:
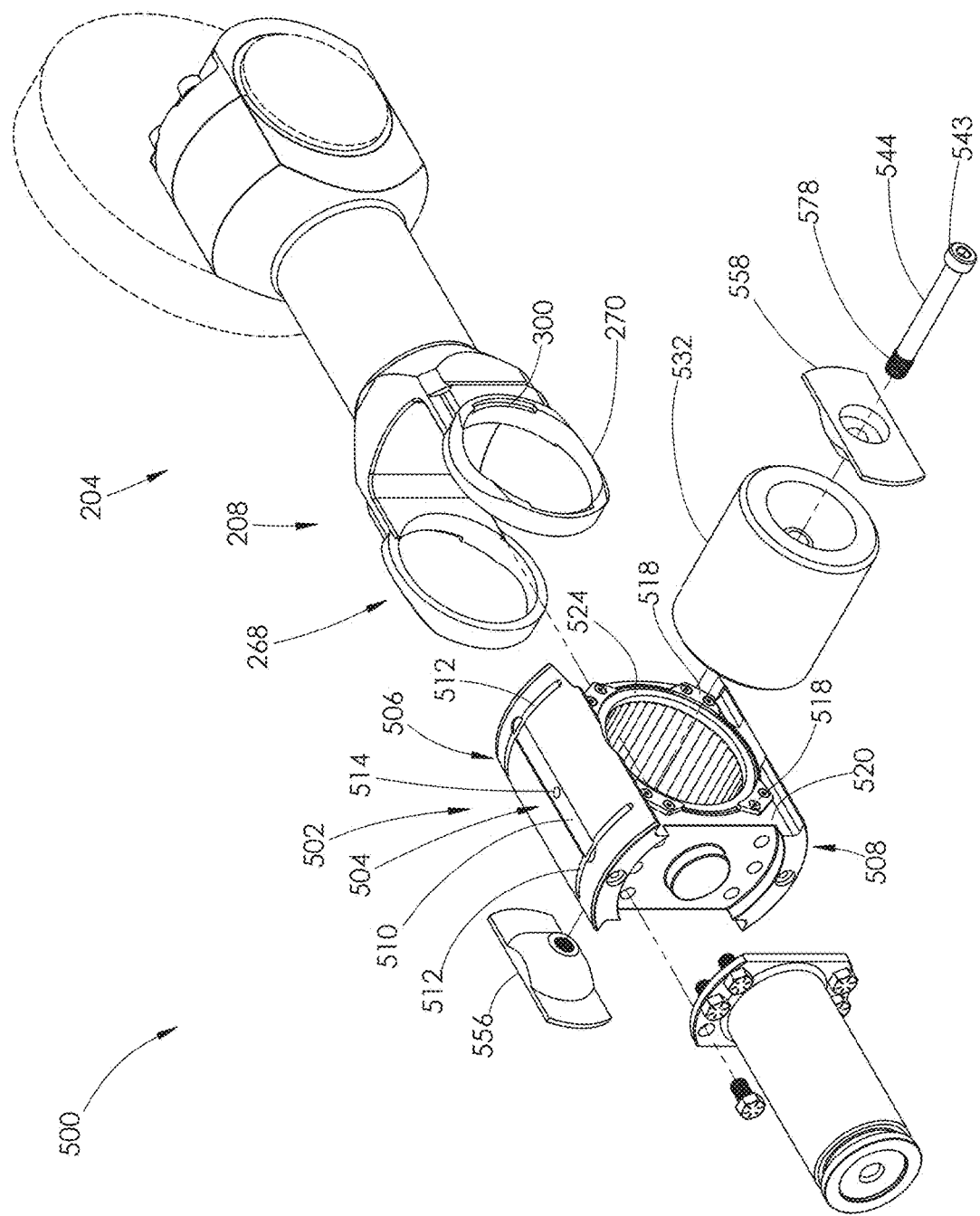
FIG. 73 is a front perspective and exploded view of the linear drive assembly shown in FIG. 71.
Figure 74:
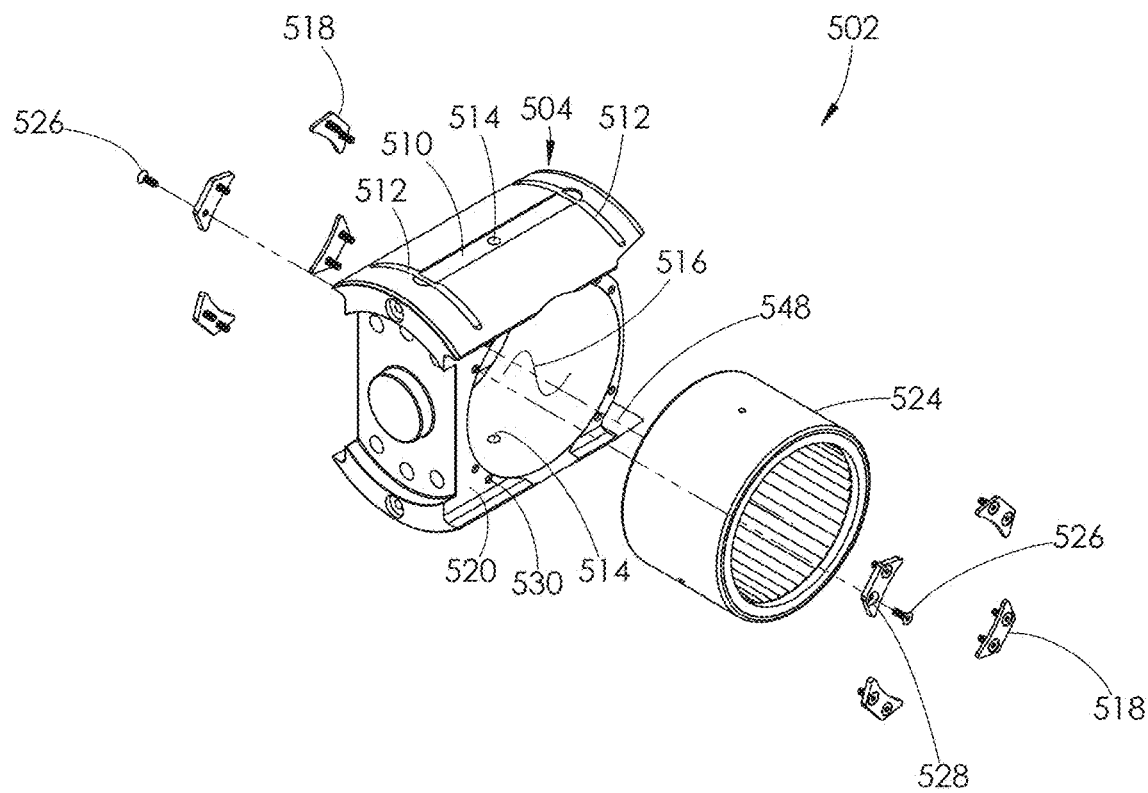
FIG. 74 is a front perspective and exploded view of the crosshead and bearing used within the linear drive assembly shown in FIG. 71.
Figure 75:
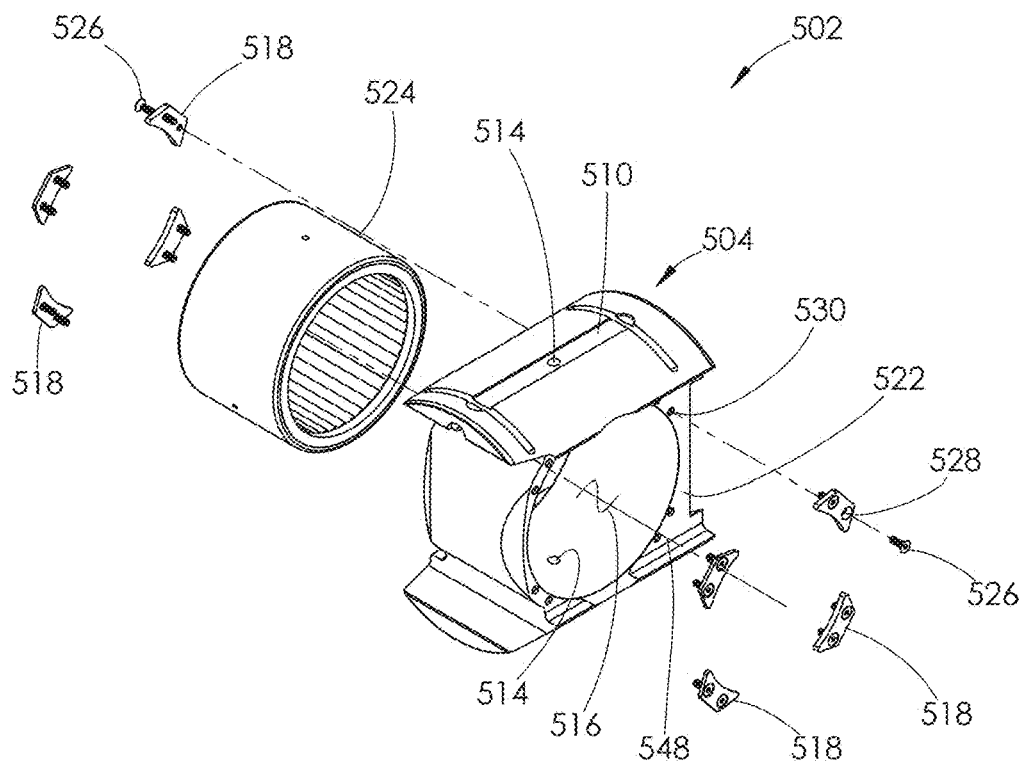
FIG. 75 is a rear perspective and exploded view of the crosshead and bearing shown in FIG. 74.

Continuing with FIGS. 71-73, the crosshead assembly 502 comprises another embodiment of a crosshead 504. The crosshead 504 is identical to the crosshead 402 shown in FIGS. 57-62, except for the following described features. The crosshead 504 does not have any wear plates attached to its upper and lower ends 506 and 508. Because the crosshead 504 does not utilize any wear plates, a lubricant channel 510 and a plurality of lubricant grooves 512 are formed in the upper and lower ends 506 and 508 of the crosshead 504. A lubricant hole 514 is formed within the crosshead 504 that interconnects a wrist pin bore 516 and the lubricant channel 510, as shown in FIGS. 74 and 75. In operation, lubricant delivered to the crosshead bore 124, shown in FIG. 47, enters the wrist pin bore 516 directly through the lubricant hole 514. In alternative embodiments, the crosshead 504 may have wear plates attached to its upper and lower ends 506 and 508.

Turning to FIGS. 73-75, the crosshead 504 is configured to have four small wear pads 518 attached to each of its opposed sides 520 and 522 to hold in a bearing 524, instead of the two larger wear pads 234 shown in FIGS. 24 and 28. Each wear pad 518 is attached to the crosshead 504 using a plurality of fasteners 526, as shown in FIGS. 74 and 75. The fasteners 526 are installed within openings 528 formed in each wear pad 518 and threaded openings 530 formed in the sides 520 and 522 of the crosshead 504, as shown in FIGS. 74 and 75. In alternative embodiments, the crosshead 504 may use the larger wear pads 234.

Continuing with FIGS. 76-78, the crosshead assembly 502 further comprises another embodiment of a wrist pin 532. The wrist pin 532 comprises a cylindrical body 534 having opposed first and second sides 536 and 538. Each side 536 and 538 is joined to the body 534 by a chamfer 540. The chamfer 540 helps to ease installation of the wrist pin 532 within the bearing 524. A through-bore 542 extends through a center of the wrist pin 532 and interconnects the first and second sides 536 and 538, as shown in FIG. 78. As will be described herein, the through-bore 542 is sized to receive a wrist pin fastener 544. A longitudinal axis 546 of the through-bore 542 aligns with a central longitudinal axis 548 of the wrist pin bore 516, shown in FIG. 85, when the wrist pin 532 is installed within the crosshead 504.

Continuing with FIGS. 76-78, the first and second sides 536 and 538 of the wrist pin 532 each comprise an outer rim 550 joined to an inner rim 552 by a tapered surface 554. The outer and inner rims 550 and 552 are planar surfaces parallel to each other and perpendicular to the longitudinal axis 546 of the through-bore 542. The through-bore 542 interconnects the first and second sides 536 and 538 at the inner rims 552. As will be described herein, each tapered surface 554 is sized to mate with one of a threaded retainer 556 or non-threaded retainer 558, shown in FIGS. 79-84. Like the wrist pin 242 shown in FIG. 29, when the wrist pin 532 is installed within the bearing 524, the first and second sides 536 and 538 of the wrist pin 532 project from the first and second sides 520 and 522 of the crosshead 504. As will be described herein, the linking elements 268 are secured to the wrist pin 532 using the wrist pin fastener 544 and the threaded and unthreaded retainer 556 and 558.

Figures 79, 80:
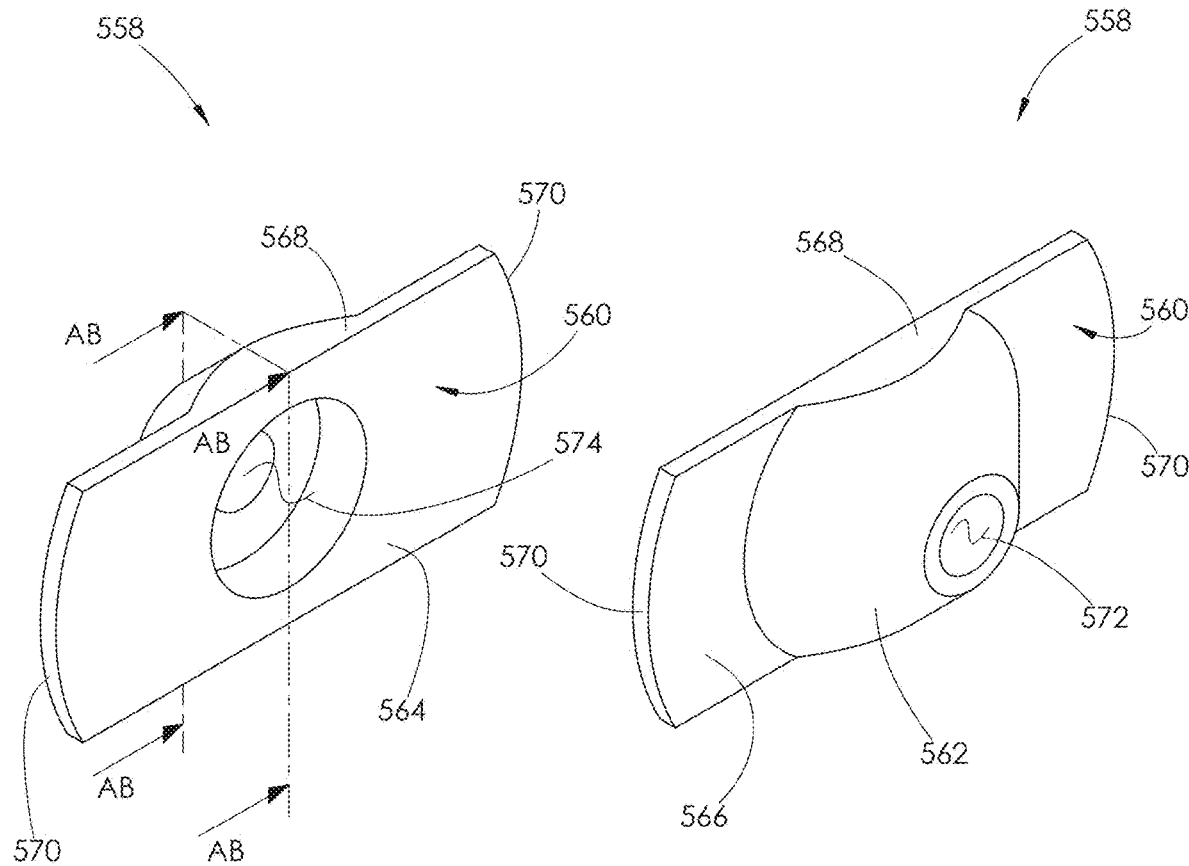
FIG. 79 is a front perspective view of the unthreaded retainer used with the linear drive assembly shown in FIG. 73.
FIG. 80 is a rear perspective view of the unthreaded retainer shown in FIG. 79.
Figure 81:
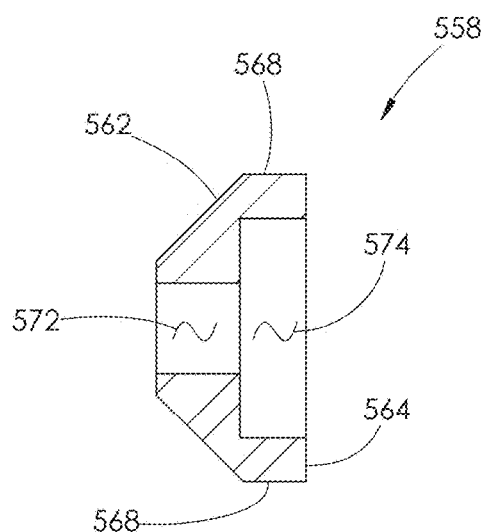
FIG. 81 is a cross-sectional view of the unthreaded retainer shown in FIG. 79, taken along line AB-AB.

Turning to FIGS. 79-81, the non-threaded or unthreaded retainer 558 comprises a plate 560 joined to a conical boss 562. The unthreaded retainer 558 may be characterized as an "unthreaded retainer plate" 558. The plate 560 has a generally rectangular shape and comprises opposed front and rear surfaces 564 and 566 joined to flat upper and lower surfaces 568 and curved side surfaces 570. The conical boss 562 is centered on the rear surface 566 of the plate 560 and is sized to mate with the tapered surface 554 of a chosen one of the sides 536 and 538 of the wrist pin 532. A through-bore 572 extends through a center of the conical boss 562 and opens into a counterbore 574 formed in the front surface 564 of the plate 560.

Figures 82, 83:
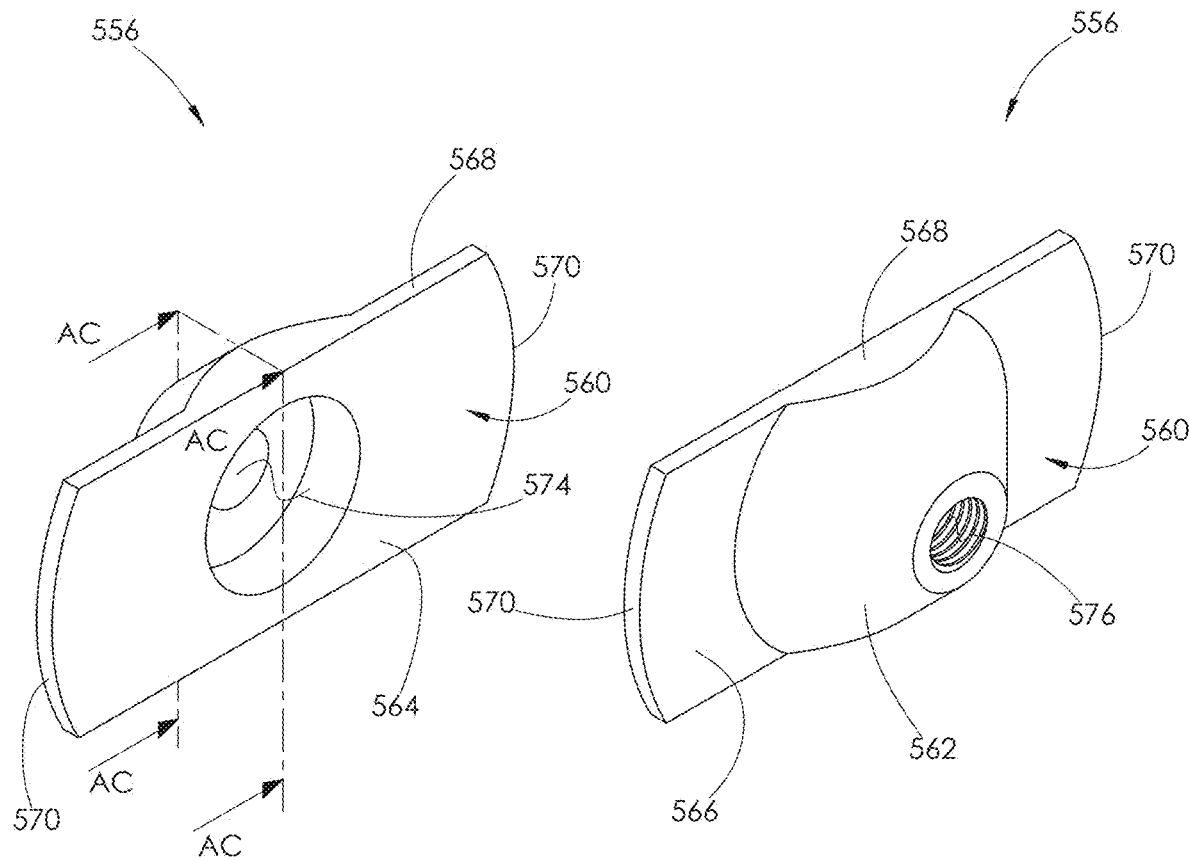
FIG. 82 is a front perspective view of the threaded retainer used with the linear drive assembly shown in FIG. 73.
FIG. 83 is a rear perspective view of the threaded retainer shown in FIG. 82.
Figure 84:
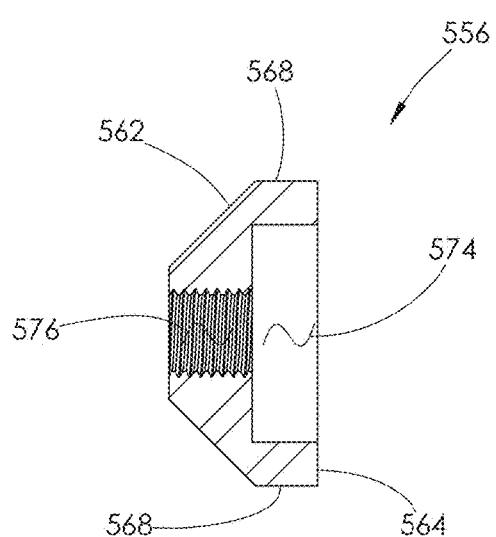
FIG. 84 is a cross-sectional view of the threaded retainer shown in FIG. 82, taken along line AC-AC.

Turning to FIGS. 82-84, the threaded retainer 556 is identical to the unthreaded retainer 558, but it comprises a threaded through-bore 576. The threaded retainer 556 may be characterized as a "threaded retainer plate" 556.

Figure 85:
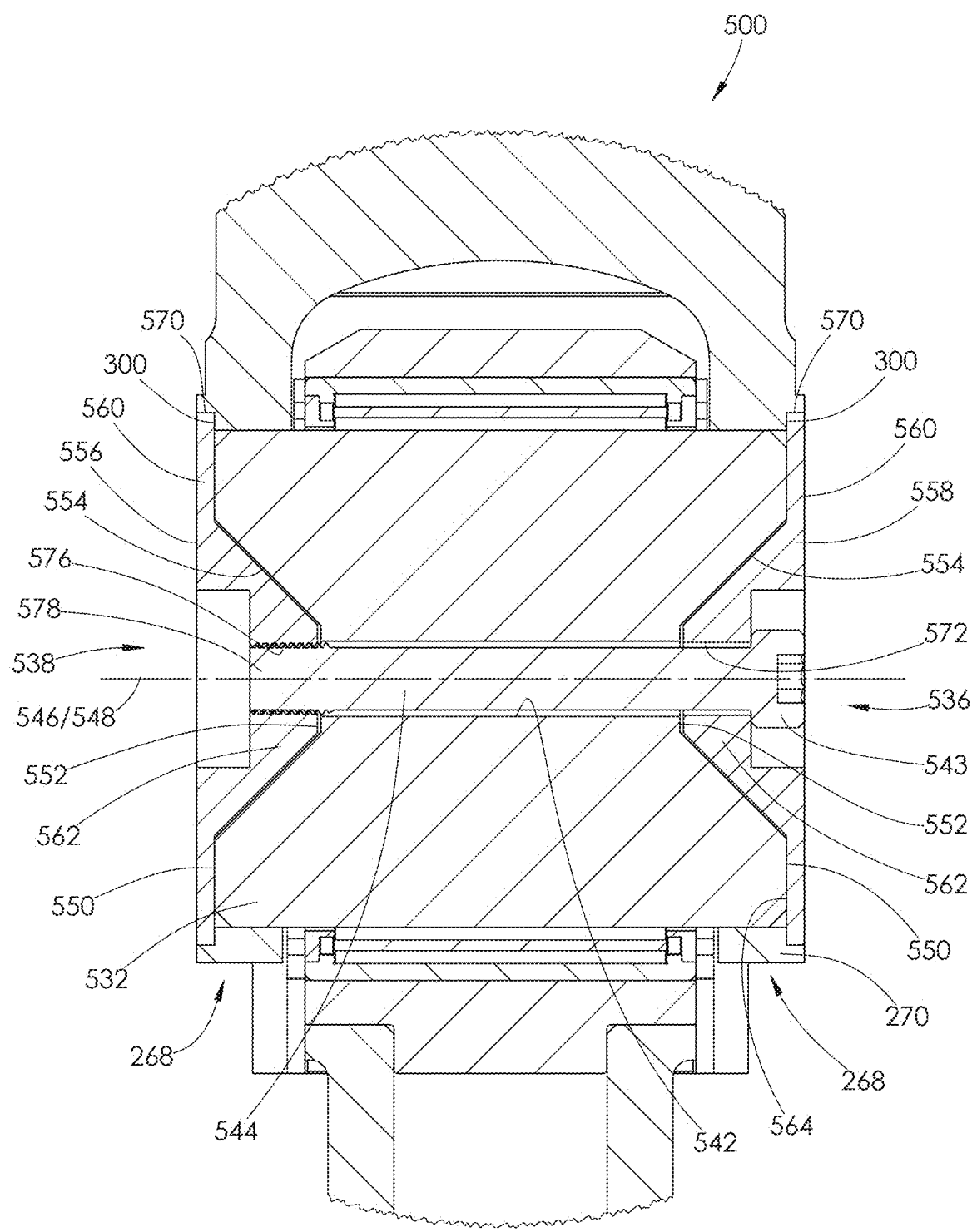
FIG. 85 is a cross-sectional view of the linear drive assembly shown in FIG. 71, taken along line AD-AD.
Figure 86:
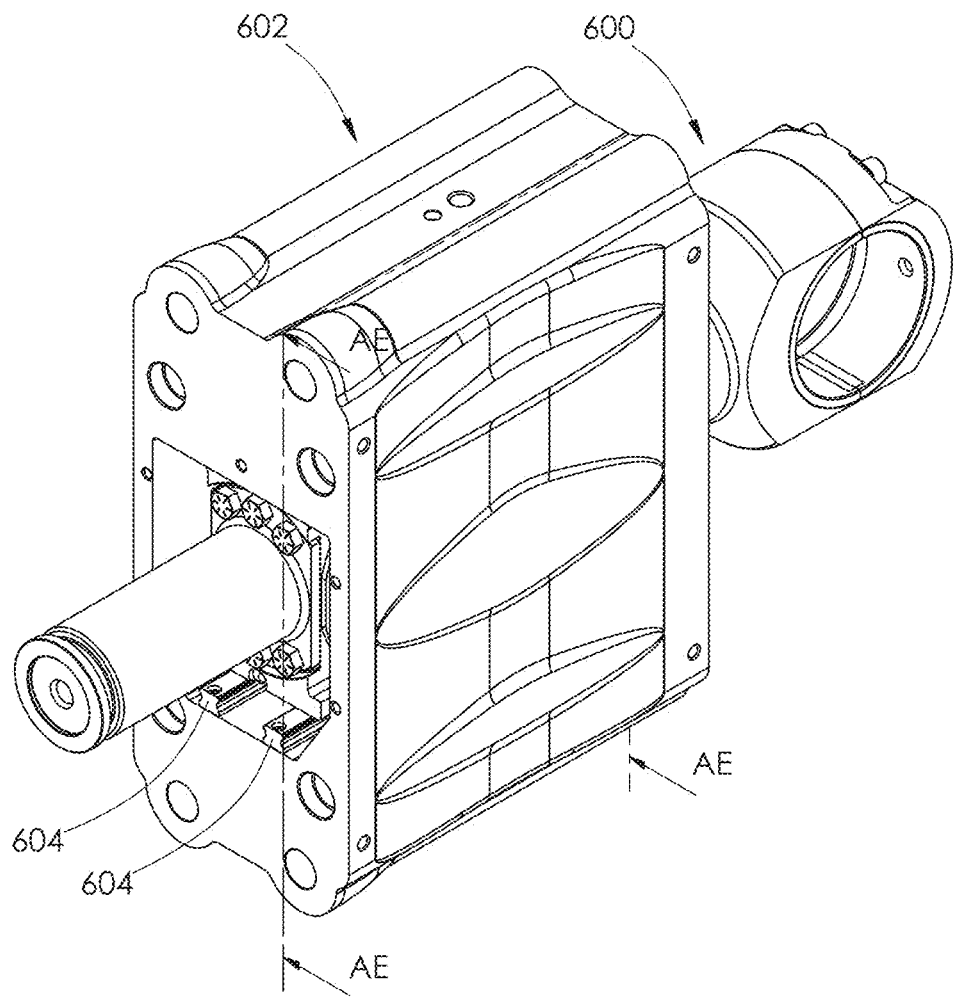
FIG. 86 is a front perspective view of another embodiment of a linear drive assembly disclosed herein shown installed within another embodiment of a crosshead guide disclosed herein.

Continuing with FIG. 85, the retainers 556 and 558 are positioned against a corresponding one of the first or second sides 536 and 538 of the wrist pin 532 such that the conical bosses 562 engage the tapered surfaces 554. When in such position, the through-bore 572 and threaded through-bore 576 align with the through-bore 542 formed in the wrist pin 532. The front surface 564 of each plate 560 engage the outer rim 550 of each corresponding side 536 and 538 of the wrist pin 532 and engage opposed sides of a corresponding one of the rings 270 of the linking elements 268. The curved sides 570 engage the cutout 300 formed in opposed sides of each ring 270. The cutouts 300 hold the plates 560 in place, thereby preventing the retainers 556 and 558 from rotating relative to the linking elements 268. The cutout 300 shown in FIG. 73 may be sized differently from the cutout 300 shown in FIG. 28 to accommodate the different embodiments of retainers 556 and 558 from the retainer 264.

Continuing with FIG. 85, the retainers 558 and 556 are secured together using the wrist pin fastener 544. A threaded end 578 of the fastener 544 is inserted through the through-bore 572 in the unthreaded retainer 558 and through the through-bore 542 in the wrist pin 532 until it engages the threaded through-bore 576 in the threaded retainer 556. The fastener 544 is turned until the wrist pin 532 and the linking elements 268 are tightly clamped between the opposed retainers 556 and 558, thereby securing the crosshead connection end 208 of the connecting rod assembly 204 to the wrist pin 532. When the fastener 544 is in such position, a head 543 of the fastener 544 is disposed within the counterbore 574 formed in the nonthreaded retainer 558. In operation, the wrist pin 532 and the crosshead connection end 208 rotate relative to the crosshead 504.

Linear Drive Assembly 600

Turning now to FIGS. 86-99, another embodiment of a linear drive assembly 600 is shown. The linear drive assembly 600 is configured for use with another embodiment of a crosshead guide 602. As will be described herein, the linear drive assembly 600 is configured to move within the crosshead guide 602 along a pair of rails 604.

Figure 87:
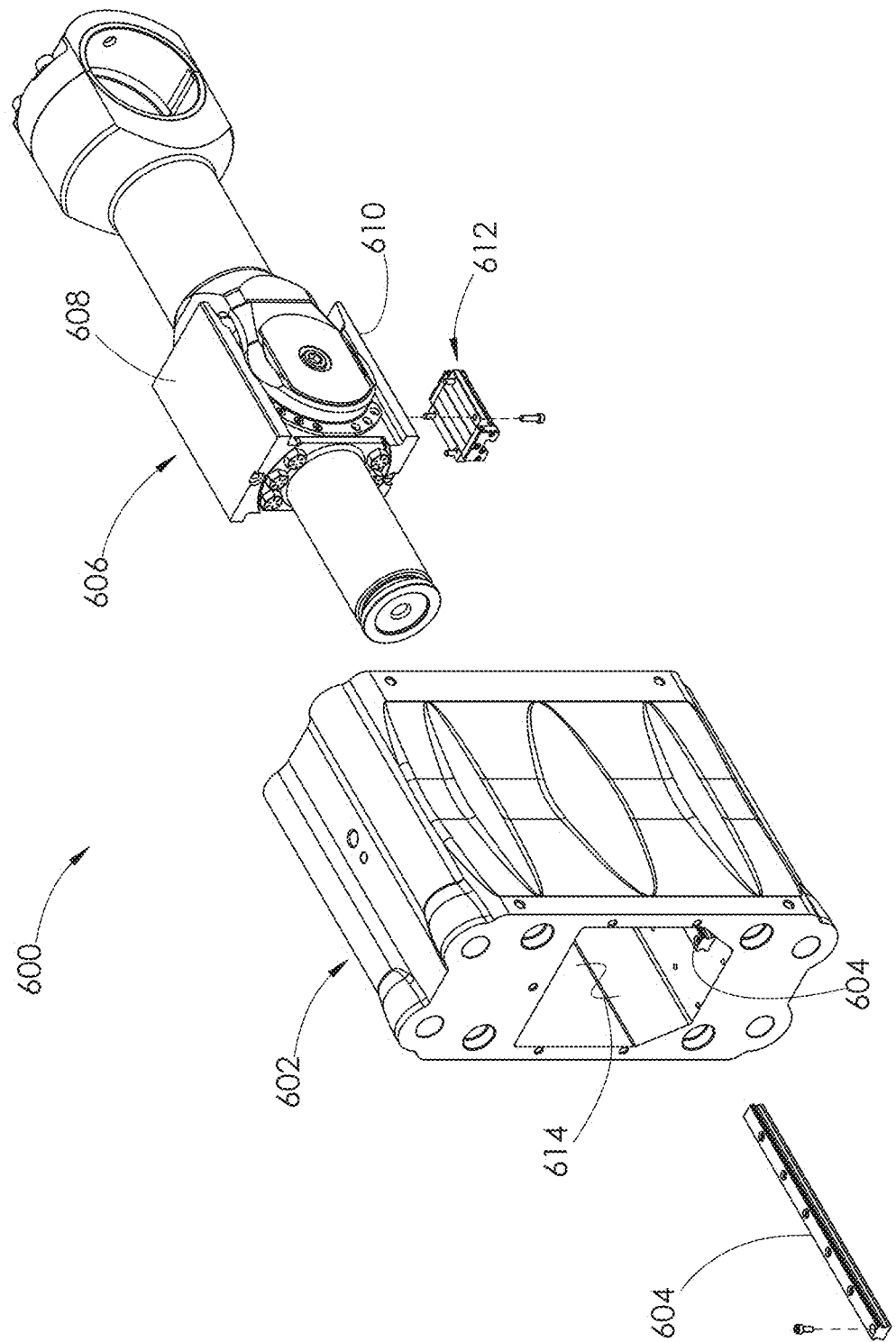
FIG. 87 is a front perspective and partially exploded view of the linear drive assembly and crosshead guide shown in FIG. 86.
Figure 88:
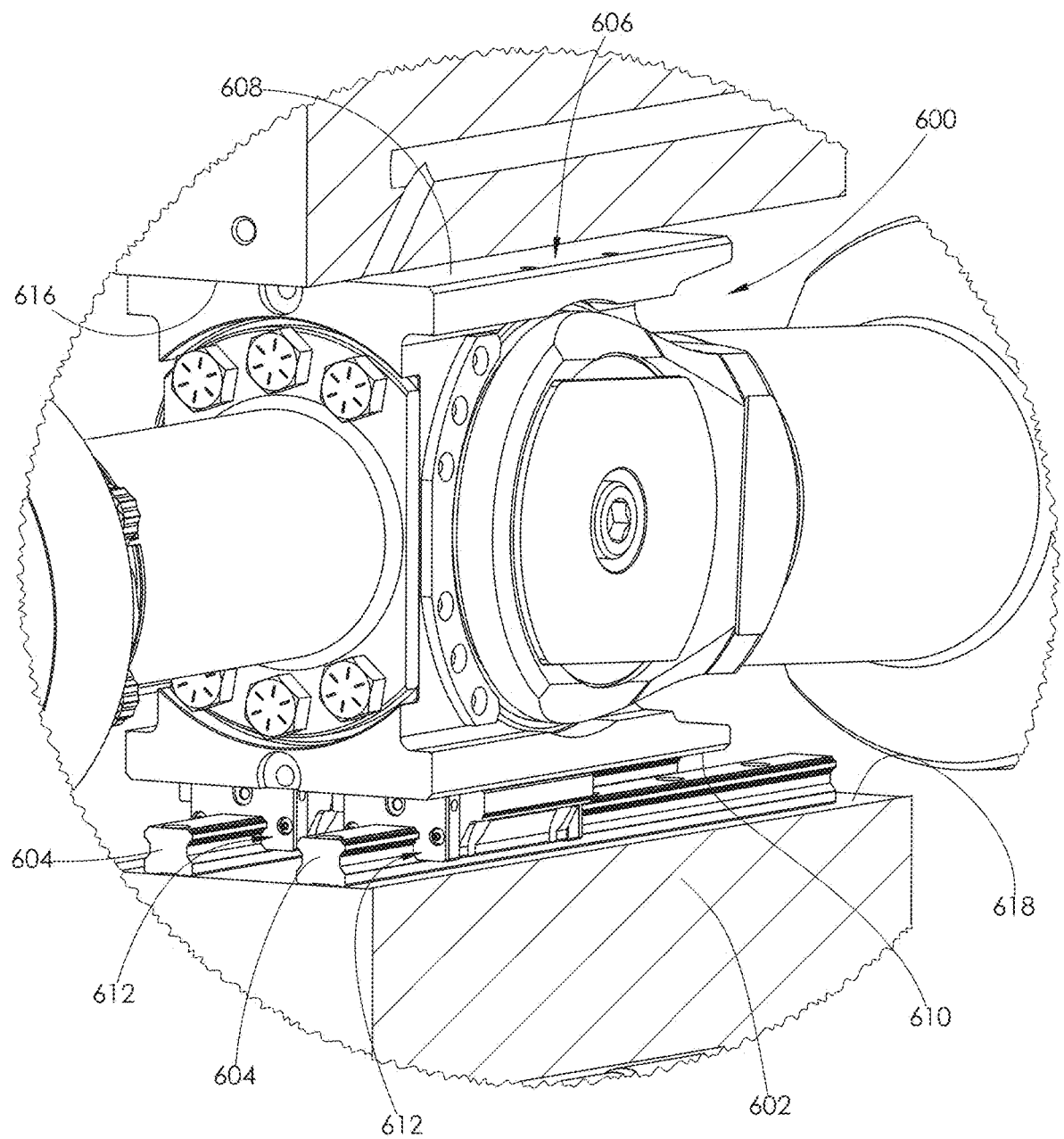
FIG. 88 is an enlarged partial cross-sectional view of the linear drive assembly and crosshead guide shown in FIG. 86, taken along line AE-AE.

Continuing with FIGS. 87 and 88, the linear drive assembly 600 is identical to the linear drive assembly 400 shown in FIGS. 57-62, but the linear drive assembly 600 comprises another embodiment of a crosshead 606. The crosshead 606 is identical to the crosshead 402, but the crosshead 606 has different upper and lower ends 608 and 610. The upper and lower ends 608 and 610 of the crosshead 606 do not have a convex shape. Instead, the upper and lower ends 608 and 610 of the crosshead 606 are flat. While not shown, one or more lubricant holes may be formed in the upper end 608 of the crosshead 606 for suppling lubricant to the interior of the crosshead 606. The lower end 610 of the crosshead 606 is configured to attach to a pair of carriages 612. The carriages 612 are each configured to slide back and forth along a corresponding one of the rails 604.

Figure 14:
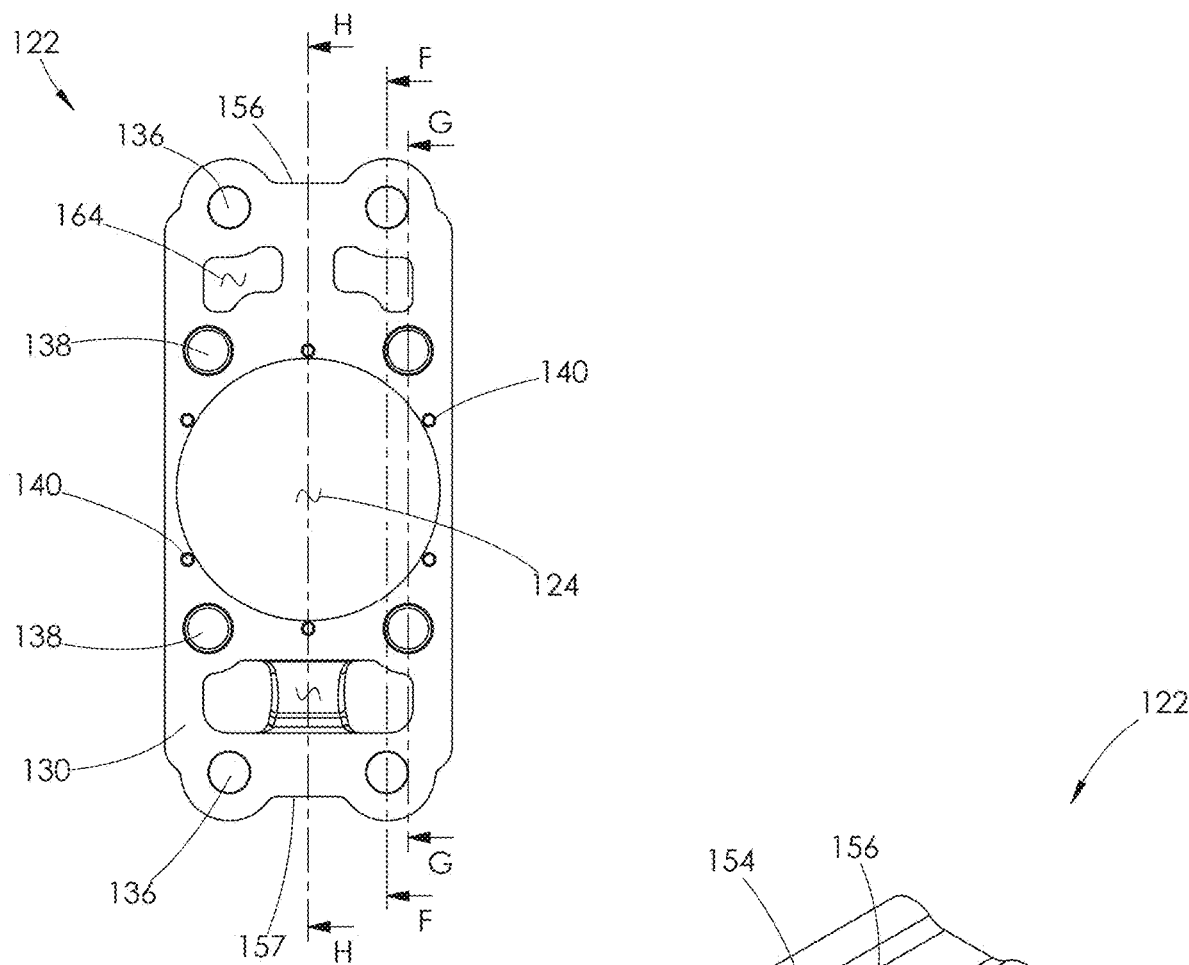
FIG. 14 is a front elevational view of one of the crosshead guides used within the power end assembly shown in FIG. 13.
Figure 15:
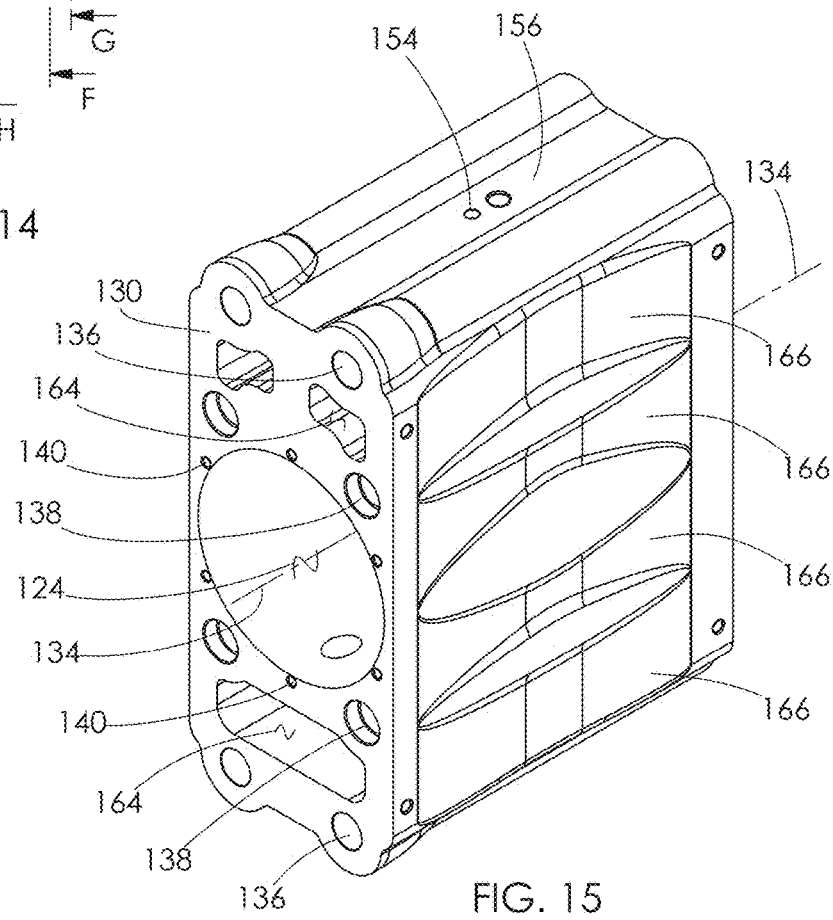
FIG. 15 is a front perspective view of the crosshead guide shown in FIG. 14.
Figure 89:
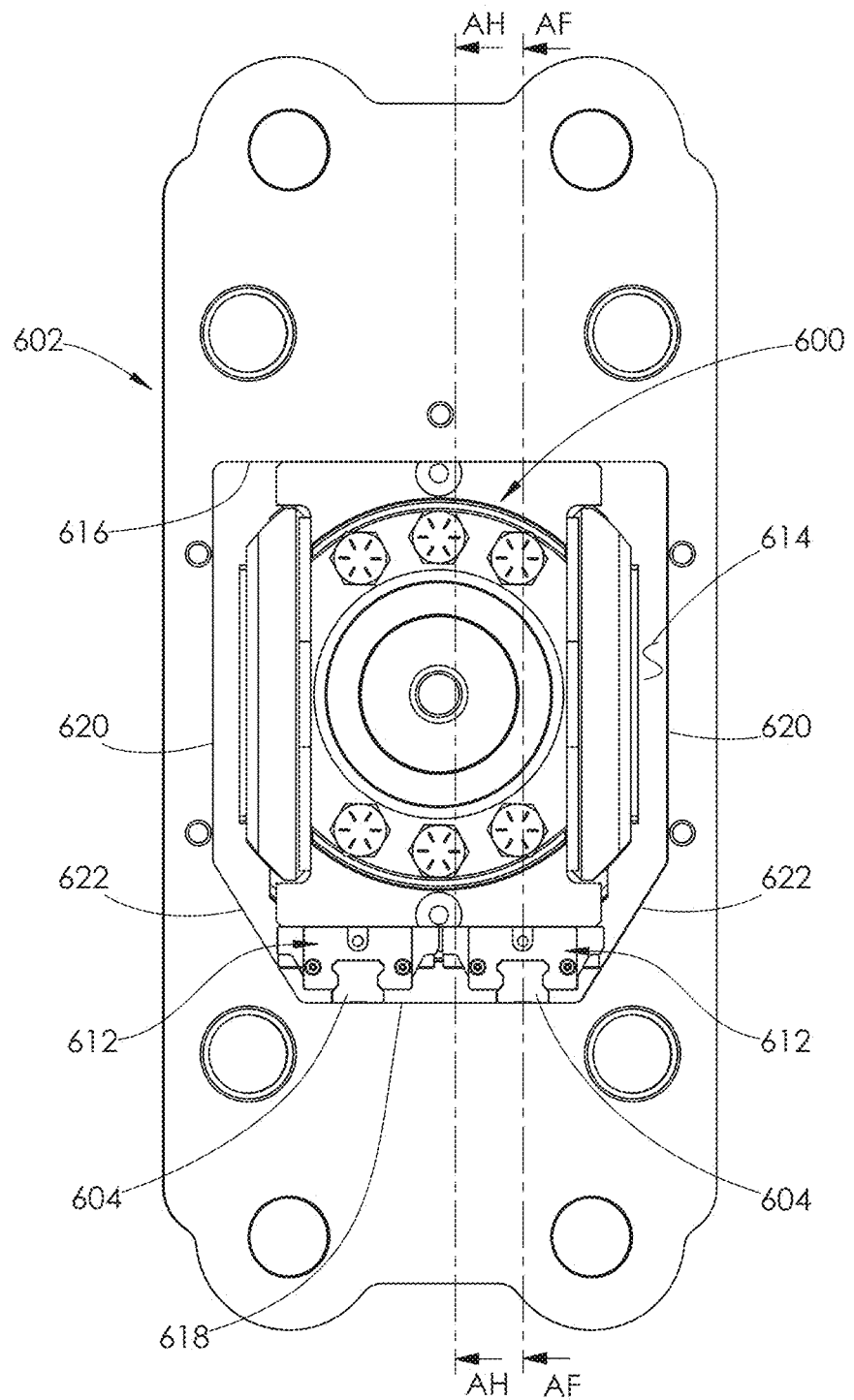
FIG. 89 is a front elevational view of the crosshead guide and installed linear drive assembly shown in FIG. 86.

Continuing with FIG. 89, the crosshead guide 602 is identical to the crosshead guide 122, shown in FIGS. 14 and 15, but the crosshead guide 602 comprises another embodiment of a crosshead bore 614. The crosshead bore 614 does not have a cylindrical shape, like the crosshead bore 124 shown in FIGS. 14 and 15. Instead, the crosshead bore 614 has flat upper and lower walls 616 and 618 joined by flat side walls 620 and angled side walls 622. The upper wall 616 has a greater width than the lower wall 618. Thus, the angled side walls 622 join the lower wall 618 and to the side walls 620. However, the crosshead bore 614 may have other shapes, as desired. The rails 604 are configured to attach to the lower wall 618 of the crosshead bore 614. While not shown, the crosshead guide 602 may further comprise non-symmetrical bores, like the hole 164 shown in FIGS. 14 and 15, for reducing the weight of the crosshead guide 602.

Figure 90:
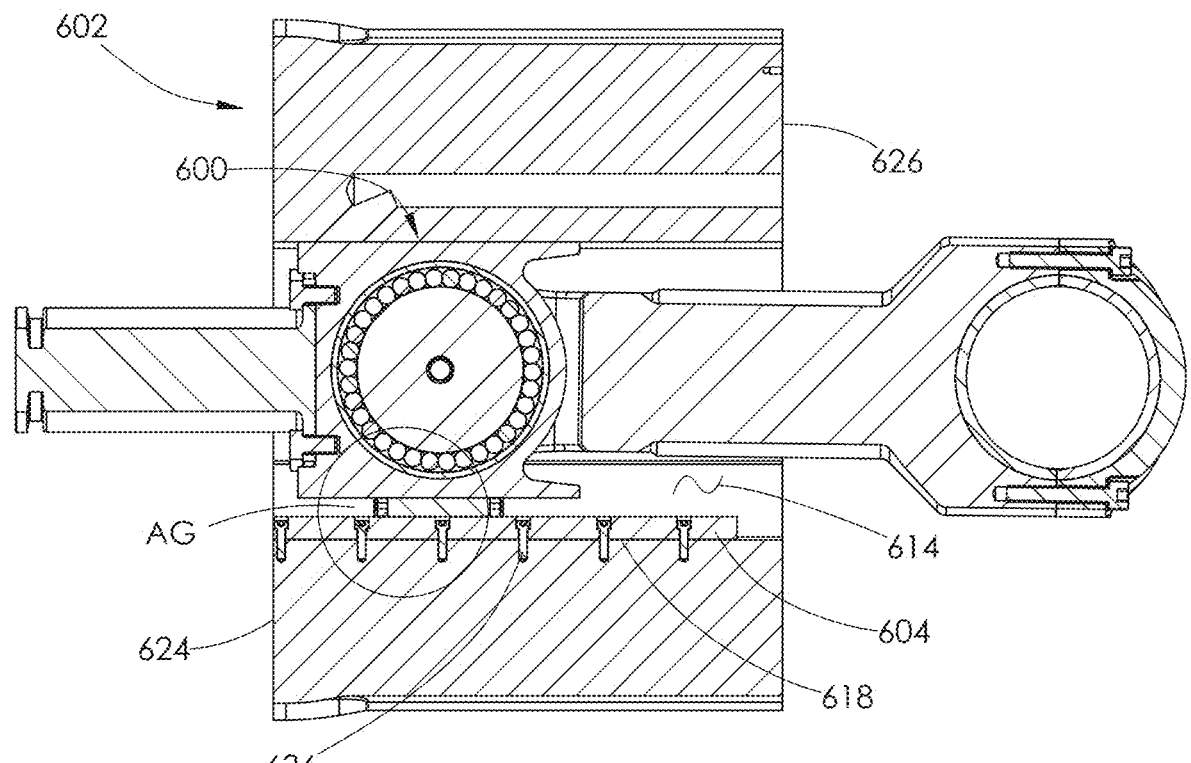
FIG. 90 is a cross-sectional view of the crosshead guide and installed linear drive assembly shown in FIG. 89, taken along line AF-AF.
Figure 91:
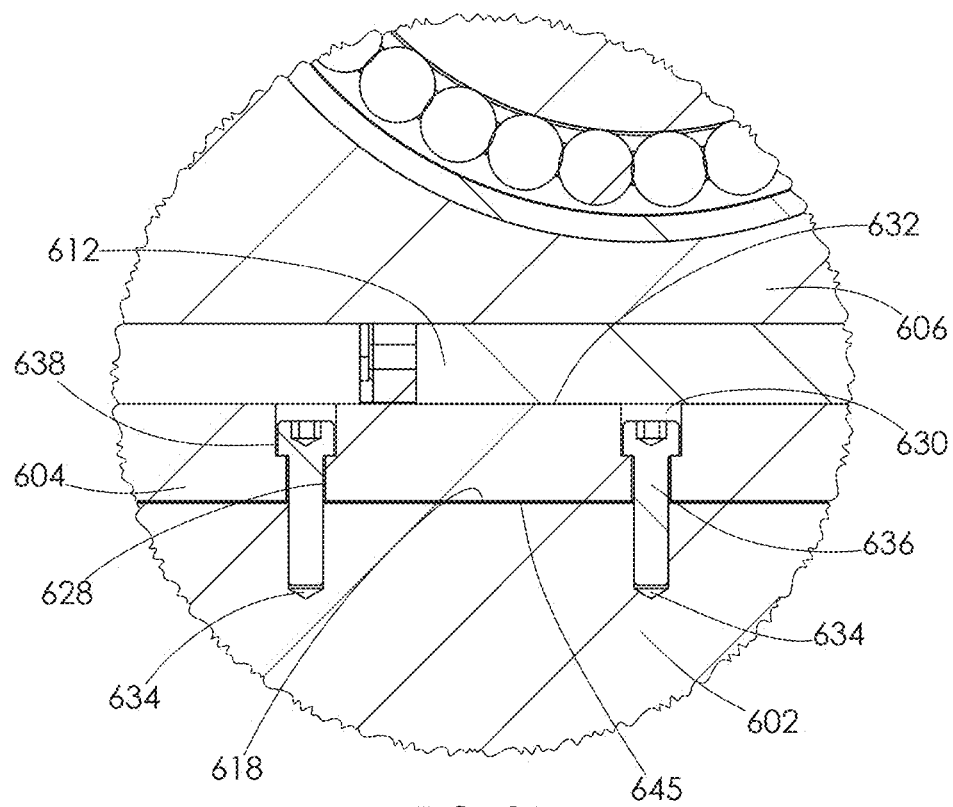
FIG. 91 is an enlarged view of area AG, shown in FIG. 90.
Figure 92:
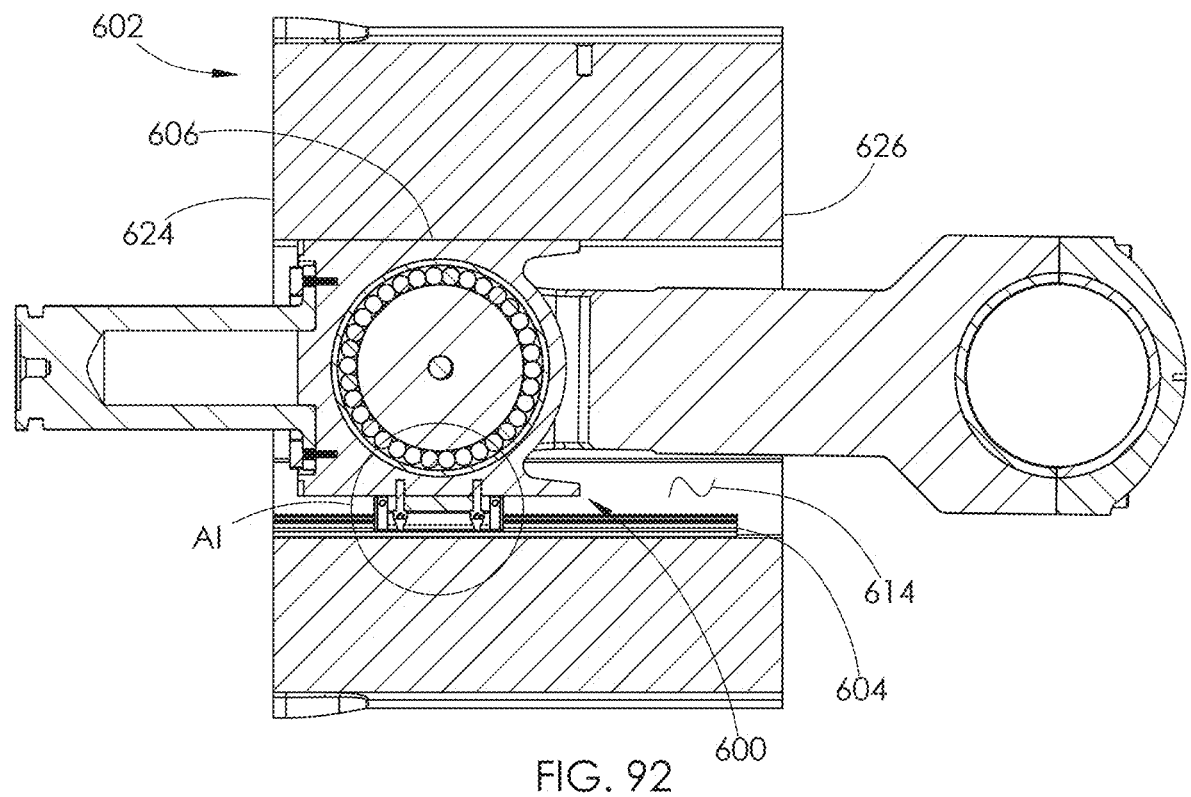
FIG. 92 is a cross-sectional view of the crosshead guide and installed linear drive assembly shown in FIG. 89, taken along line AH-AH.

Continuing with FIGS. 90 and 91, each rail 604 is sized to extend between front and rear surfaces 624 and 626 of the crosshead guide 602. A plurality of through-bores 628 are formed in each rail 604 along its length. Each through bore 628 opens into a counterbore 630 on an upper surface 632 of each rail 604, as shown in FIG. 91. The through-bores 628 are configured to align with a plurality of threaded openings 634 formed in the lower wall 618 of the crosshead bore 614. A fastener 636 is installed within each pair of aligned through-bores 628 and threaded openings 634. When installed therein, a head 638 of each fastener 636 is fully recessed within the corresponding counterbore 630 so that no part of the fastener 636 projects above the upper surface 632 of the rail 604.

Figure 94:
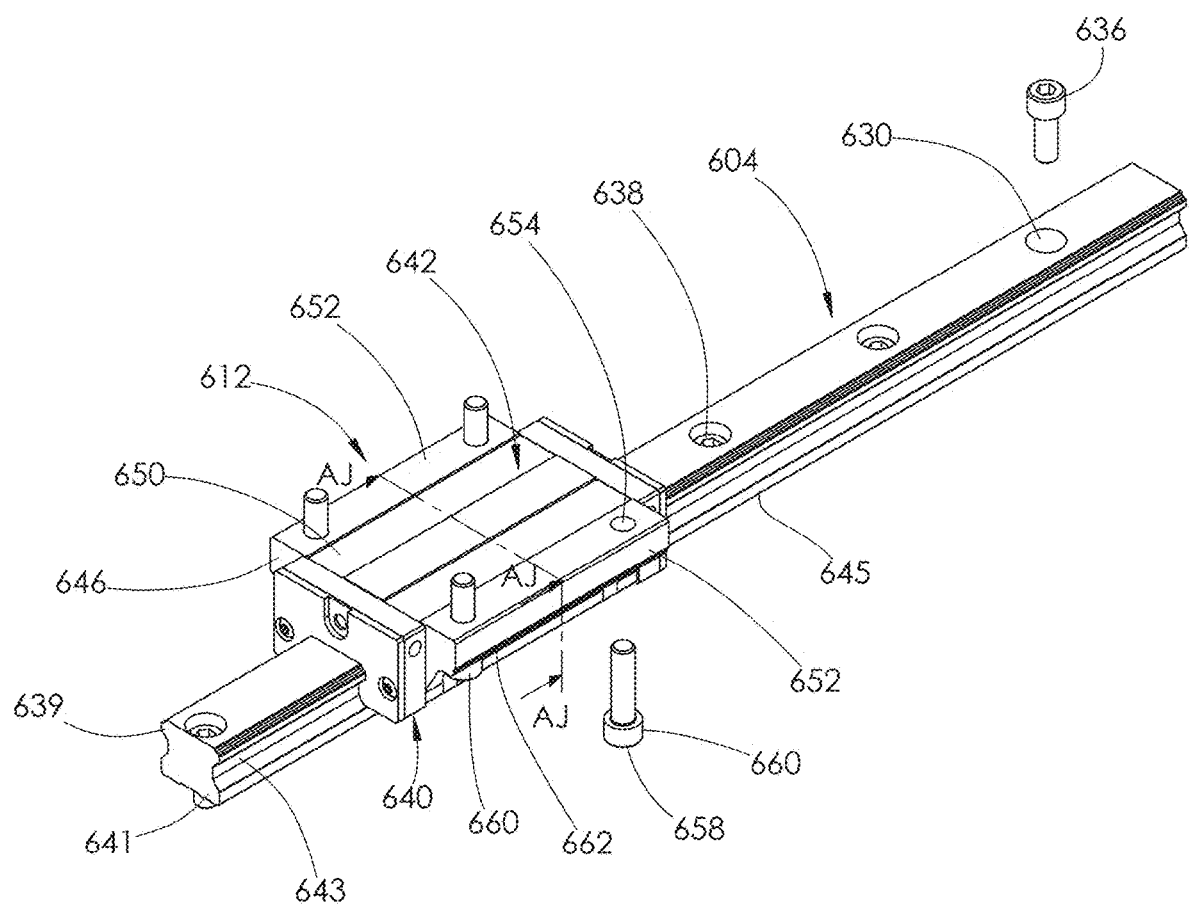
FIG. 94 is a front perspective view of one of the carriages and corresponding rails used with the linear drive assembly shown in FIGS. 88 and 89.

Turning to FIG. 94, each rail 604 further comprises a top half 639 joined to a bottom half 641 by side channels 643. When the rail 604 is attached to the crosshead guide 602, a lower surface 645 of the bottom half 641 abuts the lower wall 618 of the crosshead bore 614, as shown in FIG. 91. The carriage 612 is configured to ride along the top half 639 and side channels 643 of the rail 604, as shown in FIG. 94.

Figure 95:
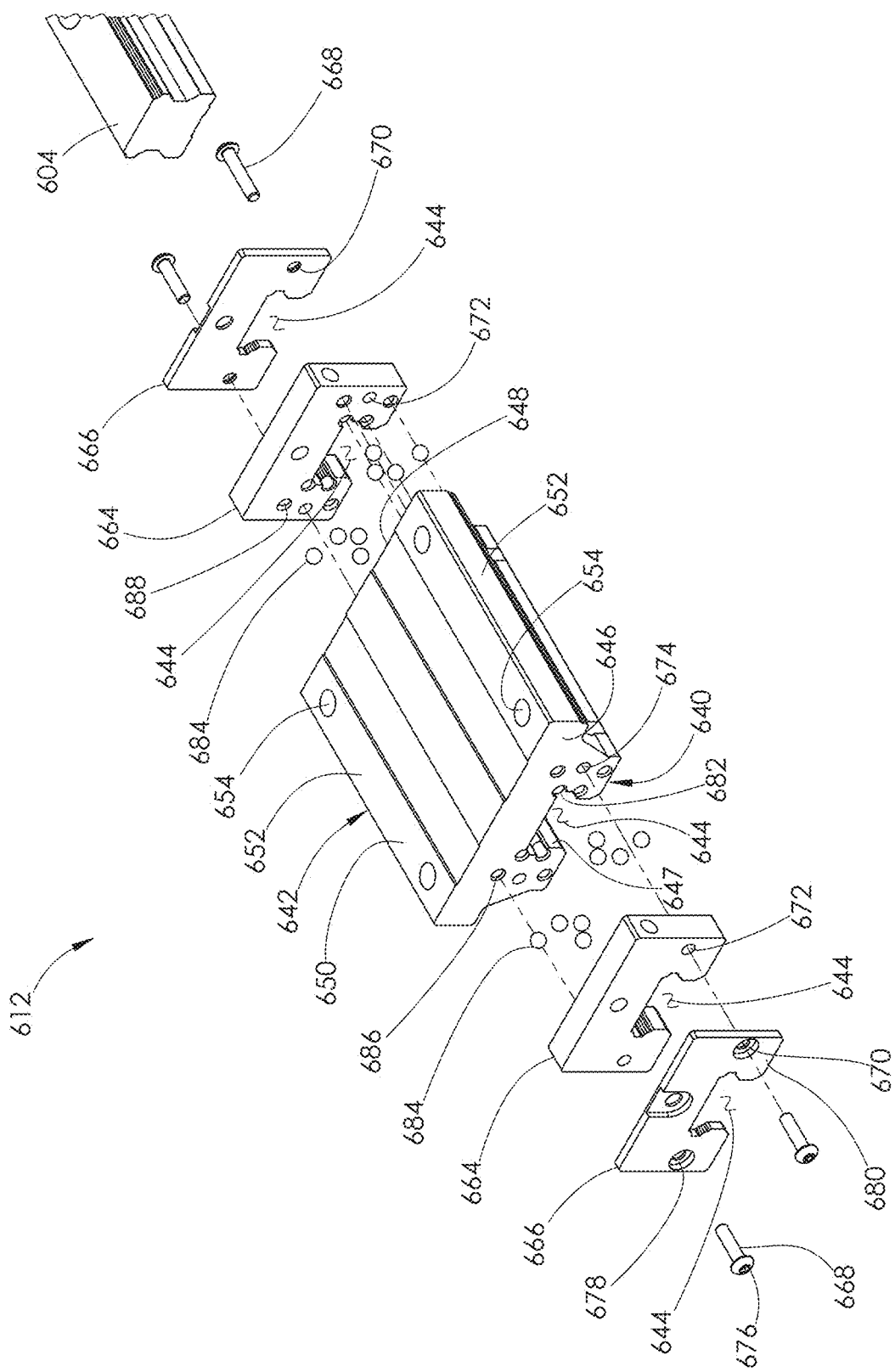
FIG. 95 is a top perspective and exploded view of the carriage shown in FIG. 94.
Figure 96:
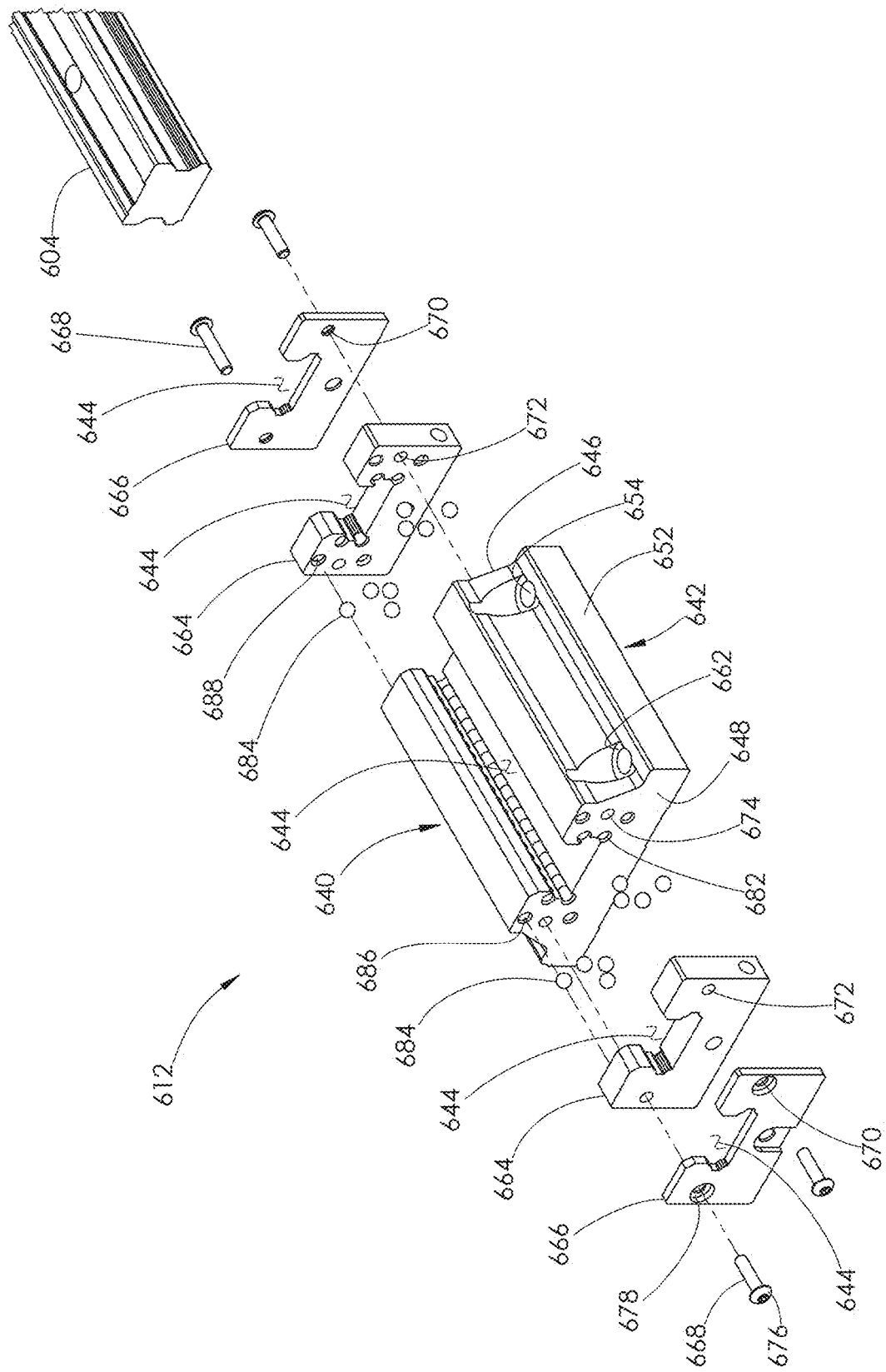
FIG. 96 is a bottom perspective and exploded view of the carriage shown in FIG. 95.
Figure 97:
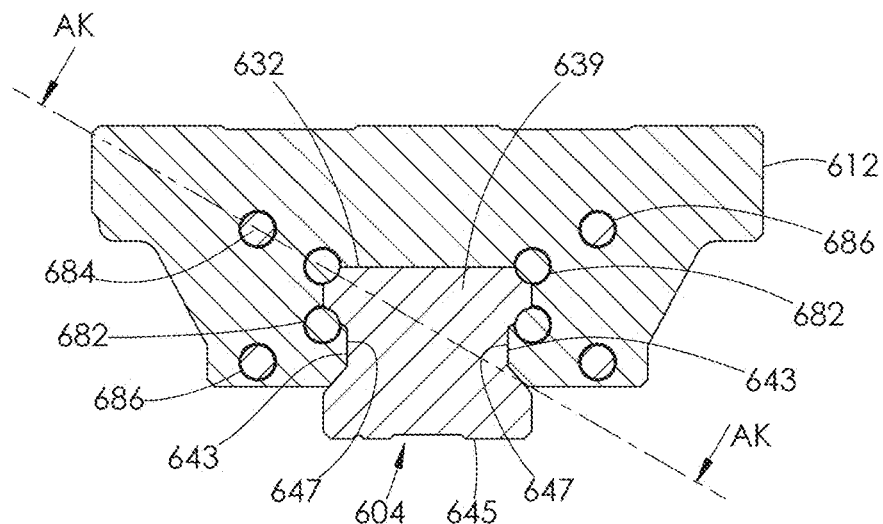
FIG. 97 is a cross-sectional view of the carriage and rail shown in FIG. 94, taken along line AJ-AJ.

Turning to FIGS. 92-97, each carriage 612 comprises a lower portion 640 joined to an upper portion 642, as shown in FIGS. 95 and 96. A rail slot 644 extends between front and rear surfaces 646 and 648 and the carriage 612. The lower portion 640 comprises the rail slot 644, which is configured to receive the top half 639 of the rail 604, as shown in FIGS. 94 and 95. When the rail 604 is installed within the rail slot 644, lower sides 647 of the rail slot 644 engage the side channels 643 of the rail 604, as shown in FIG. 97.

Figure 93:
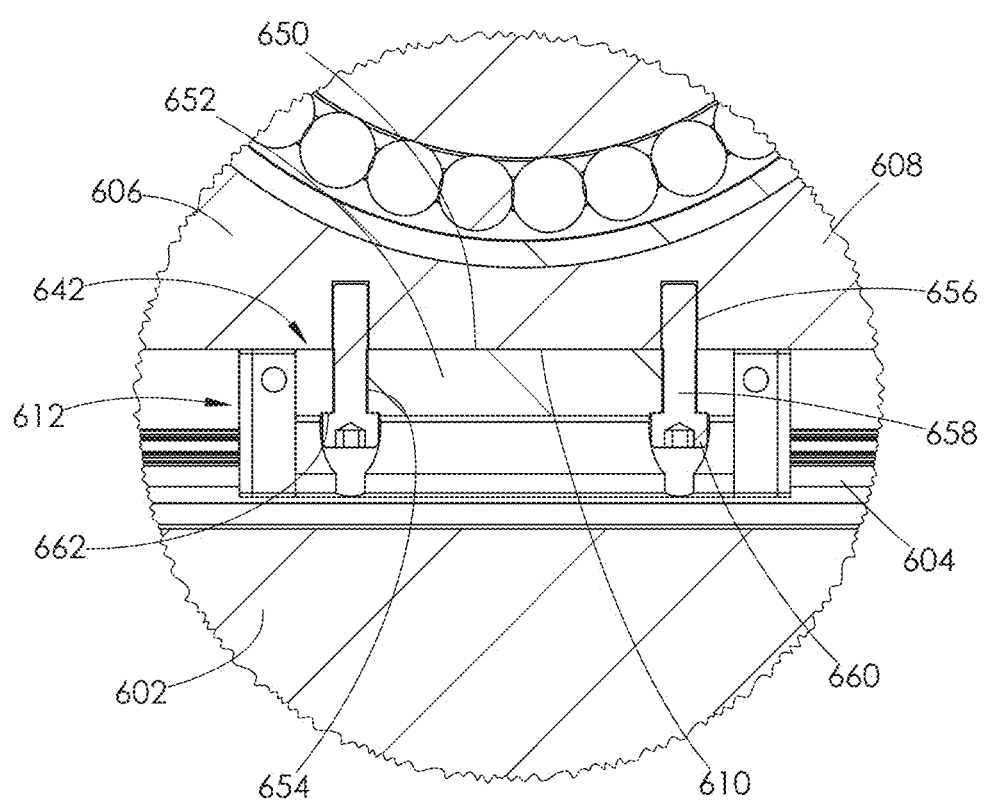
FIG. 93 is an enlarged view of area AI, shown in FIG. 92.

Continuing with FIGS. 92-96, the upper portion 642 comprises a support surface 650 having mounting flanges 652 that extend outside of the footprint of the lower portion 640. A plurality of openings 654 are formed in each mounting flange 652. The openings 654 are configured to align with threaded openings 656 formed in the lower end 610 of the crosshead 606, as shown in FIG. 93. A fastener 658 is installed within each pair of aligned openings 654 and threaded openings 656 to attach the crosshead 606 to each carriage 612. When attached thereto, the lower end 610 of the crosshead 606 is supported on the support surface 650 and the mounting flanges 652 of the upper portion 642. When the fastener 658 is installed within the aligned openings 654 and threaded openings 656, a head 660 of each fastener 658 engages a base 662 of each mounting flange 652, as shown in FIGS. 93 and 94.

Figure 98:
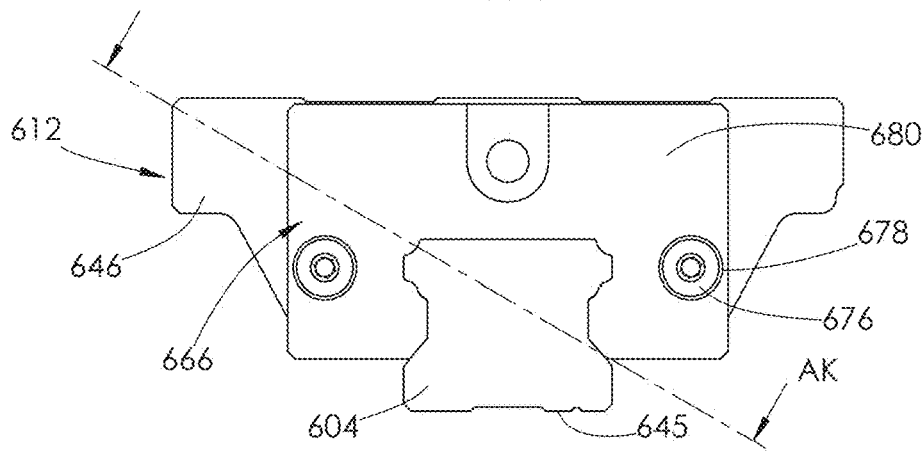
FIG. 98 is a front elevational view of the carriage and rail shown in FIG. 94.

Turning to FIGS. 95 and 96, each carriage 612 further comprises a pair of rail blocks 664 and a pair of end blocks 666 attached to its opposed front and rear surfaces 646 and 648. One rail block 664 is positioned intermediate the front surface 646 of the carriage 612 and one of the end blocks 666, and the other rail block 664 is positioned intermediate the rear surface 648 of the carriage 612 and the other end block 666. Each block 664 and 666 comprises a rail slot 644. The blocks 664 and 666 and the carriage 612 are held together by a plurality of fasteners 668. Each fastener 668 is installed within a first through-bore 670 formed in the end block 666, a second through-bore 672 formed in the rail block 664, and a threaded opening 674 formed in the front or rear surface 646 or 648 of the carriage 612. A head 676 of each fastener 668 is contained within a counterbore 678 that opens on a front surface 680 of each end block 666, as shown in FIG. 98.

Continuing with FIGS. 95-97, the rail slot 644 formed within the lower portion 640 of the carriage 612 comprises a plurality of bearing raceways 682 that extend between front and rear surfaces 646 and 648 of the carriage 612. Four raceways 682 are shown in FIGS. 95-98, two upper raceways 682 and two lower raceways 682. The raceways 682 are configured to receive a plurality of ball bearings 684. At least a portion of each raceway 682 is open and exposed to the rail slot 644, as shown in FIG. 96. When a rail 604 is installed within a corresponding one of the rail slots 644, the ball bearings 684 engage outer side surfaces of the top half 639 of the rail 604, as shown in FIG. 97. Specifically, the ball bearings 684 engage the top half 639 adjacent the upper surface 632 of the rail 604 and adjacent the start of the side channels 643. Engagement of the rail 604 with the ball bearings 684 allows the carriage 612 to easily slide back and forth along the rail 604.

Figure 99:
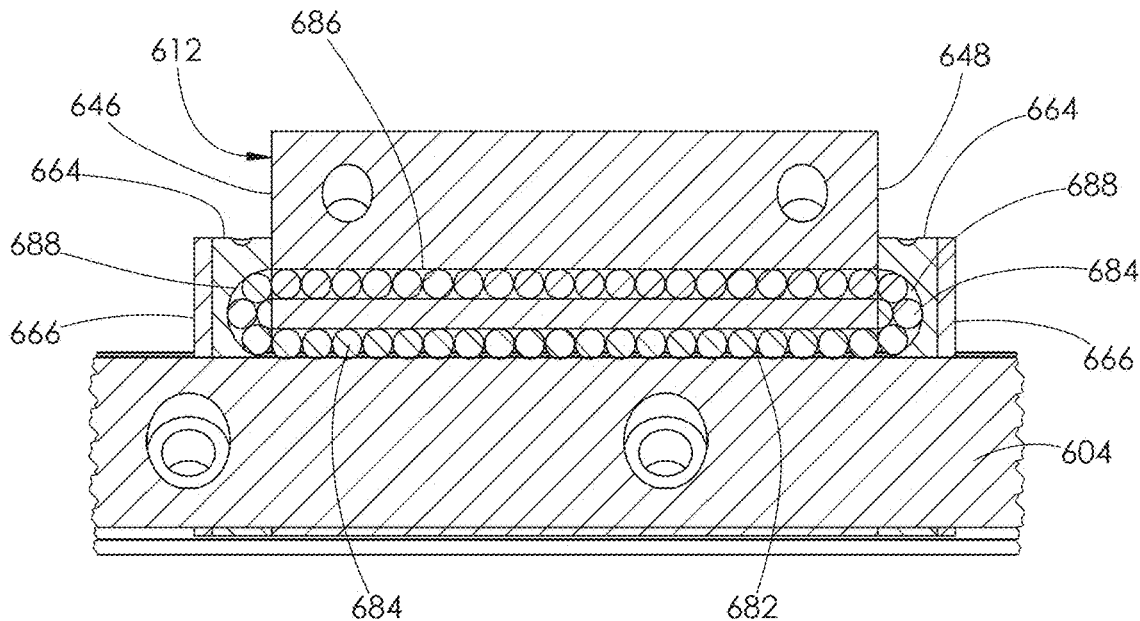
FIG. 99 is a cross-sectional view of the carriage and rail shown in FIGS. 97 and 98, taken along lines AK-AK.

Continuing with FIGS. 95-97 and 99, the carriage 612 further comprises a plurality of return raceways 686 extending between its front and rear surfaces 646 and 648. Each return raceway 686 corresponds with one of the bearing raceways 682. The return raceways 686 are spaced from and positioned slightly above or slightly below each corresponding bearing raceway 682. The return raceways 686 are not exposed to any portion of the rail slot 644. Each return raceway 686 is connected to its corresponding bearing raceway 682 by a linking or reversing raceway 688 formed in each rail block 664, as shown in FIG. 99. In operation, the ball bearings 684 move in a loop, either forwards or backwards, within the interconnected bearing raceway 682, return raceway 686, and reversing raceway 688, as shown in FIG. 99.

A rail 604 and a corresponding carriage 612 may together be referred to as a "linear guide" or a "sliding bearing block". In operation, the rails 604 and corresponding carriages 612 allow longitudinal movement of the linear drive assembly 600 while restricting transverse and vertical movement thereof. The linear drive assembly 400, for example, may experience frictional loss during operation due to the interaction between the wear plates 442 and the walls of the crosshead bore 124. Such frictional loss is greatly reduced by using the rails 604 and carriages 612. Reducing frictional loss helps increase operational efficiency. The rails 604 and carriages 612 also experience wear during operation, instead of the crosshead 606 and the crosshead guide 602. The rails 604 and carriages 612 thus become the wear components and can easily be replaced during operation, if needed.

While two rails 604 and two carriages 612 are shown in FIGS. 86-89, the linear drive assembly 600 and corresponding crosshead guide 602 may also be configured to utilize a single larger rail 604 and corresponding carriage 612. Likewise, the linear drive assembly 600 and corresponding crosshead guide 602 may further be configured to utilize more than two rails 604 and corresponding carriages 612, if desired. In even further alternative embodiments, two carriages 612 may be utilized with a single rail 604. In such embodiment, one carriage 612 would be attached adjacent a front end of the crosshead 606 and a second carriage 612 attached adjacent a rear end of the crosshead 606.

In further alternative embodiments, the rail 604 may be attached to the crosshead 606 and the carriage 612 attached to the crosshead bore 614. Other methods of attaching the various components together known in the art and not specifically described herein, may be used. Various components may also be formed as integral pieces, if desired. For example, the carriage 612 may be internally joined to the lower end 610 of the crosshead 606.

Linear Drive Assembly 700

Turning now to FIGS. 100-108, another embodiment of a linear drive assembly 700 is shown. The linear drive assembly 700 comprises a crosshead assembly 702 joined to a connecting rod assembly 704. As described herein, the linear drive assembly 700 comprises another method of attaching the connecting rod assembly 704 to the crosshead assembly 702.

Figure 102:
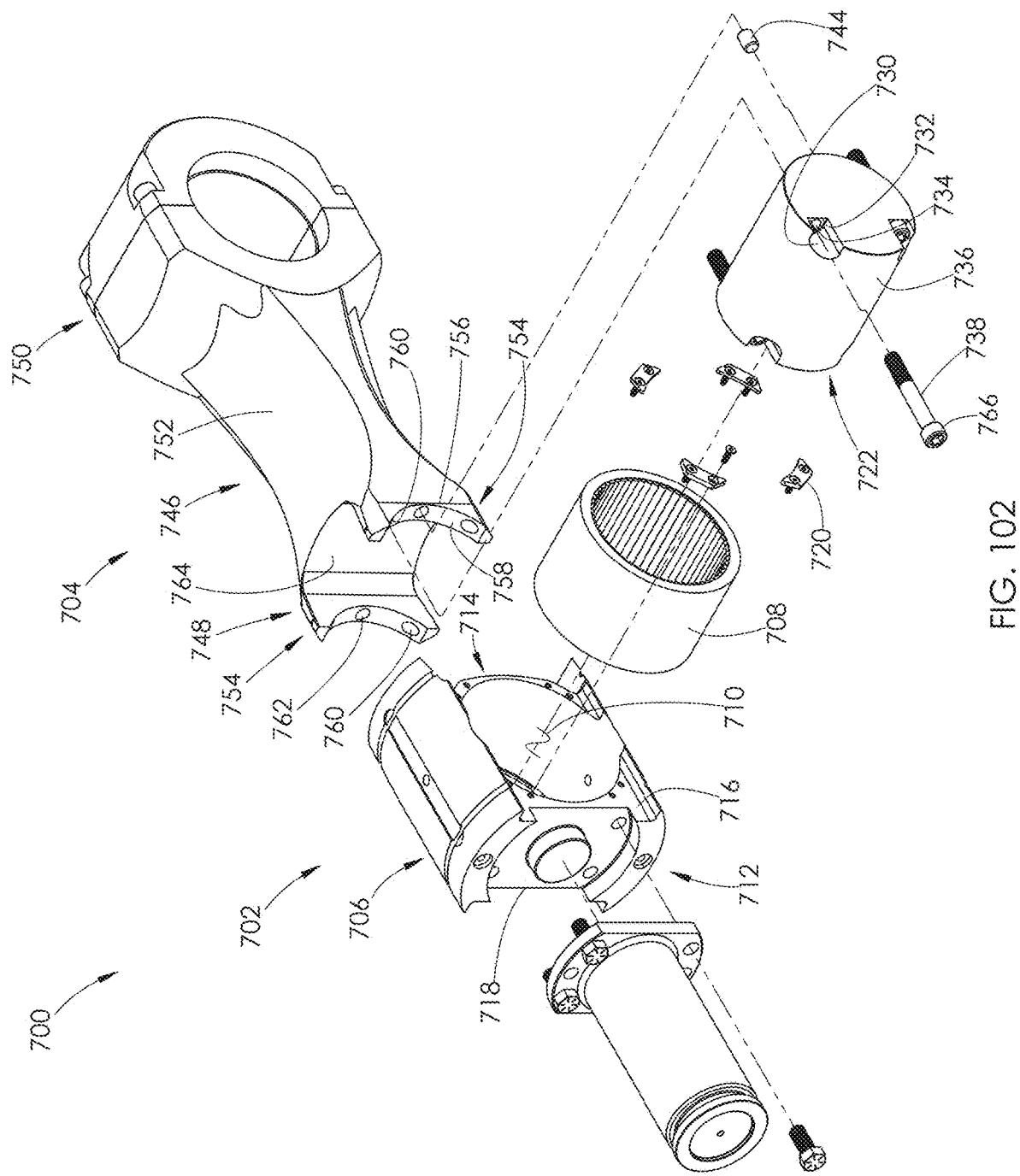
FIG. 102 is a front perspective and exploded view of the linear drive assembly shown in FIG. 100.

Continuing with FIG. 102, the crosshead assembly 702 comprises a crosshead 706 having a bearing 708 installed within a wrist pin bore 710. The crosshead 706 further comprises opposed front and rear ends 712 and 714 and opposed first and second sides 716 and 718. The crosshead 706 and installed bearing 708 are like those used with the crosshead assembly 502, shown in FIGS. 72-75. Like the crosshead 504, the bearing 708 is held within the wrist pin bore 710 by a plurality of small wear pads 720. Also, like the crosshead 504, no wear plates are attached to the crosshead 706. However, wear plates may be attached thereto, if desired.

Continuing with FIGS. 103-105, the crosshead assembly 702 further comprises another embodiment of a wrist pin 722. The wrist pin 722 comprises a cylindrical body 724 having opposed flat first and second sides 726 and 728. Upper and lower cutouts 730 are formed in each side 726 and 728 of the body 724. The lower cutout 730 is spaced from and positioned directly below each upper cutout 730. Each cutout 730 extends into a portion of the body 724 and exposes a flat medial surface 732.

Figure 107:
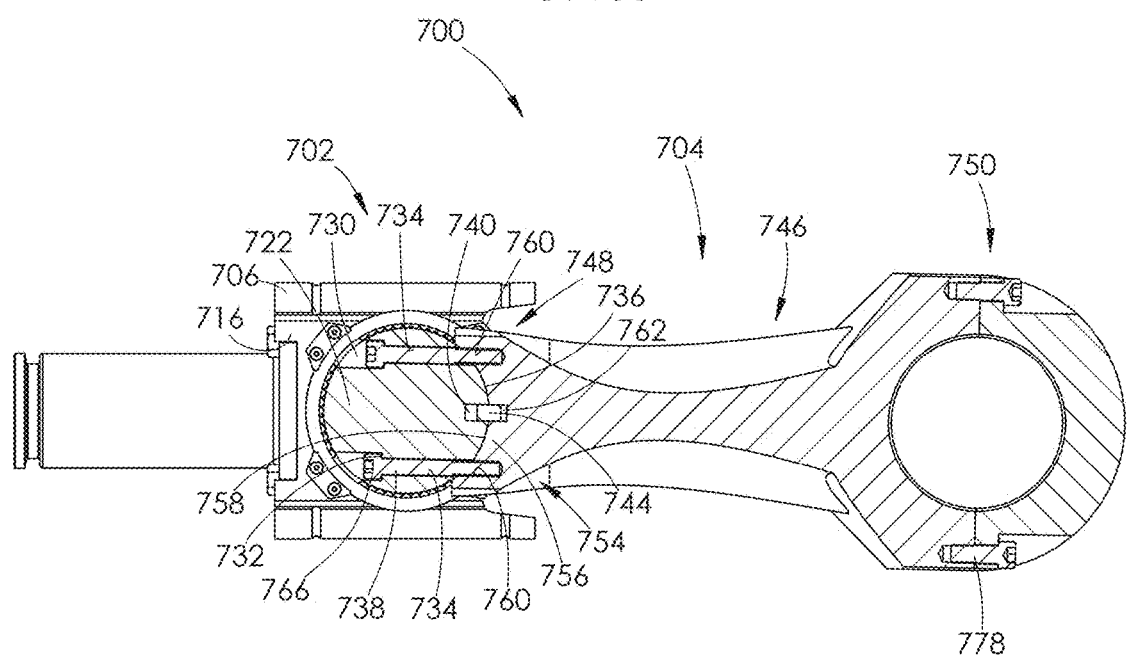
FIG. 107 is a cross-sectional view of the linear drive assembly shown in FIG. 100, taken along line AN-AN.

Continuing with FIGS. 103-105, the wrist pin 722 further comprises a plurality of upper and lower through-bores 734 formed within the body 724 that open into a corresponding one of the cutouts 730. Each through-bore 734 extends through a chord of the body 724 and interconnects the medial surface 732 and an outer surface 736 of the body 724. As will be described herein, each through-bore 734 is configured to receive a wrist pin fastener 738, as shown in FIGS. 102 and 107. The wrist pin 722 further comprises a plurality of first dowel openings 740 formed within the body 724, as shown in FIG. 105. Each first dowel opening 740 is positioned intermediate an opening 742 of each upper and lower through-bore 734 on the outer surface 736 of the body 724. The first dowel openings 740 are configured to receive a locating dowel 744, as shown in FIGS. 102 and 107.

Continuing with FIG. 102, the connecting rod assembly 704 comprises a connecting rod 746 having a crosshead connection end 748 joined to a crankshaft connection end 750 by an elongate arm 752. The crosshead connection end 748 comprises a pair of linking elements 754. Each linking element 754 comprises an arm 756 having a front face 758. The arms 756 are spaced apart by a recessed intermediate surface 764. Each front face 758 is shaped to conform to the outer surface 736 of the wrist pin 722, and each front face 758 has an upper and lower threaded opening 760 formed therein. A second dowel opening 762 is also formed in each front face 758 and positioned intermediate the upper and lower threaded openings 760.

With reference to FIG. 107, the upper and lower threaded openings 760 on each front face 758 are configured to align with the upper and lower through-bores 734 formed in the wrist pin 722. Likewise, the second dowel openings 762 formed in the arms 756 are configured to align with the first dowel openings 740 formed in the wrist pin 722.

Turning back to FIGS. 100 and 101, when the wrist pin 722 is installed within the bearing 708, the opposed sides 726 and 728 of the wrist pin 722 extend out of the crosshead 706 such that the upper and lower cutouts 730 and openings 742 of each upper and lower through-bores 734 are exposed, as shown in FIGS. 100 and 101. The crosshead connection end 748 is brought together with the crosshead 706 such that the linking elements 754 are positioned on opposite sides 716 and 718 of the crosshead 706 and the front faces 758 of each arm 756 are engaging the outer surface 736 of the wrist pin 722, as shown in FIG. 107.

Continuing with FIGS. 102 and 107, the wrist pin 722 is properly aligned on the arms 756 by installing a locating dowel pin 744 within each pair of aligned first and second dowel openings 740 and 762, as shown in FIG. 107. Once aligned, a wrist pin fastener 738 is installed within each pair of aligned through-bores 734 and threaded openings 760. The fasteners 738 are turned until the wrist pin 722 is rigidly secured to the crosshead connection end 748 of the connecting rod 746. When secured thereto, a head 766 of each wrist pin fastener 738 abuts the medial surface 732 of the wrist pin 722 and is positioned within a corresponding one of the cutouts 730. The cutouts 730 allow the head 766 to be completely recessed within the outer surface 736 of the wrist pin 722. During operation, such positioning keeps the heads 766 from contacting the crosshead 706.

Figure 100:
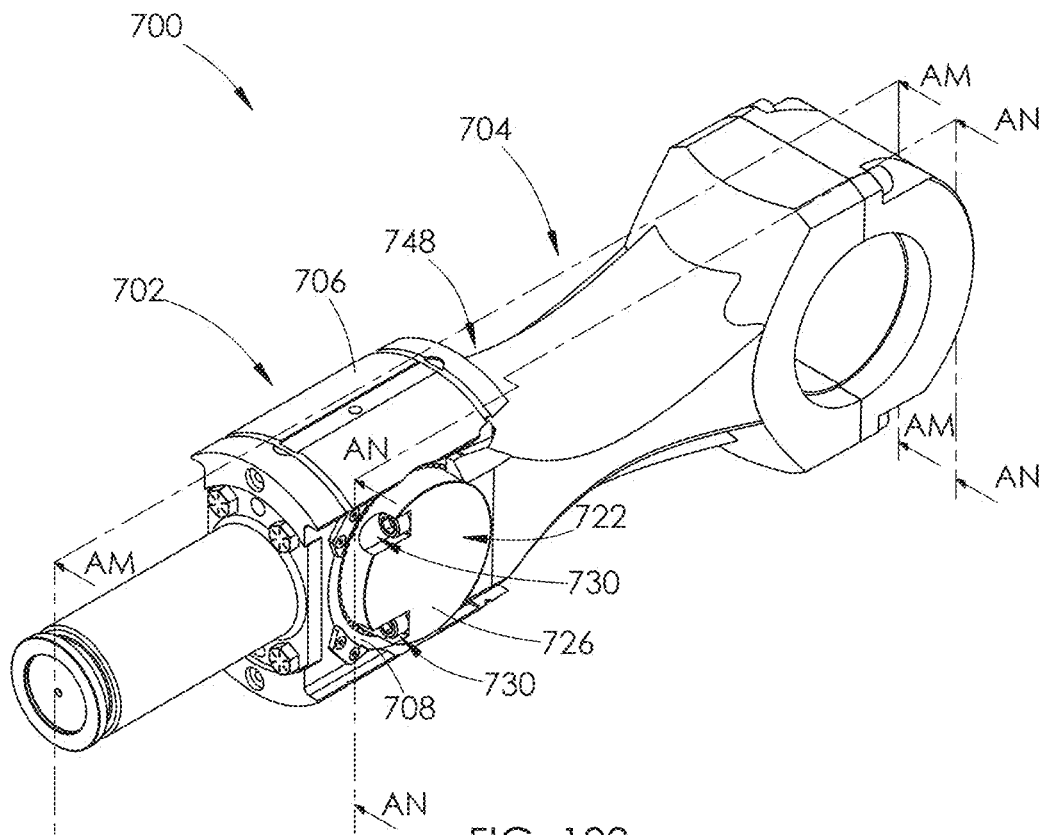
FIG. 100 is a front perspective view of another embodiment of a linear drive assembly disclosed herein.
Figure 101:
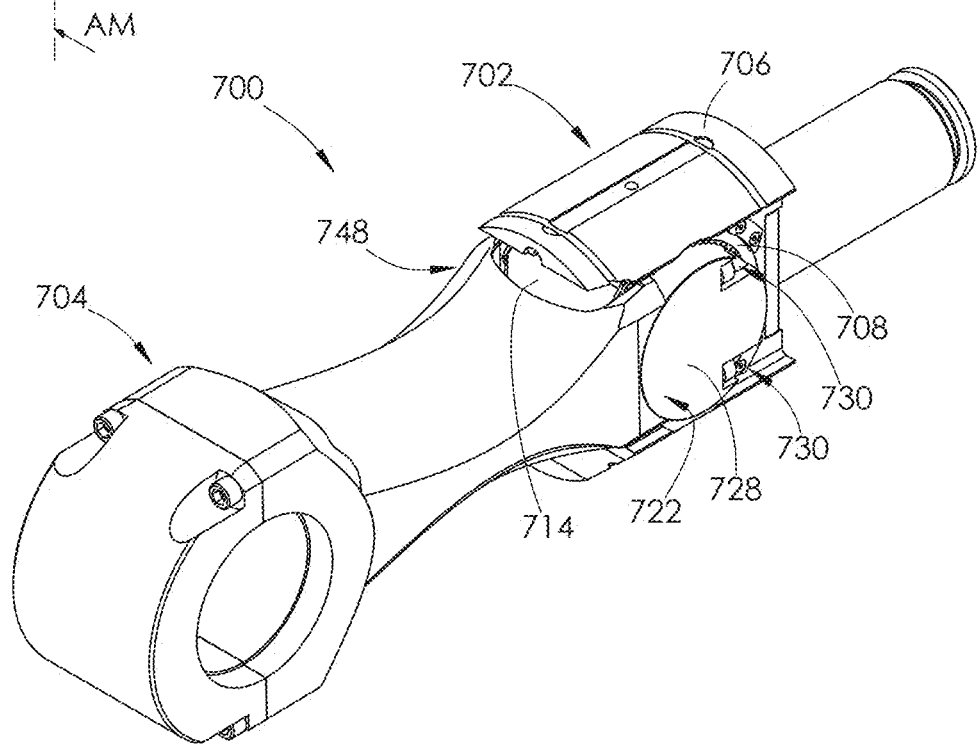
FIG. 101 is a rear perspective view of the linear drive assembly shown in FIG. 100.
Figure 106:
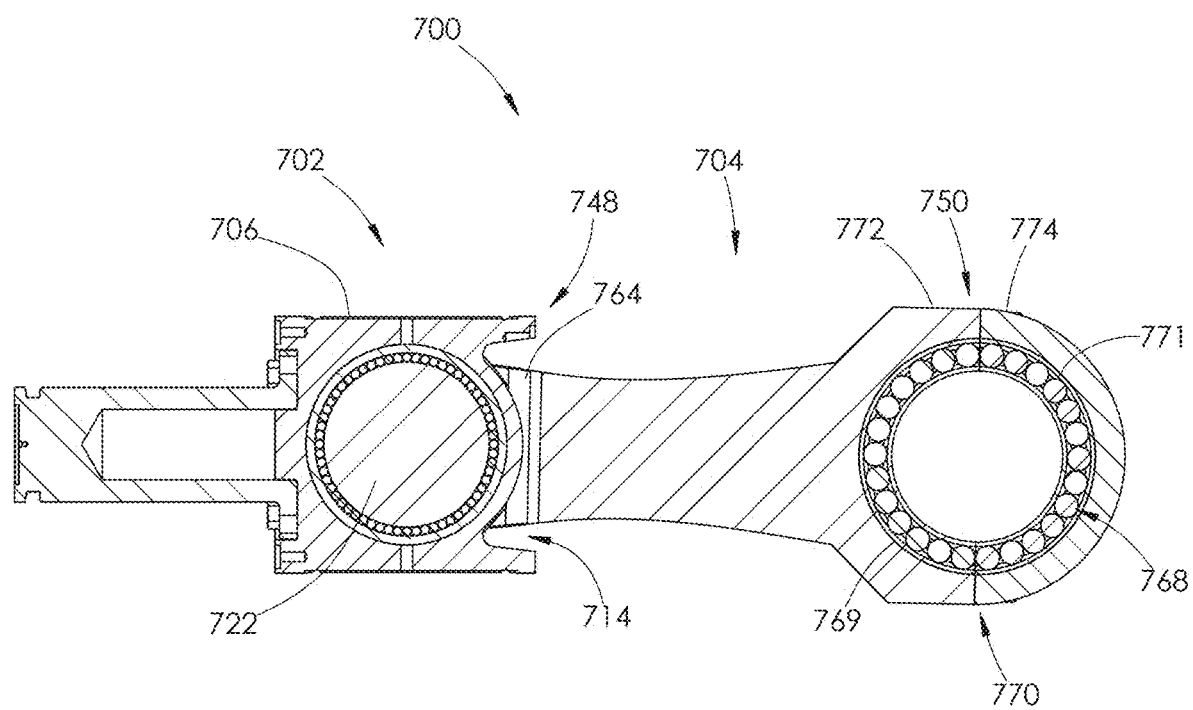
FIG. 106 is a cross-sectional view of the linear drive assembly shown in FIG. 100, taken along line AM-AM.

Continuing with FIGS. 100, 101, and 106, when the crosshead assembly 702 is attached to the connecting rod assembly 704, the intermediate surface 764 of the crosshead connection end 748 is spaced from and faces the rear end 714 of the crosshead 706. No portion of the crosshead connection end 748 extends into an interior of the crosshead 706. In operation, the crosshead connection end 748 and the wrist pin 722 rotate together relative to the crosshead 706. Like the linear drive assembly 200, the linear drive assembly 700 does not utilize a thrust seat engaged within any portion of the connecting rod assembly 704. Thus, the linear drive assembly 700 does not experience the wear found in traditional linear drive assemblies, like the linear drive assembly 40, shown in FIGS. 5-7.

Figure 108:
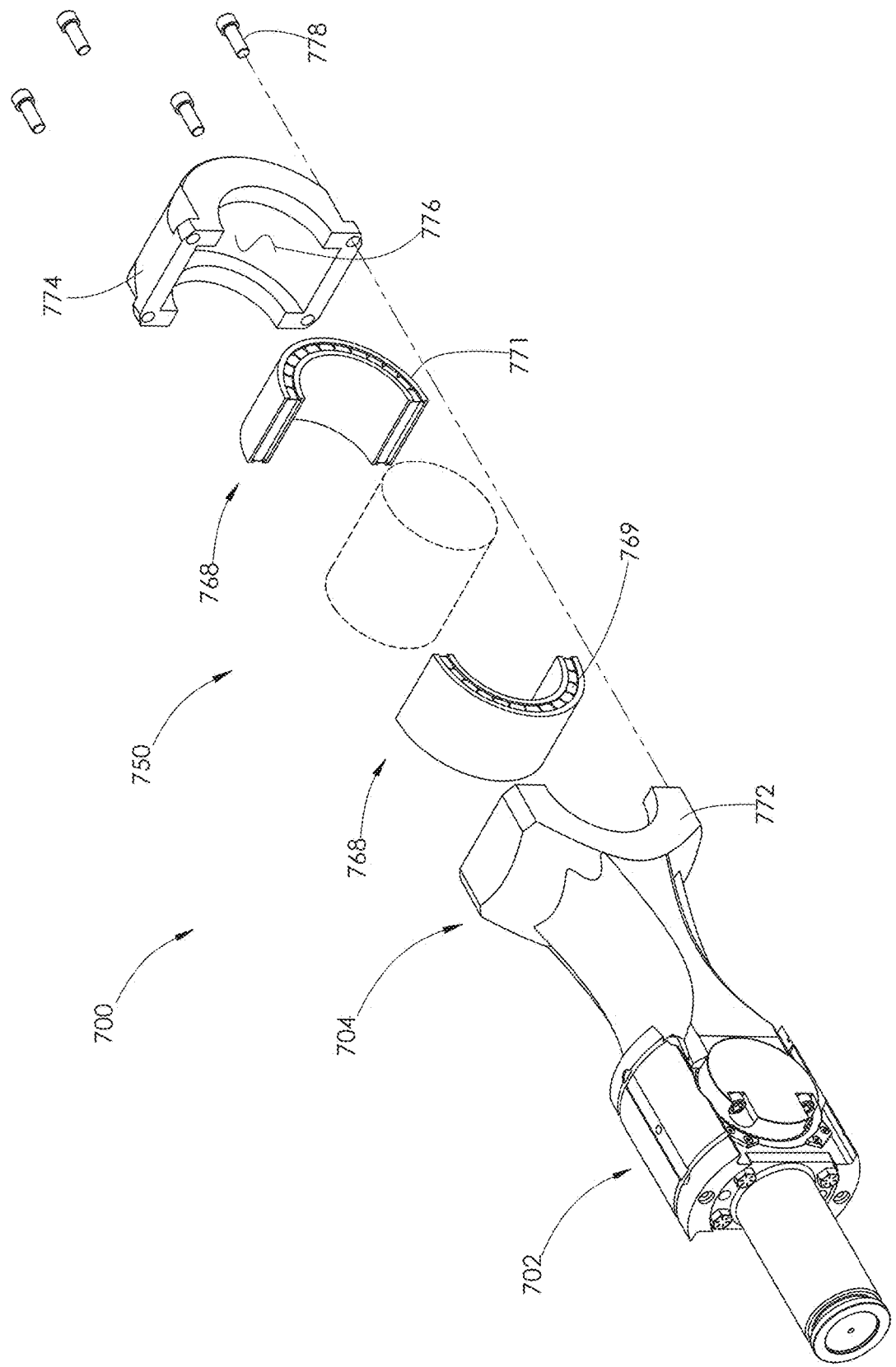
FIG. 108 is a front perspective view of the linear drive assembly shown in FIG. 100, but the crankshaft connection end of the crosshead assembly is shown in exploded form.
Figure 109:
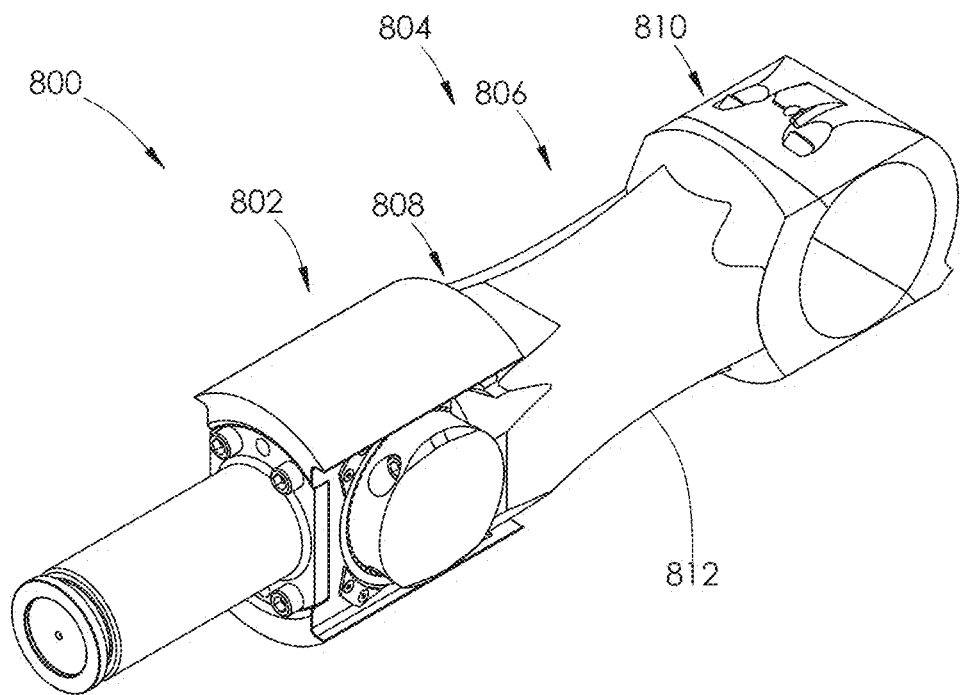
FIG. 109 is a front perspective view of another embodiment of a linear drive assembly disclosed herein.
Figure 110:
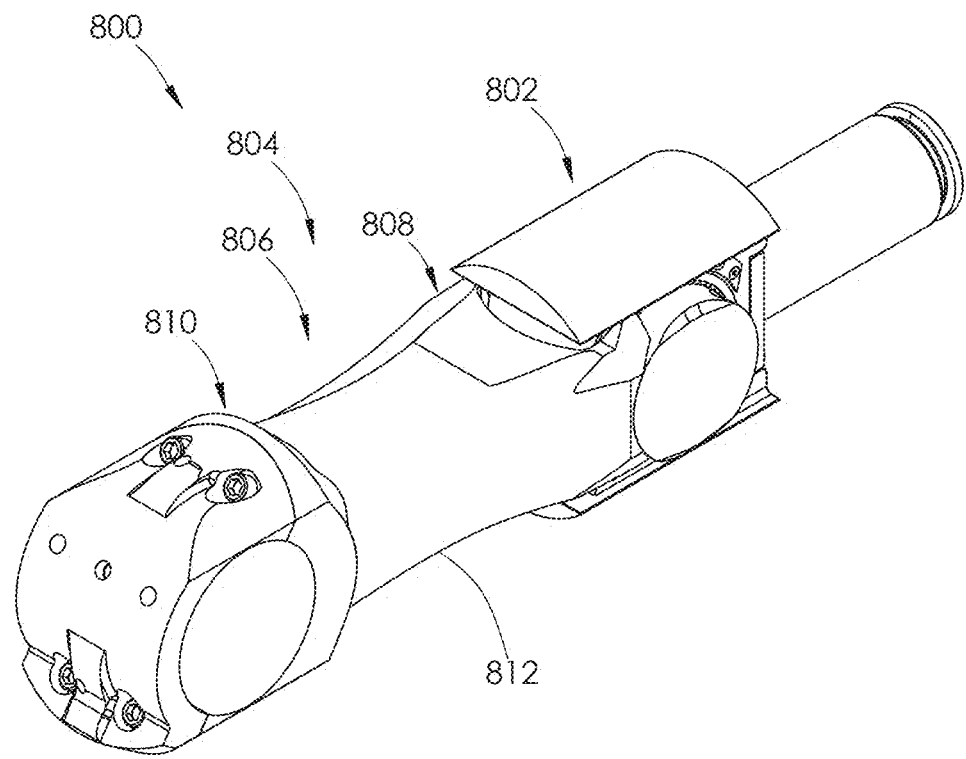
FIG. 110 is a rear perspective view of the linear drive assembly shown in FIG. 109.

Turning to FIGS. 106 and 108, the crankshaft connection end 750 of the connecting rod assembly 704 is like the crankshaft connection end 210 shown in FIGS. 51 and 52, but the crankshaft connection end 750 is configured to receive another embodiment of a split ring bearing 768. The split ring bearing 375, shown in FIGS. 51 and 52 is a plain bearing or bushing. The split ring bearing 768 is a roller bearing and is thus thicker than the bearing 375.

Like the crankshaft connection end 210, the crankshaft connection end 750 comprises a clamp 770 comprising an integral first half 772 and a removable second half 774. Likewise, the split ring bearing 768 comprises a first half 769 abutting a second half 771. To accommodate the thicker bearing 768, a cutout 776 is formed within each half 772 and 774 to receive a corresponding one of the halves 769 and 771 of the split ring bearing 768. Like the crankshaft connection end 210, the halves 772 and 774 of the clamp 770 are secured using a plurality of fasteners 778, as shown in FIG. 107. While not shown herein, one or more locating dowel pins may be used to align the second half 774 of the clamp 770 with the first half 772. Likewise, one or more locating dowels may be used to retain the split ring bearing 768 in position within the clamp 770.

Linear Drive Assembly 800

Turning now to FIGS. 109-119, another embodiment of a linear drive assembly 800 is shown. The linear drive assembly 800 comprises another embodiment of a crosshead assembly 802 attached to another embodiment of a connecting rod assembly 804. The connecting rod assembly 804 comprises a connecting rod 806 comprising a crosshead connection end 808 joined to a crankshaft connection end 810 by an elongate arm 812. The crosshead connection end 808 is identical to the crosshead connection end 748 shown in FIG. 102. As will be described herein, the crankshaft connection end 810 is a different embodiment from the crankshaft connection end 750 shown in FIGS. 107 and 108.

Figure 111:
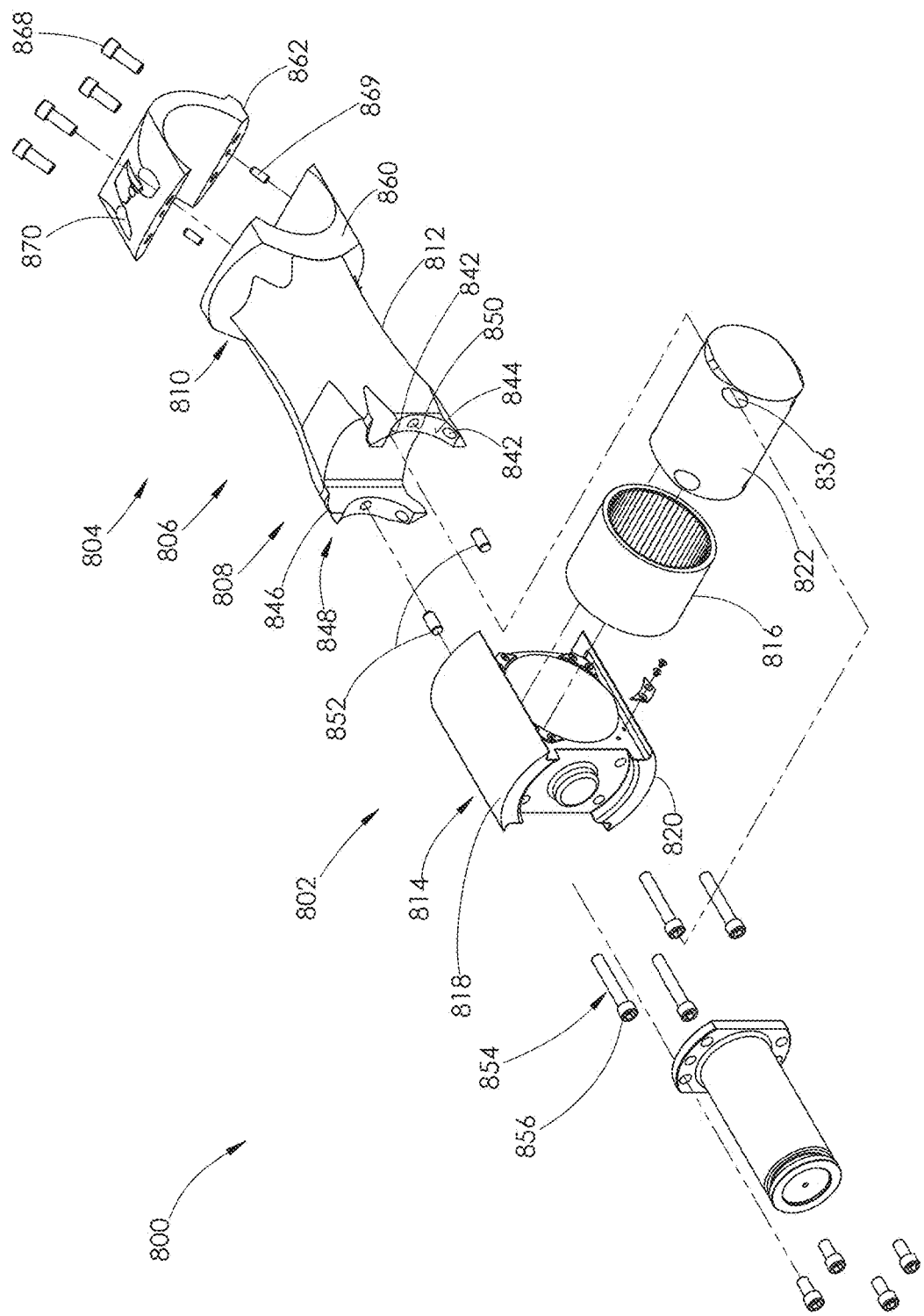
FIG. 111 is a front perspective and exploded view of the linear drive assembly shown in FIG. 109.
Figures 112, 113:
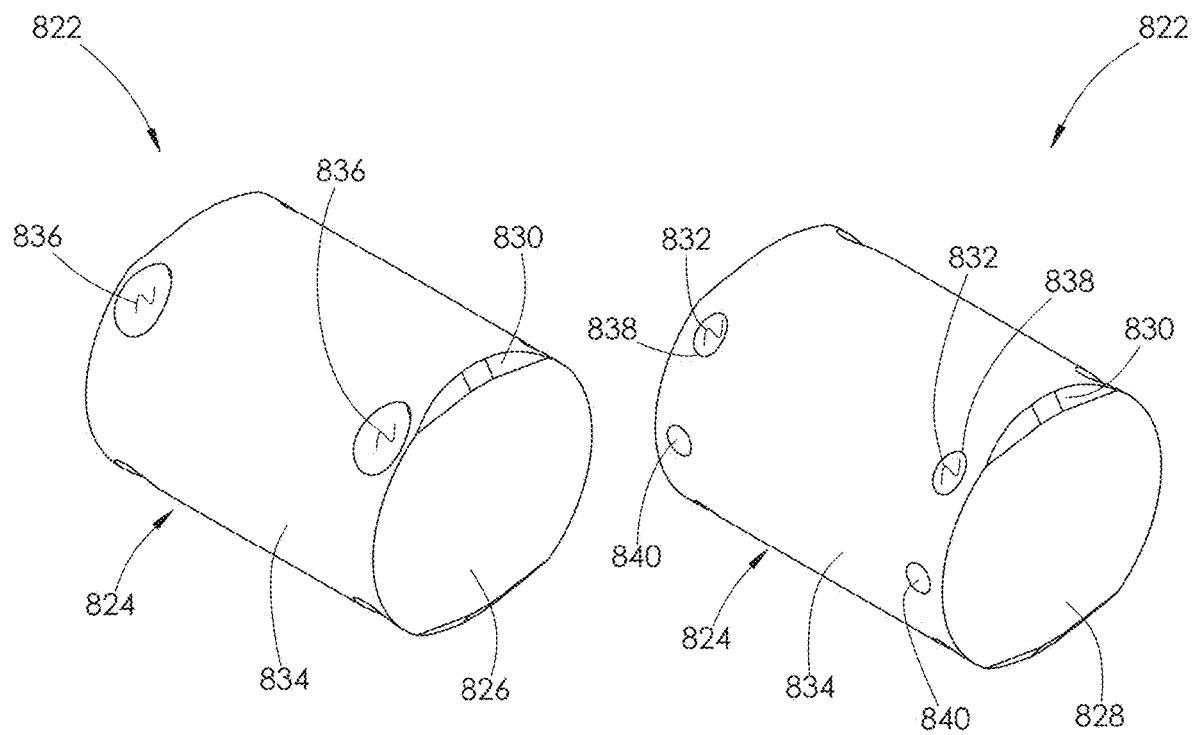
FIG. 112 is a front perspective view of the wrist pin used with the linear drive assembly shown in FIG. 109.
FIG. 113 is a rear perspective view of the wrist pin shown in FIG. 112.
Figures 114, 115:
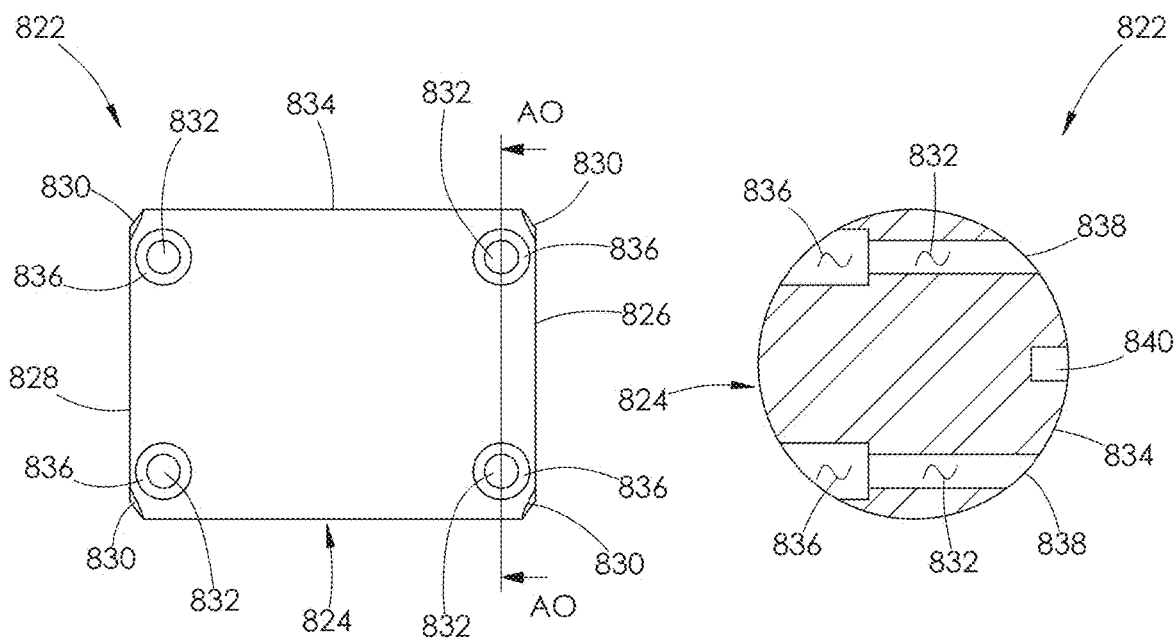
FIG. 114 is a front elevational view of the wrist pin shown in FIG. 112.
FIG. 115 is a cross-sectional view of the wrist pin shown in FIG. 114, taken along line AO-AO.
Figure 116:
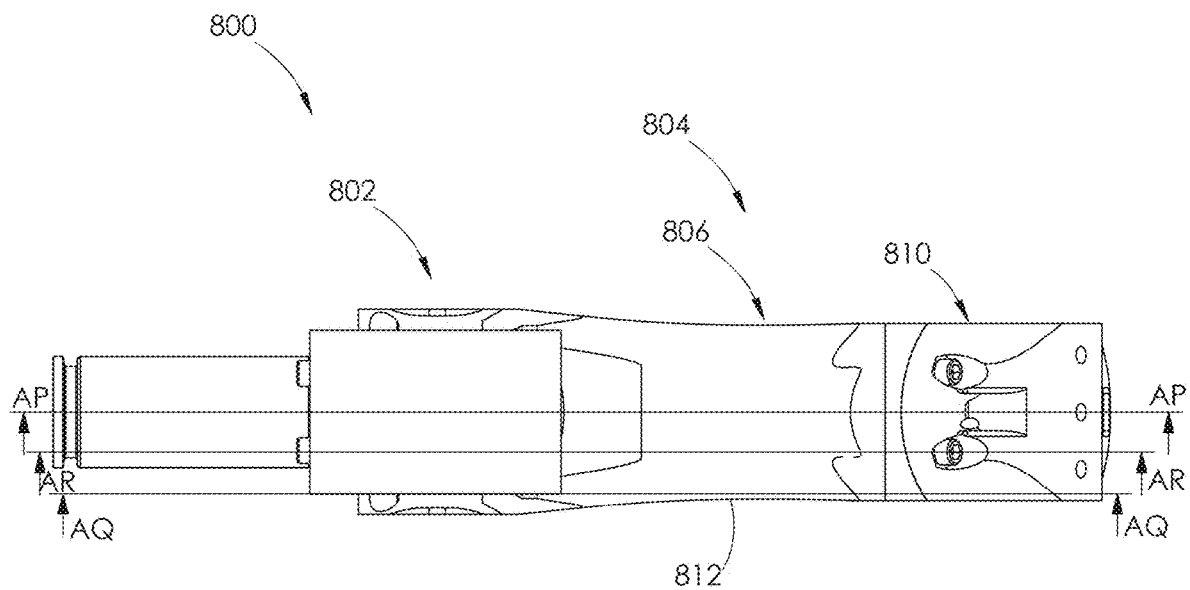
FIG. 116 is a top plan view of the linear drive assembly shown in FIG. 109.

Continuing with FIG. 111, the crosshead assembly 802 comprises a crosshead 814 having a bearing 816 installed therein. The crosshead 814 is identical to the crosshead 504 shown in FIGS. 74 and 75 and the crosshead 706 shown in FIG. 102, but the crosshead 814 does not have any lubricant channels or grooves formed in its upper and lower ends 818 and 820. In alternative embodiments, lubricant grooves and channels may be formed in the crosshead 814 or wear plates may be attached to the crosshead 814. While not shown, the crosshead 814 preferably has a lubricant hole formed in its upper and lower ends 818 and 820 for delivering lubricant to the interior of the crosshead 814.

Continuing with FIGS. 112-115, the crosshead assembly 802 further comprises another embodiment of a wrist pin 822. The wrist pin 822 is configured to attach to the crosshead connection end 808 in the same manner as the wrist pin 722 shown in FIG. 102. However, the wrist pin 822 comprises different features from the wrist pin 722. The wrist pin 822 comprises a cylindrical body 824 having opposed first and second sides 826 and 828 and an outer cylindrical surface 834. Upper and lower portions of the first and second sides 826 and 828 are joined to the outer surface 834 by a chamfer 830. The chamfer 830 provides clearance for the wrist pin 822 when installed in a crosshead guide, not shown. Such clearance allows the length of the wrist pin 822 to be maximized for the maximum width of the bearing 816, thus reducing the load per unit area of the bearing 816 and the wrist pin 822.

Continuing with FIGS. 112-115, like the wrist pin 722, a plurality of upper and lower through-bores 832 are formed in the wrist pin 822 that extend through a chord of the wrist pin 822 and open on an outer surface 834 of the wrist pin 822. However, instead of interconnecting a cutout and the outer surface 834, each through-bore 832 opens into a counterbore 836. The counterbore 836 opens on the outer surface 834 of the wrist pin 822 opposite an opening 838 of the corresponding through-bore 832. In contrast to the wrist pin 722, no portion of the counterbore 836 opens on a first or second side 826 or 828 of the wrist pin 822. The wrist pin 822 further comprises a plurality of first dowel openings 840 positioned intermediate the upper and lower openings 838 of the through-bores 832.

Figure 118:
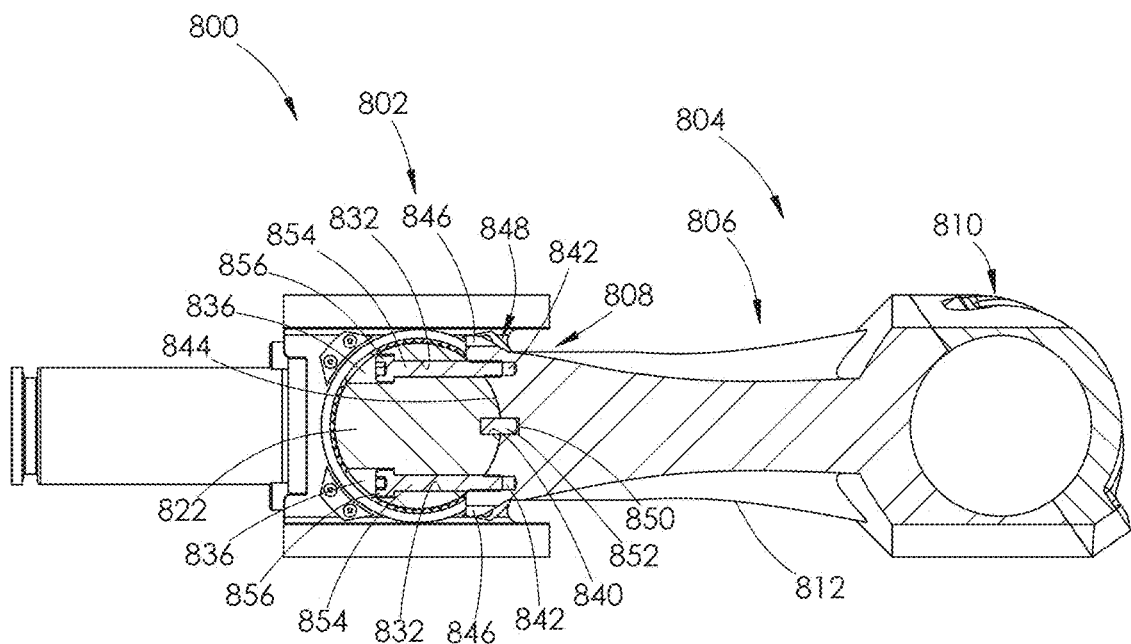
FIG. 118 is a cross-sectional view of the linear drive assembly shown in FIG. 116, taken along line AQ-AQ.

Turning to FIGS. 111 and 118, like the wrist pin 722, the through-bores 832 align with upper and lower threaded openings 842 formed in a front face 844 of each arm 846 of each linking element 848 of the crosshead connection end 808. The first dowel opening 840 likewise aligns with a second dowel opening 850 formed in each front face 844, as shown in FIG. 118. A locating dowel 852 is installed within the aligned dowel openings 840 and 850 to properly align the wrist pin 822 on the arms 846. A wrist pin fastener 854 is installed within each pair of aligned through-bores 832 and threaded openings 842 to attach the wrist pin 822 to the crosshead connection end 808, as shown in FIG. 118. When attached thereto, a head 856 of each fastener 854 is completely recessed within a corresponding one of the counterbores 836, as shown in FIG. 118.

Figure 117:
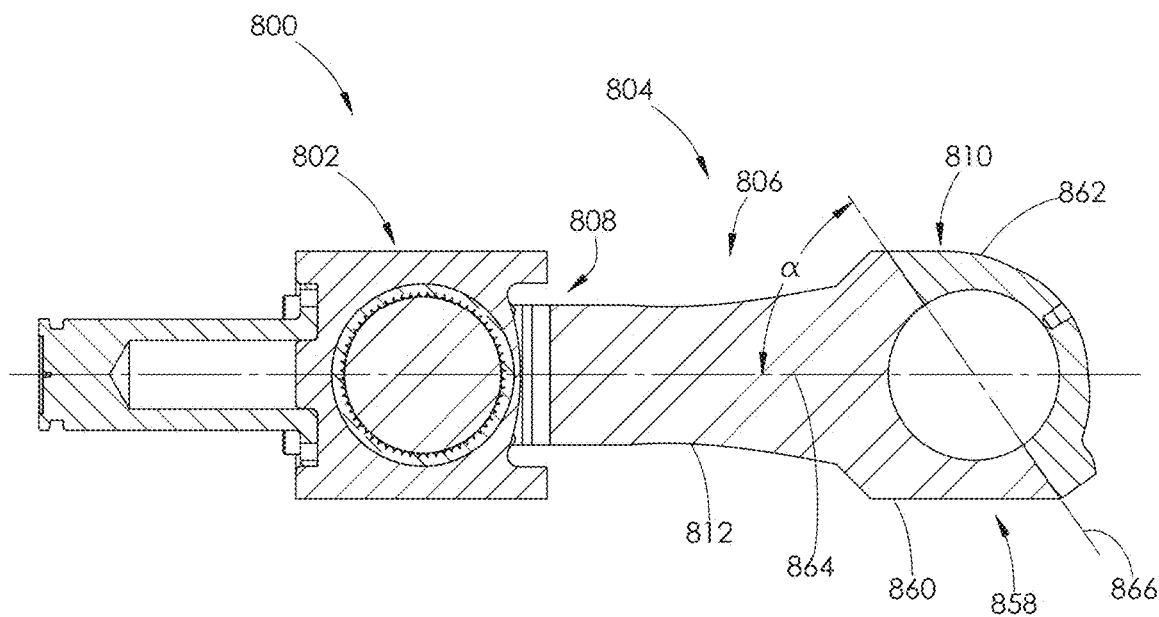
FIG. 117 is a cross-sectional view of the linear drive assembly shown in FIG. 116, taken along line AP-AP.

Turning to FIG. 117, the crankshaft connection end 810 comprises a clamp 858 comprising an integral first half 860 and a removable second half 862. In contrast to the clamp 770 shown in FIGS. 106 and 107, the first and second halves 860 and 862, are not joined at an axis that is perpendicular to a longitudinal axis 864 of the connecting rod 806. Instead, the first and second halves 860 and 862 are joined along an axis 866 that extends at an acute angle α relative to the longitudinal axis 864 of the connecting rod 806. The angle may be between 50 and 60 degrees. Joining the halves 860 and 862 at an angle provides for easier access and maintenance to the crankshaft connection end 810 during operation.

Figure 119:
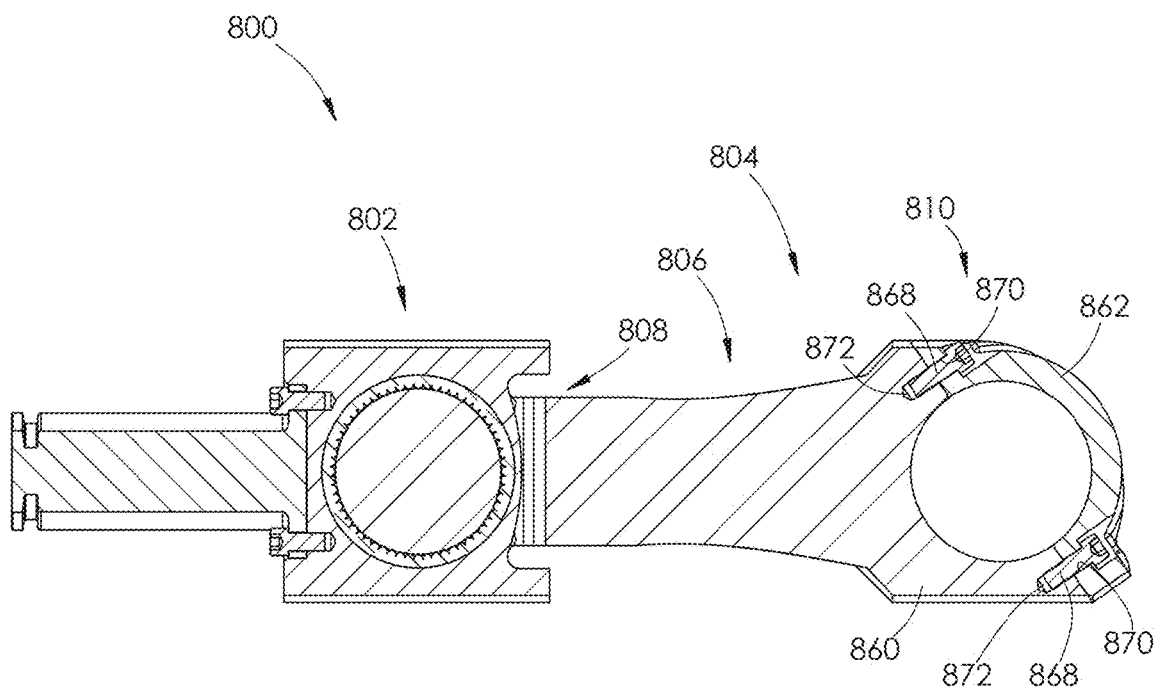
FIG. 119 is a cross-sectional view of the linear drive assembly shown in FIG. 116, taken along line AR-AR.

Continuing with FIGS. 111 and 119, like the crankshaft connection end 750, the halves 860 and 862 are joined together using a plurality of fasteners 868. Each fastener 868 is installed within an opening 870 formed in the second half 862 that aligns with a threaded opening 872 formed in the first half 860, as shown in FIG. 119. The halves 860 and 862 may be aligned with one another using locating dowels 869. While not shown, the clamp 858 may be configured to receive the split ring bearing 768, shown in FIG. 108, or the split ring bearing 375, shown in FIGS. 51 and 52.

Linear Drive Assembly 900

Figure 124:
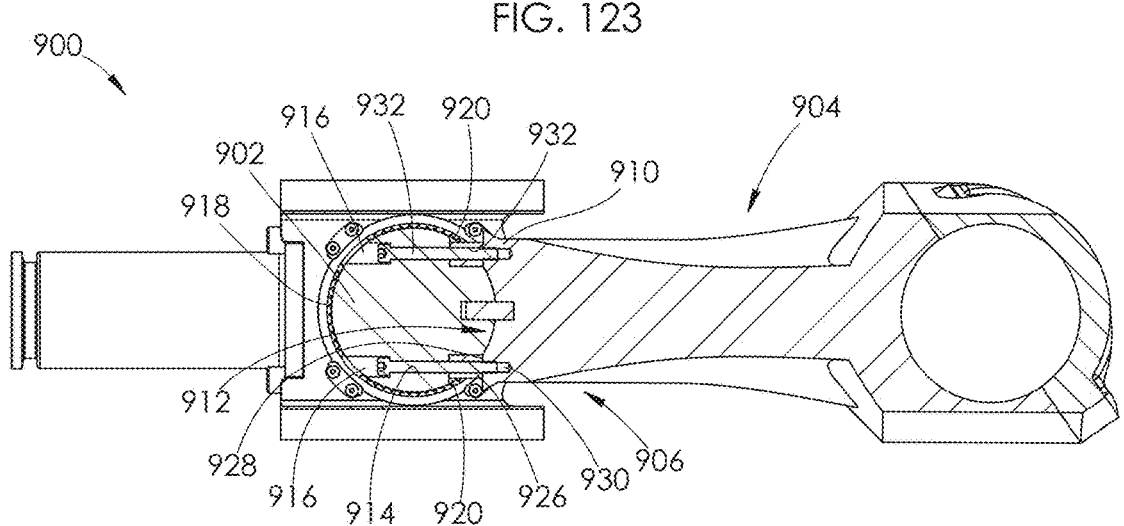
Figure 125:
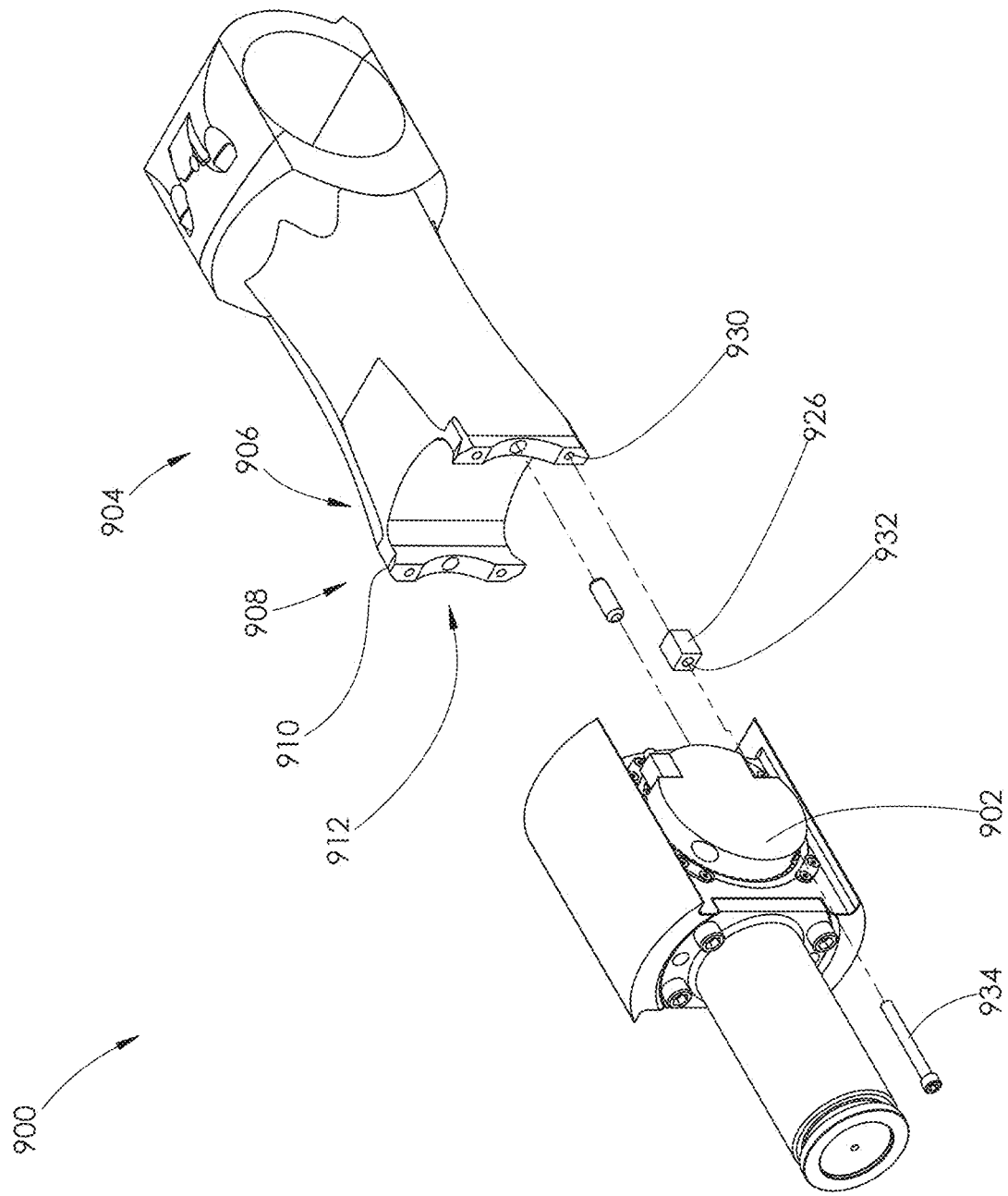
Figure 126:
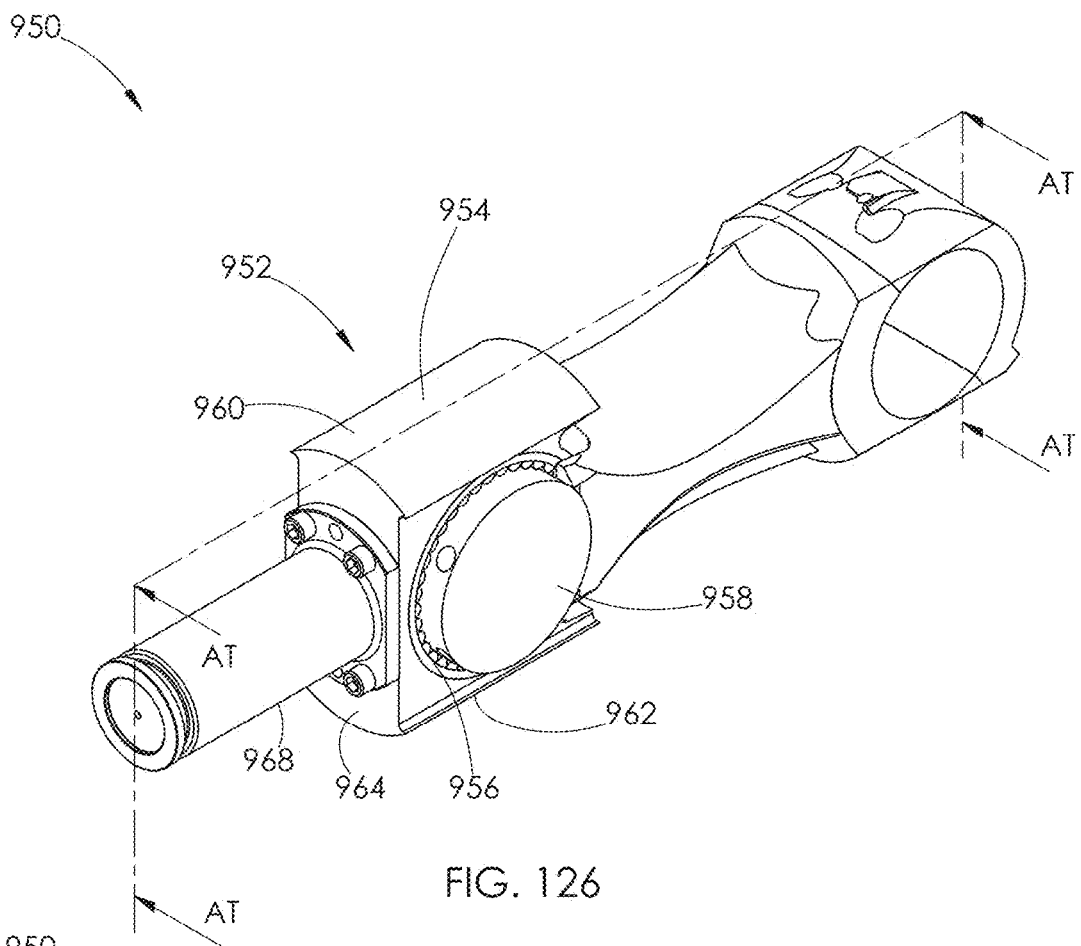
Figure 127:
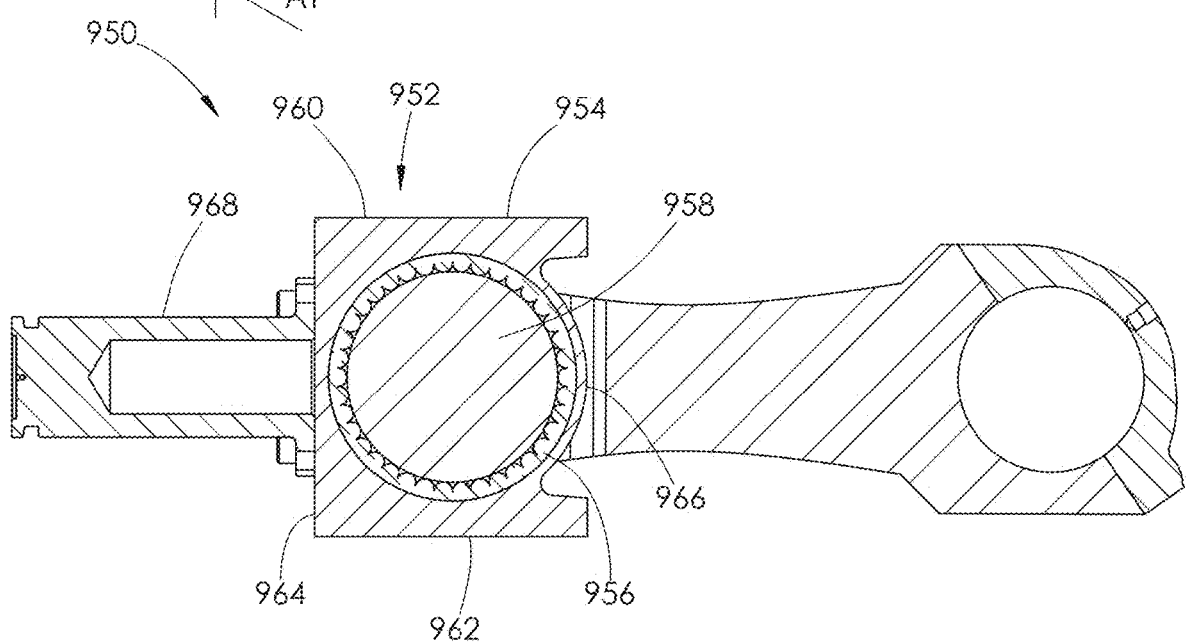
Figure 128:
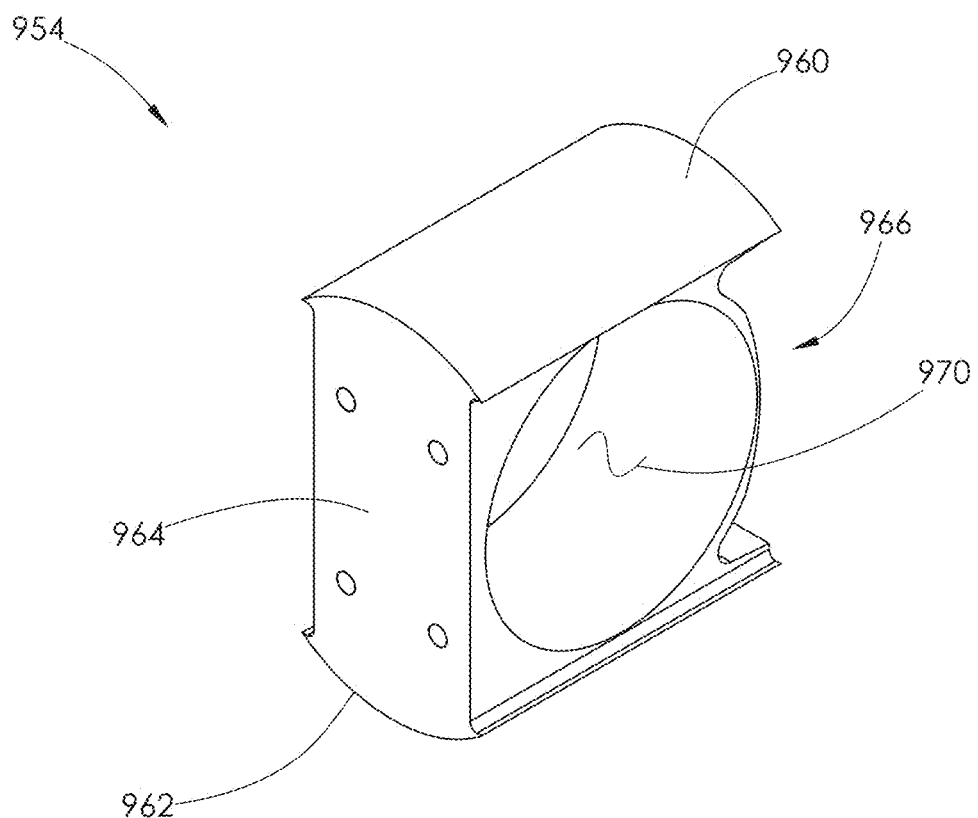

Turning to FIGS. 120-125, another embodiment of a linear drive assembly 900 is shown. The linear drive assembly 900 is identical to the linear drive assembly 800, but the linear drive assembly 900 comprises another embodiment of a wrist pin 902 and another embodiment of a connecting rod assembly 904. The connecting rod assembly 904 is identical to the connecting rod assembly 804 shown in FIG. 111, but the connecting rod assembly 904 comprises another embodiment of a crosshead connection end 906. As will be described herein, the crosshead connection end 906 is identical to the crosshead connection end 808 shown in FIG. 111, but the crosshead connection end 906 comprises linking elements 908 comprising arms 910 that have a differently shaped front face 912, as shown in FIG. 125.

Figure 120:
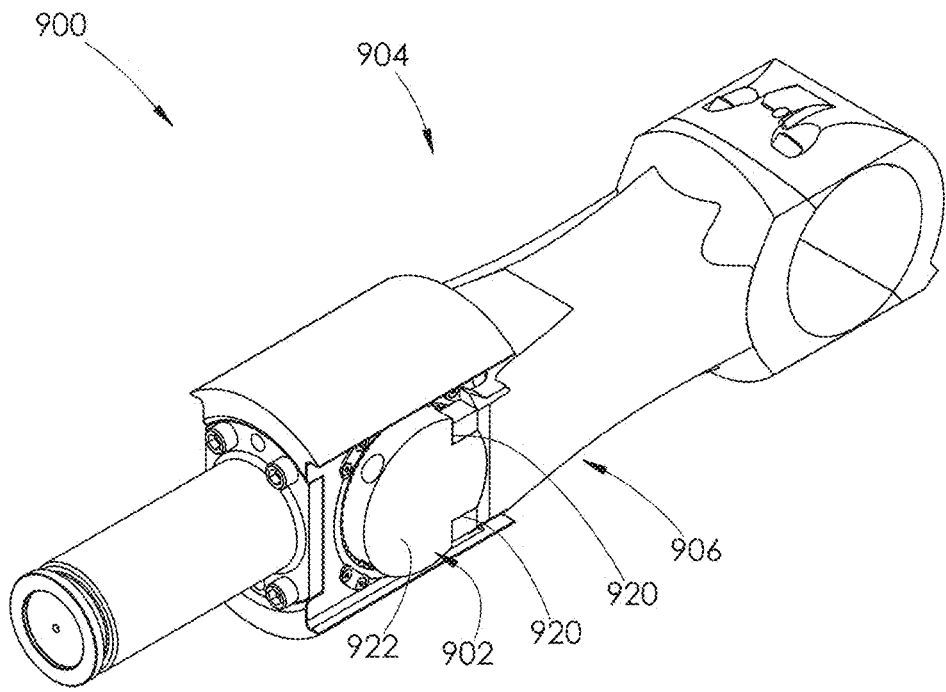
Figure 121:
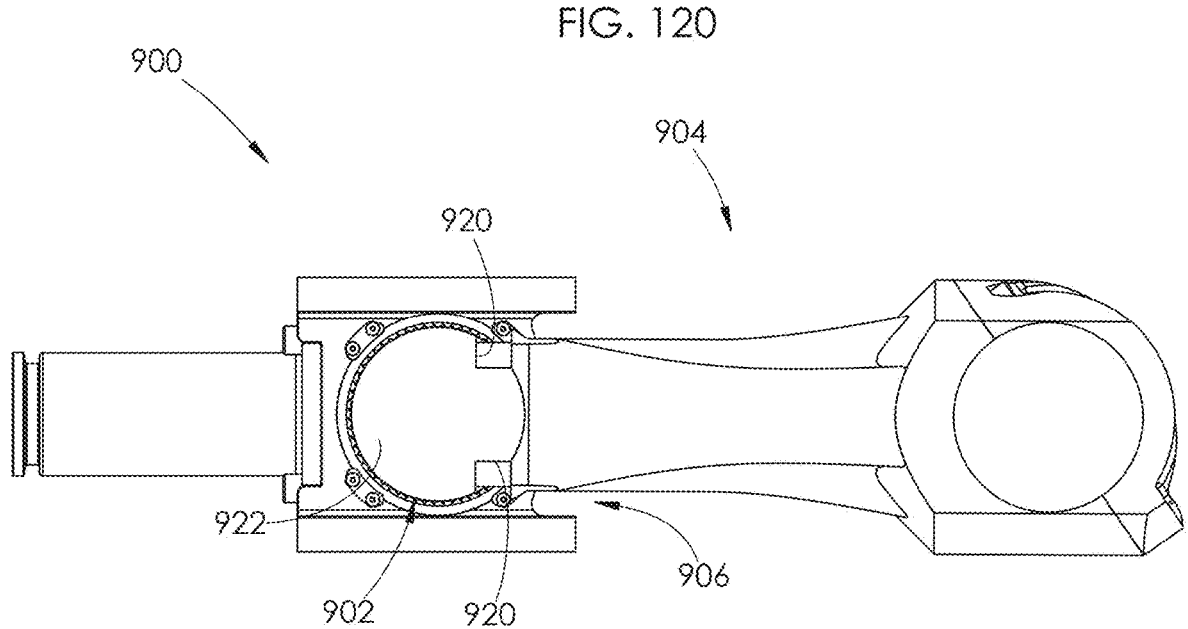
Figure 122:
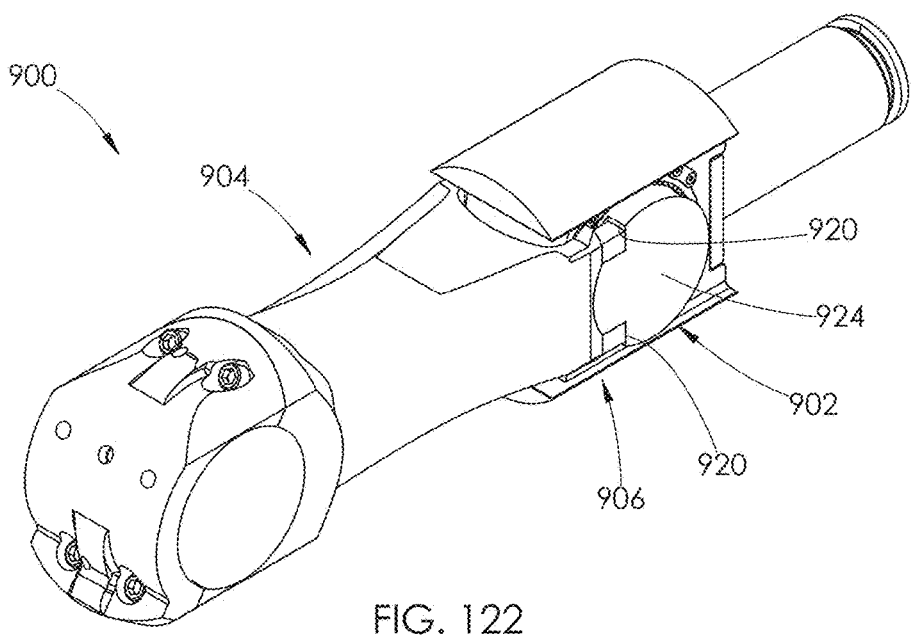
Figure 123:
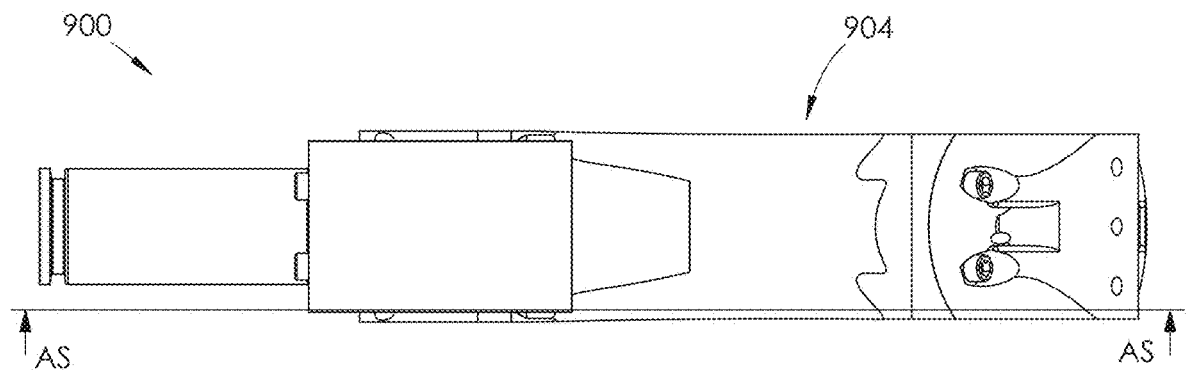

Continuing with FIG. 124, like the wrist pin 822, a plurality of through-bores 914 are formed in the wrist pin 902 that open into counterbores 916. However, in contrast to the wrist pin 822, the through-bores 914 do not open on an outer surface 918 of the wrist pin 902 opposite the counterbores 916. Instead, the through-bores 914 open into cutouts 920. Each cutout 920 has a rectangular shape and opens on a first side 922 or second side (not shown) of the wrist pin 902, as shown in FIGS. 120-122. Each cutout 920 is sized to receive a rectangular shaped spacer block 926. The spacer blocks 926 are configured to abut the front face 912 of each arm 910. Thus, the front face 912 of each arm 910 is not shaped to conform to the outer surface 918 of the wrist pin 902. Instead, each front face 912 has flat surfaces 928 surrounding each of its threaded openings 930. The flat surfaces 928 are configured to abut a corresponding one of the spacer blocks 926.

Continuing with FIGS. 124 and 125, a through-bore 932 is formed in each spacer block 926 that is configured to align with a corresponding through-bore 914 formed in the wrist pin 902 and a corresponding threaded opening 930 formed in the front face 912. A wrist pin fastener 934 is installed within each group of aligned through-bores 914 and 932 and threaded openings 930 to secure the wrist pin 902 to the crosshead connection end 906. In operation, the spacer blocks 926 provide a larger contact surface between the wrist pin 902 and the crosshead connection end 906. Providing a larger contact surface helps reduce any bending forces applied to the wrist pin fastener 934 during operation.

Linear Drive Assembly 950

Turning to FIGS. 126-133, another embodiment of a linear drive assembly 950 is shown. The linear drive assembly 950 is identical to the linear drive assembly 800, but the linear drive assembly 950 comprises another embodiment of a crosshead assembly 952. The crosshead assembly 952 comprises a crosshead 954 having a bearing 956 and a wrist pin 958 installed therein. The crosshead assembly 952 is like the crosshead assembly 802, shown in FIG. 111, but as will be described herein, the crosshead 954 has been increased in height, H, from the crosshead 814.

Figure 129:
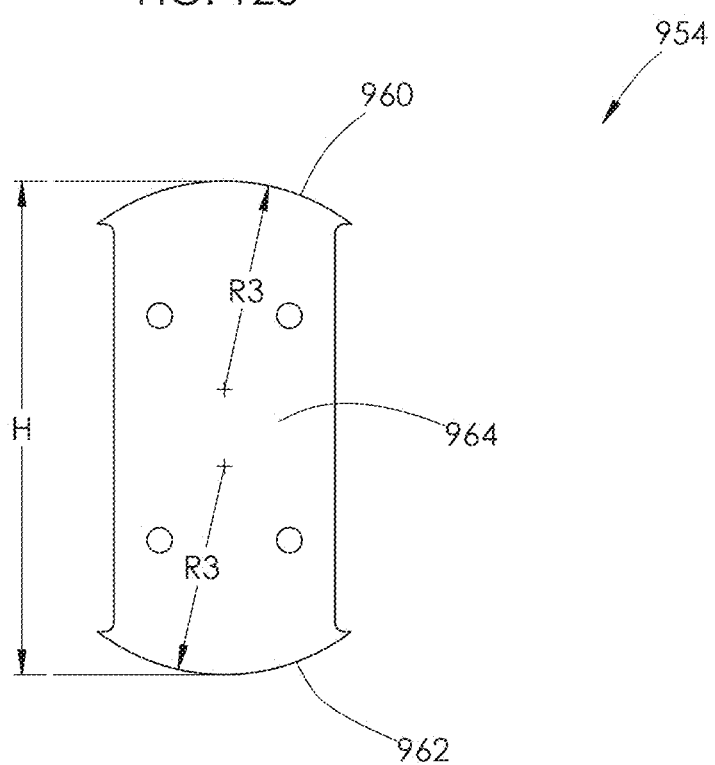

Continuing with FIGS. 126-129, the crosshead 954 comprises upper and lower surfaces 960 and 962 and opposed front and rear surfaces 964 and 966. While not shown, the front surface 964 may comprise a cutout for receiving a portion of a pony rod 968. The upper and lower surfaces 960 and 962 are arcuate sections of a cylinder with equal radii, R3, as shown in FIG. 129. However, the radii R3 are not concentric. This allows the height, H, also shown in FIG. 129, of the crosshead 954 to be greater than embodiments where the radii are concentric. The greater height, H, allows a larger wrist pin bore 970 to be formed within the crosshead 954. The larger wrist pin bore 970 accommodates a larger sized bearing 956 and a larger sized wrist pin 958. As described above, using larger components provides larger surface areas to apply forces thereto. The larger surface areas reduce the force per unit area applied to the components, thereby reducing wear to the components during operation.

Turning to FIGS. 130-133, because the crosshead 954 has a greater height, H, the crosshead 954 must be installed within another embodiment of a crosshead guide 972. The crosshead guide 972 is like the crosshead guide 122, shown in FIGS. 14 and 15, but the crosshead guide 972 comprises a differently shaped crosshead bore 974. The crosshead bore 974 has a non-circular slot shape with upper and lower surfaces 976 and 978 of the bore 974 being radiused and having the same radii R3 as the upper and lower surfaces 960 and 962 of the crosshead 954, as shown in FIG. 133. As with the crosshead 954, the radii R3 of the upper and lower surfaces 976 and 978 of the crosshead bore 974 are non-concentric. The increased size of the crosshead bore 974 thereby accommodates the taller crosshead 954.

Linear Drive Assembly 980

Turning to FIGS. 134-140, another embodiment of a linear drive assembly 980 is shown. The linear drive assembly 980 is identical to the linear drive assembly 950, but comprises another embodiment of a crosshead 982. The crosshead 982 comprises opposed upper and lower surfaces 983 and 984 and front and rear surfaces 985 and 986. The upper and lower surfaces 983 and 984 are flat and are each configured to have a crosshead insert 987 attached thereto.

Continuing with FIGS. 136-140, each crosshead insert 987 comprises a convex upper surface 988 and a flat lower surface 989, as best shown in FIG. 140. The lower surface 989 is sized to mate with and abut a corresponding upper or lower surface 983 or 984 of the crosshead 982. Each crosshead insert 987 further comprises opposed front and rear surfaces 990 and 991. The front surface 990 of each insert 987 comprises a flange 992 configured to be installed within a cutout 993 formed in the front surface 985 of the crosshead 982. A plurality of openings 994 are formed in the flange 992 that align with threaded openings 995 formed in the cutout 993. A fastener 996 is installed within each pair of aligned openings 994 and threaded openings 995 to secure the crosshead insert 987 to the crosshead 982.

Continuing with FIGS. 135 and 140, a plurality of first dowel openings 997 are formed in the upper and lower surfaces 983 and 984 of the crosshead 982. Likewise, a plurality of second dowel openings 998 are formed within the lower surface 989 of the crosshead inserts 987 that are configured to align with the first dowel openings 997. Each crosshead insert 987 is properly aligned on the crosshead 982 by installing a locating dowel 999 within each pair of aligned first and second dowel openings 997 and 998.

During operation, wear occurs to the crosshead inserts 987, which may be removed and replaced as needed. The crosshead inserts 987 may be formed of a different material than that of the crosshead 982. For example, the crosshead inserts 987 may be formed of a harder and more wear resistant material than that of the crosshead 982. Alternatively, the crosshead inserts 987 may be formed of a softer material than that of the crosshead guide 972, shown in FIG. 130, making the crosshead inserts 987 the intentional wear component. The crosshead inserts 987 may also be manufactured separately from the crosshead 982, thereby simplifying the manufacturing of the crosshead 982 itself. While the crosshead inserts 987 are shown used with the taller crosshead 982, the crosshead inserts 987 may also be used with other embodiments of crossheads disclosed herein.

Linear Drive Assembly 1000

Turning to FIGS. 141-150, another embodiment of a linear drive assembly 1000 is shown. The linear drive assembly 1000 comprises another embodiment of a crosshead assembly 1002 attached to another embodiment of a connecting rod assembly 1004. As will be described herein, the linear drive assembly 1000 comprises another method of attaching the crosshead assembly 1002 to the connecting rod assembly 1004. As also will be described herein, the linear drive assembly 1000 is configured to be installed within another embodiment of a crosshead guide 1006, shown in FIGS. 148-150.

Continuing with FIGS. 146 and 147, the connecting rod assembly 1004 comprises a connecting rod 1008 comprising a crosshead connection end 1010 joined to a crankshaft connection end 1012 by an elongate arm 1014. The crankshaft connection end 1012 is identical to the crankshaft connection end 810 shown in FIG. 111. In contrast to the previous embodiments disclosed herein, the crosshead connection end 1010 does not comprise linking elements. Instead, the crosshead connection end 1010 comprises a cylindrical body 1016 having a wrist pin bore 1018 formed therein. In contrast to the crosshead connection end 54 shown in FIG. 7, a needle roller bearing 1020 is installed within the wrist pin bore 1018. The roller bearing 1020 is configured to receive a wrist pin 1022.

Continuing with FIGS. 144-147, the crosshead assembly 1002 comprises a crosshead 1024. The crosshead 1024 comprises upper and lower surfaces 1026 and 1028, opposed side surfaces 1030 and 1032, and front and rear surfaces 1034 and 1036. A cavity 1038 is formed within the crosshead 1024 that opens on the rear surface 1036. The cavity 1038 is sized to receive the crosshead connection end 1010 of the connecting rod 1008. A first opening 1040 is formed in the first side 1030 of the crosshead 1024, and a second opening 1042, having a larger diameter than the first opening 1040, is formed in the second side 1032 of the crosshead 1024. The openings 1040 and 1042 are aligned with one another and configured to each receive a portion of the wrist pin 1022.

Continuing with FIGS. 144-147, a through-bore 1044 is formed within the first side 1030 of the crosshead 1024. The through-bore 1044 intersects the first opening 1040 and opens on the front and rear surfaces 1034 and 1036 of the crosshead 1024, as shown in FIG. 145. The through-bore 1044 comprises a larger diameter portion 1046 joined to a smaller diameter portion 1048. The larger diameter portion 1046 is configured to receive a shear pin 1050, as shown in FIG. 145. An annular groove 1052 is formed in the walls surrounding the second opening 1042 formed in the crosshead 1024, as shown in FIG. 147. The groove 1052 is configured to receive a retaining ring 1054, as shown in FIG. 144. The retaining ring 1054 is a snap ring. However, other types of retaining rings may be used.

Continuing with FIGS. 146 and 147, the wrist pin 1022 comprises a cylindrical body 1056 having a smaller diameter portion 1058. A through-bore 1060 is formed in the small diameter portion 1058. Like the through-bore 1044 formed in the crosshead 1024, the through-bore 1060 comprises a larger diameter portion 1062 joined to a smaller diameter portion 1064, as shown in FIG. 145.

In order to attach the crosshead assembly 1002 to the crosshead connection end 1010, the crosshead connection end 1010 with the needle roller bearing 1020 installed therein is first installed within the cavity 1038 such that the inside diameter of the roller bearing 1020 aligns with the first and second openings 1040 and 1042. Once installed therein, the smaller diameter portion 1058 of the wrist pin 1022 is pushed through the second opening 1042 and the roller bearing 1020 until it is disposed within the first opening 1040. When the smaller diameter portion 1058 is disposed within the first opening 1040, the body 1056 of the wrist pin 1022 abuts an inner wall of the crosshead 1024. The wrist pin 1022 is rotated until the larger diameter portion 1062 of the through-bore 1060 formed in the wrist pin 1022 aligns with the larger diameter portion 1046 of the through-bore 1044 formed in the crosshead 1024, as shown in FIG. 145.

Once the wrist pin 1022 is properly aligned within the first opening 1040, the shear pin 1050 is installed within the larger diameter portion 1046 of the through-bore 1044 at the rear surface 1036 of the crosshead 1024. The shear pin 1050 is pushed through the through-bore 1044 until it abuts the smaller diameter portion 1064 of the through-bore 1060 formed in the wrist pin 1022, as shown in FIG. 145. The shear pin 1050 spans between the wrist pin 1022 and the crosshead 1024 and prevents rotation of the wrist pin 1022 relative to the crosshead 1024. The shear pin 1050 is removed by inserting a tool through the aligned smaller diameter portions 1048 and 1064 of the corresponding through-bores 1044 and 1060. The wrist pin 1022 is retained within the crosshead 1024 by installing the retaining ring 1054 within the groove 1052 formed in the second opening 1042, as shown in FIG. 144.

In contrast to other embodiments described herein, the crosshead connection end 1010 is not rotationally locked to the wrist pin 1022. Instead, the crosshead connection end 1010 rotates relative to the wrist pin 1022 and the crosshead 1024. The wrist pin 1022 and the crosshead 1024 are secured together instead of the wrist pin 1022 and the connecting rod 1008.

Figure 5:
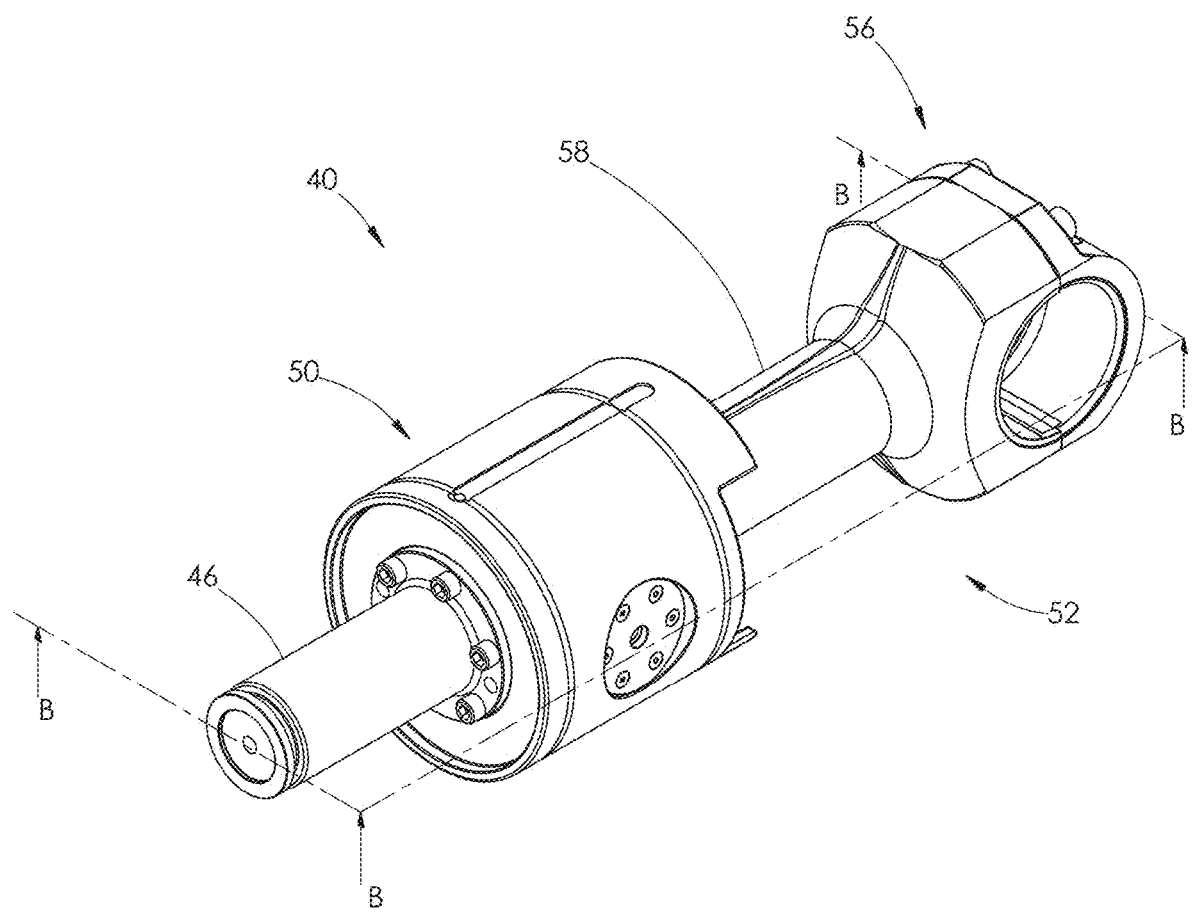
FIG. 5 is a front perspective view of the linear drive assembly shown installed within the power end assembly in FIG. 4. Various features of the linear drive assembly are known in the art.

The linear drive assembly 1000 is like the linear drive assembly 40 shown in FIGS. 5-7, but the disclosed method of securing the wrist pin 1022 to the crosshead 1024 allows for a larger wrist pin 1022 to be used, thereby increasing the contact surface areas and reducing wear to the components over time. The linear drive assembly 1000 also does not comprise a thrust seat. Instead, the cylindrical body 1016 of the crosshead connection end 1010 engages a cylindrical shaped front wall 1066 at the front of the cavity 1038, as shown in FIG. 149. However, less force per unit area is applied to these engaged areas because of the increased surface area of the various components.

Turning to FIGS. 148-150, the linear drive assembly 1000 is configured to be installed within the crosshead guide 1006. The crosshead guide 1006 is like the crosshead guide 122 shown in FIGS. 14 and 15, but it comprises another embodiment of a crosshead bore 1068. The crosshead bore 1068 comprises upper and lower cutouts 1070 formed in the walls surrounding the bore 1068. The cutouts 1070 extend between front and rear surfaces 1072 and 1074 of the crosshead guide 1006 and are each sized to receive a crosshead guide insert 1076. The inserts 1076 each have a convex upper surface 1078 and a concave lower surface 1080. When the inserts 1076 are installed within the corresponding cutouts 1070, the inserts 1076 are sized to mate with cylindrical side walls 1082 of the crosshead bore 1068.

Continuing with FIGS. 148-150, one or more openings 1084 are formed in each insert 1076 that are configured to align with vent openings 1086 formed in the crosshead guide 1006, as shown in FIG. 149. While not shown, the upper insert 1076 may also include a lubricant opening configured to align with a lubricant hole 1087, shown in FIG. 149. A front surface 1088 of each insert 1076 comprises a tab 1090. The tab 1090 is sized to fit within a cutout 1092 formed in the front surface 1072 of the crosshead guide 1006. A plurality of openings 1094 are formed in each tab 1090 that are configured to mate with threaded openings 1096 formed in each cutout 1092, as shown in FIG. 150. A fastener 1098 is installed within each pair of aligned openings 1094 and threaded openings 1096 to secure the insert 1076 to the crosshead guide 1006, as shown in FIG. 148.

Continuing with FIG. 149, the crosshead 1024 does not utilize any wear plates on its upper and lower surfaces 1026 and 1028. Instead, the crosshead guide inserts 1076 function as wear plates and serve as the wear component during operation. The crosshead guide inserts 1076 may be removed and replaced, as needed. The inserts 1076 may be made of a different material than the crosshead 1024 or treated in any of the various methods known in the art. For example, the inserts 1076 may be made of a harder, more wear resistant material than the crosshead 1024 or made of a softer material known to accumulate wear instead of the crosshead 1024. In alternative embodiments, only one crosshead guide insert 1076 may be used, or the inserts 1076 may be used in conjunction with wear plates disclosed herein. The crosshead guide inserts 1076 may also be used within any one of the embodiments of the linear drive assemblies disclosed herein.

Linear Drive Assembly 1100

Turning to FIGS. 151-165, another embodiment of a linear drive assembly 1100 is shown. The linear drive assembly 1100 comprises a crosshead assembly 1102 attached to a connecting rod assembly 1104. The linear drive assembly 1100 comprises the same reduction in wear advantages as the linear drive assemblies 200 and 700 disclosed herein, but the linear drive assembly 1100 discloses another method of attaching the crosshead assembly 1102 to the connecting rod assembly 1104.

Continuing with FIGS. 151-153, the connecting rod assembly 1104 comprises a connecting rod 1106 comprising a crosshead connection end 1108 joined to a crankshaft connection end 1110 by an elongate arm 1112. The crankshaft connection end 1110 is identical to the crankshaft connection end 810 shown in FIGS. 109 and 110. In contrast to other embodiments disclosed herein, the elongate arm 1112 has the cross-sectional shape of a cross, as shown in FIG. 154. Such shape provides strength along the axes of maximum load while removing material that contributes minimally to strength in the load directions. Removing unnecessary material reduces the weight of the connecting rod 1106, allowing for easier assembly, maintenance, and better pump efficiency.

Continuing with FIGS. 152 and 153, the crosshead connection end 1108 comprises a pair of linking elements 1114. The linking elements 1114 each comprise an arm 1116 having upper and lower front faces 1118 joined by a cylindrical wrist pin cutout 1120. Threaded openings 1122 are formed in each upper and lower front face 1118. As will be described herein, each threaded opening 1122 is configured to receive a wrist pin fastener 1162. The arms 1116 are spaced apart by a recessed intermediate surface 1124. As will be described herein, the linking elements 1114 are configured to engage a portion of a wrist pin 1126 and mate with a pair of saddles 1128.

Turning to FIGS. 152, 155, and 156, the crosshead assembly 1102 comprises a crosshead 1130 having a wrist pin bore 1132 formed therein. The wrist pin bore 1132 is sized to receive a bearing 1134, shown in FIG. 152. The crosshead 1130 is like the crosshead 814 shown in FIG. 111, but it has a differently shaped rear end 1136, shown in FIG. 156. The rear end 1136 of the crosshead 1130 comprises a rear surface 1138 that joins opposed side surfaces 1140 of the crosshead 1130 by tapered surfaces 1142. Like the crosshead 814, the rear end 1136 is closed and faces the intermediate surface 1124 of the crosshead connection end 1108 when the crosshead connection end 1108 is attached to the crosshead assembly 1104.

Continuing with FIGS. 157-159, the crosshead assembly 1102 further comprises the wrist pin 1126. The wrist pin 1126 comprises a cylindrical body 1144 having opposed side surfaces 1146. A cylindrical boss 1148 is attached to or integrally formed with each side surface 1146. Each boss 1148 is sized to engage the wrist pin cutout 1120 formed in a corresponding one of the arms 1116. As will be described herein, an opening 1150 is formed in each boss 1148 for receiving a shear pin 1152, as shown in FIG. 165.

Turning to FIGS. 160-163, the crosshead connection end 1108 further comprises the pair of saddles 1128. Each saddle 1128 has a U-shape and comprises opposed front and rear surfaces 1154 and 1156 interconnected by upper and lower through-bores 1158. Each through-bore 1158 opens into a cutout 1160 on the front surface 1154 of the saddle 1128. The rear surface 1156 of each saddle 1128 comprises upper and lower rear faces 1164 joined by a cylindrical wrist pin cutout 1166. The upper and lower through-bores 1158 open on a corresponding upper or lower rear face 1164 on the rear surface 1156 of each saddle 1128. As will be described herein, the upper and lower through-bores 1158 are each configured to receive a wrist pin fastener 1162, as shown in FIG. 165.

Continuing with FIGS. 160-163, each saddle 1128 further comprises an intermediate through-bore 1168 positioned between the upper and lower through-bores 1158. The intermediate through-bore 1168 opens into a counterbore 1170 on the front surface 1154 and opens on the wrist pin cutout 1166 on the rear surface 1156 of the saddle 1128. Each intermediate through-bore 1168 is configured to receive a shear pin 1152, as shown in FIG. 165.

Continuing with FIG. 165, when the wrist pin 1126 is installed within the bearing 1134, the bosses 1148 project from opposed side surfaces 1140 of the crosshead 1130. The linking elements 1114 and the saddles 1128 are then brought together such that each boss 1148 is sandwiched between the wrist pin cutout 1120 formed in the arm 1116 and the wrist pin cutout 1166 formed in the saddle 1128. When brought together, the upper and lower through-bores 1158 formed in each saddle 1128 align with the upper and lower threaded openings 1122 formed in the front face 1118 of each arm 1116. The linking elements 1114 are secured to the saddles 1128 using the wrist pin fasteners 1162. Each fastener 1162 is installed within an aligned pair of through-bores 1158 and threaded openings 1122.

Continuing with FIG. 165, the wrist pin 1126 is rotationally locked to the crosshead connection end 1108 by installing a shear pin 1152 within the opening 1150 formed in one of the bosses 1148 and a corresponding opening 1168 of one of the intermediate through-bores 1168. The shear pin 1152 may be installed through the counterbore 1170 formed in a corresponding one of the saddles 1128 and pushed through until the shear pin 1152 spans between the wrist pin 1126 and the saddle 1128. In operation, the crosshead connection end 1108 and wrist pin 1126 rotate together relative to the crosshead 1130.

Linear Drive Assembly 1200

Turning to FIGS. 166-170, another embodiment of a linear drive assembly 1200 is shown. The linear drive assembly 1200 comprises a crosshead assembly 1202 attached to a connecting rod assembly 1204. The crosshead assembly 1202 is like the crosshead assembly 1102 shown in FIG. 152, but the crosshead assembly 1202 comprises another embodiment of a wrist pin 1206. The connecting rod assembly 1204 is identical to the connecting rod assembly 1104 shown in FIG. 152, but a crosshead connection end 1208 of the assembly's connecting rod 1210 comprises another embodiment of a pair of saddles 1212.

Continuing with FIGS. 169 and 170, the wrist pin 1206 is identical to the wrist pin 1126 shown in FIGS. 157-159, but instead of an opening for receiving a shear pin, each boss 1214 comprises a blind hole 1216 for receiving a shear ball 1218. Likewise, each saddle 1212 is identical to the saddle 1128 shown in FIGS. 160-163, but the saddle 1212 does not comprise an intermediate through-bore. Instead, a blind hole 1220 is formed in a wrist pin cutout 1222 of each saddle 1212. The blind hole 1220 is configured to align with the blind hole 1216 formed in the wrist pin 1206.

Continuing with FIGS. 169 and 170, during assembly, each shear ball 1218 is installed within the aligned blind holes 1216 and 1220 such that each shear ball 1218 spans between a corresponding one of the saddles 1212 and the corresponding boss 1214 of the wrist pin 1206, as shown in FIG. 169. The shear balls 1218 rotationally lock the wrist pin 1206 to the crosshead connection end 1208 of the connecting rod 1210. The shear balls 1218 may have a larger diameter than the shear pins 1152 shown in FIG. 152. The larger diameter increases the durability of the shear balls 1218 as compared to the shear pins 1152, making the shear balls 1218 less susceptible to failure during operation. Using the blind holes 1216 and 1220 instead of larger openings 1150 and through-bores 1168 shown in FIG. 165, also helps increase the durability of the saddles 1212 and the wrist pin 1206 during operation.

Linear Drive Assembly 1250

Turning to FIGS. 171-175, another embodiment of a linear drive assembly 1250 is shown. The linear drive assembly 1250 comprises a crosshead assembly 1252 attached to a connecting rod assembly 1254. The crosshead assembly 1252 is identical to the crosshead assembly 1102 shown in FIG. 152, but the crosshead assembly 1252 comprises another embodiment of a wrist pin 1256. The connecting rod assembly 1254 is identical to the connecting rod assembly 1104 shown in FIG. 152, but a crosshead connection end 1258 of the assembly's connecting rod 1260 comprises another embodiment of a pair of saddles 1262.

Continuing with FIGS. 174 and 175, the wrist pin 1256 is identical to the wrist pin 1126 shown in FIGS. 157-159, but instead of an opening for receiving a shear pin, each boss 1264 comprises a rectangular shaped cutout 1266 for receiving a rectangular shaped shear key 1268. Each cutout 1266 opens on a side surface 1270 of each boss 1264. Likewise, each saddle 1262 is identical to the saddle 1128 shown in FIGS. 160-163, but the saddle 1262 does not comprise an intermediate through-bore. Instead, a rectangular shaped cutout 1272 is formed in a wrist pin cutout 1274 of each saddle 1262. The cutout 1272 opens on opposed sides 1276 of each saddle 1262. The cutout 1272 is configured to align with the cutout 1266 formed in the wrist pin 1256.

Continuing with FIGS. 174 and 175, during assembly, each shear key 1268 is installed within the aligned cutouts 1266 and 1272 such that each shear key 1268 spans between a corresponding one of the saddles 1262 and the corresponding boss 1264 of the wrist pin 1256, as shown in FIG. 174. The shear keys 1268 rotationally lock the wrist pin 1256 to the crosshead connection end 1258 of the connecting rod 1260.

Continuing with FIG. 175, the shear keys 1268 are oriented within the cutouts 1266 and 1272 such that a longitudinal axis 1278 of each key 1268 is parallel to a longitudinal axis 1280 of the wrist pin 1256, as shown in FIG. 175. Likewise, each cutout 1266 and 1272 extends along an axis that is parallel to the longitudinal axis 1280 of the wrist pin 1256. Since the cutouts 1266 and 1272 extend along an axis that is parallel to the longitudinal axis 1280 of the wrist pin 1256 and not perpendicular thereto, the cutouts 1266 and 1272 have shallow depths. The shallow depths help increase the integrity of the wrist pin 1256 and saddles 1262 during operation. The shear keys 1268 also have a larger loaded cross-section than the shear pins 1152 shown in FIG. 152 or the shear balls 1218 shown in FIG. 170. The larger cross-section increases the durability of the shear keys 1268 as compared to the shear pins 1152 or shear balls 1218, making the shear keys 1268 less susceptible to failure during operation.

Linear Drive Assembly 1300

Turning to FIGS. 176-180, another embodiment of a linear drive assembly 1300 is shown. The linear drive assembly 1300 comprises a crosshead assembly 1302 attached to a connecting rod assembly 1304. The crosshead assembly 1302 is identical to the crosshead assembly 1102 shown in FIG. 152, but the crosshead assembly 1302 comprises another embodiment of a wrist pin 1306. The connecting rod assembly 1304 is identical to the connecting rod assembly 1104 shown in FIG. 152, but the assembly's connecting rod 1308 comprises another embodiment of a crosshead connection end 1310 and another embodiment of a pair of saddles 1312.

Continuing with FIGS. 179 and 180, the wrist pin 1306 is identical to the wrist pin 1126 shown in FIGS. 157-159, but the wrist pin 1306 comprises differently shaped bosses 1314. Each boss 1314 has a non-circular shape. The bosses 1314 each have a circular triangle cross-sectional shape or more specifically, the bosses 1314 each have the cross-sectional shape of a Reuleaux triangle with radiused vertices. No openings are formed in the bosses 1314 for receiving any kind of shear pin, ball, or key.

Continuing with FIGS. 179 and 180, each saddle 1312 is identical to the saddle 1128 shown in FIGS. 160-163, but the saddle 1312 has a wrist pin cutout 1316 that conforms to the non-circular shape of the bosses 1314. No openings are formed in the wrist pin cutout 1316 for receiving any kind of shear pin, ball, or key. Likewise, the crosshead connection end 1310 is identical to the crosshead connection end 1108 shown in FIG. 153, but a wrist pin cutout 1318 formed in each arm 1320 is shaped to conform to the non-circular shape of the bosses 1314. Like the linear drive assembly 1100, the wrist pin 1306 is secured between the saddles 1312 and the crosshead connection end 1310 using a plurality of wrist pin fasteners 1322.

During operation, the noncircular shape of the bosses 1314 allows for the transmission of torque between the wrist pin 1306 to the crosshead connection end 1310 of the connecting rod 1308. Thus, the shape of the bosses 1314 rotationally locks the wrist pin 1306 to the crosshead connection end 1310. This alleviates the need for forming any openings in the wrist pin 1306 or the saddles 1312 that may compromise the integrity of such components during operation.

Linear Drive Assembly 1400

Turning to FIGS. 181-185, another embodiment of a linear drive assembly 1400 is shown. The linear drive assembly 1400 comprises a crosshead assembly 1402 attached to a connecting rod assembly 1404. The crosshead assembly 1402 is identical to the crosshead assembly 1102 shown in FIG. 152, but a crosshead 1406 used with the assembly 1402 is not shown with any wear pads used to secure a bearing 1408 within the crosshead's wrist pin bore 1410, as shown in FIG. 185. In alternative embodiments, the crosshead 1406 may be configured to have wear pads attached thereto. Another embodiment of a pony rod 1412 is also shown attached to the crosshead 1406. The pony rod 1412 is identical to the pony rod 404 shown in FIGS. 61 and 62, but the pony rod 1412 comprises a circular shaped rear plate 1414. In alternative embodiments, the pony rod 404 may be used instead of the pony rod 1412.

Continuing with FIGS. 184 and 185, the connecting rod assembly 1404 comprises a connecting rod 1416 comprising a crosshead connection end 1418 joined to a crankshaft connection end 1420 by an elongate arm 1422. The crosshead connection end 1418 is identical to the crosshead connection end 1108 shown in FIGS. 152 and 153, but certain features of the crosshead connection end 1418 may vary slightly in shape and size.

Continuing with FIGS. 183 and 185, the elongate arm 1422 has a circular cross-sectional shape and comprises a sharper transition into the crosshead connection end 1418 than elongate arms shown in other embodiments described herein. Unlike other elongate arms described herein, the entire crankshaft connection end 1420 is removable from the elongate arm 1422. A rear plate 1424 is formed at an end of the elongate arm 1422 that is configured to attach to the crankshaft connection end 1420 using a plurality of fasteners 1426.

Continuing with FIGS. 183-185, the crankshaft connection end 1420 comprises a clamp 1428 comprising a first half 1430 joined to a second half 1432. The first half 1430 has a rectangular shape and has a plurality of threaded openings 1434 formed in its front surface 1436. The threaded openings 1434 are configured to align with openings 1438 formed in the rear plate 1424 of the elongate arm 1422. The fasteners 1426 are installed within the aligned openings 1438 and threaded openings 1434 to secure the elongate arm 1422 to the first half 1430 of the clamp 1428. The rear plate 1424 may be properly aligned on the clamp 1428 using dowel pins 1427.

Continuing with FIGS. 181 and 185, like other crankshaft connection ends described herein, the second half 1432 of the clamp 1428 is secured to the first half 1430 using a plurality of fasteners 1440. The fasteners 1440 are installed within openings 1442 formed in the second half 1432 that align with threaded openings (not shown) formed in the first half 1430. The halves 1430 and 1432 may be properly aligned using dowel pins 1444.

Continuing with FIG. 183, the halves 1430 and 1432 are joined together at an axis that is perpendicular to a longitudinal axis of the elongate arm 1422. When joined together, a central opening 1446 is formed within the clamp 1428 that is configured to receive a connecting rod journal of the crankshaft. While not shown, the clamp 1428 may be configured to receive a split-ring bearing, like those described herein. In operation, the crankshaft connection end 1420 may be removed and replaced with a new crankshaft connection end 1420, if needed.

Crosshead Guide 1500

Turning to FIGS. 186-189, another embodiment of a crosshead guide 1500 is shown. The linear drive assembly 1000 is shown installed within the crosshead guide 1500. However, the crosshead guide 1500 may be used within any of the various linear drive assemblies disclosed herein with the appropriate modifications.

Continuing with FIGS. 186-189, in contrast to the crosshead guide 122 shown in FIGS. 14 and 15, the crosshead guide 1500 is not a single, integrally formed piece. Instead, the crosshead guide 1500 comprises a plurality of pieces joined together, which may be referred to as being of "multi-piece construction". The crosshead guide 1500 comprises an upper half 1502 joined to a lower half 1504 by a plurality of removable side walls 1506. When the pieces are attached together, a crosshead bore 1508 is formed therein.

Continuing with FIGS. 188 and 189, each side wall 1506 comprises upper and lower surfaces 1510 and 1512. A plurality of threaded openings 1514 are formed in each surface 1510 and 1512. The threaded openings 1514 formed in the upper surface 1510 align with through-bores 1516 formed in the upper half 1502. Each through-bore 1516 interconnects upper and lower surfaces 1518 and 1520 of the upper half 1502. Likewise, the threaded openings 1514 formed in the lower surface 1512 align with through-bores 1522 formed in the lower half 1504. Each through-bore 1522 interconnects upper and lower surfaces 1524 and 1526 of the lower half 1504. A plurality of fasteners 1528 are installed within each pair of aligned threaded openings 1514 and through-bores 1516 or 1522 to secure the side walls 1506 to the upper and lower halves 1502 and 1504.

Because the crosshead guide 1500 comprises a plurality of smaller pieces, it is generally easier to manufacture than the single piece crosshead guide 122. Specifically, a crosshead bore does not need to be machined within the crosshead guide 1500. Instead, the upper and lower halves 1502 and 1504 are machined to have radius or cylindrical inner surfaces. The side walls 1506 are shown to be planar, making the crosshead bore 1508 non-concentric. However, in alternative embodiments, the side walls 1506 may also be machined to have radius or cylindrical inner surfaces so as to form a concentric crosshead bore. In operation, if any portion of the crosshead guide 1500 begins to wear, the worn piece may be removed and replaced with a new piece.

Crosshead Section 1600

Turning now to FIGS. 190-192, another embodiment of a crosshead section 1600 is shown. In contrast to the crosshead section 114 shown in FIG. 13, the crosshead section 1600 does not use a plurality of individual crosshead guides, like the crosshead guides 122. Instead, the crosshead section 1600 comprises an upper half 1602 joined to a lower half 1604 by a plurality of removable side walls 1606. When joined together, a crosshead bore 1608 is formed between each pair of adjacent side walls 1606.

Continuing with FIGS. 190-192, the upper half 1602 of the crosshead section 1600 comprises a plurality of upper crosshead bore surfaces 1610 positioned in a side-by-side relationship and separated by intermediate walls 1612. Those walls at opposed ends of the upper half 1602 may be characterized as end walls 1614, but the end walls 1614 are identical in shape and size to the intermediate walls 1612. A plurality of through-bores 1616 are formed in each intermediate wall 1612 and end wall 1614 that open on upper and lower surfaces 1618 and 1620 of the upper half 1602. A plurality of dowel openings 1622 are also formed in each intermediate wall 1612 and end wall 1614 that open on the lower surface 1620 of the upper half 1602, as shown in FIG. 191.

Continuing with FIGS. 190-192, the lower half 1604 of the crosshead section 1600 comprises a plurality of lower crosshead bore surfaces 1624 positioned in a side-by-side relationship and separated by intermediate walls 1626. Like the upper half 1602, the walls at opposed ends of the lower half 1604 may be characterized as end walls 1628, but the end walls 1628 are identical to the intermediate walls 1626. A plurality of through-bores 1630 are formed in each intermediate wall 1626 and end wall 1628 that open on upper and lower surfaces 1632 and 1634 of the lower half 1604. A plurality of dowel openings 1636 are also formed in each intermediate wall 1626 and end wall 1628 that open on the upper surface 1632 of the lower half 1604.

Continuing with FIGS. 191 and 192, each side wall 1606 comprises a plurality of threaded openings 1638 formed in its upper and lower surfaces 1646 and 1648. Each side wall 1606 further comprises a plurality of dowel openings 1640 that open on the upper and lower surfaces 1646 and 1648. The side walls 1606 are aligned on the upper and lower halves 1602 and 1604 by installing dowel pins 1642 within each pair of aligned dowel openings 1640 and 1622 or 1636.

Continuing with FIGS. 191 and 192, the threaded openings 1638 formed in the side walls 1606 are configured to align with the through-bores 1616 and 1630 formed in the upper and lower halves 1602 and 1604. The side walls 1606 are secured to the upper and lower halves 1602 and 1604 by installing a fastener 1644 in each pair of aligned through-bores 1616 or 1630 and threaded openings 1638.

Because the crosshead section 1600 comprises a plurality of pieces, it is generally easier to manufacture than other crosshead sections known in the art. Specifically, a plurality of crosshead bores do not need to be machined within the crosshead section 1600. Instead, the upper and lower halves 1602 and 1604 are machined to have radius or cylindrical inner bore surfaces 1610 and 1624. The side walls 1606 are shown to be planar, making each crosshead bore 1608 non-concentric. However, in alternative embodiments, the side walls 1606 may also be machined to have radius or cylindrical inner surfaces so as to form a concentric crosshead bore. In operation, if any portion of the crosshead section 1600 begins to wear, that piece may be removed and replaced with a new piece. While the linear drive assembly 1000 is shown installed within the crosshead section 1600, the crosshead section 1600 may be used with any one of the various embodiments of the linear drive assemblies disclosed herein with appropriate modifications.

Figure 1:
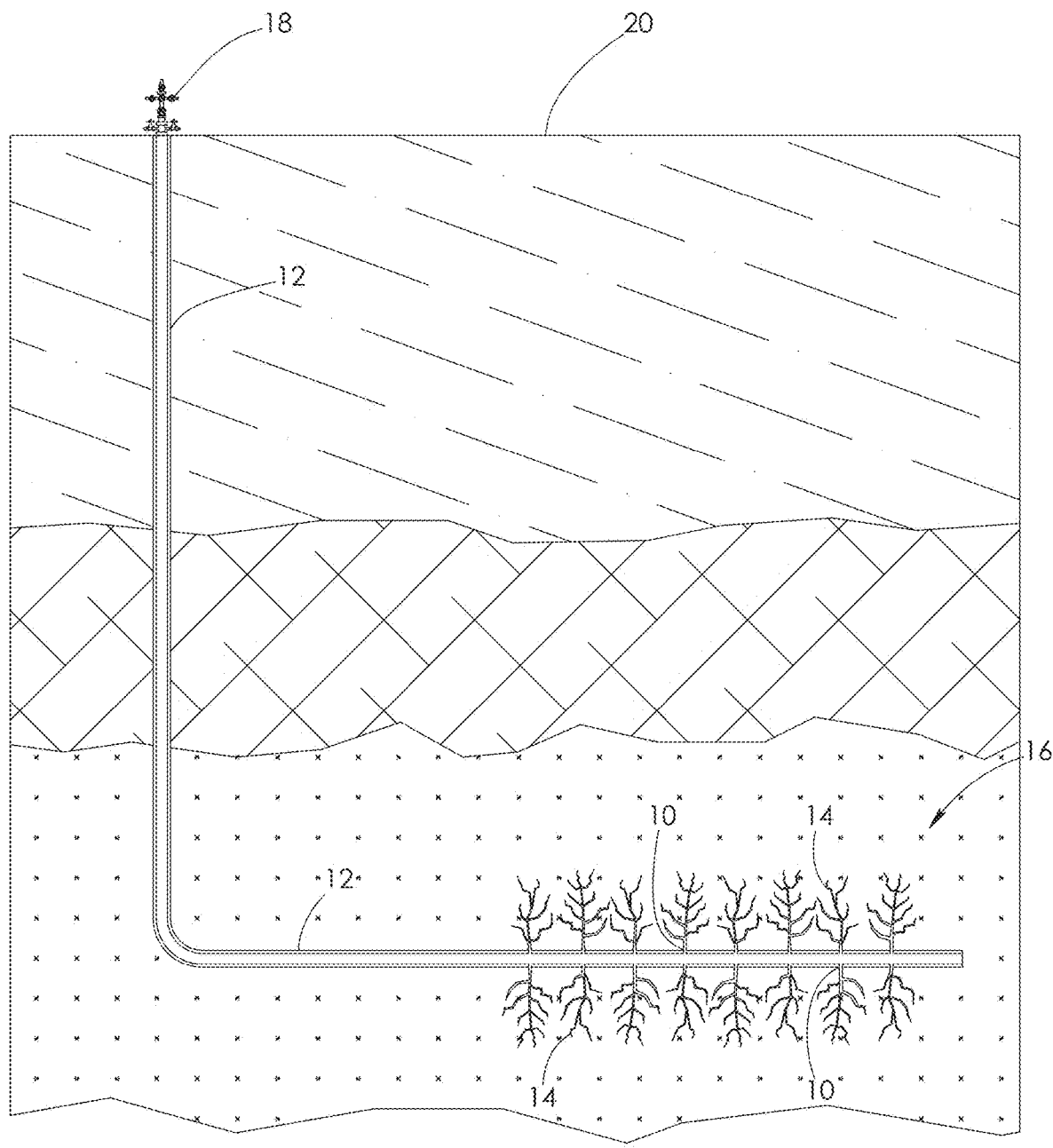
FIG. 1 is an illustration of the underground environment of a hydraulic fracturing operation.
Figure 2:
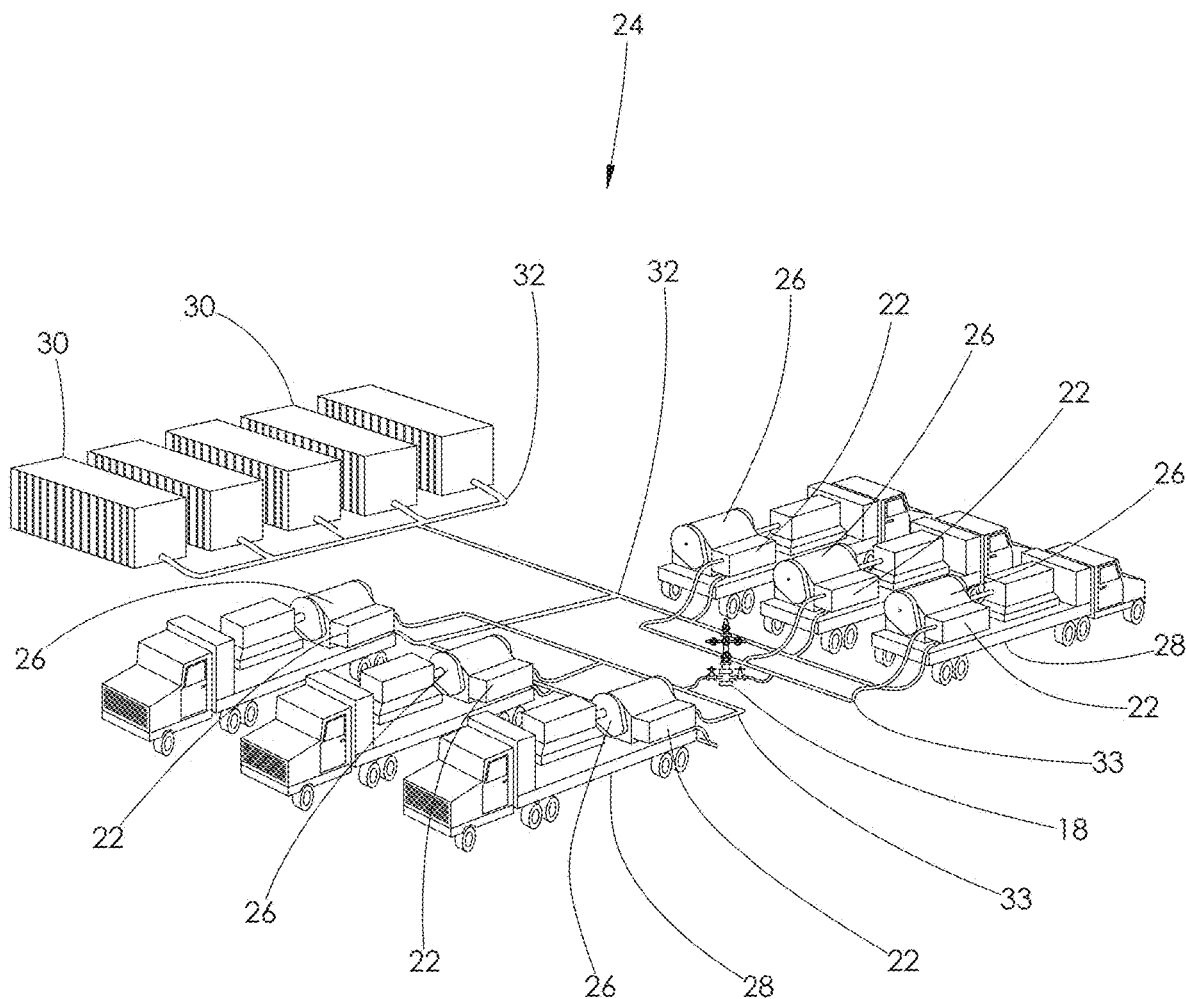
FIG. 2 illustrates above-ground equipment used in a hydraulic fracturing operation.
Figure 3:
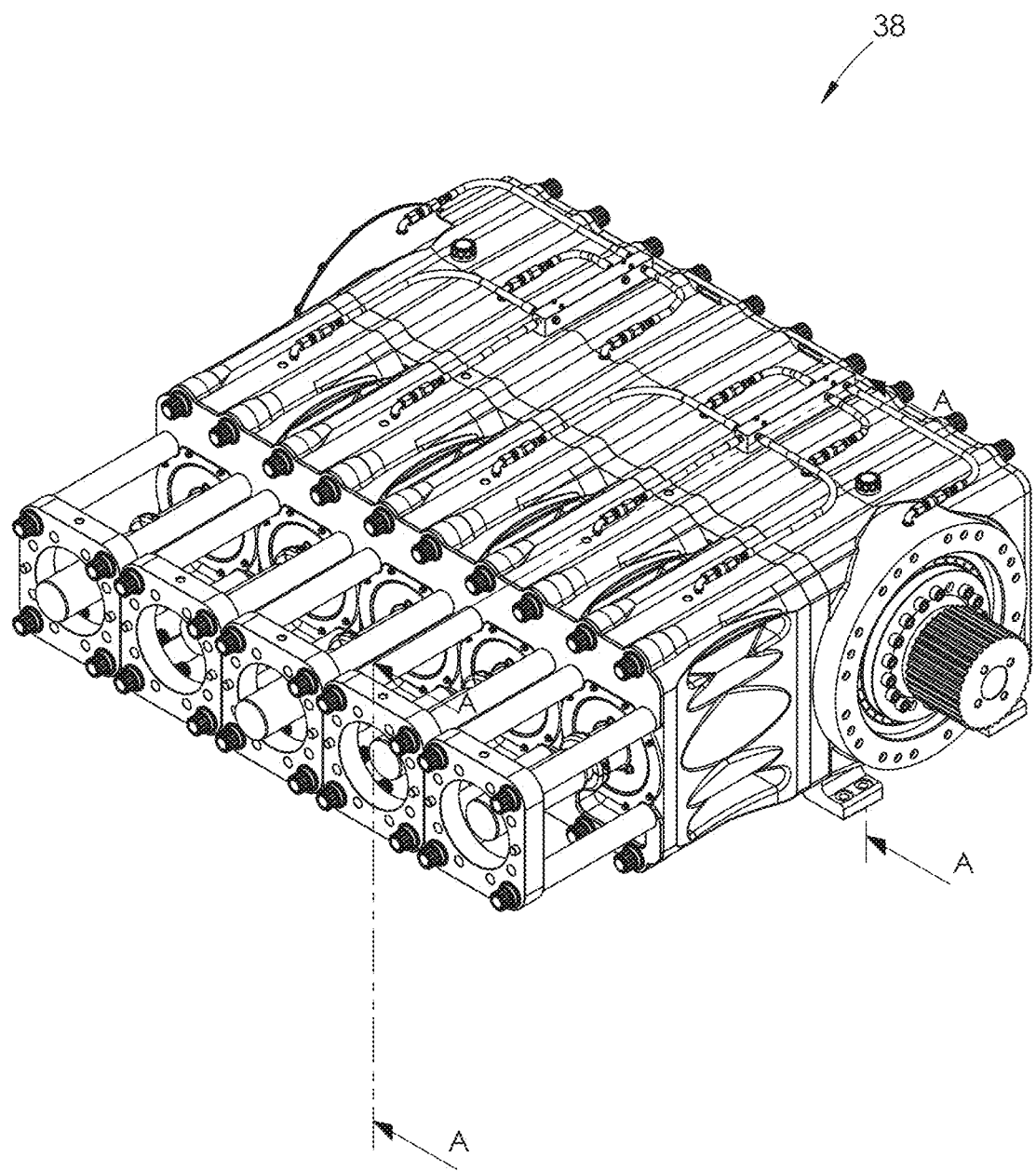
FIG. 3 is a front perspective view of one embodiment of a power end assembly.
Figure 4:
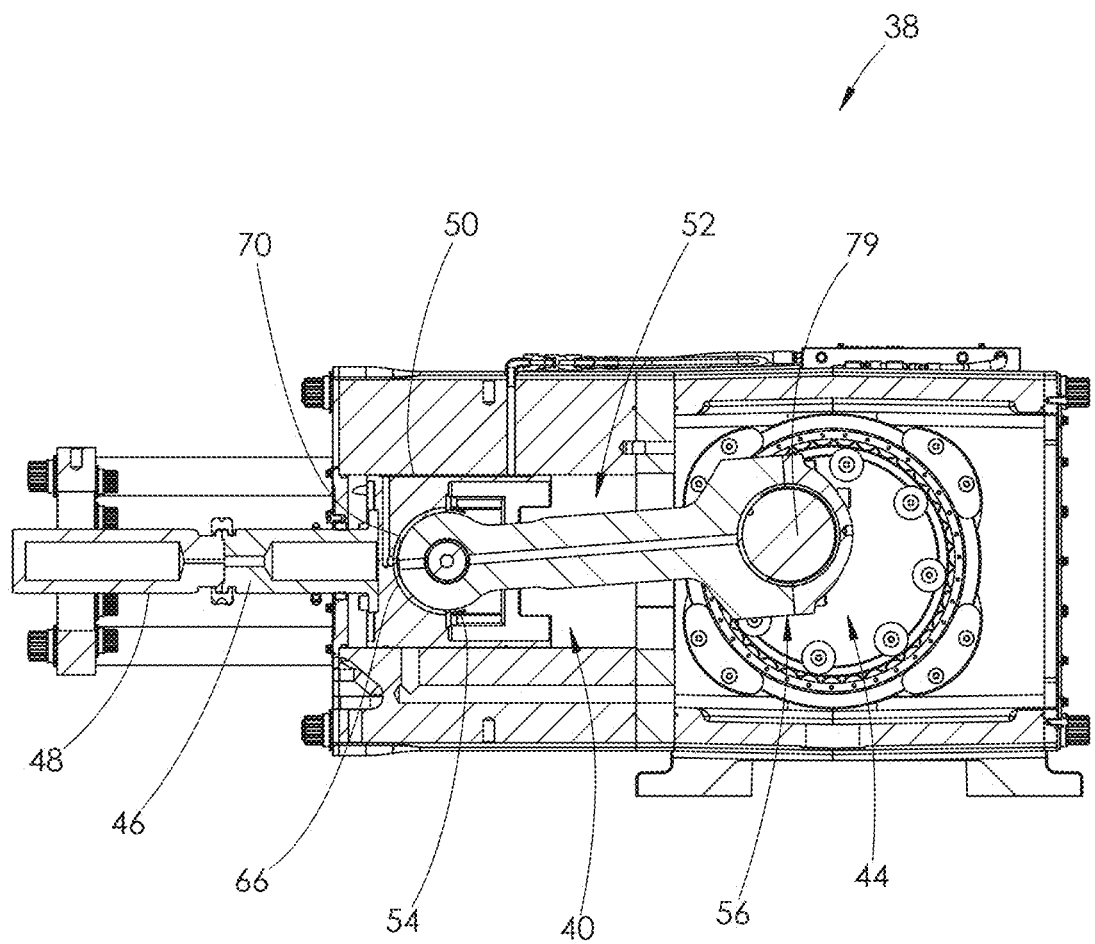
FIG. 4 is a cross-sectional view of the power end assembly shown in FIG. 3, taken along line A-A.

With reference to FIGS. 1-192, the present application discloses numerous embodiments of linear drive assemblies. Each assembly comprises one embodiment of a crosshead assembly attached to one embodiment of a connecting rod assembly. While not specifically shown herein, any of the various components described herein may be mixed and matched with the various assemblies described herein, as desired and as practical. Likewise, the various components described herein may vary in shape or size from those specifically shown in the figures if the assemblies still work as intended.

The present application also discloses various embodiments of crosshead guides and crosshead sections. While not specifically shown herein, any of the various features described herein making up each crosshead guide or crosshead section may be mixed and matched, as desired and as practical. Likewise, the various features described herein may vary in shape or size from those specifically shown in the figures if the crosshead guides and crosshead sections still work as intended.

The present application also discloses numerous fasteners used with the various embodiments. The fasteners may comprise any number of fasteners known in the art, such as screws, bolts, and studs and nuts. The fasteners used within each embodiment are not limited to those specific fasteners shown in the figures. Other fasteners known in the art may be used instead, as is practical on a case-by-case basis.

One or more kits may also be used with the linear drive assemblies disclosed herein. One kit may comprise one of the crosshead assemblies disclosed herein and one of the connecting rod assemblies disclosed herein. The kit may further comprise one of the crosshead guides, wear plate, or inserts disclosed herein. Another kit may comprise any of the various components making up each crosshead assembly disclosed herein, or any of the various components making up each connecting rod assembly disclosed herein.

Each embodiment of a linear drive assembly disclosed herein may be referred to as "a means for interconnecting a pony rod and a crankshaft". Each embodiment of a crosshead assembly disclosed herein may be referred to as "a means for interconnecting a pony rod and a connecting rod assembly". Each embodiment of a connecting rod assembly disclosed herein may be referred to as "a means for interconnecting a crosshead assembly and a crankshaft". Each embodiment of a crosshead connection end disclosed herein may be referred to as "a means for interconnecting a wrist pin and a connecting rod". Each embodiment of a crosshead connection end disclosed herein may be referred to as "a means for interconnecting a connecting a rod and a crankshaft". Each embodiment of a crosshead guide disclosed herein may be referred to as "a means for supporting reciprocal movement of a crosshead assembly".

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only, and changes may be made in detail. Changes may especially be made in matters of structure and arrangements of parts within the principles of the present technology to the full extent indicated by the broad general meaning of the terms in which the appended claims are expressed.

The invention claimed is:

1. A linear drive assembly, comprising:
    a crosshead configured to reciprocate within a guide, the crosshead comprising a bore formed therein;
    a connecting rod, comprising:
        a first end;
        a second end comprising a plurality of linking elements, in which each linking element comprises an opening that is aligned with the bore of the crosshead; and
        a body interconnecting the first end and the second end;
    a wrist pin situated within the bore and each opening of the plurality of linking elements; and a plate attached to the crosshead, the plate comprising a plurality of grooves formed therein;
in which the plate is formed from a first material and the guide is formed from a second material.

2. The linear drive assembly of claim 1, in which the second material is harder than the first material.

3. The linear drive assembly of claim 1, further comprising:
a second plate attached to the crosshead, the second plate comprising a plurality of second grooves.

4. The linear drive assembly of claim 1, further comprising:
a first retainer plate and a second retainer plate, each retainer plate engaging the wrist pin.

5. The linear drive assembly of claim 4, in which the plurality of linking elements in the connecting rod are situated between the first and second retainer plates.

6. The linear drive assembly of claim 4, further comprising a threaded pin, in which the threaded pin is disposed through the first retainer plate and joined to the wrist pin.

7. The linear drive assembly of claim 1, in which the crosshead comprises an outer surface having a groove formed therein; in which the plate further comprises a flange that is situated within the groove.

8. The linear drive assembly of claim 1, in which the wrist pin comprises a first end and an opposed second end, in which both the first and second ends of the wrist pin extend from the bore of the crosshead.

9. A power end assembly comprising a crosshead section, in which the crosshead section comprises a plurality of the linear drive assemblies of claim 1, each linear drive assembly attached to a crankshaft.

10. A pump, comprising:
the power end assembly of claim 9; and
a fluid end assembly attached to the power end assembly by a plurality of stay rods.

11. The pump of claim 10, further comprising:
a plurality of stay rod sleeves, each stay rod sleeve configured to receive a corresponding one of the plurality of stay rods.

12. The linear drive assembly of claim 1, in which the second end of the connecting rod comprises a recess, in which the crosshead is at least partially situated within the recess.

13. The linear drive assembly of claim 1, further comprising a pony rod attached to the crosshead.

14. The linear drive assembly of claim 1, in which the crosshead further comprises upper and lower ends each having a convex shape.

15. The linear drive assembly of claim 1, further comprising:
a bearing situated within the first end of the connecting rod, the bearing made of two semi-cylindrical components.

16. The linear drive assembly of claim 15, in which the bearing comprises an inner surface having a lubricant channel formed therein.

17. A linear drive assembly, comprising:
a crosshead configured to reciprocate within a guide, the crosshead comprising a bore formed therein;
a connecting rod, comprising:
a first end;
a second end comprising a plurality of linking elements, in which each linking element comprises an opening that is aligned with the bore of the crosshead; and
a body interconnecting the first end and the second end;
a wrist pin situated within the bore and each opening of the plurality of linking elements;
a plate attached to the crosshead, the plate comprising a plurality of grooves formed therein; and
a cylindrical bearing situated within the bore of the crosshead, the bearing having a central opening formed therein; in which the wrist pin is situated within the central opening of the bearing.

18. The linear drive assembly of claim 17, further comprising:
a first pad and a second pad configured to retain the bearing within the bore of the crosshead; in which the first and second pads are secured to the crosshead by a plurality of fasteners.

19. The linear drive assembly of claim 18, in which the bearing is situated intermediate the first and second pads.

20. A linear drive assembly, comprising:
a crosshead configured to reciprocate within a guide, the crosshead comprising a bore formed therein;
a connecting rod, comprising:
a first end;
a second end comprising a plurality of linking elements, in which each linking element comprises an opening that is aligned with the bore of the crosshead; and
a body interconnecting the first end and the second end;
a wrist pin situated within the bore and each opening of the plurality of linking elements;
a plate attached to the crosshead, the plate comprising a plurality of grooves formed therein; and
a bearing situated within the first end of the connecting rod, the bearing made of two semi-cylindrical components;
in which the bearing is formed from a softer material than the connecting rod.

\* \* \* \* \*